US 12,393,066 B2

United States Patent
Robinson et al.

(10) Patent No.: US 12,393,066 B2
(45) Date of Patent: Aug. 19, 2025

(54) PRIVACY DISPLAYS

(71) Applicant: RealD Spark, LLC, Boulder, CO (US)

(72) Inventors: Michael G Robinson, Boulder, CO (US); Graham J. Woodgate, Henley-on-Thames (GB); Jonathan Harrold, Leamington Spa (GB); Ben Ihas, Boulder, CO (US)

(73) Assignee: REALD SPARK, LLC, Boulder, CO (US)

( * ) Notice: Subject to any disclaimer, the term of this patent is extended or adjusted under 35 U.S.C. 154(b) by 0 days.

(21) Appl. No.: 18/792,135

(22) Filed: Aug. 1, 2024

(65) Prior Publication Data

US 2025/0044624 A1  Feb. 6, 2025

Related U.S. Application Data

(60) Provisional application No. 63/645,839, filed on May 10, 2024, provisional application No. 63/627,998, (Continued)

(51) Int. Cl.
*G02F 1/13* (2006.01)
*G02F 1/1335* (2006.01)
(Continued)

(52) U.S. Cl.
CPC ...... *G02F 1/1323* (2013.01); *G02F 1/133531* (2021.01); *G02F 1/133536* (2013.01); *G02F 1/133638* (2021.01); *G02F 1/133738* (2021.01); *G02F 1/133742* (2021.01); *G02F 1/133746* (2021.01); *G02F 1/134363* (2013.01)

(58) Field of Classification Search
CPC ............ G02F 1/1323; G02F 1/133531; G02F 1/133536; G02F 1/133638; G02F 1/133738; G02F 1/133742; G02F 1/133746; G02F 1/134363; G02F 1/13471
See application file for complete search history.

(56) References Cited

U.S. PATENT DOCUMENTS 3,914,022 A   10/1975   Kashnow
4,059,916 A   11/1977   Tachihara et al.
(Continued)

FOREIGN PATENT DOCUMENTS

CA   2222313 A1   6/1998
CN   1125943 C    10/2003
(Continued)

OTHER PUBLICATIONS

JP2021-518864 Non-Final Notice of Reasons for Rejection dated Oct. 24, 2023.
(Continued)

*Primary Examiner* — Donald L Raleigh
(74) *Attorney, Agent, or Firm* — Foley & Lardner LLP

(57) ABSTRACT

A switchable privacy display device comprises a spatial light modulator comprising an in-plane display polariser, an out-of-plane polariser and a polarisation switch arranged between the in-plane display polariser and the out-of-plane polariser. The display achieves high image visibility to an off-axis user in a wide-angle mode and high image security to an off-axis snooper in privacy mode of operation.

49 Claims, 65 Drawing Sheets

Related U.S. Application Data filed on Feb. 1, 2024, provisional application No. 63/530,643, filed on Aug. 3, 2023.

(51) Int. Cl.
*G02F 1/13363* (2006.01)
*G02F 1/1337* (2006.01)
*G02F 1/1343* (2006.01)

(56) References Cited

U.S. PATENT DOCUMENTS

| | | |
|---|---|---|
| 4,586,790 A | 5/1986 | Umeda et al. |
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,579,139 A | 11/1996 | Abileah et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,726,729 A | 3/1998 | Takei |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,852,509 A | 12/1998 | Coleman |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 6,752,505 B2 | 6/2004 | Parker et al. |
| 6,987,550 B2 | 1/2006 | Takato et al. |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,228,476 B2 | 7/2012 | Shibazaki |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 9,798,169 B2 | 10/2017 | Su et al. |
| 9,939,675 B2 | 4/2018 | Peng et al. |
| 10,054,732 B2 | 8/2018 | Robinson et al. |
| 10,067,726 B2 | 9/2018 | Wakamoto et al. |
| 10,126,575 B1 | 11/2018 | Robinson et al. |
| 10,146,093 B2 | 12/2018 | Sakai et al. |
| 10,216,018 B2 | 2/2019 | Fang et al. |
| 10,288,914 B2 | 5/2019 | Chung et al. |
| 10,303,030 B2 | 5/2019 | Robinson et al. |
| 10,401,638 B2 | 9/2019 | Robinson et al. |
| 10,424,232 B2 | 9/2019 | Schubert et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,802,356 B2 | 10/2020 | Harrold et al. |
| 10,935,714 B2 | 3/2021 | Woodgate et al. |
| 10,948,648 B2 | 3/2021 | Ihas et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 11,079,645 B2 | 8/2021 | Harrold et al. |
| 11,079,646 B2 | 8/2021 | Robinson et al. |
| 11,092,851 B2 | 8/2021 | Robinson et al. |
| 11,092,852 B2 | 8/2021 | Robinson et al. |
| 11,099,433 B2 | 8/2021 | Robinson et al. |
| 11,099,447 B2 | 8/2021 | Woodgate et al. |
| 11,099,448 B2 | 8/2021 | Woodgate et al. |
| 11,237,417 B2 | 2/2022 | Woodgate et al. |
| 11,327,358 B2 | 5/2022 | Robinson et al. |
| 11,340,482 B2 | 5/2022 | Robinson et al. |
| 11,366,358 B2 | 6/2022 | Wu et al. |
| 11,442,316 B2 | 9/2022 | Woodgate et al. |
| 11,573,437 B2 | 2/2023 | Woodgate et al. |
| 11,892,717 B2 | 2/2024 | Harrold et al. |
| 11,977,286 B2 | 5/2024 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0140342 A1 | 10/2002 | Sundahl |
| 2002/0163790 A1 | 11/2002 | Yamashita et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0169499 A1 | 9/2003 | Bourdelais et al. |
| 2003/0214615 A1 | 11/2003 | Colgan et al. |
| 2003/0222857 A1 | 12/2003 | Abileah |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0223094 A1 | 11/2004 | Hamada et al. |
| 2004/0240777 A1 | 12/2004 | Woodgate et al. |
| 2004/0246418 A1 | 12/2004 | Kumagai et al. |
| 2004/0264910 A1 | 12/2004 | Suzuki et al. |
| 2005/0002174 A1 | 1/2005 | Min et al. |
| 2005/0014913 A1 | 1/2005 | Kim et al. |
| 2005/0041311 A1 | 2/2005 | Mi et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0206814 A1 | 9/2005 | Histake |
| 2005/0213348 A1 | 9/2005 | Parikka et al. |
| 2005/0219693 A1 | 10/2005 | Hartkop et al. |

(56) References Cited

U.S. PATENT DOCUMENTS

| | | |
|---|---|---|
| 2005/0243265 A1 | 11/2005 | Winlow et al. |
| 2005/0259193 A1 | 11/2005 | Sumiyoshi et al. |
| 2005/0259205 A1 | 11/2005 | Sharp et al. |
| 2005/0270798 A1 | 12/2005 | Lee et al. |
| 2006/0050209 A1 | 3/2006 | Higa |
| 2006/0066785 A1 | 3/2006 | Moriya |
| 2006/0082702 A1 | 4/2006 | Jacobs et al. |
| 2006/0092512 A1 | 5/2006 | Shioya |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262376 A1 | 11/2006 | Mather et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0024970 A1 | 2/2007 | Lub et al. |
| 2007/0030240 A1 | 2/2007 | Sumiyoshi et al. |
| 2007/0035964 A1 | 2/2007 | Olczak |
| 2007/0040780 A1 | 2/2007 | Gass et al. |
| 2007/0047254 A1 | 3/2007 | Schardt et al. |
| 2007/0064163 A1 | 3/2007 | Tan et al. |
| 2007/0076406 A1 | 4/2007 | Kodama et al. |
| 2007/0139772 A1 | 6/2007 | Wang |
| 2007/0147088 A1 | 6/2007 | Chien et al. |
| 2007/0223251 A1 | 9/2007 | Liao |
| 2007/0268427 A1 | 11/2007 | Uehara |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0106689 A1 | 5/2008 | Inoue et al. |
| 2008/0117364 A1 | 5/2008 | Matsushima |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2008/0316366 A1 | 12/2008 | Takatani et al. |
| 2009/0009894 A1 | 1/2009 | Chuang |
| 2009/0021657 A1 | 1/2009 | Yang et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109381 A1 | 4/2009 | Haruyama |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213147 A1 | 8/2009 | Sagardoyburu et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0014313 A1 | 1/2010 | Tillin et al. |
| 2010/0066960 A1 | 3/2010 | Smith et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1 | 7/2010 | Hsu et al. |
| 2010/0205667 A1 | 8/2010 | Anderson et al. |
| 2010/0214324 A1 | 8/2010 | Broughton et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0309204 A1 | 12/2010 | Smith et al. |
| 2010/0328438 A1 | 12/2010 | Ohyama et al. |
| 2011/0018860 A1 | 1/2011 | Parry-Jones et al. |
| 2011/0032437 A1 | 2/2011 | Yoshimi et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1 | 1/2012 | Chang |
| 2012/0086875 A1 | 4/2012 | Yokota |
| 2012/0086893 A1 | 4/2012 | Ou et al. |
| 2012/0113158 A1 | 5/2012 | Goto et al. |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1 | 7/2012 | Fan et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0050610 A1 | 2/2013 | Parry-Jones et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0120817 A1 | 5/2013 | Yoon et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308185 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0313464 A1 | 10/2014 | Li et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0029449 A1 | 1/2015 | Woo et al. |
| 2015/0035872 A1 | 2/2015 | Shima et al. |
| 2015/0055366 A1 | 2/2015 | Chang et al. |
| 2015/0088284 A1 | 3/2015 | Hendricks et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |

(56) References Cited

U.S. PATENT DOCUMENTS

| | | |
|---|---|---|
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0293409 A1 | 10/2015 | Usukura et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0154458 A1 | 6/2016 | Liu et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0291358 A1 | 10/2016 | Kikuchi et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0023725 A1 | 1/2017 | Oki et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0210253 A1 | 7/2018 | Kashima |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0056628 A1 | 2/2019 | Inokuchi |
| 2019/0086706 A1 | 3/2019 | Robinson et al. |
| 2019/0121173 A1 | 4/2019 | Robinson et al. |
| 2019/0146134 A1 | 5/2019 | Miura et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0331944 A1 | 10/2019 | Fang et al. |
| 2019/0339433 A1 | 11/2019 | Benoit et al. |
| 2019/0353944 A1 | 11/2019 | Acreman et al. |
| 2019/0361165 A1 | 11/2019 | Chang et al. |
| 2020/0019006 A1 | 1/2020 | Robinson et al. |
| 2020/0026114 A1 | 1/2020 | Harrold et al. |
| 2020/0026125 A1 | 1/2020 | Robinson et al. |
| 2020/0041839 A1 | 2/2020 | Robinson et al. |
| 2020/0110301 A1 | 4/2020 | Harrold et al. |
| 2020/0132904 A1 | 4/2020 | Smith et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2020/0409156 A1 | 12/2020 | Sissom et al. |
| 2021/0018773 A1 | 1/2021 | Woodgate et al. |
| 2021/0033898 A1 | 2/2021 | Woodgate et al. |
| 2021/0072448 A1 | 3/2021 | Peng et al. |
| 2021/0116627 A1 | 4/2021 | Tsuji |
| 2021/0149233 A1* | 5/2021 | Robinson ............. G02B 6/0076 |
| 2021/0149234 A1 | 5/2021 | Woodgate et al. |
| 2021/0271121 A1 | 9/2021 | Woodgate et al. |
| 2021/0333577 A1 | 10/2021 | Robinson et al. |
| 2021/0333580 A1 | 10/2021 | Matsushima |
| 2021/0341769 A1 | 11/2021 | Woodgate et al. |
| 2021/0373382 A1 | 12/2021 | Sakai et al. |
| 2022/0269128 A1 | 8/2022 | Matsushima |
| 2022/0404540 A1 | 12/2022 | Robinson et al. |
| 2022/0413338 A1 | 12/2022 | Matsushima et al. |
| 2023/0099000 A1 | 3/2023 | Harrold et al. |
| 2023/0254457 A1 | 8/2023 | Robinson et al. |
| 2023/0375863 A1 | 11/2023 | Woodgate et al. |

FOREIGN PATENT DOCUMENTS

| | | |
|---|---|---|
| CN | 1690800 A | 11/2005 |
| CN | 1776484 A | 5/2006 |
| CN | 101042449 A | 9/2007 |
| CN | 101256251 A | 9/2008 |
| CN | 101435952 A | 5/2009 |
| CN | 101454712 A | 6/2009 |
| CN | 101518095 A | 8/2009 |
| CN | 101681061 A | 3/2010 |
| CN | 102540544 A | 7/2012 |
| CN | 103109226 A | 5/2013 |
| CN | 103473494 A | 12/2013 |
| CN | 103688211 A | 3/2014 |
| CN | 103988121 A | 8/2014 |
| CN | 104133292 A | 11/2014 |
| CN | 104303085 A | 1/2015 |
| CN | 104321686 A | 1/2015 |
| CN | 104380177 A | 2/2015 |
| CN | 104597661 A | 5/2015 |
| CN | 204740413 U | 11/2015 |
| CN | 105842909 A | 8/2016 |
| CN | 105960609 A | 9/2016 |
| CN | 106104372 A | 11/2016 |
| CN | 106415342 A | 2/2017 |
| CN | 106557711 A | 4/2017 |
| CN | 107102460 A | 8/2017 |
| CN | 209171779 U | 7/2019 |
| EP | 1326102 A1 | 7/2003 |
| EP | 1060344 B1 | 5/2004 |
| EP | 1956423 A1 | 8/2008 |
| EP | 2037318 A1 | 3/2009 |

(56) References Cited

FOREIGN PATENT DOCUMENTS

| | | |
|---|---|---|
| GB | 2405542 A | 3/2005 |
| GB | 2415850 A | 1/2006 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |
| JP | H09197405 A | 7/1997 |
| JP | H10268251 A | 10/1998 |
| JP | H11174489 A | 7/1999 |
| JP | 2005316470 A | 11/2005 |
| JP | 2005345799 A | 12/2005 |
| JP | 2006139160 A | 6/2006 |
| JP | 2006201326 A | 8/2006 |
| JP | 2006330164 A | 12/2006 |
| JP | 2007501966 A | 2/2007 |
| JP | 2007148279 A | 6/2007 |
| JP | 2007273288 A | 10/2007 |
| JP | 2008310271 A | 12/2008 |
| JP | 2009020293 A | 1/2009 |
| JP | 2011095719 A | 5/2011 |
| JP | 2011103241 A | 5/2011 |
| JP | 2013160818 A | 8/2013 |
| JP | 2014032953 A | 2/2014 |
| JP | 2014099363 A | 5/2014 |
| KR | 20090106062 A | 10/2009 |
| KR | 20090108231 A | 10/2009 |
| KR | 20120011228 A | 2/2012 |
| KR | 101227145 B1 | 2/2013 |
| KR | 20130046116 A | 5/2013 |
| KR | 1020150021937 A | 3/2015 |
| KR | 20160053264 A | 5/2016 |
| KR | 1020170013915 A | 2/2017 |
| KR | 1020170019006 A | 2/2017 |
| KR | 1020170040565 A | 4/2017 |
| KR | 101990286 B1 | 6/2019 |
| TW | M537663 U | 3/2017 |
| TW | I612360 B | 1/2018 |
| WO | 2005071449 A2 | 8/2005 |
| WO | 2005071474 A2 | 8/2005 |
| WO | 2006030702 A1 | 3/2006 |
| WO | 2008001896 A1 | 1/2008 |
| WO | 2008078764 A1 | 7/2008 |
| WO | 2008093445 A1 | 8/2008 |
| WO | 2009008406 A1 | 1/2009 |
| WO | 2009011199 A1 | 1/2009 |
| WO | 2010021926 A2 | 2/2010 |
| WO | 2010101141 A1 | 9/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2017065745 A1 | 4/2017 |
| WO | 2017117570 A1 | 7/2017 |
| WO | 2018003380 A1 | 1/2018 |
| WO | 2018035492 A1 | 2/2018 |
| WO | 2018178790 A1 | 10/2018 |
| WO | 2018208618 A1 | 11/2018 |
| WO | 2018221413 A1 | 12/2018 |
| WO | 2019055755 A1 | 3/2019 |
| WO | 2019067846 A1 | 4/2019 |
| WO | 2019090252 A1 | 5/2019 |
| WO | 2019147762 A1 | 8/2019 |
| WO | 2021003383 A1 | 1/2021 |

OTHER PUBLICATIONS

JP2022-506340 Non-Final Notice of Reasons for Rejection dated Mar. 19, 2024.
JP2022-526302 Non-Final Notice of Reasons for Rejection dated Apr. 30, 2024.
Kalantar, et al. "Backlight Unit With Double Surface Light Emission," J. Soc. Inf. Display, vol. 12, Issue 4, pp. 379-387 (Dec. 2004).
KR10-2020-7010753 Notice of Preliminary Rejection mailed Feb. 17, 2023.
KR10-2020-7024291 Notice of Preliminary Rejection mailed Jun. 13, 2024.
KR10-2020-7024293 Notice of Preliminary Rejection mailed Dec. 7, 2023.
Nelkon et al., "Advanced Level Physics", Third edition with SI units, Heinemann Educational Books Ltd, London, 1970.
PCT/US2016/058695 International search report and written opinion of the international searching authority mailed Feb. 28, 2017.
PCT/US2017/032734 International search report and written opinion of the international searching authority mailed Jul. 27, 2017.
PCT/US2018/031206 International search report and written opinion of the international searching authority mailed Jul. 20, 2018.
PCT/US2018/031218 International search report and written opinion of the international searching authority mailed Jul. 19, 2018.
PCT/US2018/051021 International search report and written opinion of the international searching authority mailed Nov. 21, 2018.
PCT/US2018/051027 International search report and written opinion of the international searching authority mailed Nov. 30, 2018.
PCT/US2018/053328 International search report and written opinion of the international searching authority mailed Nov. 30, 2018.
PCT/US2018/059249 International search report and written opinion of the international searching authority mailed Jan. 3, 2019.
PCT/US2018/059256 International search report and written opinion of the international searching authority mailed Jan. 3, 2019.
PCT/US2019/014889 International search report and written opinion of the international searching authority mailed May 24, 2019.
PCT/US2019/014902 International search report and written opinion of the international searching authority mailed Jun. 25, 2019.
PCT/US2019/023659 International search report and written opinion of the international searching authority mailed Jun. 10, 2019.
PCT/US2019/038409 International search report and written opinion of the international searching authority mailed Sep. 19, 2019.
PCT/US2019/038466 International search report and written opinion of the international searching authority mailed Nov. 5, 2019.
PCT/US2019/042027 International search report and written opinion of the international searching authority mailed Oct. 15, 2019.
PCT/US2019/054291 International search report and written opinion of the international searching authority mailed Jan. 6, 2020.
PCT/US2019/059990 International search report and written opinion of the international searching authority mailed Feb. 28, 2020.
PCT/US2019/066208 International search report and written opinion of the international searching authority mailed Feb. 27, 2020.
PCT/US2020/017537 International search report and written opinion of the international searching authority mailed Apr. 29, 2020.
PCT/US2020/040686 International search report and written opinion of the international searching authority mailed Nov. 20, 2020.
PCT/US2020/044574 International search report and written opinion of the international searching authority mailed Oct. 21, 2020.
PCT/US2020/053863 International search report and written opinion of the international searching authority mailed Mar. 12, 2021.
PCT/US2020/060155 International search report and written opinion of the international searching authority mailed Feb. 5, 2021.
PCT/US2020/060191 International search report and written opinion of the international searching authority mailed Feb. 8, 2021.
PCT/US2020/063638 International search report and written opinion of the international searching authority mailed Mar. 2, 2021.
PCT/US2020/064633 International search report and written opinion of the international searching authority mailed Mar. 15, 2021.
PCT/US2021/029937 International search report and written opinion of the international searching authority mailed Aug. 6, 2021.
PCT/US2021/029944 International search report and written opinion of the international searching authority mailed Aug. 3, 2021.

(56) References Cited

OTHER PUBLICATIONS

PCT/US2021/029947 International search report and written opinion of the international searching authority mailed Aug. 10, 2021.
PCT/US2021/029954 International search report and written opinion of the international searching authority mailed Aug. 10, 2021.
PCT/US2021/029958 International search report and written opinion of the international searching authority mailed Aug. 10, 2021.
PCT/US2021/043435 International search report and written opinion of the international searching authority mailed Nov. 1, 2021.
PCT/US2021/043444 International search report and written opinion of the international searching authority mailed Nov. 1, 2021.
PCT/US2022/045030 International search report and written opinion of the international searching authority mailed Jan. 3, 2023.
PCT/US2023/012240 International search report and written opinion of the international searching authority mailed Apr. 27, 2023.
PCT/US2023/012243 International search report and written opinion of the international searching authority mailed May 10, 2023.
PCT/US2023/017639 International search report and written opinion of the international searching authority mailed Jul. 6, 2023.
PCT/US2024/020519 International search report and written opinion of the international searching authority mailed Jun. 17, 2024.
PCT/US2024/025836 International search report and written opinion of the international searching authority mailed Jul. 23, 2024.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks for Large-Scale Image Recognition", ICLR 2015.
TW107132221 First Office Action dated Apr. 28, 2022.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
Cheng, et al., "Fast-Response Liquid Crystal Variable Optical Retarder and Multilevel Attenuator," Optical Engineering 52 (10), 107105 (Oct. 16, 2013). (Year: 2013).
Chiu, et al, "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.
CN201680061632.6 Notification of the First Office Action dated Sep. 14, 2021.
CN201780030715.3 Notification of the First Office Action dated Jan. 21, 2020.
CN201880042320.X Notification of the First Office Action dated May 25, 2021.
CN-201880042320.X Notification of the Third Office Action from the Chinese Patent Office dated Dec. 30, 2022.
CN201880073578.6 Notification of the First Office Action dated Aug. 27, 2021.
CN-201980020303.0—Notification of the First Office Action dated Dec. 16, 2021.
CN201980030279.9 Notification of the First Office Action dated Mar. 29, 2022.
CN201980056000.4 Notification of the First Office Action dated Nov. 1, 2023.
CN201980056022.0 Notification of the First Office Action dated Oct. 23, 2023.
CN201980056022.0 Notification of the Second Office Action dated Jul. 26, 2024.
CN-201980082757.0 Notification of the 1st Office Action of the Chinese Patent Office mailed Dec. 5, 2022.
CN202080020818.3 Notification of the First Office Action dated Oct. 23, 2023.
CN202080059812.7 Notification of the First Office Action dated Oct. 19, 2023.
CN202080079843.9 Notification of the First Office Action dated Jul. 18, 2024.
CN202080089170.5 Notification of the First Office Action dated Apr. 7, 2024.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
EP19771688.9 Notification of the First Office Action dated Mar. 6, 2023.
EP-19825448.4 Extended European Search Report of European Patent Office dated Mar. 10, 2022.
EP-19881483.2 Extended European Search Report of European Patent Office dated Aug. 5, 2022.
EP-20754927.0 Extended European Search Report of European Patent Office dated Sep. 19, 2022.
EP-20835231.0 Extended European Search Report of European Patent Office dated May 15, 2023.
EP-20851155.0 Extended European Search Report of European Patent Office dated Aug. 2, 2023.
EP-20872625.7 Extended European Search Report of European Patent Office dated Sep. 20, 2023.
EP-20887527.8 Extended European Search Report of European Patent Office dated Nov. 20, 2023.
EP-20887756.3 Extended European Search Report of European Patent Office dated Jan. 2, 2024.
EP-20898295.9 Extended European Search Report of European Patent Office dated Jan. 22, 2024.
EP21795524.4 Extended European Search Report of European Patent Office dated Apr. 26, 2024.
EP21796016.0 Extended European Search Report of European Patent Office dated Apr. 29, 2024.
EP21849510.9 Extended European Search Report of European Patent Office dated Jun. 19, 2024.
EP21849888.9 Extended European Search Report of European Patent Office dated Jul. 1, 2024.
EP23218625.4 Extended European Search Report of European Patent Office dated Feb. 23, 2024.
Gass, et al. "Privacy LCD Technology for Cellular Phones", Sharp Laboratories of Europe Ltd, Mobile LCD Group, Feb. 2007, pp. 45-49.
Heber, "Switchable View Control using a Vertically Aligned Polarizer and Polarization Control", 31-2, siOPTICA GmbH, SID 2024 Digest, Jena, Germany, ISSN 0097-996X/24/5501, pp. 398-401.
IN202017035853 Hearing Notice dated Jan. 3, 2024.
Ishikawa, T., "New Design for a Highly Collimating Turning Film", SID 06 Digest, pp. 514-517.
JP2019-561773 Non-Final Notice of Reasons for Rejection dated Mar. 22, 2022.
JP2020-509511 Non-Final Notice of Reasons for Rejection dated Jul. 19, 2022.
JP2020-540724 Non-Final Notice of Reasons for Rejection dated Jan. 4, 2023.
JP-2020-540797 Non-Final Notice of Reasons for Rejection from the Japan Patent Office mailed Dec. 6, 2022.
JP2020-550747 Non-Final Notice of Reasons for Rejection dated Mar. 29, 2023.
TW108140291 First Office Action dated Nov. 9, 2023.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
EP20835231.0 Notification of the First Office Action dated Nov. 27, 2024.

(56) References Cited

OTHER PUBLICATIONS

KR10-2022-7019753 Notice of Preliminary Rejection mailed Oct. 30, 2024.

\* cited by examiner

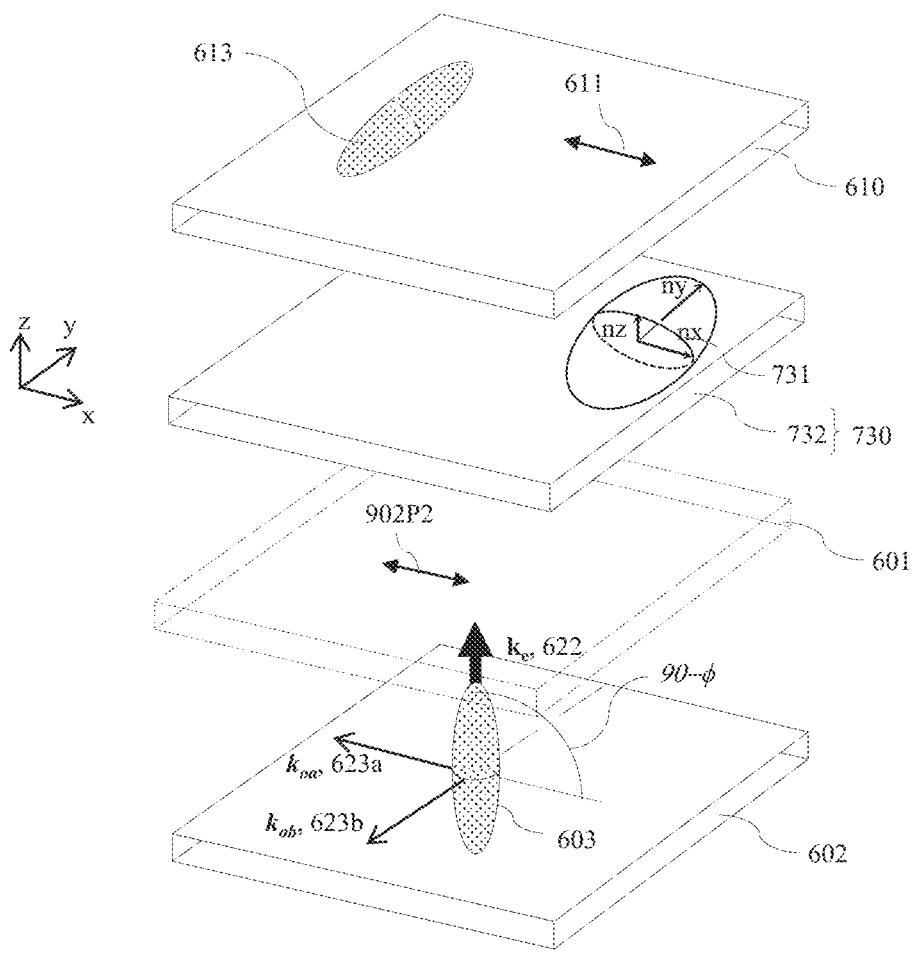
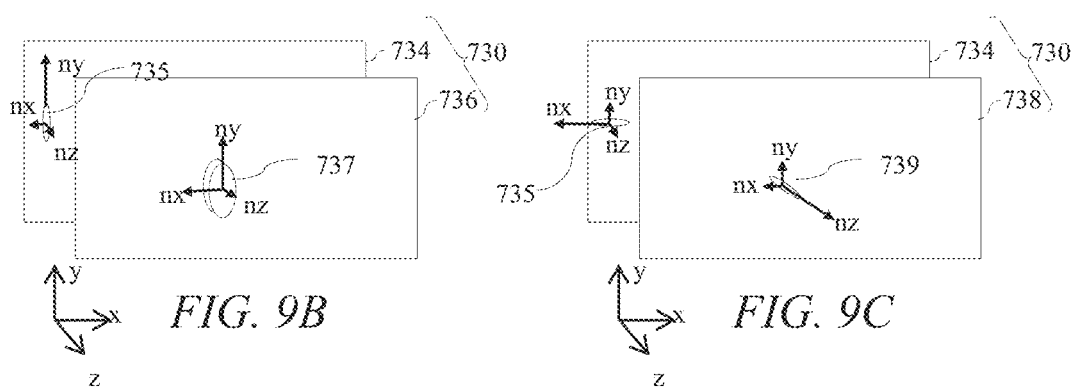
FIG. 9A
FIG. 9B    FIG. 9C

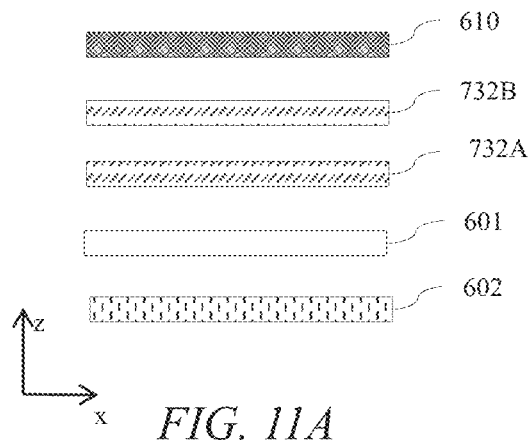
*FIG. 11A*
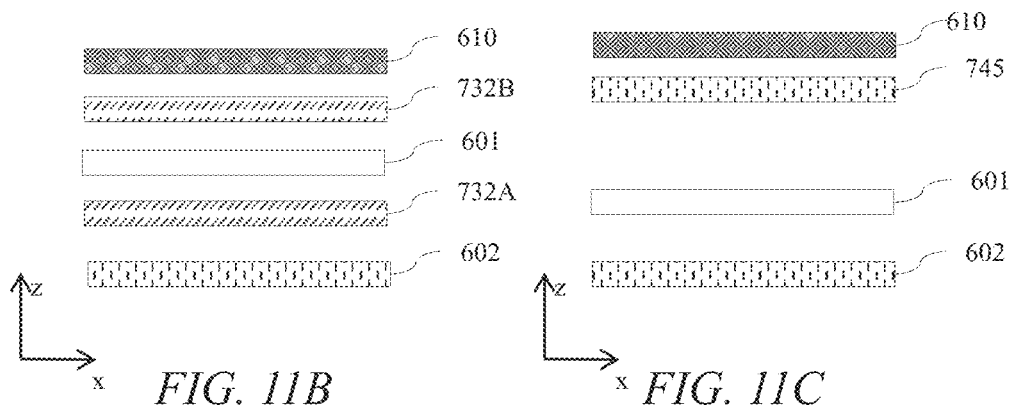
*FIG. 11B*  *FIG. 11C*
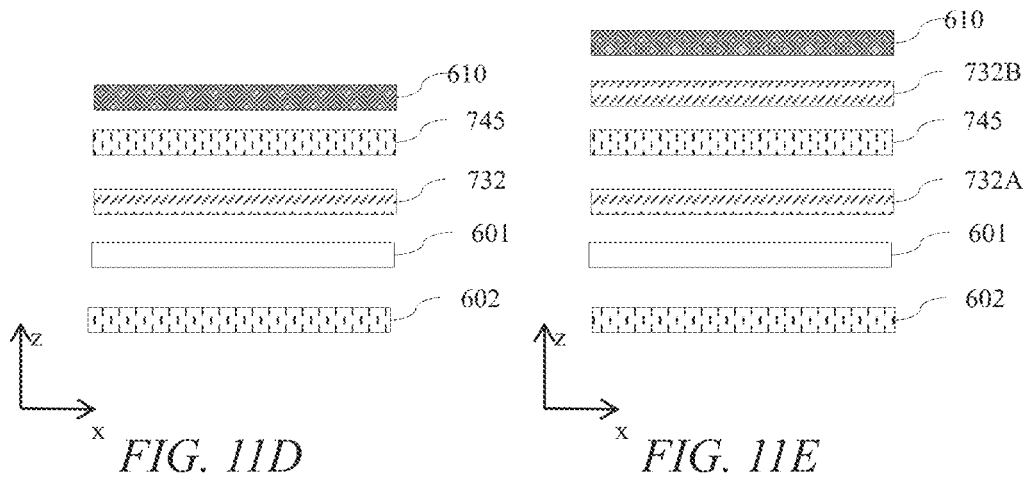
*FIG. 11D*  *FIG. 11E*

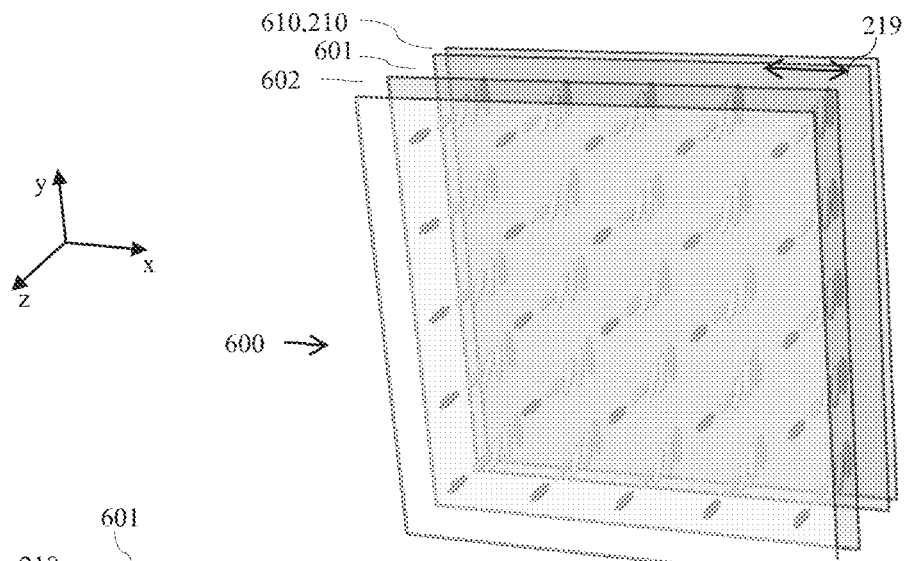
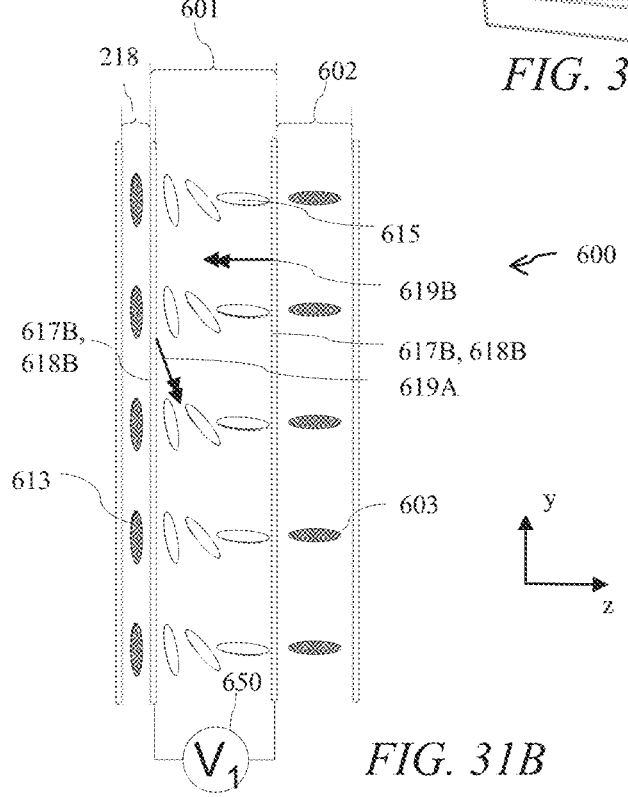
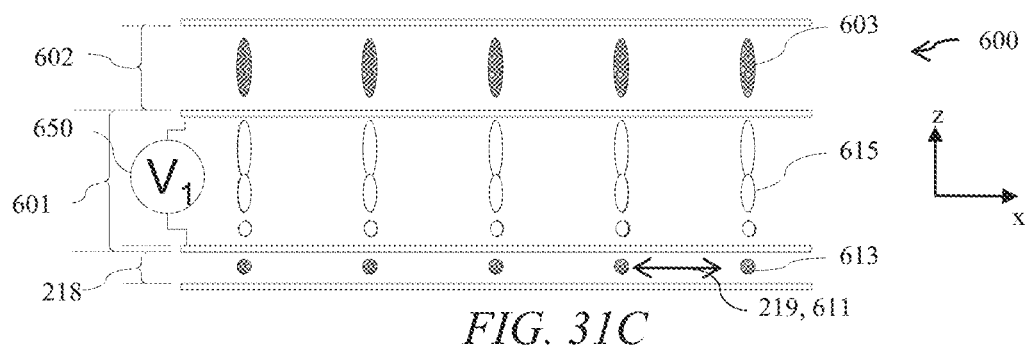
FIG. 31A
FIG. 31B
FIG. 31C

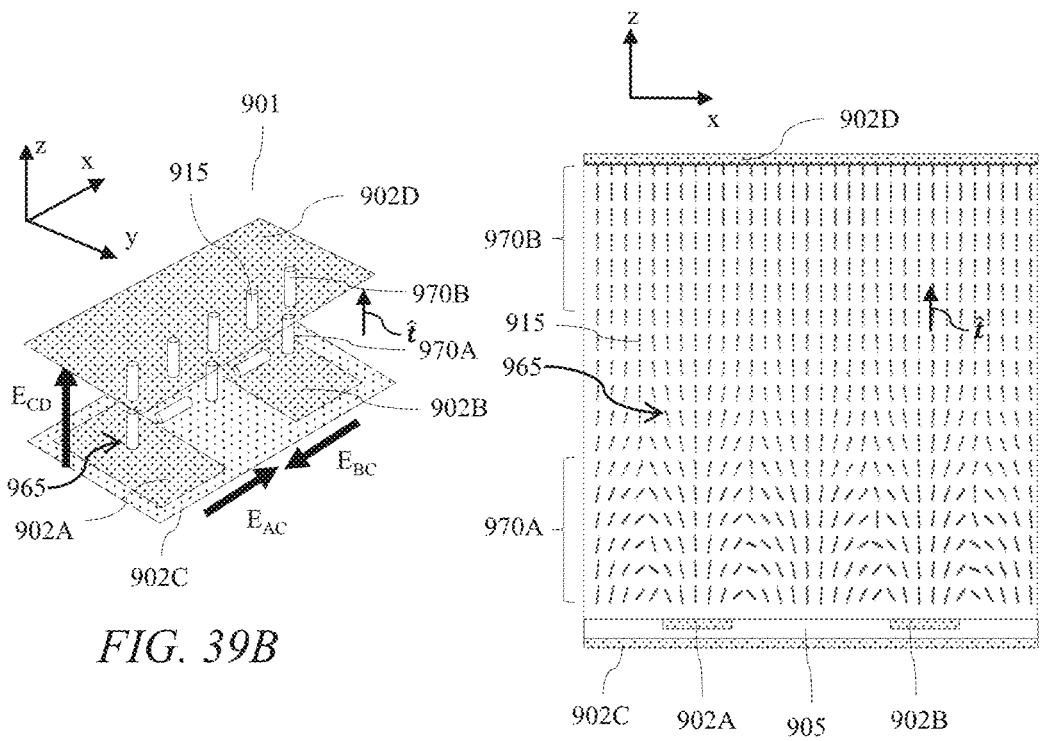
FIG. 39B
FIG. 39C
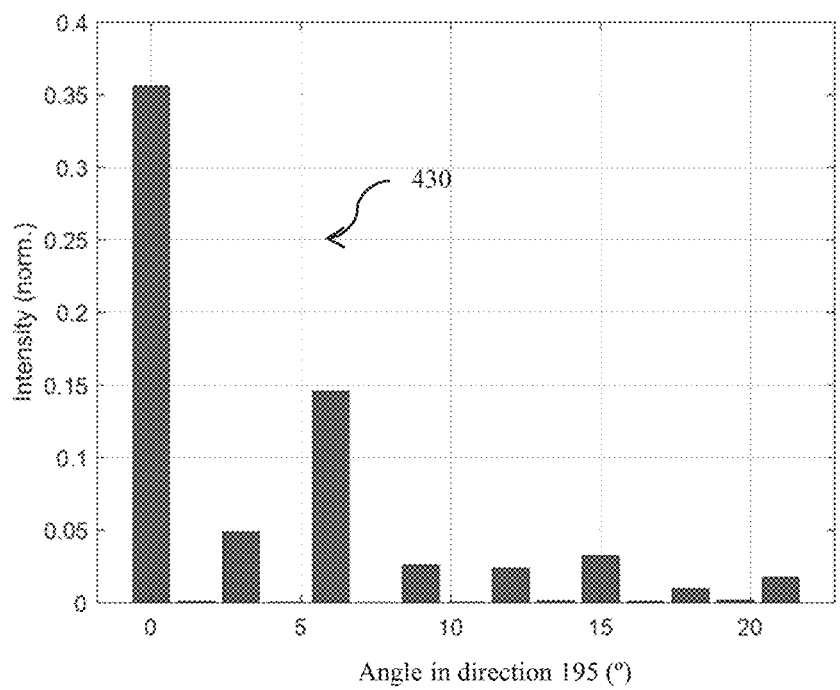
FIG. 39D

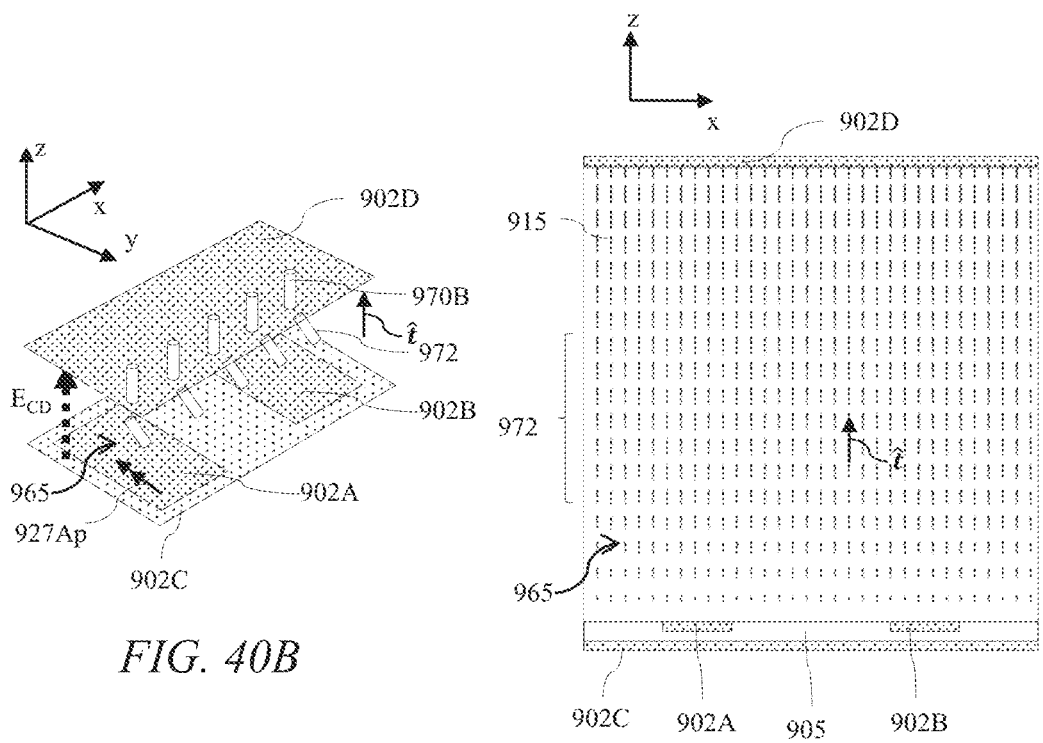
FIG. 40B
FIG. 40C
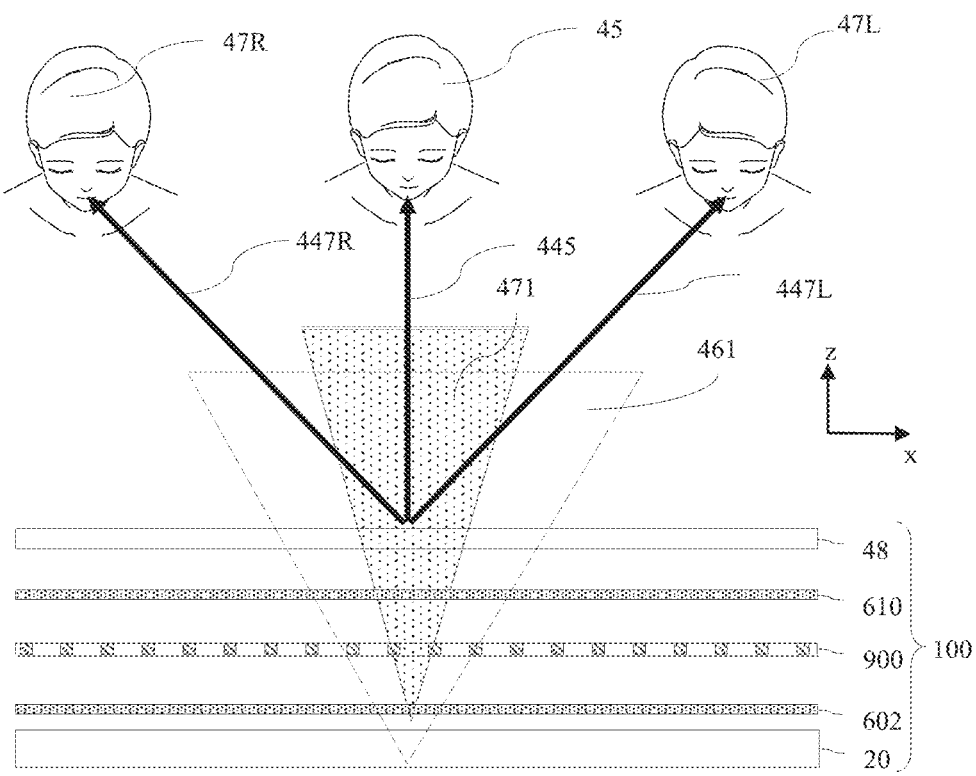
FIG. 40D

PRIVACY DISPLAYS

TECHNICAL FIELD

This disclosure generally relates to optical stacks for use in privacy display and low stray light displays.

BACKGROUND

Privacy displays provide image visibility to a primary user that is typically in an on-axis position and reduced visibility of image content to a snooper, that is typically in an off-axis position.

Switchable privacy displays may be provided by control of the off-axis optical output.

Control of off-axis privacy may be provided by means of contrast reduction, for example by adjusting the liquid crystal bias tilt in an In-Plane-Switching LCD.

Control may be further provided by means of off-axis luminance reduction. Luminance reduction may be achieved by means of switchable backlights for a liquid crystal display (LCD) spatial light modulator. Off-axis luminance reduction may also be provided by switchable liquid crystal retarders and compensation retarders arranged to modulate the input and/or output directional luminance profile of a spatial light modulator.

Control may be further provided by means of off-axis reflectivity increase. Reflectivity increase may be achieved by means of switchable liquid crystal retarders, compensation retarders that are arranged to control the polarisation of ambient light that falls onto a reflective polariser.

BRIEF SUMMARY

According to a first aspect of the present disclosure there is provided a polar angle control display device comprising: a spatial light modulator arranged to output light; an in-plane polariser having an absorption axis in a plane of the in-plane polariser arranged on a side of the spatial light modulator; and an out-of-plane polariser having an absorption axis in a direction having a component out of a plane of the out-of-plane polariser arranged on the same side of the spatial light modulator as the in-plane polariser.

A privacy display may be provided with high luminance in desirable viewing directions and reduced luminance in non-viewing directions. A low thickness and cost display may be provided.

The polar angle control display device may further comprise a polarisation switch provided between the in-plane polariser and the out-of-plane polariser, the polarisation switch being switchable between a first mode in which it may be arranged to change a polarisation state of the light passing therethrough and a second mode in which it may be arranged to affect the polarisation state of the light passing therethrough differently from the first mode. The privacy display may be switchable between a landscape privacy operating mode, a portrait privacy operating mode and a share mode of operation.

In the first mode, the polarisation switch may be arranged to change the polarisation state of the light passing therethrough from a first linear polarisation state to a second linear polarisation state that may be orthogonal to the first linear polarisation state. In the second mode, the polarisation switch may be arranged not to change the polarisation state of the light passing therethrough. The change of polarisation state may be provided with a wide field of view to achieve desirable off-axis luminance reduction.

The polarisation switch may comprise a switchable layer of liquid crystal material and at least one electrode arranged to switch the state of the liquid crystal material. A polarisation switch may be provided with low thickness and cost.

The polarisation switch may further comprise two surface alignment layers disposed adjacent to the liquid crystal material on opposite sides thereof and each arranged to provide alignment at the adjacent liquid crystal material. Advantageously a switchable layer of liquid crystal material may be provided.

One or both of the surface alignment layers may be arranged to provide homogeneous alignment in the adjacent liquid crystal material. Improved resilience to applied pressure may be achieved. One or both of the surface alignment layers may be arranged to provide homeotropic alignment in the adjacent liquid crystal material. Reduced colouration in at least one mode of operation may be achieved. One of the surface alignment layers may be arranged to provide homogeneous alignment in the adjacent liquid crystal material and the other of the surface alignment layers may be arranged to provide homeotropic alignment in the adjacent liquid crystal material. Increased size of polar region for desirable image security may be achieved.

Each of the surface alignment layers may have a pretilt having a pretilt direction with a component in the plane of the layer of liquid crystal material that may be parallel or anti-parallel or orthogonal to the electric vector transmission direction of the in-plane polariser. The luminance in the elevation direction may be substantially preserved in both wide-angle mode and privacy modes of operation. Luminance profiles that are symmetric about the lateral direction may be provided.

Each alignment layer may have a pretilt having a pretilt direction with a component in the plane of the layer of liquid crystal material and the components may be orthogonal. Colour variations with viewing angle in at least one mode of operation may be reduced.

The polarisation switch may further comprise at least one passive retarder. Advantageously increased reduction of transmission may be provided over an increased polar region.

The display device may further comprise a biaxial retarder arrangement arranged between the out-of-plane polariser and the in-plane polariser. The size of the angular region in privacy mode for which reduced transmission and increased security factor is achieved may be increased.

The biaxial retarder arrangement may comprise a B-plate. The B-plate may have principal components of refractive index nx, ny, nz and a thickness d, and wherein for light at a wavelength of 550 nm: the value of (nx−ny) d is in a range between −130 nm and −170 nm, the value of (nx−nz) d is in a range between +270 nm and +330 nm, and the value of a parameter Rth is in a range between +340 nm and +400 nm, wherein Rth=((nx+ny)/2−nz)d. A low thickness component may be provided that may be formed with low cost, for example by double stretching.

The biaxial retarder arrangement may comprise a C-plate arranged to receive the light output from an A-plate. For light at a wavelength of 550 nm the A-plate has a retardance in a range between +85 nm and +115 nm, and the C-plate may be a negative C-plate with a retardance in a range between −190 nm and −250 nm. The complexity of manufacture of the A-plate and negative C-plate retarders may be reduced, achieving reduced cost.

For light at a wavelength of 550 nm the A-plate has a retardance in a range between +85 nm and +115 nm, and the C-plate may be a positive C-plate with a retardance in a range between +220 nm and +280 nm. The thickness of the positive C-plate may be reduced.

Such ranges represent particularly beneficial or advantageous embodiments because the luminance in the viewing quadrants of the display device may be reduced in comparison to alternative combinations of values. In operation, the angular variation of output polarisation state of the out-of-plane polariser may be modified by the means of the biaxial retarder arrangement with said combination of values. The angular variation of output polarisation state of the biaxial retarder arrangement may achieve said reduction of luminance in viewing quadrants in narrow-angle or privacy mode. Image security factor in non-viewing directions may be increased.

The direction of the absorption axis of the out-of-plane polariser may be normal to the plane of the out-of-plane polariser. Advantageously a symmetric reduction about a plane of transmission profile may be achieved.

The direction of the absorption axis of the out-of-plane polariser may be inclined at an acute angle to the normal orthogonal to the plane of the out-of-plane polariser. Advantageously an asymmetric reduction about a plane of transmission profile may be achieved. A display suitable for use as a passenger infotainment display in a vehicle may be provided.

The direction of the absorption axis of the out-of-plane polariser may change monotonically along a predetermined axis across the display device. The display device may be curved with a concave curvature as viewed from an output side of the display device. Luminance uniformity to a user in a viewing direction and security factor uniformity in a non-viewing direction may be improved across the area of the display device. Aesthetic appearance may be improved.

Said side of the spatial light modulator may be an output side of the spatial light modulator and the spatial light modulator may comprise an output polariser. The output polariser may be the in-plane polariser. Advantageously thickness and cost may be reduced. The in-plane polariser may be a different component from the output polariser. Advantageously improved performance may be achieved.

The polar angle control display device may further comprise: an additional polariser arranged on the output side of the output polariser; and at least one polar control retarder arranged between the output polariser and the additional polariser. Advantageously increased security factor may be achieved in non-viewing directions. The additional polariser may be the in-plane polariser. Advantageously thickness and cost may be reduced. The polar angle control display device may further comprise a reflective polariser arranged on the output side of the output polariser, wherein the reflective polariser is the in-plane polariser. Advantageously improved image security may be achieved for a device illuminated by ambient light.

Said side of the spatial light modulator may be an input side of the spatial light modulator and the spatial light modulator may comprise an input polariser. Advantageously image blur may be reduced and image contrast may be increased.

The input polariser may be the in-plane polariser. Advantageously thickness and cost may be reduced. The in-plane polariser may be a different component from the input polariser. The polar angle control display device may further comprise: an additional polariser arranged on the input side of the input polariser; and at least one polar control retarder arranged between the input polariser and the additional polariser. The additional polariser may be the in-plane polariser. Advantageously increased security factor may be achieved in non-viewing directions.

The spatial light modulator may be a transmissive spatial light modulator. A backlight may be provided with directional output to achieve reduced off-axis luminance and improved security factor in non-viewing directions of the privacy mode of operation. Further polar control retarder optical elements and out-of-plane polarisers may be provided. Improved security factor may be achieved in non-viewing directions.

The spatial light modulator may be an emissive spatial light modulator and said side of the spatial light modulator may be an output side of the spatial light modulator. In comparison to a transmissive spatial light modulator, display thickness may be reduced.

The polar angle control display device may further comprise at least one polar control retarder arranged between the additional polariser and the display polariser, the at least one polar control retarder including a switchable liquid crystal retarder comprising a layer of liquid crystal material; and a transmissive electrode arrangement arranged to drive the layer of liquid crystal material, wherein the transmissive electrode arrangement is patterned to be capable of driving the layer of liquid crystal material into a structure of orientations providing relative phase shifts that vary spatially across an area of the layer of liquid crystal material so that the layer of liquid crystal material provides a diffractive effect.

In at least one mode of operation of a display device, wide-angle mode may be provided. The display device may provide a directional light cone and advantageously achieve high efficiency of operation. Light may be distributed from the directional light cone to a larger size light cone so that the display may be viewed with high image visibility from a wider range of viewing directions than provided by the directional light cone. Multiple viewers may advantageously see the displayed image simultaneously and comfortably. A thin, light-weight and low-cost display device may be provided.

The transmissive electrode arrangement may also be capable of driving the layer of liquid crystal material into a structure of orientations providing uniform phase shifts across the area of the layer of liquid crystal material so that the layer of liquid crystal material may provide no diffractive effect. A display device capable of switching between wide-angle and narrow-angle modes of operation may be provided. In at least one narrow-angle mode the display may be a privacy display that is arranged to provide a desirably high luminance and high image visibility to a primary display user along a viewing direction, and may advantageously be arranged to provide desirable security factor along a non-viewing direction such that image data on the display is not visible to image snoopers. In another narrow-angle mode, the display may provide high luminance with low power consumption to a primary user with reduced image visibility along the non-viewing direction. Advantageously image uniformity to the primary user may be improved.

The transmissive electrode arrangement may be patterned to be capable of driving the layer of liquid crystal material into a structure of orientations providing relative phase shifts that vary spatially in one direction across the area of the layer of liquid crystal material so that the layer of liquid crystal material may provide a diffractive effect in the one direction. The one direction may be in the lateral direction that may be a horizontal axis to enable horizontally spaced locations of viewers. The efficiency of operation in the wide-angle mode may advantageously be increased.

The transmissive electrode arrangement may comprise an array of separated electrodes. The separated electrodes may be manufactured by known manufacturing processes at low cost and complexity.

The array of separated electrodes may be arrayed in the one direction and the separated electrodes may extend across the area of the layer of liquid crystal material in the direction orthogonal to the one direction. The separated electrodes may have a common connection. The common connection may be formed by a bar located outside an area of the spatial light modulator. Electrical connections to the separated electrodes may be conveniently provided at low cost and complexity.

The array of separated electrodes may comprise two interdigitated sets of separated electrodes. Each set of separated electrodes may have a common connection. The common connection for each set of separated electrodes may be formed by a respective bar, the bars being located outside an area of the spatial light modulator on opposite sides of the layer of liquid crystal material. Further control of the structure of orientations of the layer of liquid crystal material may be provided to achieve alternative profiles of diffracted light. Asymmetric diffraction patterns may be provided to achieve improved control of light output to the non-viewing direction that is primarily to one side of the optical axis of the display device. Increased display functionality may be provided. Passenger infotainment displays that provide higher luminance to a driver in wide-angle mode may be provided.

The transmissive electrode arrangement may further comprise a control electrode extending across the entirety of the spatial light modulator, the control electrode being arranged on the same side of the layer of liquid crystal material as the array of separated electrodes, outside the array of separated electrodes. The profile of electric field within the layer of liquid crystal material may be modified and diffraction angles may be increased for a given pitch of separated electrodes.

The transmissive electrode arrangement may further comprise a reference electrode extending across the entirety of the spatial light modulator, the reference electrode being arranged on the opposite side of the layer of liquid crystal material from the array of separated electrodes. The layer of liquid crystal material may be switched between different structures of orientations to achieve desirable wide-angle and narrow-angle modes of operation.

The display device may further comprise a control system arranged to supply voltages to the transmissive electrode arrangement for driving the layer of liquid crystal material. The control system may be arranged: in a narrow-angle mode, to supply voltages to the transmissive electrode arrangement that may be selected to drive the layer of liquid crystal material into a structure of orientations providing relative phase shifts that may be uniform across the area of the layer of liquid crystal material; and in a wide-angle mode, to supply voltages to the transmissive electrode arrangement that may be selected to drive the layer of liquid crystal material into the structure of orientations providing relative phase shifts that vary spatially across the area of the layer of liquid crystal material so that the layer of liquid crystal material may provide a diffractive effect. The liquid crystal layer of the display device may be controlled to provide output light cones for wide-angle or narrow-angle modes of operation. The size of the display device output light cones in each mode may be adjusted to achieve desirable viewing properties.

The switchable liquid crystal retarder may comprise two surface alignment layers disposed adjacent to the layer of liquid crystal material and on opposite sides thereof. The alignment layer on the side of the layer of liquid crystal material adjacent the array of separated electrodes may have a component of alignment in the plane of the layer of liquid crystal material in the direction that may be orthogonal to the one direction. Advantageously the direction of diffracted light dispersion in the wide-angle mode is in the one direction; and the direction of luminance reduction in the narrow-angle privacy mode is also in the one direction. For display devices wherein the one direction is the horizontal direction, viewing freedom in the vertical direction may be increased.

According to a second aspect of the present disclosure there is provided a polar angle control component for assembly with a display device comprising a spatial light modulator, the polar angle control component comprising an out-of-plane polariser having an absorption axis in a direction having a component out of the plane of the out-of-plane polariser. The polar angle control component may further comprise a polarisation switch, the polarisation switch being switchable between a first mode in which it may be arranged to change a polarisation state of the light passing therethrough and a second mode in which it may be arranged to affect the polarisation state of the light passing therethrough differently from the first mode. The polar angle control component may further comprise an in-plane polariser having an absorption axis in a plane of the in-plane polariser, the polarisation switch being provided between the in-plane polariser and the out-of-plane polariser. The polar angle control component may further comprise an in-plane polariser having an absorption axis in a plane of the in-plane polariser. Components may be provided for attachment to spatial light modulators during manufacture of a display apparatus, or may be added by a user.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single-person viewing for a security function, where the display can only be seen by a single viewer from a limited range of angles; high electrical efficiency, where illumination is primarily provided over a small angular directional distribution; alternating left-eye and right-eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 9A is a schematic diagram illustrating in perspective side view a polar transmission control arrangement comprising an out-of-plane polariser, a polarisation switch, a biaxial retarder arrangement and an in-plane polariser;

FIG. 9B is a schematic diagram illustrating in perspective front view a biaxial retarder arrangement comprising an A-plate retarder and a negative C-plate retarder arranged between an out-of-plane polariser and an in-plane polariser;

FIG. 9C is a schematic diagram illustrating in perspective front view a biaxial retarder arrangement comprising an A-plate retarder and a positive C-plate retarder arranged between an out-of-plane polariser and an in-plane polariser;

FIG. 9D is a schematic diagram illustrating in perspective top view an out-of-plane polariser;

FIG. 9E is a schematic diagram illustrating in perspective left side view an out-of-plane polariser;

FIG. 9F is a schematic diagram illustrating in perspective upper left quadrant view an out-of-plane polariser;

FIG. 11A, FIG. 11B, FIG. 11C, FIG. 11D, and FIG. 11E are schematic diagrams illustrating in top view various alternative structures of display device optical stacks comprising biaxial retarders;

FIG. 31A is a schematic diagram illustrating in perspective front view a polar transmission control arrangement comprising an in-plane polariser, a polarisation switch comprising a homeotropic alignment layer and a homogeneous alignment layer and an out-of-plane polariser;

FIG. 31B is a schematic diagram illustrating in perspective side view the arrangement of FIG. 31A;

FIG. 31C is a schematic diagram illustrating in top view the arrangement of FIG. 31A;

FIG. 39E is a schematic graph illustrating a profile of diffracted luminance into diffractive orders for the embodiment of FIG. 39C in wide-angle mode for different drive voltages;

FIG. 39F is a schematic diagram illustrating in top view the structure and operation of the display device comprising a switchable diffractive polar control retarder for wide-angle mode;

FIG. 39G is a schematic diagram illustrating in top view the propagation of a first linear polarisation state through a layer comprising a switchable diffractive polar control retarder arranged in wide-angle mode;

FIG. 39H is a schematic diagram illustrating in perspective front view the propagation of the first polarisation state through a layer comprising a switchable diffractive polar control retarder arranged in wide-angle mode;

FIG. 40A is a schematic diagram illustrating in top view the structure and operation of the optical stack comprising a switchable diffractive polar control retarder for privacy mode;

FIG. 40B is a schematic diagram illustrating in perspective front view an electrode and liquid crystal molecular arrangement for a switchable diffractive polar control retarder in privacy mode;

FIG. 40C is a schematic diagram illustrating in top view an electrode and liquid crystal molecular arrangement for a switchable diffractive polar control retarder in privacy mode;

FIG. 40D is a schematic diagram illustrating in top view the structure and operation of the display device comprising a switchable diffractive polar control retarder for wide-angle mode;

FIG. 41A and FIG. 41B are schematic diagrams illustrating in perspective side views alternative electrode arrangements comprising interdigitated electrodes; and FIG. 41C and FIG. 41D are schematic diagrams illustrating in perspective side views alternative electrode arrangements comprising interdigitated electrodes arranged on a single substrate and further control and reference electrodes.

DETAILED DESCRIPTION

Figure 1A:
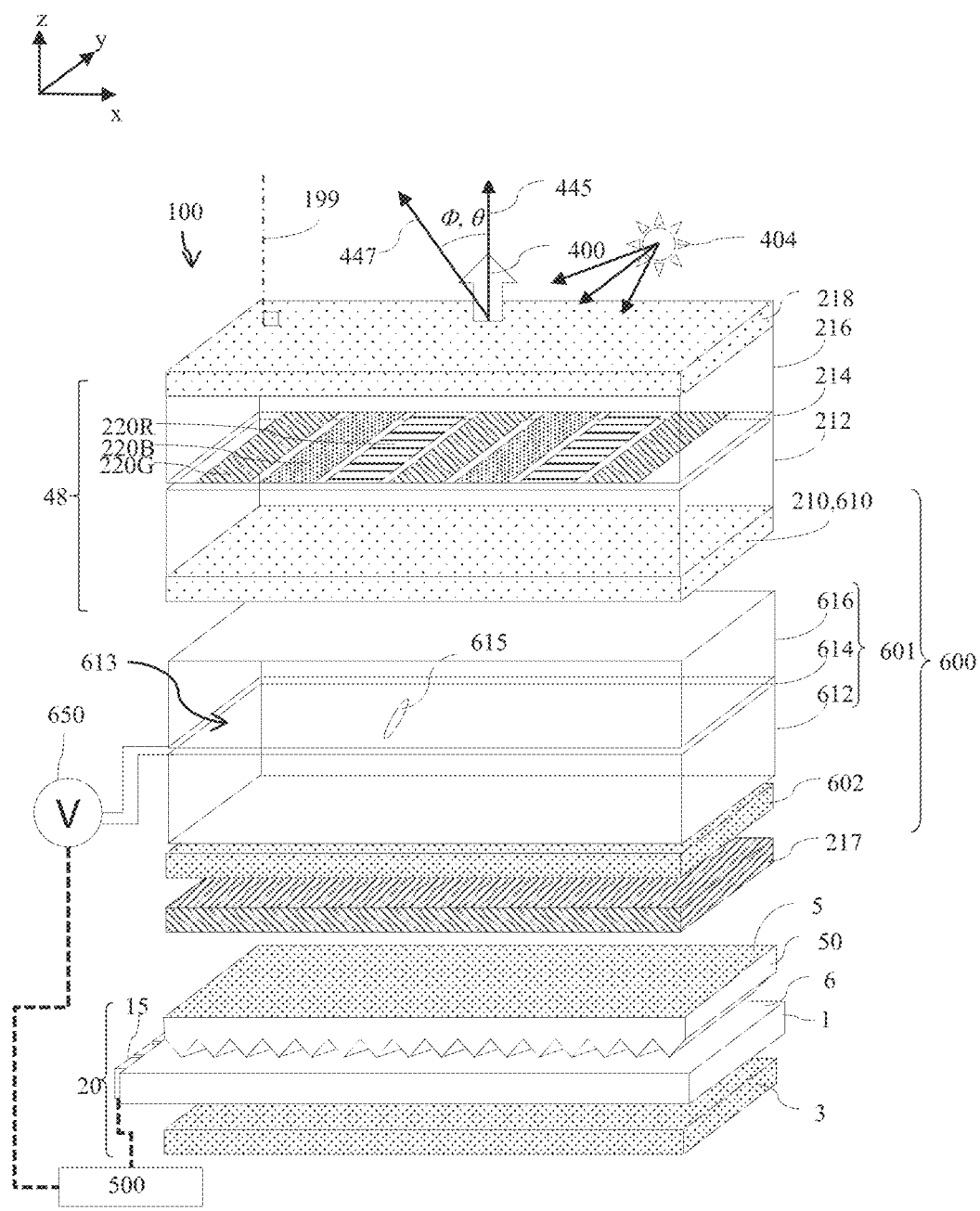
FIG. 1A is a schematic diagram illustrating in perspective side view a switchable privacy display comprising: a polar angle control display device comprising a backlight comprising a light source array, a waveguide, a rear reflector and a light-turning component; a polar transmission control arrangement comprising an out-of-plane polariser, a polarisation switch and an in-plane polariser that is the input polariser of a spatial light modulator.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components: which is related to the birefringence $\Delta n$ and the thickness d of the retarder by $$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma=\pi$. For a quarter-wave retarder, the relationship between d, $\Delta n$, and $\lambda_0$ is chosen so that the phase shift between polarization components is $\Gamma=\pi/2$. The term half-wave retarder herein typically refers to light propagating normal to the retarder and normal to the spatial light modulator.

An absorption-type polariser transmits light waves of a specific polarisation state and absorbs light (in a spectral waveband) of different polarisation states which may be orthogonal polarisation states to the specific polarisation state. For a given wavefront, an absorptive linear polariser absorbs light waves of a specific linear polarisation state and transmits light waves of the orthogonal polarisation state of the wavefront. The absorptive linear polariser comprises an absorption axis with unit vector direction $k_e$ which may alternatively be termed the optical axis or the director of the absorption material. Orthogonal directions $k_o$ to the absorption axis direction may be termed transmission axes.

A dichroic material has different absorption coefficients $\alpha_e$, $\alpha_o$ for light polarized in different directions, where the complex extraordinary refractive index is:

$$\vec{n_e} = n_e + i \cdot \alpha_e \qquad \text{eqn. 3A}$$

and the complex ordinary refractive index is:

$$\vec{n_o} = n_o + i \cdot \alpha_o \qquad \text{eqn. 3B}$$

Absorptive linear polarisers may comprise a dichroic material such as a dye or iodine. During manufacture a polyvinyl alcohol (PVA) layer is stretched so that the PVA chains align in one particular direction. The PVA layer is doped with iodine molecules, from which valence electrons are able to move linearly along the polymer chains, but not transversely. An incident polarisation state parallel to the chains is, at least in part, absorbed and the perpendicular polarisation state is substantially transmitted. Such a polariser may conveniently provide an in-plane polariser.

Another type of absorptive linear polariser is a liquid crystal dye-type dichroic linear polariser. A thermotropic liquid crystal material is doped with a dye, and the liquid crystal material is aligned during manufacture, or by an electric field. The liquid crystal layers may be untwisted, or may incorporate a twist from one side of the device to the other. Alternatively, alignment may be provided by lyotropic liquid crystal molecules that self-align onto a surface by provision of amphiphilic compounds (with hydrophilic and hydrophobic molecular groups) during manufacture. The alignment may be aided by mechanical movement of the liquid by for example a Meyer rod in a coating machine. The liquid crystal material may be a curable liquid crystal material. The dye may comprise an organic material that is aligned by the liquid crystal material or is provided in the liquid crystal molecules or may comprise silver nano-particles. Such polarisers may provide in-plane polarisers or may provide out-of-plane polarisers, wherein the optical axis direction $k_e$ or the absorption axis is out of the plane of the polariser. The directions $k_o$ of the transmission axes may be in the plane of the out-of-plane polariser. The direction $k_e$ may alternatively be referred to as the extraordinary axis direction and the directions $k_o$ may be referred to as the ordinary axis directions of the dichroic molecules.

If the absorbing dye molecules are rod-shaped then the polariser absorbs along a single axis and transmits on orthogonal axes. If the absorbing dye molecules are disc-shaped rather than rod-shaped, then the polariser can absorb two orthogonal axes and transmit the third.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP. In the current disclosure, the SOP may be termed the polarisation state.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP. The term "electric vector transmission direction" refers to a non-directional axis of the polariser parallel to which the electric vector of incident light is transmitted, even though the transmitted "electric vector" always has an instantaneous direction. The term "direction" is commonly used to describe this axis.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive Δn.

In the present disclosure a 'C-plate' refers to an optical retarder utilizing a layer of birefringent material with its optical axis perpendicular to the plane of the layer. A 'positive C-plate' refers to positively birefringent C-plates, i.e. C-plates with a positive Δn. A 'negative C-plate' refers to negatively birefringent C-plates, i.e. C-plates with a negative Δn.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive Δn.

A biaxial-plate or 'B-plate' is a non-chiral retarder that has three different principal refractive indices nx, ny, nz wherein:

$$nx \ne ny \ne nz \quad \text{eqn. 4A}$$

The out-of-plane retardation of a B-plate is described by the parameter Rth wherein $$Rth = ((nx + ny)/2 - nz)d \quad \text{eqn. 4B}$$

A B-plate is typically fabricated by stretching organic polymer films along two orthogonal in-plane directions that become two of the three principal axes; the third being orthogonal to both and out-of-plane. The direction that is stretched the most induces the largest principal refractive index along that same direction. A smaller refractive index results along the orthogonal in-plane stretch direction leaving the smallest third principal refractive index out-of-plane.

The angular dependence of birefringence is different between uniaxial A-plates, uniaxial C-plates and biaxial B-plates. In particular A-plates and C-plates have only one propagation direction with no birefringence whereas B-plates can achieve increased control of modification of output polarisation states with respect to transmission angle.

Achromatic retarders may be provided wherein the material of the retarder is provided with a retardance Δn·d that varies with wavelength λ as $$\Delta n \cdot d / \lambda = \sigma \quad \text{eqn. 5}$$

where σ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by Δn·d where Δn is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells or in alignment of curable liquid crystal layers before a curing step.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer, a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy may be switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy may be switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic-like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which a viewer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to a viewer, visual security may be given as:

$$V = (Y + R)/(Y - K) \qquad \text{eqn. 6}$$

where V is the visual security level (VSL), Y is the luminance of the white state of the display at a snooper viewing angle (which may be termed a non-viewing direction), K is the luminance of the black state of the display at the snooper viewing angle and R is the luminance of reflected light from the display.

Panel contrast ratio is given as:

$$C = Y/K \qquad \text{eqn. 7}$$

so the visual security level may be further given as:

$$V = (P \cdot Y_{max} + I \cdot \rho/\pi)/(P \cdot (Y_{max} - Y_{max}/C)) \qquad \text{eqn. 8}$$

where: $Y_{max}$ is the maximum luminance of the display; P is the off-axis relative luminance typically defined as the ratio of luminance at the snooper angle to the maximum luminance $Y_{max}$; C is the image contrast ratio; $\rho$ is the surface reflectivity; $\pi$ is a solid angle factor (with units steradians) and I is the illuminance. The units of $Y_{max}$ are the units of I divided by solid angle in units of steradian.

The luminance of a display varies with angle and so the maximum luminance of the display $Y_{max}$ occurs at a particular angle that depends on the configuration of the display.

In many displays, the maximum luminance $Y_{max}$ occurs head-on, i.e. normal to the display. Any display device disclosed herein may be arranged to have a maximum luminance $Y_{max}$ that occurs head-on, in which case references to the maximum luminance of the display device $Y_{max}$ may be replaced by references to the luminance normal to the display device.

Alternatively, any display described herein may be arranged to have a maximum luminance $Y_{max}$ that occurs at a polar angle to the normal to the display device that is greater than zero degrees. By way of example, the maximum luminance $Y_{max}$ may occur at a non-zero polar angle and at an azimuth angle that has for example zero lateral angle so that the maximum luminance is for an on-axis user that is looking down on to the display device. The polar angle may for example be 10 degrees and the azimuthal angle may be the northerly direction (90 degrees anti-clockwise from easterly direction). The viewer may therefore desirably see a high luminance at typical non-normal viewing angles.

The off-axis relative luminance, P is sometimes referred to as the privacy level. However, such privacy level P describes relative luminance of a display at a given polar angle compared to head-on luminance, and in fact is not a measure of privacy appearance.

The illuminance, I is the luminous flux per unit area that is incident on the display and reflected from the display towards the viewer location. For Lambertian illuminance, and for displays with a Lambertian front diffuser, illuminance I is invariant with polar and azimuthal angles. For arrangements with a display with non-Lambertian front diffusion arranged in an environment with directional (non-Lambertian) ambient light, illuminance I varies with polar and azimuthal angle of observation.

Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$V = 1 + I \cdot \rho/(\pi \cdot P \cdot Y_{max}) \qquad \text{eqn. 9}$$

In the present embodiments, in addition to the exemplary definition of eqn. 6, other measurements of visual security level, V may be provided, for example to include the effect on image visibility to a snooper of snooper location, image contrast, image colour and white point and subtended image feature size. Thus the visual security level may be a measure of the degree of privacy of the display but may not be restricted to the parameter V.

The perceptual image security may be determined from the logarithmic response of the eye, such that a Security Factor, S is given by $$S = \log_{10}(V) \qquad \text{eqn. 10}$$

$$S = \log_{10}(1 + \alpha \cdot \rho/(\pi \cdot P)) \qquad \text{eqn. 11}$$

where $\alpha$ is the ratio of illuminance I to maximum luminance $Y_{max}$.

Desirable limits for S were determined in the following manner. In a first step a privacy display device was provided. Measurements of the variation of privacy level, P(θ) of the display device with polar viewing angle and variation of reflectivity ρ(θ) of the display device with polar viewing angle were made using photopic measurement equipment. A light source such as a substantially uniform luminance light box was arranged to provide illumination from an illuminated region that was arranged to illuminate the privacy display device along an incident direction for reflection to viewer positions at a polar angle of greater than zero degrees to the normal to the display device. The variation I(θ) of illuminance of a substantially Lambertian emitting lightbox with polar viewing angle was determined by and measuring the variation of recorded reflective luminance with polar viewing angle taking into account the variation of reflectivity ρ(θ). The measurements of P(θ), ρ(θ) and I(θ) were used to determine the variation of Security Factor S(θ) with polar viewing angle along the zero elevation axis.

In a second step a series of high contrast images were provided on the privacy display including (i) small text images with maximum font height 3 mm, (ii) large text images with maximum font height 30 mm and (iii) moving images.

In a third step each viewer (with eyesight correction for viewing at 1000 mm where appropriate) viewed each of the images from a distance of 1000 mm, and adjusted their polar angle of viewing at zero elevation until image invisibility was achieved for one eye from a position near on the display at or close to the centre-line of the display. The polar location of the viewer's eye was recorded. From the relationship S(θ), the security factor at said polar location was determined. The measurement was repeated for the different images, for various display luminance $Y_{max}$, different lightbox illuminance I(θ=0), for different background lighting conditions and for different viewers.

From the above measurements S<1.0 provides low or no visual security, and S≥1 makes the image not visible. In the range 1.0≤S<1.5, even though the image is not visible for practical purposes, some features of the image may still be perceived dependent on the contrast, spatial frequency and temporal frequency of image content, whereas in the range 1.5≤S<1.8, the image is not visible for most images and most viewers and in the range S≥1.8 the image is not visible, independent of image content for all viewers.

In practical display devices, this means that it is desirable to provide a value of S for an off-axis viewer who is a snooper that meets the relationship S≥$S_{min}$, where: $S_{min}$ has a value of 1.0 or more to achieve the effect that in practical terms the displayed image is not visible to the off-axis viewer.

At an observation angle θ in question, the security factor $S_n$ for a region of the display labelled by the index n is given from eqn. 10 and eqn. 11 by:

$$S_n(\theta) = \log_{10}[1 + \rho_n(\theta) \cdot \alpha(\theta)/(\pi \cdot P_n(\theta))] \qquad \text{eqn. 12}$$

where: $\alpha$ is the ratio of illuminance I(θ) onto the display that is reflected from the display to the angle in question and with units lux (lumen·m$^{-2}$), to maximum luminance $Y_{max}$ with units of nits (lumen·m$^{-2}$·sr$^{-1}$) where the units of $\alpha$ are steradians, $\pi$ is a solid angle in units of steradians, $\rho_n(\theta)$ is the reflectivity of the display device along the observation direction in the respective $n^{th}$ region, and $P_n(\theta)$ is the ratio of the luminance of the display device along the observation direction in the respective $n^{th}$ region.

In human factors measurement, it has been found that desirable privacy displays of the present embodiments described hereinbelow typically operate with security factor $S_n$≥1.0 at the observation angle when the value of the ratio $\alpha$ of illuminance I to maximum luminance $Y_{max}$ is 4.0. For example, the illuminance I(θ=−45°) that illuminates the display and is directed towards the snooper at the observation direction (θ=+45°) after reflection from the display may be 1000 lux and the maximum display illuminance $Y_{max}$ that is provided for the user may be 250 nits. This provides an image that is not visible for a wide range of practical displays.

More preferably, the display may have improved characteristics of reflectivity $\rho_n(\theta=45°)$ and privacy $P_n(\theta=45°)$ by operating with security factor $S_n$≥1.0 at the observation angle when the ratio $\alpha$ is 2.0. Such an arrangement desirably improves the relative perceived brightness and contrast of the display to the primary user near to the direction of $Y_{max}$ while achieving desirable security factor, $S_n$≥1.0. Most preferably, the display may have improved characteristics of reflectivity $\rho_n(\theta=45°)$ and privacy $P_n(\theta=45°)$ by operating with security factor $S_n$≥1.0 at the observation angle when the ratio $\alpha$ is 1.0. Such an arrangement achieves desirably high perceived brightness and contrast of the display to the primary user near to the direction of $Y_{max}$ in comparison to the brightness of illuminated regions around the display, while achieving desirable security factor, $S_n$≥1.0 for an off-axis viewer 47 at the observation direction.

The above discussion focusses on reducing visibility of the displayed image to an off-axis viewer who is a snooper, but similar considerations apply to visibility of the displayed image to the intended user of the display device who is typically on-axis. In this case, decrease of the level of the visual security level (VSL) V corresponds to an increase in the visibility of the image to the viewer. During observation S<0.2 may provide acceptable visibility (perceived contrast ratio) of the displayed image and more desirably S<0.1. In practical display devices, this means that it is desirable to provide a value of S for an on-axis viewer who is the intended user of the display device that meets the relationship S≤$S_{max}$, where $S_{max}$ has a value of 0.2.

In the present discussion the colour variation Δε of an output colour ($u_w$'+Δu', $v_w$'+Δv') from a desirable white point ($u_w'$, $v_w'$) may be determined by the CIELUV colour difference metric, assuming a typical display spectral illuminant and is given by:

$$\Delta\varepsilon = (\Delta u'^2 + \Delta v'^2)^{1/2} \qquad \text{eqn. 13}$$

A diffractive effect of a liquid crystal layer relates to the interference or bending of waves around the corners of an obstacle or through an aperture into the region of the geometrical shadow of the obstacle/aperture. The diffractive effect arises from the interaction of plane waves incident onto the phase structure of the layer, rather than the propagation of rays through the layer.

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

It may be desirable to provide high visual security levels for a display device in a privacy mode and to provide high luminance in off-axis viewing angles in the wide-angle mode of the display device. The structure of a switchable privacy display will now be described.

Figure 1B:
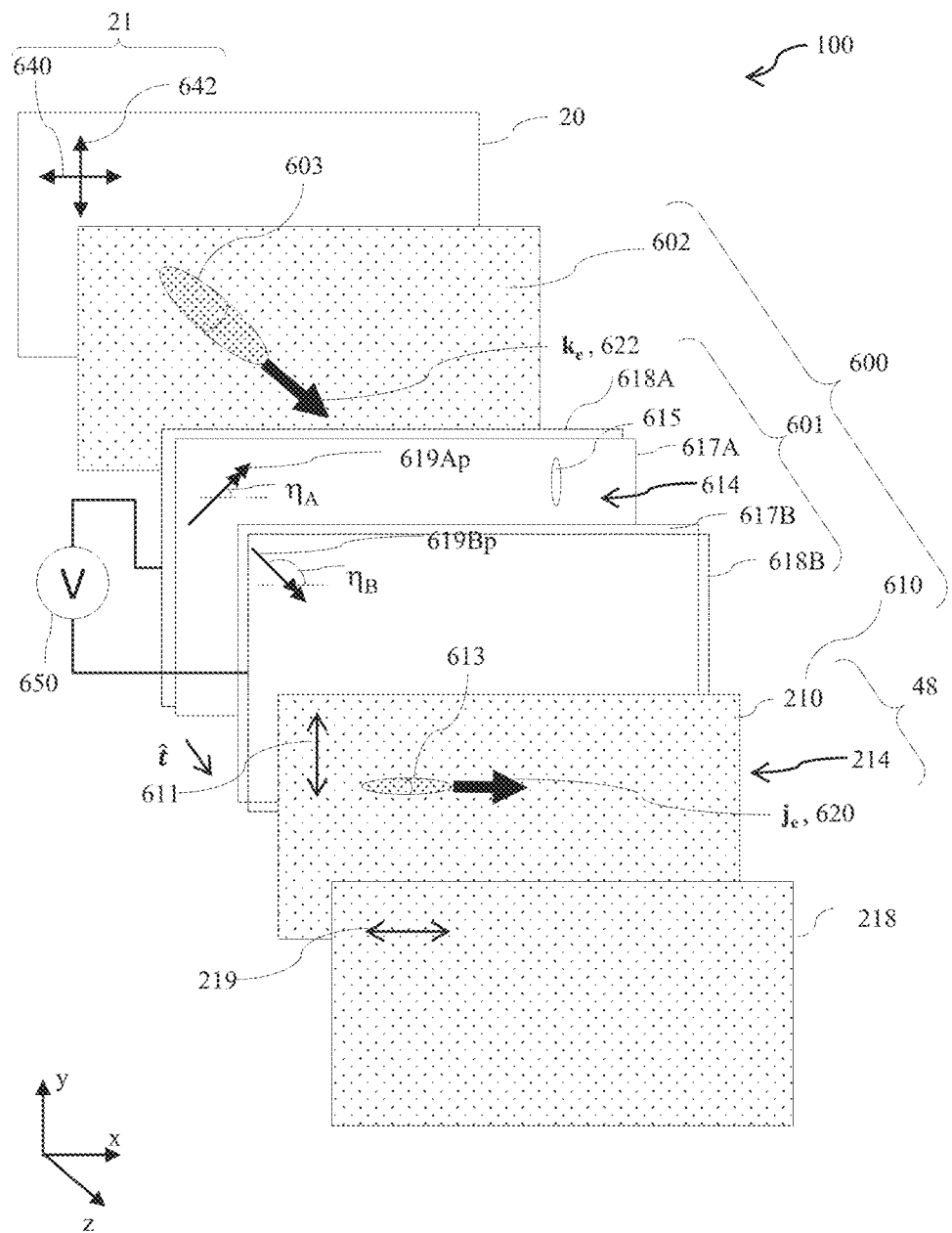
FIG. 1B is a schematic diagram illustrating in perspective front view components of the optical stack of the display device of FIG. 1A.

FIG. 1A is a schematic diagram illustrating in perspective side view a switchable privacy display comprising: a polar angle control display device 100 comprising a backlight 20 comprising a light source array 15, a waveguide 1, a rear reflector 3 and a light-turning component 50; a polar transmission control arrangement 600 comprising an out-of-plane polariser 602, a polarisation switch 601 and an in-plane polariser 610 that is the input polariser 210 of a spatial light modulator 48; and FIG. 1B is a schematic diagram illustrating in perspective front view alignment orientations for an optical stack for use in the display device 100 of FIG. 1A.

The embodiment of FIG. 1A illustrates a display device 100 comprising a spatial light modulator 48 arranged to output spatially modulated light. The spatial light modulator 48 comprises a liquid crystal display device comprising transparent substrates 212, 216, and pixel layer 214 that may comprise a liquid crystal layer pixel having red, green and blue pixels 220, 222, 224. The spatial light modulator 48 has an input display polariser 210 and an output display polariser 218 on opposite sides thereof. The display polarisers 210, 218 are arranged to provide high extinction ratio for light from the pixels 220R, 220G, 220B of the spatial light modulator 48. Typical polarisers 210, 218 may be absorptive linear in-plane polarisers, the operation of which will be described further hereinbelow. The transmissive spatial light modulator 48 thus comprises an input polariser 210 and an output polariser 218, and the input polariser 210 is the in-plane polariser 610 and a said side of the spatial light modulator 48 is an input side of the spatial light modulator 48.

The display device 100 further comprises a backlight 20 arranged to output light, and the spatial light modulator 48 is a transmissive spatial light modulator 48 arranged to receive the output light from the backlight 20. The backlight apparatus 20 comprises a rear reflector 3 and a waveguide arrangement comprising waveguide 1, and light sources 15, light-turning film 50 and light control components 5 that may comprise diffusers and arranged to receive light exiting from the waveguide 1 and directed through the spatial light modulator 48. A reflective polariser 217 may be provided between the backlight 20 and the additional polariser 918 to improve the efficiency of output light from the backlight 20 to achieve improved luminance. The reflective polariser 217 may alternatively be omitted. The reflective polariser 217 is different in operation to the reflective polariser 302 to achieve increased security factor, S that will be described in alternative embodiments hereinbelow. The backlight 20 may be arranged to provide light with high luminance in a preferred direction such as the on-axis direction, and to provide reduced luminance in other directions. Alternative backlight arrangements will be described further hereinbelow.

The display device has a normal 199 to at least one region of the display device. The nominal display user 45 polar viewing direction 445 may be parallel to the normal 199, for example in displays such as laptops where the user 45 desirably aligns centrally to the display device 100. In applications such as automotive applications, the direction 445 may be different to the normal 199 direction. In privacy mode, the non-viewing direction 447, that is the direction in which a display snooper is located, is inclined at a polar angle ($\phi, \theta$) to the viewing direction 445.

Polar transmission control arrangement 600 comprises in-plane polariser 610 that is the input polariser 210 of the spatial light modulator 48. In-plane polariser 610 thus has an absorption axis 620 in a plane of the in-plane polariser 610 arranged on the input side of the spatial light modulator 48.

In the present description the term plane does not imply flat and could be a curved plane, for example for use in curved displays. The normal direction 199 is the normal direction to the plane at a given spatial location and may vary across the display device 100.

Polar transmission control arrangement 600 further comprises an out-of-plane polariser 602 having an absorption axis 622 in a direction $k_e$ having a component out of a plane of the out-of-plane polariser 602. Out-of-plane polariser 602 is arranged on the same side of the spatial light modulator 48 as the in-plane polariser 610.

The polar angle control display device 100 further comprises a polarisation switch 601 provided between the in-plane polariser 610 and the out-of-plane polariser 602. The polarisation switch 601 comprises a switchable layer 614 of liquid crystal material 615 and at least one electrode 613A, 613B arranged to switch the state of the liquid crystal material 615. A transmissive electrode arrangement comprising electrodes 618A, 618B is arranged to drive the layer 614 of liquid crystal material 615 by means of applied voltages V from voltage drivers 650. The display device 100 further comprises a control system 500 arranged to supply voltages by means of the drivers 650 to the transmissive electrode arrangement for driving the layer 614 of liquid crystal material 615.

The polarisation switch 601 further comprises alignment layers 617A, 617B with alignment directions with components 619Ap, 627Bp in the plane of the respective alignment layers 617A, 617B at angles $\eta_A$, $\eta_B$ and arranged to provide alignment of the layer 614 of liquid crystal material 615. In the present illustrative embodiments, the direction of various orientations of respective layers is measured anticlockwise from an easterly direction when viewing the front of the display device 100.

The two surface alignment layers 617A, 617B are disposed adjacent to the layer 914 of liquid crystal material 915 and on opposite sides thereof.

In operation as will be described below, the polarisation switch 601 is switchable between a first mode in which it is arranged to change a polarisation state of the light passing therethrough and a second mode in which it is arranged to affect the polarisation state of the light passing therethrough differently from the first mode.

The structure and operation of various layers of the optical stack of FIG. 1A will now be described further with respect to FIG. 1B. Backlight 20 provides output polarised light state 21 that may be an unpolarised or partially polarised light state and can be resolved into horizontal and vertical polarisation states 642, 640. Such polarisation state 21 is incident onto the out-of-plane polariser 602 comprising dichroic material 603 with absorption axis 622 direction $k_e$, that has a component that is out of the plane of the out-of-plane polariser 602. The out-of-plane polariser 602 modifies the polar polarisation state distribution of the input light polarisation state 21, and output light is directed through the polarisation switch 601. The light is output towards the in-plane polariser 610 comprising dichroic material 611 with absorption axis 620 direction $j_e$ that has no component that is out of the plane of the out-of-plane polariser 602.

Further, pretilt of the alignment directions 619At, 619Bt provides an out-of-plane component in the thickness direction $\hat{t}$ through the layer 614 of liquid crystal material 615 that reduces degeneracy of the structure of liquid crystal material 615 orientation and advantageously improves uniformity across the area 103 of the layer 614 of liquid crystal material 615.

The electrodes 618A, 618B may further comprise electrode structures arranged to provide a mark as described in U.S. Pat. No. 11,892,717, which is herein incorporated by reference in its entirety. Advantageously a switchable mark 322 may be provided.

Structures of polarisers will now be further described.

Figure 2A:
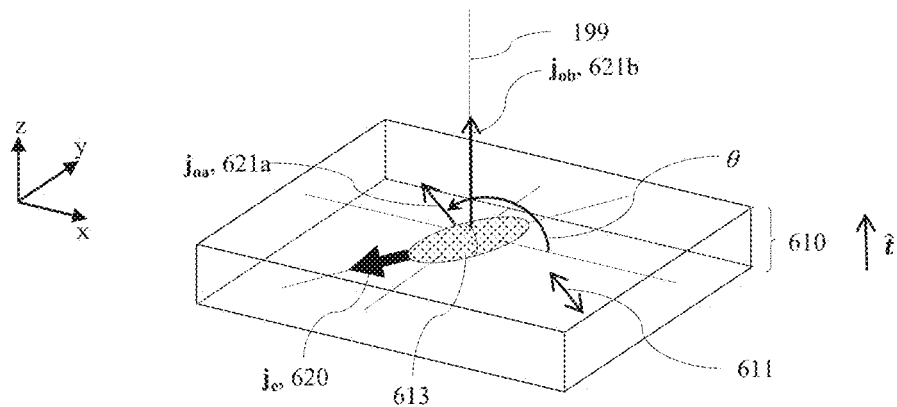
FIG. 2A is a schematic diagram illustrating in perspective side view an in-plane polariser.
Figure 2B:
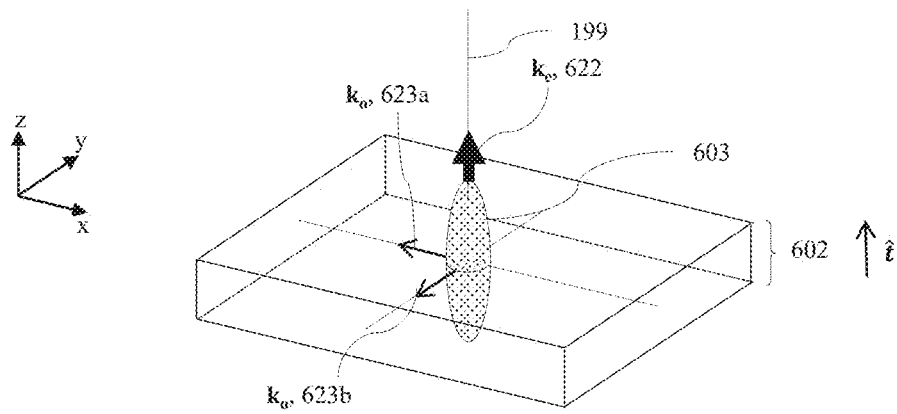
FIG. 2B is a schematic diagram illustrating in perspective side view an out-of-plane polariser comprising an absorption axis with no in-plane component.
Figure 2C:
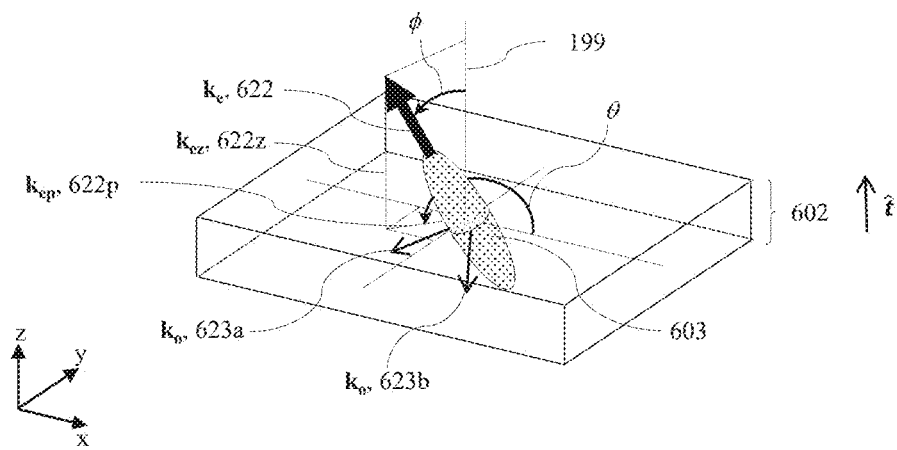
FIG. 2C is a schematic diagram illustrating in perspective side view an out-of-plane polariser comprising an absorption axis with an in-plane component.

FIG. 2A is a schematic diagram illustrating in perspective side view an in-plane polariser 610; FIG. 2B is a schematic diagram illustrating in perspective side view an out-of-plane polariser 602 comprising an absorption axis 622 with no in-plane component; and FIG. 2C is a schematic diagram illustrating in perspective side view an out-of-plane polariser 602 comprising an absorption axis 622 with an in-plane component. Features of the embodiments of FIGS. 2A-C not discussed in further detail may be assumed to correspond to the features with equivalent reference numerals as discussed above, including any potential variations in the features.

FIG. 2A illustrates that an in-plane polariser 610 comprises a dichroic molecule 611 (such as iodine contained within a PVA layer) with an absorption axis 620 that has direction $j_e$ that is in the direction $\hat{t}$ through the thickness of the layer of the in-plane polariser 610, that is the direction $j_e$ is in the plane in which the in-plane polariser 610 extends. For an incident wavefront with a linear polarisation state, the electric vector transmission direction for an incident polarisation state is the in-plane direction $j_{oa}$, 621a and is oriented at an angle $\theta$ to the easterly direction.

By way of comparison with FIG. 2A, the direction of the absorption axis 622 of the out-of-plane polariser 602 is normal to the plane of the out-of-plane polariser 602. The out-of-plane polariser 602 of FIG. 2B comprises molecules 603 that may be different material to the molecules 601 of the in-plane polariser 610 and have an orientation so that the absorption axis direction $k_e$, 622 is normal to the plane of the out-of-plane polariser 602, that is parallel to the direction $\hat{t}$ through the thickness of the layer of the out-of-plane polariser 602.

By way of comparison with FIG. 2B, in the out-of-plane polariser 602 of FIG. 2C, the direction of the absorption axis 622 of the out-of-plane polariser 602 is inclined at an acute angle $\phi$ to the normal 199 orthogonal to the plane of the out-of-plane polariser 602. The molecules 603 have an orientation so that the absorption axis 622 has a component 622z that is in a direction $k_{ez}$ inclined to the normal 199 to plane of the out-of-plane polariser 602; and a component 622p that is in a direction $k_{ep}$ in the plane of the out-of-plane polariser 602 and with the orientation $\theta$.

The operation of out-of-plane polariser 602 will now be described.

Figure 3A:
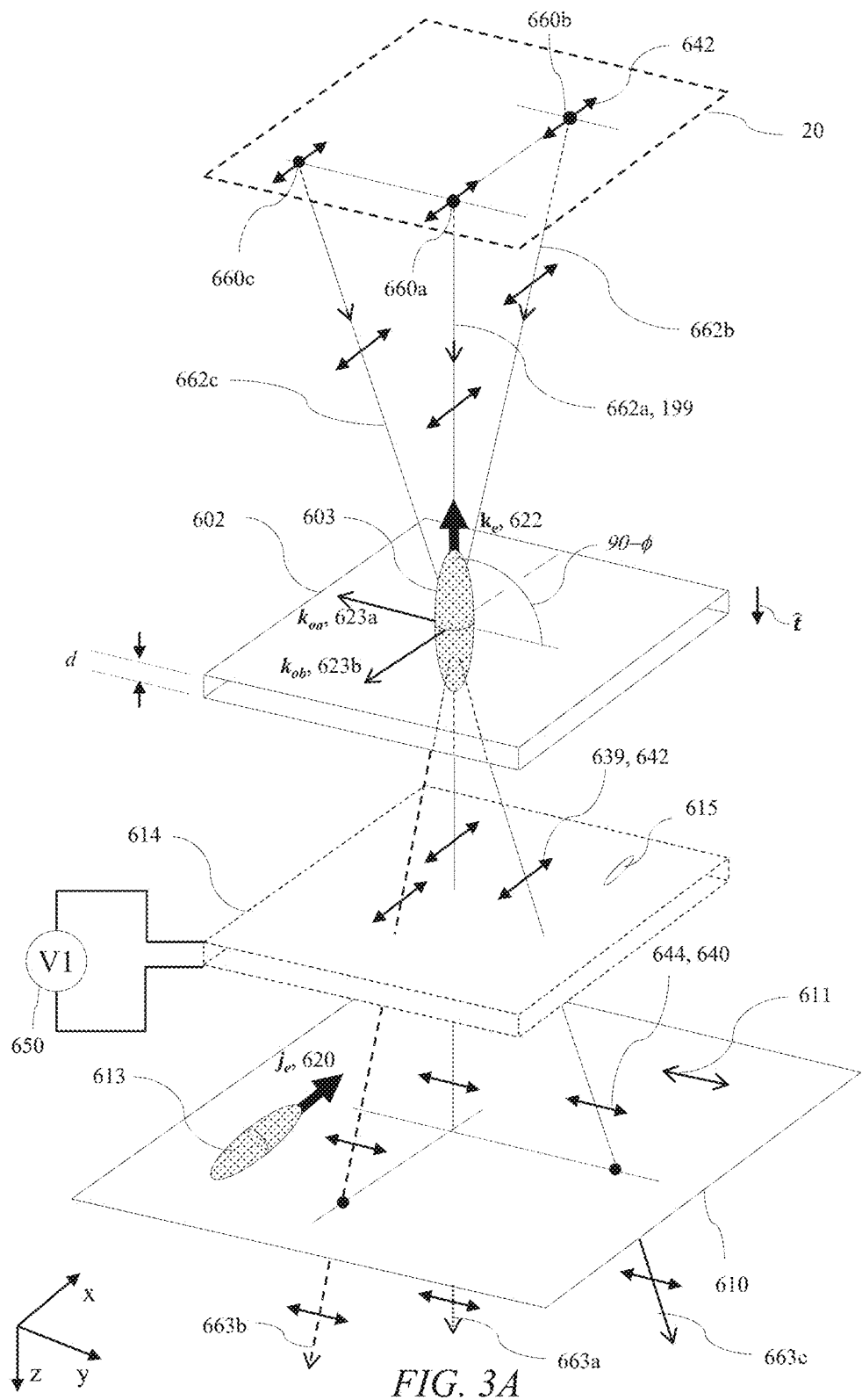
FIG. 3A is a schematic diagram illustrating in perspective side view operation of an out-of-plane polariser, a switchable layer of liquid crystal material and an in-plane polariser for light rays, inclined in lateral and elevation directions for a first mode of operation.
Figure 3B:
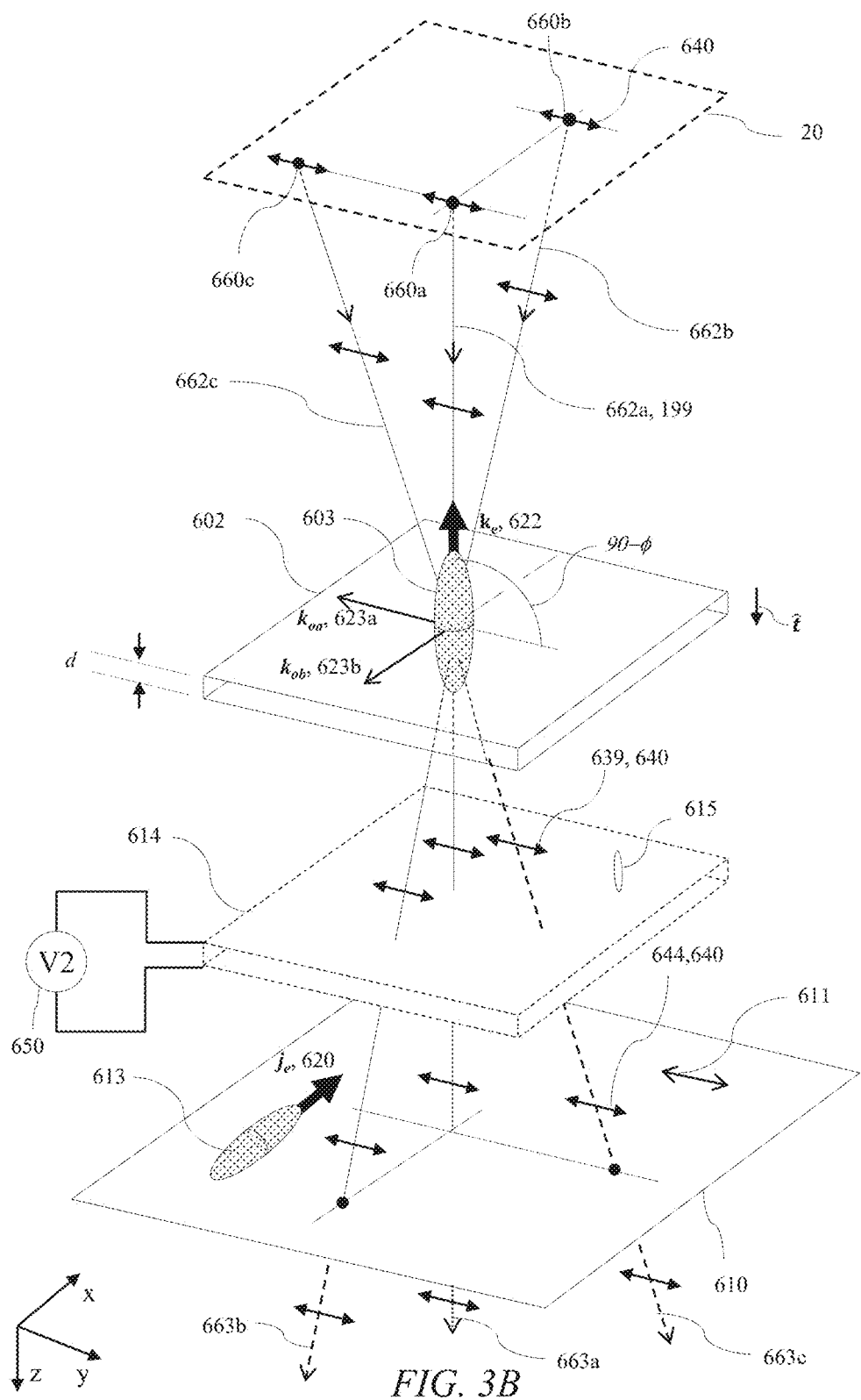
FIG. 3B is a schematic diagram illustrating in perspective side view operation of an out-of-plane polariser, a switchable layer of liquid crystal material and an in-plane polariser for light rays inclined in lateral and elevation directions for a second mode of operation.

FIG. 3A is a schematic diagram illustrating in perspective side view operation of an out-of-plane polariser 602, a switchable layer 614 of liquid crystal material 615 and an in-plane polariser 610 for light rays 662a, 662b, 662c inclined in lateral and elevation directions for a first mode of operation; and FIG. 3B is a schematic diagram illustrating in perspective side view operation of an out-of-plane polariser 602, a switchable layer 614 of liquid crystal material 615 and an in-plane polariser 610 for light rays 662a, 662b, 662c inclined in lateral and elevation directions for a second mode of operation. Features of the embodiments of FIGS. 3A-B not discussed in further detail may be assumed to correspond to the features with equivalent reference numerals as discussed above, including any potential variations in the features.

FIG. 3A illustrates light ray 662 propagation with polarisation state 642 from backlight 20 that is incident on a molecule 603 of the out-of-plane polariser 602 of the type illustrated in FIG. 2B.

Light ray 662a from location 660a along the normal 199 propagates along the absorption axis $k_e$ direction 622 of the molecule 603, and parallel to the transmission axis $k_{oa}$, 623a, so that substantially no absorption takes place and the light ray 662a is transmitted with high luminous flux through the out-of-plane polariser 602.

The linear polarisation state 639 that is incident on the input of the polarisation switch 601 is the same as the polarisation state 642.

In the first mode, the polarisation switch 601 is arranged to change the polarisation state 639 of the light passing therethrough from the first linear polarisation state 642 to a second linear polarisation state 640 that is orthogonal to the first linear polarisation state 642. A first voltage V1 is applied to the layer 614 of liquid crystal material 603 so that the linear polarisation state 639, 642 is modified through the layer 614 as will be described further hereinbelow.

In-plane polariser 610 has electric vector transmission direction 611 arranged to transmit linear polarisation state 644. Light ray 663a with modified polarisation state 640 and high luminous flux is transmitted by the in-plane polariser 610 with electric vector transmission direction 611 that has a direction orthogonal to the absorption axis 622 direction $k_e$.

Light ray 662c from location 660c is incident on the molecule 603 with polarisation state 642 aligned orthogonally to the absorption axis $k_e$ direction 622 so that substantially no absorption takes place by the molecules 603 of the out-of-plane polariser 602 and the light ray 663c is transmitted by the layer 614 of liquid crystal material 603, polarisation switch 610 and in-plane polariser 610 with high luminous flux.

By comparison with light rays 662a, 662c, for light ray 662b from location 660b the polarisation state 642 has a component along the ray 662b that is aligned with the absorption axis $k_e$ direction 622 of the molecule 603. Such alignment provides some absorption at the molecule 603 so that the output ray 663b from the out-of-plane polariser 602 has reduced luminous flux. The amount of absorption is determined by the thickness, d, refractive indices $n_e$, $n_o$ and absorption coefficients $\alpha_e(\phi,\theta)$ $\alpha_o(\phi,\theta)$ of the out-of-plane polariser 602 for polar angle $(\phi, \theta)$, at the angle of incidence of the ray 662b for the polarisation state 640.

Considering the orthogonal polarisation state 640, in the first mode, light rays 662a, 662b, 662c from the backlight 20 are absorbed by the in-plane polariser 610 from the locations 660a, 660b, 660c across the backlight 20 and so are not illustrated.

By way of comparison with FIG. 3A, in the second mode as illustrated in FIG. 3B, the polarisation switch 601 is arranged not to change the polarisation state of the light passing therethrough. FIG. 3B illustrates light ray 662 propagation with polarisation state 640 from backlight 20.

Light ray 662a from location 660a along the normal 199 propagates along the absorption axis $k_e$ direction 622 of the molecule 603, and parallel to the transmission axis $k_{oa}$, 623a, so that substantially no absorption takes place and the light ray 662a is transmitted with high luminous flux through the out-of-plane polariser 602.

In the second mode, the polarisation switch 601 is arranged to not change the polarisation state 639, 640 of the incident light that passes therethrough. A second voltage V2 is applied to the layer 614 of liquid crystal material 603 so that the linear polarisation state 640 is unmodified through the layer 614.

Light ray 663a with unmodified polarisation state 640 and high luminous flux is transmitted by the in-plane polariser 610.

Light ray 662b from location 660b is incident on the molecule 603 with polarisation state 640 aligned orthogonally to the absorption axis $k_e$ direction 622 so that substantially no absorption takes place by the molecules 603 of the out-of-plane polariser 602 and the light ray 663b is transmitted by the layer 614 of liquid crystal material 603, polarisation switch 610 and in-plane polariser 610 with high luminous flux.

By comparison with light rays 662a, 662b, for light ray 662c from location 660c the polarisation state 640 has a component along the ray 662c that is aligned with the absorption axis $k_e$ direction 622 of the molecule 603 so that the output ray 663c from the out-of-plane polariser 602 has reduced luminous flux.

Considering the orthogonal polarisation state 640, in the second mode, light rays 662a, 662b, 662c from the backlight 20 are absorbed by the in-plane polariser 610 from the locations 660a, 660b, 660c across the backlight 20 and so are not illustrated.

As will be described in FIGS. 9A-K hereinbelow, output polarisation states 639 are modified in quadrants, that is in directions that are not along the directions with zero elevation or with zero lateral angle.

The operation of an arrangement with an illustrative polarisation switch 601 will now be further described.

Figure 4A:
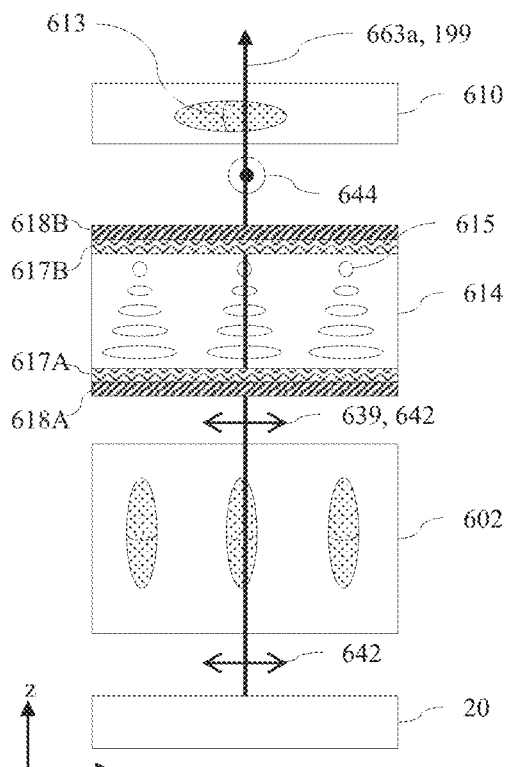
FIG. 4A is a schematic diagram illustrating in side view an out-of-plane polariser, a twisted nematic liquid crystal polarisation switch and an in-plane polariser in a first mode for an on-axis ray.
Figure 4B:
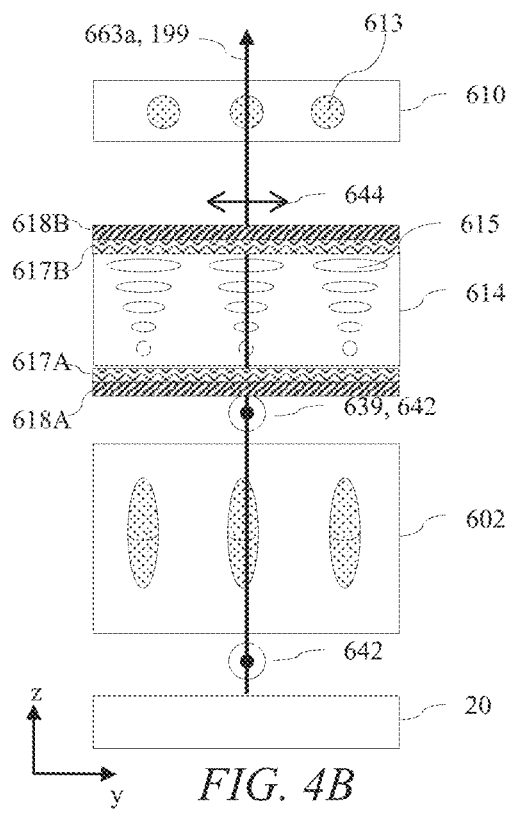
FIG. 4B is a schematic diagram illustrating the arrangement of FIG. 4A in edge view.
Figure 4C:
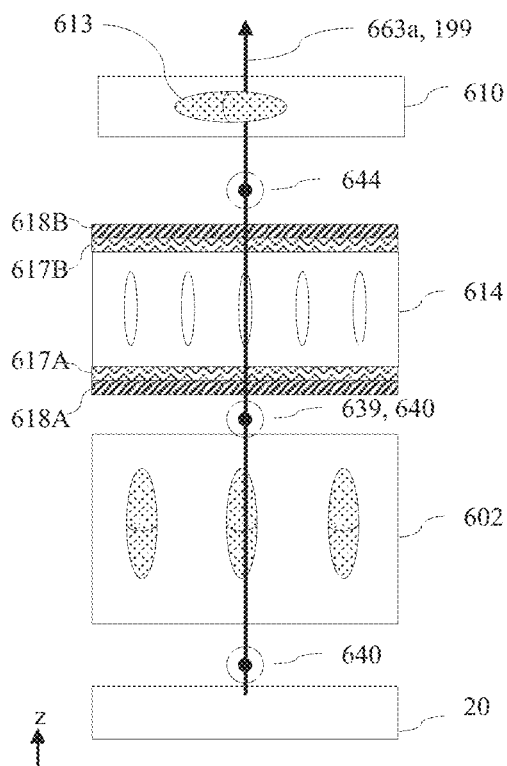
FIG. 4C is a schematic diagram illustrating in side view an out-of-plane polariser, a twisted nematic liquid crystal polarisation switch and an in-plane polariser in a second mode for an on-axis ray.
Figure 4D:
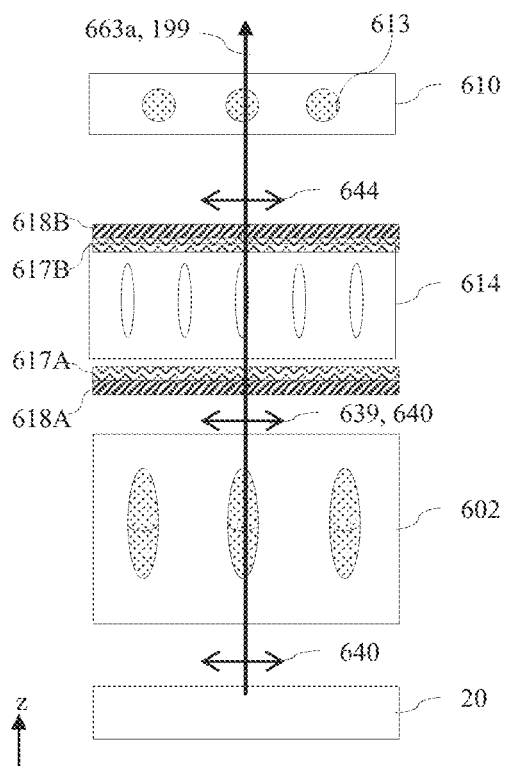
FIG. 4D is a schematic diagram illustrating the arrangement of FIG. 4C in edge view.

FIG. 4A is a schematic diagram illustrating in side view an out-of-plane polariser 602, a twisted nematic liquid crystal polarisation switch 601 and an in-plane polariser 610 in a first mode of operation for an on-axis ray 663a; FIG. 4B is a schematic diagram illustrating the arrangement of FIG. 4A in edge view; FIG. 4C is a schematic diagram illustrating in side view an out-of-plane polariser 602, a twisted nematic liquid crystal polarisation switch 601 and an in-plane polariser 610 in a second mode of operation for an on-axis ray 663a; and FIG. 4D is a schematic diagram illustrating the arrangement of FIG. 4C in edge view. Features of the embodiments of FIGS. 4A-D not discussed in further detail may be assumed to correspond to the features with equivalent reference numerals as discussed above, including any potential variations in the features.

By way of comparison with FIG. 3A, FIGS. 4A-B illustrate that the polarisation switch 601 comprises a layer 614 of twisted nematic liquid crystal material 615 provided by alignment layers 617A, 617B and the first voltage V1 may be zero volts for example to provide polarisation modification through the layer 614.

By way of comparison with FIG. 3B, FIGS. 4C-D illustrate that the polarisation switch 601 comprises a layer 614 of twisted nematic liquid crystal material 615 provided by alignment layers 617A, 617B and the second voltage V2 may be 5V for example to provide substantially no polarisation modification through the layer 614.

Figure 5A:
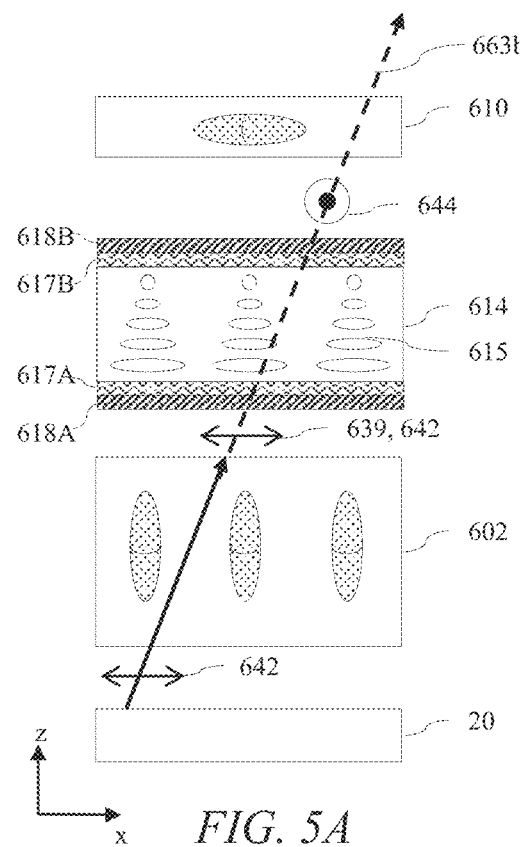
FIG. 5A is a schematic diagram illustrating in side view an out-of-plane polariser, a twisted nematic liquid crystal polarisation switch and an in-plane polariser in the first mode for an off-axis ray.
Figure 5B:
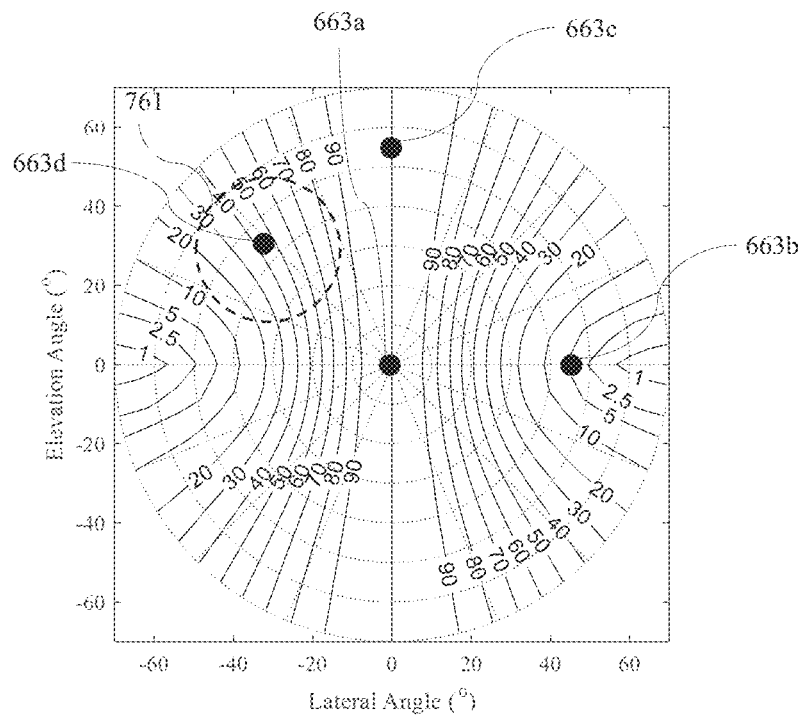
FIG. 5B is a schematic graph illustrating the polar variation of transmission output for the arrangement of FIG. 3A, FIGS. 4A-B, and FIG. 5A for the illustrative embodiment of TABLE 1.
Figure 5C:
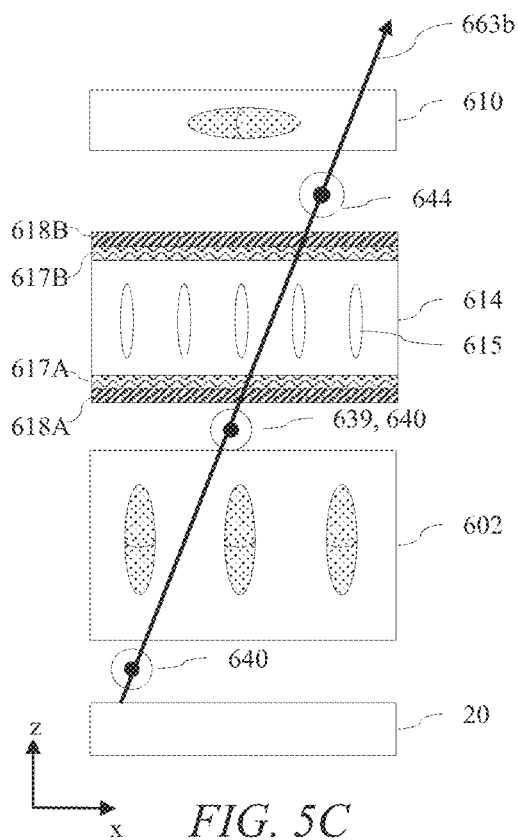
FIG. 5C is a schematic diagram illustrating in side view an out-of-plane polariser, a twisted nematic liquid crystal polarisation switch and an in-plane polariser in the second mode for an off-axis ray.
Figure 5D:
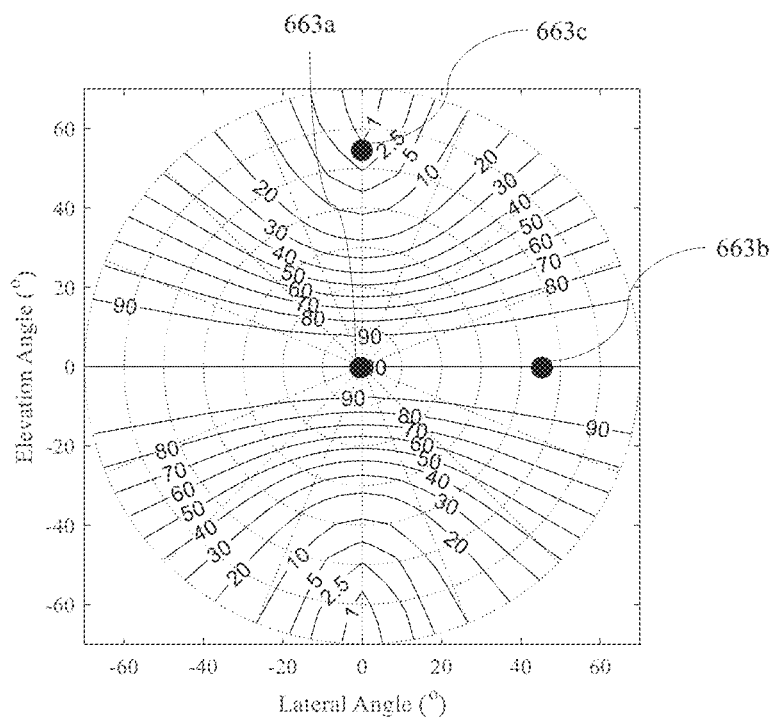
FIG. 5D is a schematic graph illustrating the polar variation of transmission output for the arrangement of FIG. 3B, FIGS. 4C-D, and FIG. 5C for the illustrative embodiment of TABLE 1.

FIG. 5A is a schematic diagram illustrating in side view an out-of-plane polariser 602, a twisted nematic liquid crystal polarisation switch 601 and an in-plane polariser 610 in the first mode of operation for an off-axis ray 663b; FIG. 5B is a schematic graph illustrating a simulated polar variation of transmission output for the arrangement of FIG. 3A, FIGS. 4A-B and FIG. 5A for the illustrative embodiment of TABLE 1; FIG. 5C is a schematic diagram illustrating in side view an out-of-plane polariser 602, a twisted nematic liquid crystal polarisation switch 601 and an in-plane polariser 610 in the second mode of operation for an off-axis ray 663b; and FIG. 5D is a schematic graph illustrating a simulated polar variation of transmission output for the arrangement of FIG. 3B, FIGS. 4C-D and FIG. 5C for the illustrative embodiment of TABLE 1. Features of the embodiments of FIGS. 5A-D not discussed in further detail may be assumed to correspond to the features with equivalent reference numerals as discussed above, including any potential variations in the features.

FIG. 5A illustrates in top view the propagation of the ray 663b of FIG. 3A, and FIG. 5C illustrates in top view the propagation of the ray 663c of FIG. 3B.

In the current description, the lateral angle with zero elevation is the angle in a plane that is typically defined as the plane comprising the x-axis and z-axis of the respective figures and is most typically the angle across the horizontal with respect to the frame of reference of the observer 45. Similarly the elevation angle with zero lateral angle is the angle in a plane that is typically defined as the plane comprising the y-axis and z-axis of the respective figures and is most typically the angle across the vertical with respect to the frame of reference of the observer 45. Angles with both non-zero elevation and non-zero lateral angle may be referred to as being in the viewing quadrants in the frame of reference of the observer 45.

FIG. 5B and FIG. 5D illustrate the operation for an idealised twisted nematic liquid crystal mode. In practice, the propagation of the input polarisation state 639 through the layer 614 of liquid crystal material 615 will be modified by non-ideal properties of the optical structure of the layer 614.

TABLE 1

| Item | Property | Value |
|---|---|---|
| Out-of-plane polariser 602 | Material 603 ordinary refractive index, $n_o$ at 550 nm | 1.506 + 0.00165i |
| | Material 603 extraordinary refractive index, $n_e$ at 550 nm | 1.53 + 0.116i |
| | Thickness, d | 5 μm |
| | Absorption axis 622 tilt φ to surface normal 199 | 0° |
| Polarisation switch 601 first mode | Twist through layer 614 of liquid crystal material 615 | 90° |
| | Polarisation state 639, 642 angle in plane of polarisation switch 601 | 0° |
| Polarisation switch 601 second mode | Twist through layer 614 of liquid crystal material 615 | 0° |
| | Polarisation state 639, 640 angle in plane of polarisation switch 601 | 90° |
| In-plane polariser 610 | Absorption axis 620 in-plane angle | 0° |

FIG. 5B and FIG. 5C illustrate the polar locations and transmission of rays 663a, 663b, 663c for the illustrative embodiment of TABLE 1. Considering polar angle of ray 663a, the luminance is the same for the first and second modes, that is the luminance is maximised. By comparison, in the arrangement of FIG. 5B the ray 663b has a reduced transmission while the ray 663c has substantially unmodified transmission; and in the arrangement of FIG. 5C the ray 663c has a reduced transmission while the ray 663b has substantially unmodified transmission.

Figure 6A:
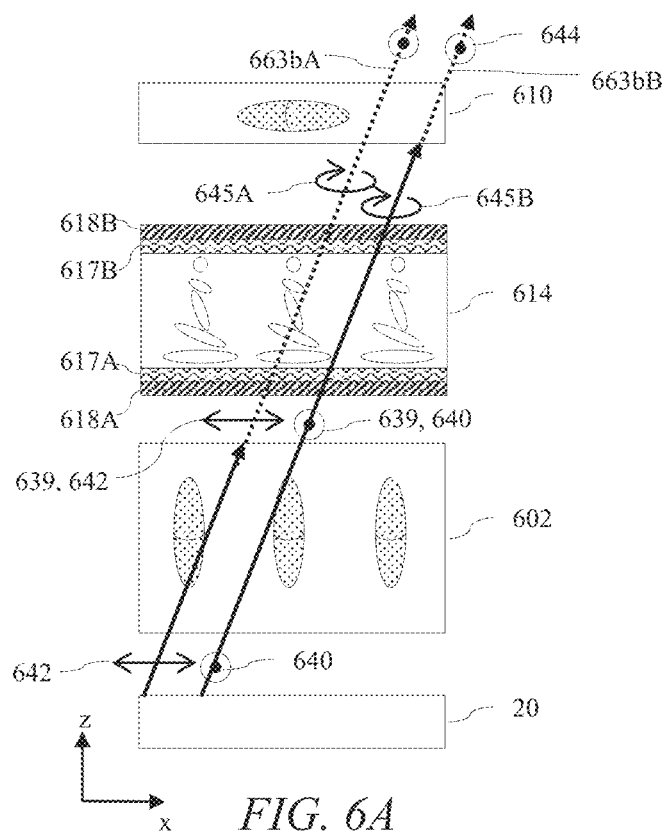
FIG. 6A is a schematic diagram illustrating in side view an out-of-plane polariser, a twisted nematic liquid crystal polarisation switch and an in-plane polariser in an alternative second mode for an off-axis ray.
Figure 6B:
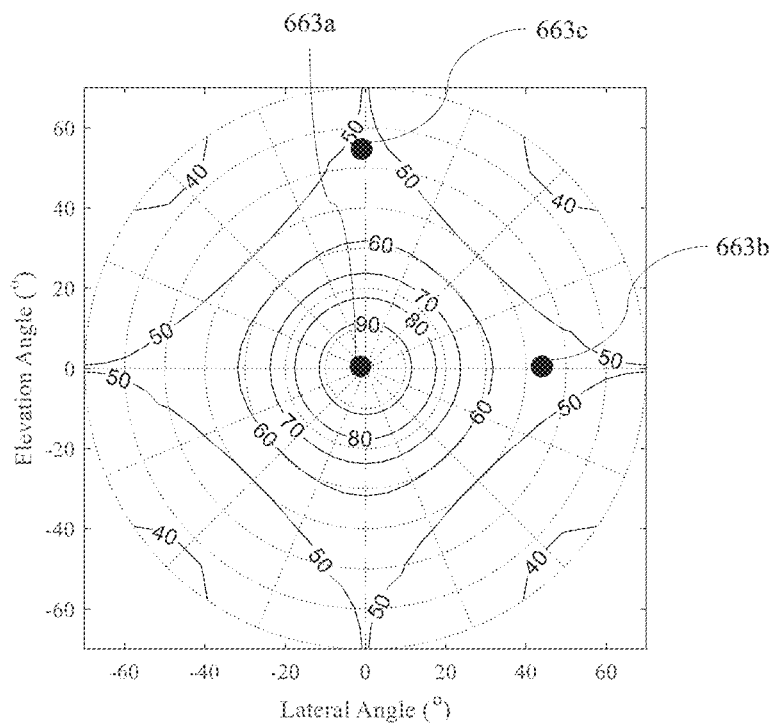
FIG. 6B is a schematic graph illustrating the polar variation of transmission output for the arrangement of FIG. 6A.

When arranged with the spatial light modulator 48 of FIG. 1A for example, the arrangement of FIG. 5B and FIG. 6B provide transmission profiles that may achieve switching between landscape and portrait privacy modes of operation, for example in a mobile display device.

FIG. 5B further illustrates that some regions 761 such as in the viewing quadrants for directions 663d, undesirable increased transmission may be provided. As will be described further hereinbelow, additional biaxial retarders 730 may be provided to achieve increased transmission in the region 761.

It may be desirable to provide improved rotational symmetry of the transmission profile in comparison to the arrangements of FIG. 5B and FIG. 6B.

FIG. 6A is a schematic diagram illustrating in side view an out-of-plane polariser 602, a twisted nematic liquid crystal polarisation switch 601 and an in-plane polariser 610 in an alternative second mode of operation for an off-axis ray 663b; and FIG. 6B is a schematic graph illustrating a simulated polar variation of transmission output for the arrangement of FIG. 6A. Features of the embodiments of FIGS. 6A-B not discussed in further detail may be assumed to correspond to the features with equivalent reference numerals as discussed above, including any potential variations in the features.

In the alternative embodiment illustrated in FIGS. 6A-B, in the second mode, the polarisation switch 601 is arranged to change the polarisation state 21 of the light passing therethrough differently from the first mode.

For ray 663bA, the input polarisation state 639, 640 is partially absorbed by the out-of-plane polariser 602. Such polarisation state 640 is converted by the polarisation switch 601 into an elliptical polarisation state 645A that can be considered a superposition of polarisation state 642, 640 by the polarisation switch 601 and residual light with polarisation state 644 transmitted by the in-plane polariser 610.

Further for ray 663bB, the polarisation state 642 from the backlight 20 is transmitted by the out-of-plane polariser 602. Such polarisation state 642 is converted by the polarisation switch 601 into an elliptical polarisation state 645B that can be considered a superposition of polarisation state 642, 640 and light with polarisation state 644 transmitted by the in-plane polariser 610. Such an arrangement may achieve an output similar to that of FIG. 6B. Advantageously improved rotation symmetry is achieved in the second mode of operation. A share mode of operation may be achieved.

The illustrative embodiments of FIG. 5B, FIG. 5D and FIG. 6B are provided assuming that the polarisation rotation of the polarisation switch 601 is independent of the polar angle. In practice, some mixed polarisation state 642, 640 will be provided that vary with viewing angle for a single input polarisation state 642 or 640. Such polarisation mixing may modify the transmission profiles. The arrangement of the layer 614 of liquid crystal material 615 may be adjusted to optimise the uniformity of polarisation modification with polar angle. Additional passive compensation retarders may further be provided as described elsewhere hereinbelow.

The operation of a switchable privacy display device 100 of FIG. 1A will now be further described.

Figures 7A, 7B:
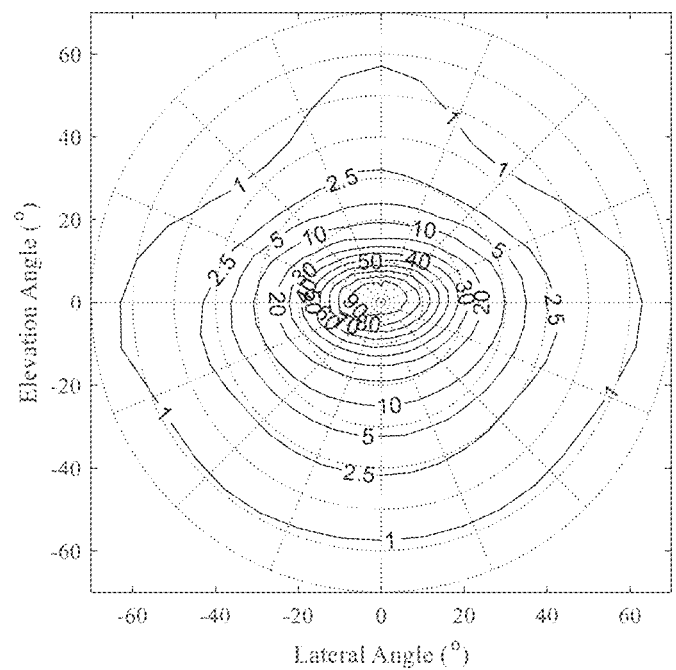
FIG. 7A is a schematic graph illustrating the polar variation of luminance output for a collimated backlight of the type illustrated in FIG. 1A.
FIG. 7B is a schematic graph illustrating the polar variation of security factor, S for a collimated backlight of the type illustrated in FIG. 1A modified by the transmission profile of FIG. 6B for typical illumination conditions.
Figure 7C:
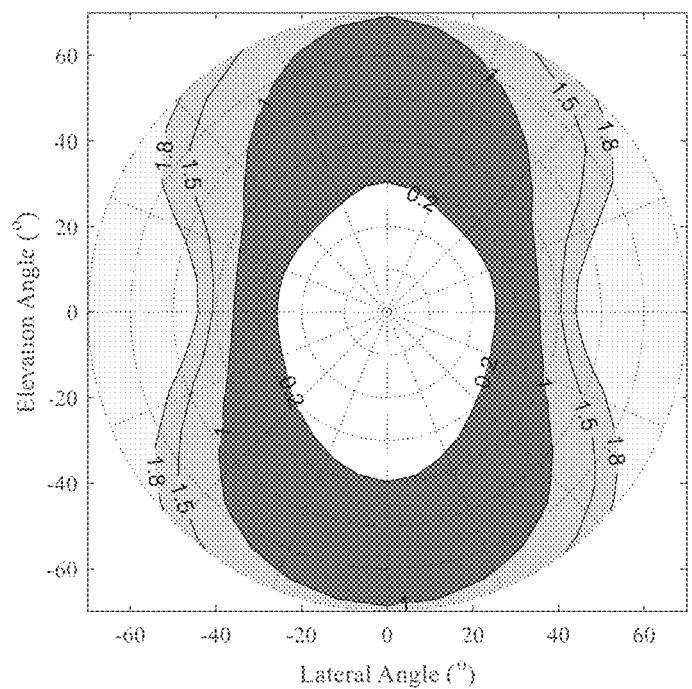
FIG. 7C is a schematic graph illustrating the polar variation of security factor, S for a collimated backlight of the type illustrated in FIG. 1A modified by the transmission profile of FIG. 5B for typical illumination conditions.
Figure 7D:
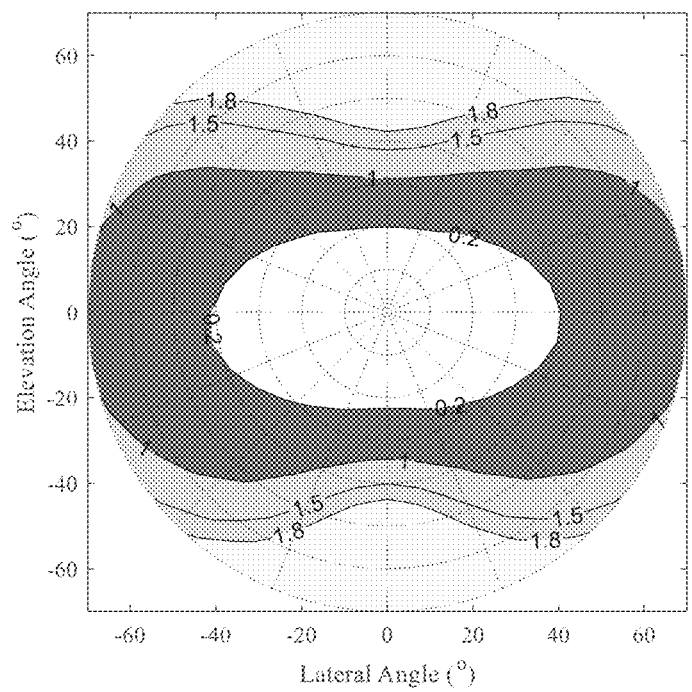
FIG. 7D is a schematic graph illustrating the polar variation of security factor, S for a collimated backlight of the type illustrated in FIG. 1A modified by the transmission profile of FIG. 5D for typical illumination conditions.

FIG. 7A is a schematic graph illustrating the polar variation of luminance output for a collimated backlight of the type illustrated in FIG. 1A; FIG. 7B is a schematic graph illustrating the polar variation of security factor. S for a collimated backlight of the type illustrated in FIG. 1A modified by the transmission profile of FIG. 6B for typical illumination conditions; FIG. 7C is a schematic graph illustrating the polar variation of security factor, S for a collimated backlight of the type illustrated in FIG. 1A modified by the transmission profile of FIG. 5B for typical illumination conditions; and FIG. 7D is a schematic graph illustrating the polar variation of security factor, S for a collimated backlight of the type illustrated in FIG. 1A modified by the transmission profile of FIG. 5D for typical illumination conditions, wherein the thickness of the out-of-plane polariser 602 is 10 μm for the material 603 of TABLE 1. Features of the embodiments of FIGS. 7A-D not discussed in further detail may be assumed to correspond to the features with equivalent reference numerals as discussed above, including any potential variations in the features.

FIG. 7B illustrates a share mode of operation and provides a display device 100 with images that are visible (security factor S<1) over a wide polar region.

FIG. 7C illustrates a privacy mode of operation of the display of FIG. 1A, wherein the display is not visible to viewers to the left and right of the nominal on-axis user direction 445; while FIG. 7D illustrates a privacy mode of operation of the display of FIG. 1A, wherein the display is not visible to viewers above or below the nominal on-axis user direction 445 for the same display orientation as in FIG. 7C. Alternatively, the arrangement of FIG. 7D may be provided when the display of FIG. 7C is rotated through 90 degrees. For example, a cell phone may operate with the security factor profile of FIG. 7C when held in portrait mode and may operate with the security factor profile of FIG. 7D when held in landscape mode. Advantageously landscape and portrait privacy operation may be achieved.

Alternative simulations of a twisted nematic polarisation switch will now be described.

Figure 7E:
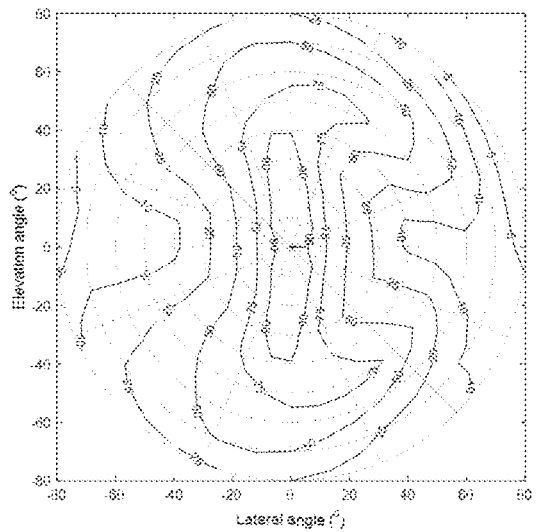
FIG. 7E is a schematic graph illustrating the polar variation of transmission output for the illustrative embodiment of TABLE 2 in a first driven state.
Figure 7F:
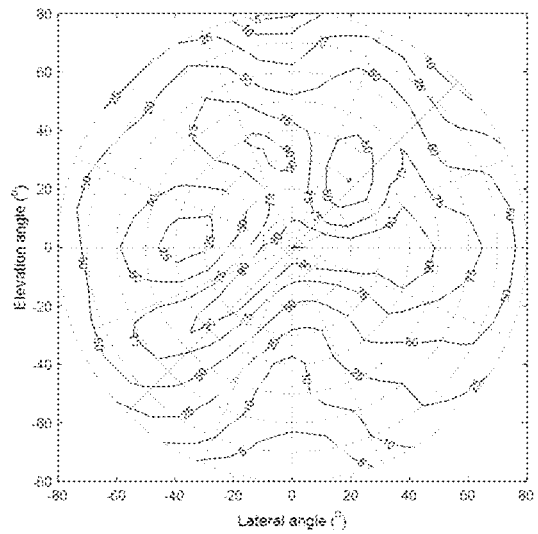
FIG. 7F is a schematic graph illustrating the polar variation of transmission output for the illustrative embodiment of TABLE 2 in a second driven state.

FIG. 7E is a schematic graph illustrating the polar variation of transmission output for the illustrative embodiment of TABLE 2 in a first driven state; FIG. 7F is a schematic graph illustrating the polar variation of transmission output for the illustrative embodiment of TABLE 2 in a second driven state; and FIG. 7G is a schematic graph illustrating the polar variation of transmission output for the illustrative embodiment of TABLE 2 in a third driven state.

Figure 7G:
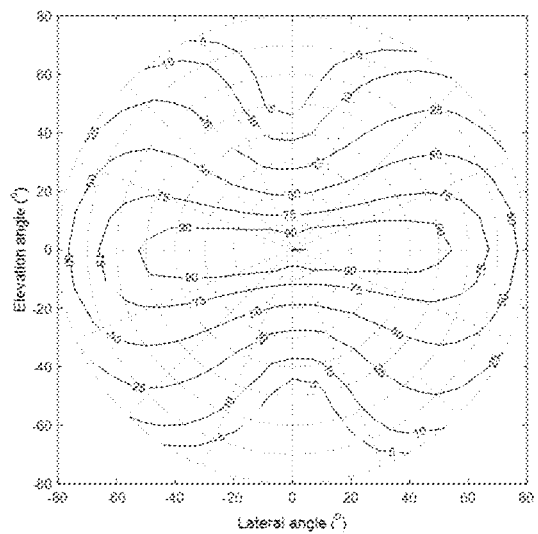
FIG. 7G is a schematic graph illustrating the polar variation of transmission output for the illustrative embodiment of TABLE 2 in a third driven state.

By way of comparison with the simulations of FIG. 5B, FIG. 6B and FIG. 5D, the simulated results of FIG. 7E, FIG. 7F and FIG. 7G are provided with a more complete description of the alignment of molecules 615 in the liquid crystal layer 614 through the thickness of the layer 614, including pretilt and residual retardance near to the alignment layers 619A, 619B and splay in intermediate twisted states. As can be seen in FIG. 7F, such non-ideal alignments provide asymmetry in output particularly in share mode operation.

By way of comparison with the twisted nematic embodiments hereinabove, the polarisation switch 601 of FIG. 8A may provide a quarter waveplate in one of the modes of operation. Said quarter waveplate provides a circular output polarisation state 22 from the linear input polarisation state 21. Such an arrangement conveniently provides output equivalent to comprising some light with the profile similar to FIG. 5B and some light with the output of FIG. 5D.

In the second mode of operation, the polarisation switch 601 may provide no modification of the polarisation state 21.

It may be desirable to improve the switching properties of the polarisation switch 601. In an alternative embodiment, the polarisation switch 601 may further comprise at least one passive retarder 630 that is arranged to provide improved control of the switched polarisation states 21, 22. The passive retarder 630 and layer 614 of liquid crystal material 615 may for example comprise a Pancharatnam stack to advantageously achieve improved chromaticity of the switched polarisation state 22.

TABLE 2

| | Item | Value |
|---|---|---|
| Out-of-plane polariser 602 | Material 603 ordinary refractive index, $n_o$ at 550 nm | 1.506 + 0.00165i |
| | Material 603 extraordinary refractive index, $n_e$ at 550 nm | 1.53 + 0.116i |
| | Thickness, d | 6 μm |
| | Absorption axis 622 tilt φ to surface normal 199 | 0° |
| Polarisation switch 601 | Layer 614 of liquid crystal material 615 retardance | 1500 nm |
| | Layer 614 of liquid crystal material 615 in-plane alignment direction, 619Ap angle θ | 90° |
| | Layer 614 of liquid crystal material 615 in-plane alignment direction, 619Bp angle θ | 0° |
| | Privacy mode voltage | 15 V, FIG. 7E |
| | Share mode voltage | 3 V, FIG. 7F |
| | Rotated privacy mode voltage | 0 V, FIG. 7G |
| In-plane polariser 610 | Absorption axis 620 in-plane angle | 90° |

Alternative arrangements of polarisation switch 601 will now be described.

Figure 8A:
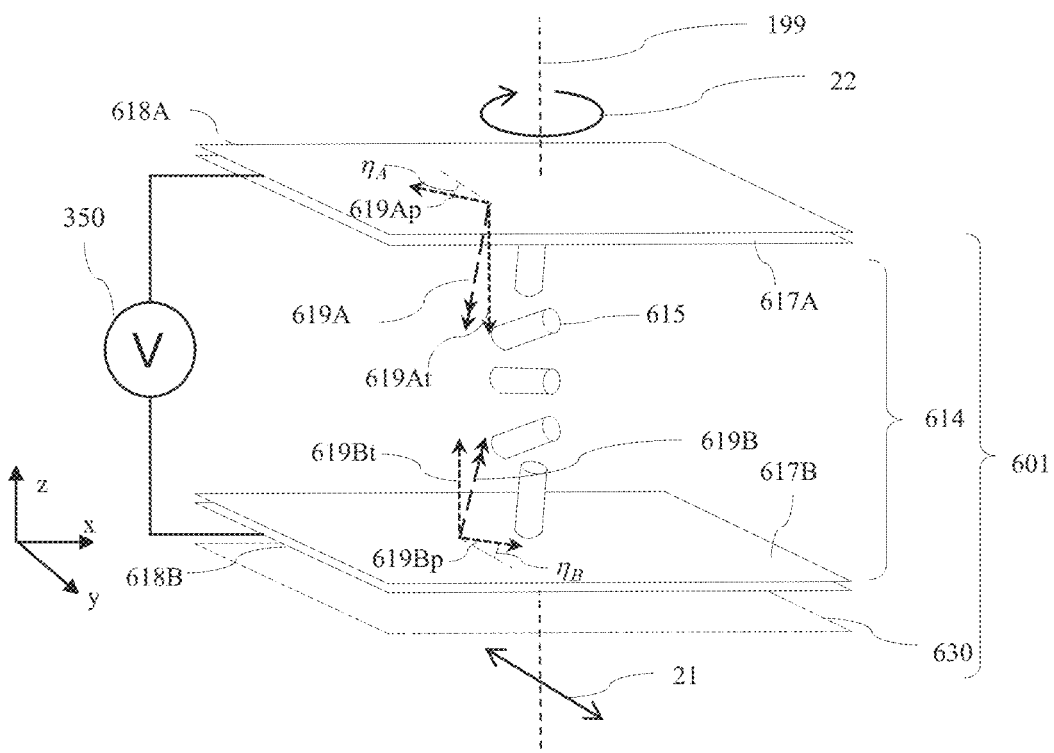
FIG. 8A is a schematic diagram illustrating in perspective side view a polarisation switch comprising a passive retarder operating in a first mode.
Figure 8B:
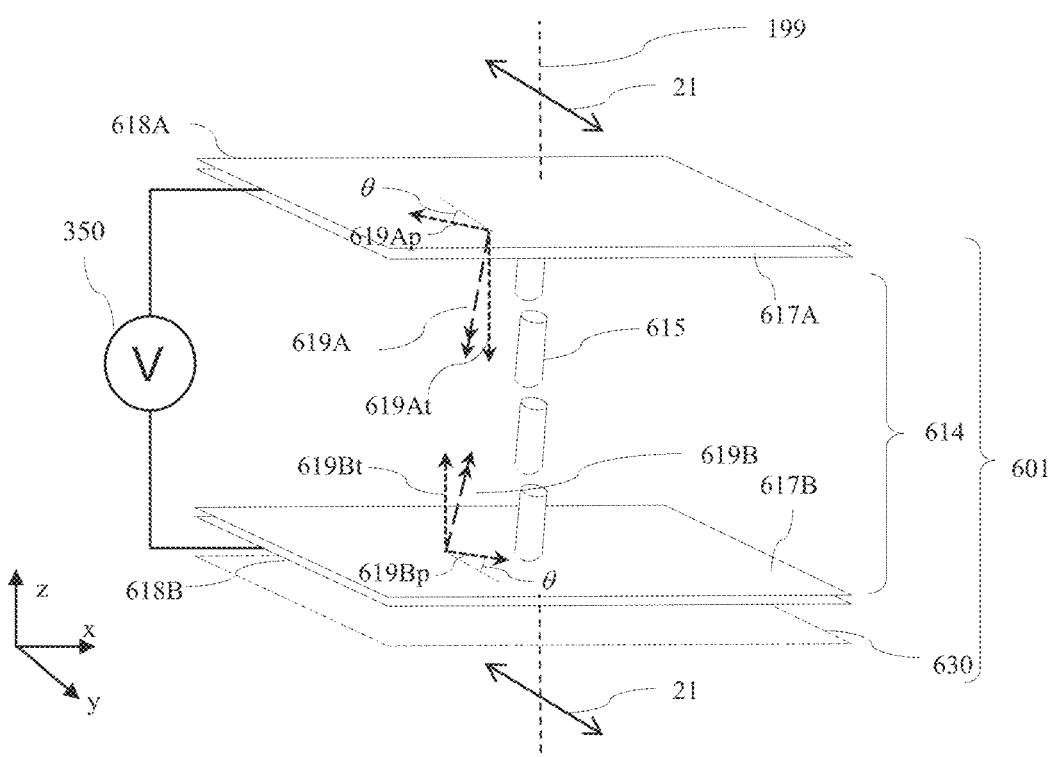
FIG. 8B is a schematic diagram illustrating in perspective side view a polarisation switch comprising a passive retarder operating in a second mode.

FIG. 8A is a schematic diagram illustrating in perspective side view a polarisation switch comprising a passive retarder operating in a first mode; FIG. 8B is a schematic diagram illustrating in perspective side view a polarisation switch comprising a passive retarder operating in a second mode. Features of the embodiments of FIGS. 8A-B not discussed in further detail may be assumed to correspond to the features with equivalent reference numerals as discussed above, including any potential variations in the features.

The alignment layers 617A, 617B of the layer 614 of liquid crystal material 615 provide alignment directions 619A, 619B with in-plane components 619Ap, 619Bp and out-of-plane components 619At, 619Bt respectively.

Figure 8C:
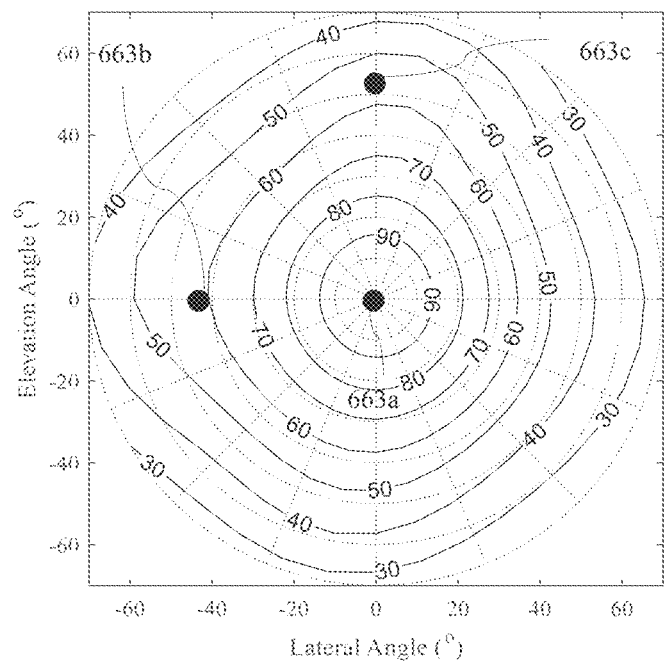
FIG. 8C is a schematic graph illustrating the polar variation of luminance transmission for the arrangement of FIG. 8A provided between an out-of-plane polariser and an in-plane polariser operating in the first mode and as described in TABLE 3.
Figure 8D:
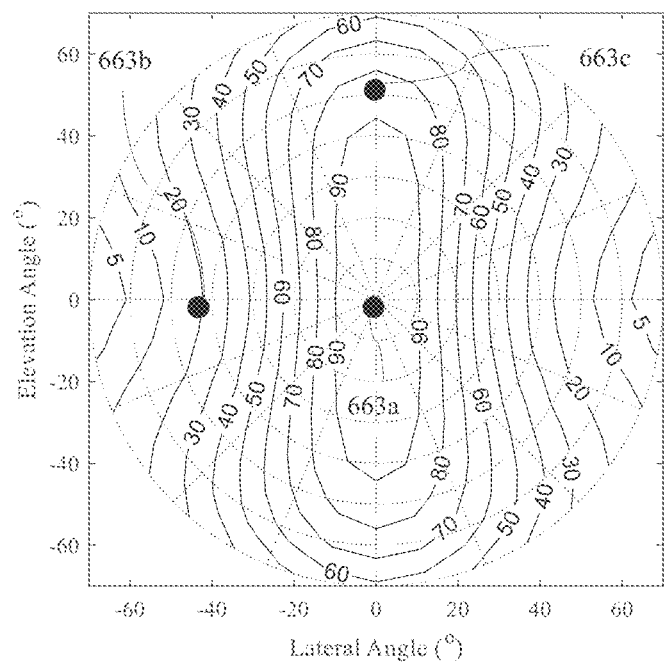
FIG. 8D is a schematic graph illustrating the polar variation of luminance transmission for the arrangement of FIG. 8B provided between an out-of-plane polariser and an in-plane polariser operating in the first mode and as described in TABLE 3.

FIG. 8C is a schematic graph illustrating the polar variation of luminance transmission for the arrangement of FIG. 8A provided between an out-of-plane polariser and an in-plane polariser operating in the first mode and as described in TABLE 3; and FIG. 8D is a schematic graph illustrating the polar variation of luminance transmission for the arrangement of FIG. 8B provided between an out-of-plane polariser and an in-plane polariser operating in the first mode and as described in TABLE 3. Features of the embodiments of FIGS. 8C-D not discussed in further detail may be assumed to correspond to the features with equivalent reference numerals as discussed above, including any potential variations in the features.

TABLE 3

| | Item | Value |
|---|---|---|
| Out-of-plane polariser 602 | Material 603 ordinary refractive index, $n_o$ at 550 nm | 1.506 + 0.00165i |
| | Material 603 extraordinary refractive index, $n_e$ at 550 nm | 1.53 + 0.116i |
| | Thickness, d | 6 μm |
| | Absorption axis 622 tilt φ to surface normal 199 | 0° |
| Polarisation switch 601 | Layer 614 of liquid crystal material 615 retardance | 140 nm |
| | Layer 614 of liquid crystal material 615 in-plane alignment direction, 619Ap angle θ | 135° |
| | Layer 614 of liquid crystal material 615 in-plane alignment direction, 619Bp angle θ | 315° |

TABLE 3-continued

| | Item | Value |
|---|---|---|
| | Privacy mode voltage | 0 V |
| | Share mode voltage | 8 V |
| | Passive retarder 630 | Not used |
| In-plane polariser 610 | Absorption axis 620 in-plane angle | 0° |

By way of comparison with FIG. 6B, improved rotational symmetry is achieved in share mode as illustrated in FIG. 8C. Further in privacy mode as illustrated in FIG. 8D, the luminance in look-down directions 663c is also reduced to achieve improved privacy.

It may be desirable to reduce luminance in the quadrant regions 761 in privacy mode of operation.

FIG. 9A is a schematic diagram illustrating in perspective side view a polarisation switch 601 arranged between an in-plane polariser that is in-plane polariser 610, a biaxial retarder arrangement 730 comprising biaxial material 731 and an out-of-plane polariser 602. Features of the embodiment of FIG. 9A not discussed in further detail may be assumed to correspond to the features with equivalent reference numerals as discussed above, including any potential variations in the features.

By way of comparison with FIG. 5A, the optical stack comprising biaxial retarder arrangement 730 of FIG. 9A comprises a B-plate with biaxial molecules 731 that provide off-axis retardation properties for input polarisation state 639 of FIGS. 3A-B in the viewing quadrants.

Alternative embodiments of biaxial retarder arrangement 730 will now be described.

FIG. 9B is a schematic diagram illustrating in perspective front view, an alternative biaxial retarder arrangement 730 comprising an A-plate and a negative C-plate; and FIG. 9C is a schematic diagram illustrating in perspective front view, an alternative biaxial retarder arrangement comprising an A-plate and a positive C-plate. Features of the embodiments of FIGS. 9B-C not discussed in further detail may be assumed to correspond to the features with equivalent reference numerals as discussed above, including any potential variations in the features.

By way of comparison with FIG. 9A, in the alternative embodiment of FIG. 9B, the biaxial retarder arrangement 730 comprises a negative C-plate 736 comprising birefringent material 737 arranged to receive the light from an A-plate 734 comprising birefringent material 735 with optical axis direction aligned to the vertical direction or y-axis; that is the extraordinary index $n_e$ is the same as the index ny. Negative C-plates may be more conveniently manufactured at low cost than positive C-plates.

By way of comparison with FIG. 9B, in the alternative embodiment of FIG. 9C, the biaxial retarder arrangement 730 comprises a positive C-plate 738 comprising birefringent material 739 arranged to receive the light from an A-plate 734 comprising birefringent material 735 with optical axis direction aligned to the horizontal direction or x-axis; that is the extraordinary index $n_e$ is the same as the index ny. Positive C-plate 738 may be provided by a coating manufacturing method, achieving reduced thickness.

The complexity of manufacture of the A-plate 735 and C-plates 736, 738 may be reduced compared to the B-plate 732 of FIG. 9A, advantageously achieving reduced cost.

The operation of the biaxial retarder arrangement 730 will now be described further.

FIG. 9D is a schematic diagram illustrating in perspective top view an out-of-plane polariser; FIG. 9E is a schematic diagram illustrating in perspective left side view an out-of-plane polariser; and FIG. 9F is a schematic diagram illustrating in perspective upper left quadrant view an out-of-plane polariser. Features of the embodiments of FIGS. 9D-F not discussed in further detail may be assumed to correspond to the features with equivalent reference numerals as discussed above, including any potential variations in the features.

In operation, the out-of-plane polariser 602 with absorption axis $k_e$ 622 provides absorption of the incident unpolarised transmitted polarisation state without output polarisation state 639 that varies with viewing direction 663, such as polarisation states 639(T) for the top look-down direction 663c, 639(L) for the left side viewing direction 663b and 639(TL) for the left side top quadrant viewing direction 663d.

Figure 9G:
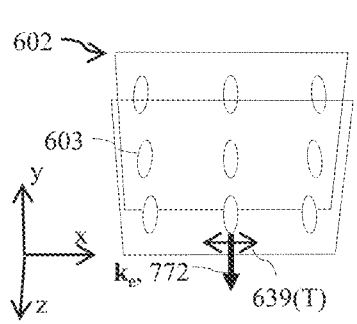
FIG. 9G is a schematic graph illustrating a polar variation of output polarisation state from an out-of-plane polariser without a biaxial retarder arrangement.
Figure 9G:
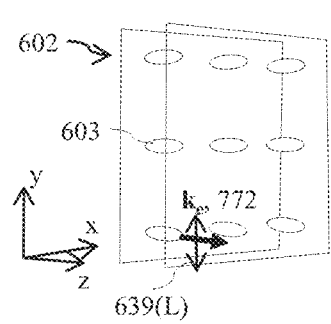
Figure 9G:
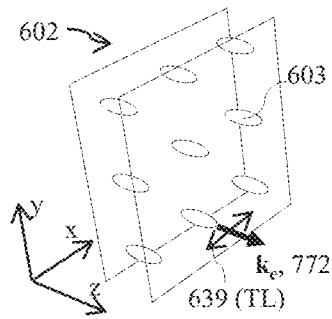
Figure 9G:
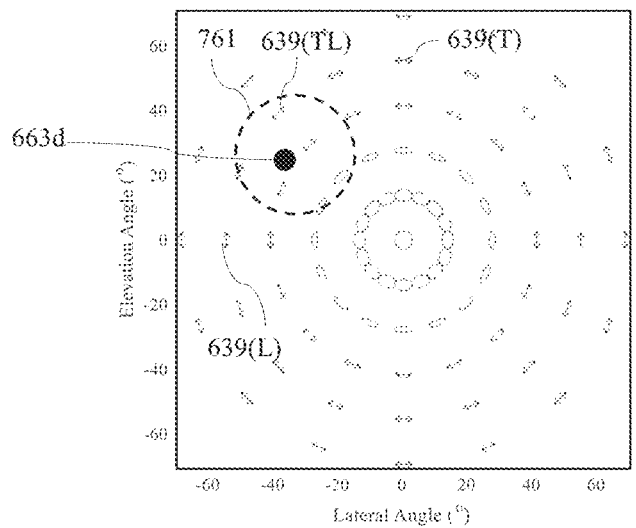
Figure 9H:
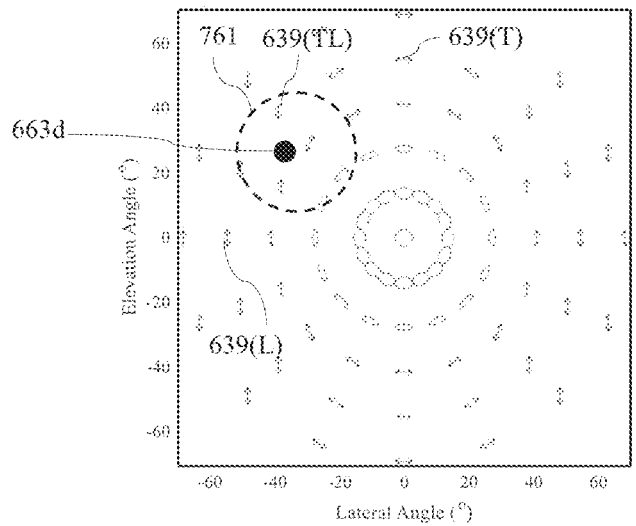
FIG. 9H is a schematic graph illustrating a polar variation of output polarisation state from an out-of-plane polariser arranged with a desirable biaxial retarder arrangement.

FIG. 9G is a schematic graph illustrating a polar variation of output polarisation state 639 from an out-of-plane polariser 602 without a biaxial retarder arrangement 730; and FIG. 9H is a schematic graph illustrating a polar variation of output polarisation state 639 from an out-of-plane polariser 602 arranged with a desirable biaxial retarder arrangement 730, for example as illustrated in FIG. 9A. Features of the embodiments of FIGS. 9G-H not discussed in further detail may be assumed to correspond to the features with equivalent reference numerals as discussed above, including any potential variations in the features.

FIG. 9G illustrates that in the region 761, the polarisation state 639(TL) is rotated with respect to the polarisation state 639(L), providing the increased transmission of FIG. 7B.

It would be desirable to reduce the transmission in the region 761 by modifying the polarisation state 639(TL) and not substantially modifying the polarisation states 639(L) and 639(T) such as is illustrated in FIG. 9H.

Figure 9I:
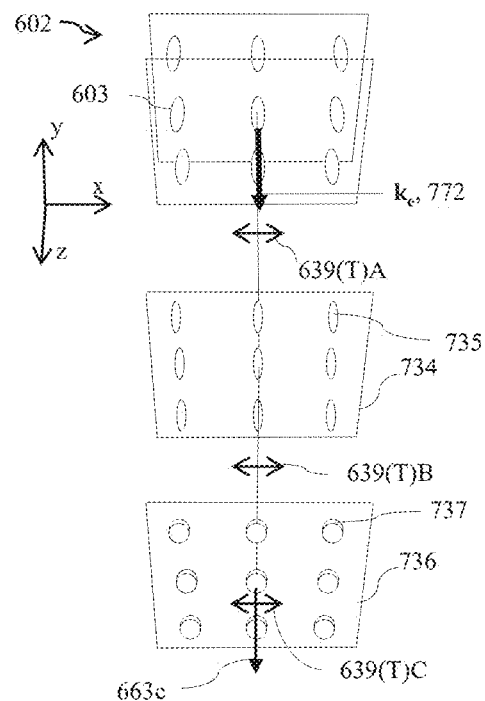
FIG. 9I is a schematic diagram illustrating in perspective top view propagation of a polarisation state through an out-of-plane polariser and a biaxial retarder arrangement.
Figure 9J:
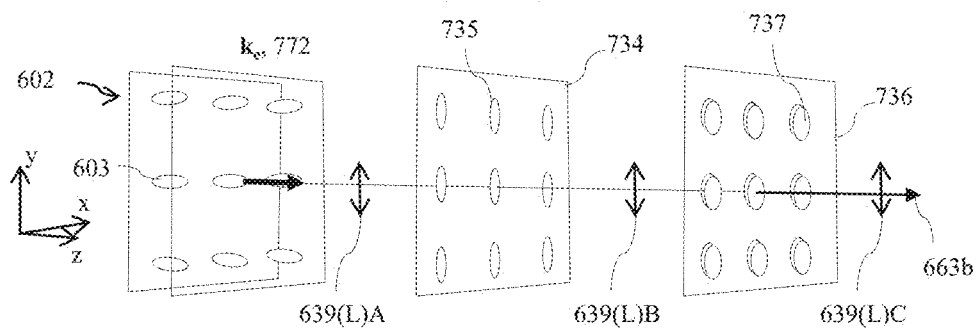
FIG. 9J is a schematic diagram illustrating in perspective left side view propagation of a polarisation state through an out-of-plane polariser and a biaxial retarder arrangement.
Figure 9K:
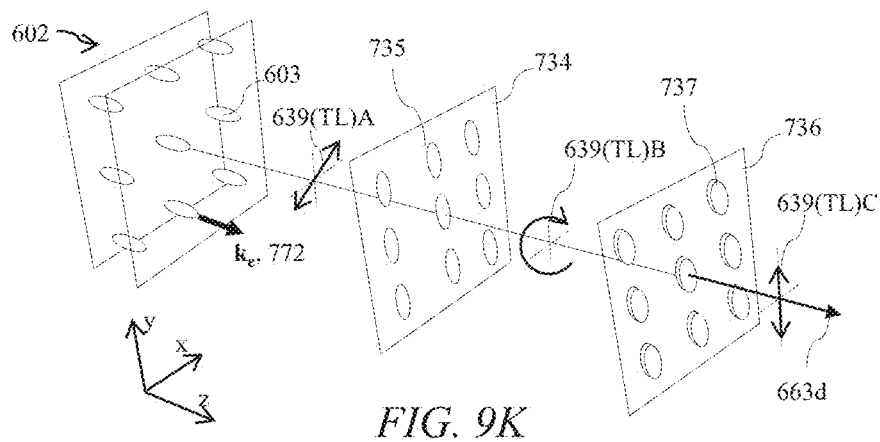
FIG. 9K is a schematic diagram illustrating in perspective upper left quadrant view propagation of a polarisation state through an out-of-plane polariser and a biaxial retarder arrangement.

FIG. 9I is a schematic diagram illustrating in perspective top view propagation of a polarisation state 639 (t) through an out-of-plane polariser 602 and a biaxial retarder arrangement 730; FIG. 9J is a schematic diagram illustrating in perspective left side view propagation of a polarisation state 639(L) through an out-of-plane polariser 602 and a biaxial retarder arrangement 730; and FIG. 9K is a schematic diagram illustrating in perspective upper left quadrant view propagation of a polarisation state 639(TL) through an out-of-plane polariser 602 and a biaxial retarder arrangement 730. Features of the embodiments of FIGS. 9I-K not discussed in further detail may be assumed to correspond to the features with equivalent reference numerals as discussed above, including any potential variations in the features.

FIGS. 9B-C illustrate that the biaxial retarder arrangement 730 may be formed as a C-plate arranged to receive the light from an A-plate. Principal axes nx, ny, nz components of the A-plate and C-plate are aligned with the orthogonal x, y and z system axes and preserve polarization in the lateral viewing direction (for zero elevation angle) and elevation viewing directions (for zero lateral angle) so that no modification of polarisation states 639(T) and 639(L) is achieved, as illustrated in FIGS. 9I-K for the directions 663c, 663b respectively where the polarisation states 639(T) A, 639(T)

B and 639(T) C are the same and the polarisation states 639(L) A, 639(L) B and 639(L) C are the same.

By comparison, in the viewing quadrant direction 663d as illustrated in FIG. 9I, the biaxial retarder 730 may be provided to provide rotation of polarisation state 639A at a desirable angle, such as illustrated by direction 663d in FIG. 10A hereinbelow. Such embodiments of biaxial retarder arrangement may achieve the desirable polarisation state 639 profiles of FIG. 9H.

Illustrative embodiments of transmission profile for the arrangement of FIG. 9A will now be described.

Figure 10A:
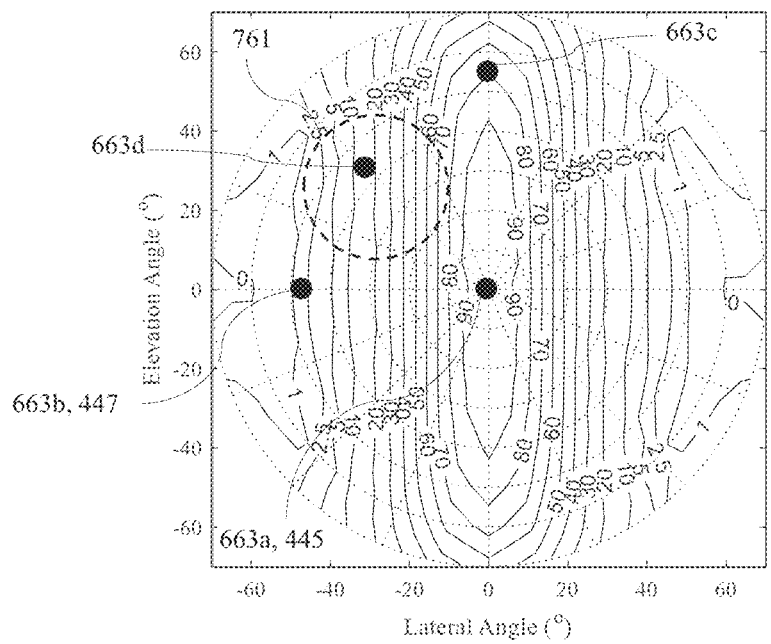
FIG. 10A is a schematic graph illustrating a polar variation of transmission for the arrangement of FIG. 9A comprising the arrangement of TABLE 4 for operation in the privacy mode.
Figure 10B:
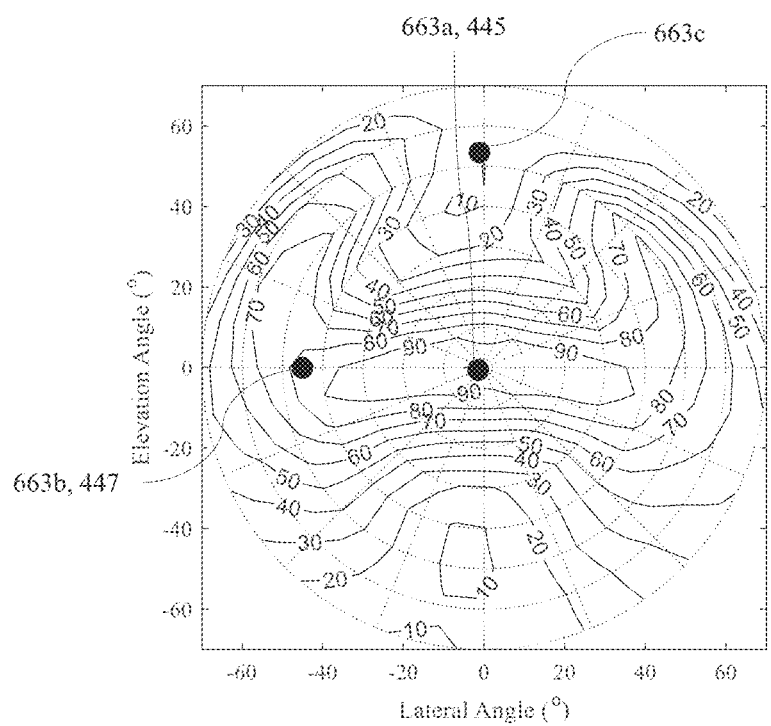
FIG. 10B is a schematic graph illustrating a polar variation of transmission for a share mode of operation comprising the polarisation switch of TABLE 6.

FIG. 10A is a schematic graph illustrating a polar variation of transmission for the arrangement of FIG. 9A comprising the arrangement of TABLE 4 and the polarisation switch of TABLE 6 for operation in the privacy mode; and FIG. 10B is a schematic graph illustrating a polar variation of transmission for the arrangement of FIG. 9A comprising the arrangement of TABLE 4 and the polarisation switch of TABLE 6 in the share mode. Features of the embodiments of FIGS. 10A-B not discussed in further detail may be assumed to correspond to the features with equivalent reference numerals as discussed above, including any potential variations in the features.

TABLE 4 illustrates a biaxial retarder arrangement 730 comprising a B-plate arranged between an out-of-plane polariser 602 and an in-plane polariser 610.

TABLE 4

| Item | Property | Value (Range) |
| --- | --- | --- |
| Out-of-plane polariser 602 | Material 751 ordinary refractive index, $n_o$ | 1.506 + 0.00165i |
| | Material 751 extraordinary refractive index, $n_e$ | 1.53 + 0.116i |
| | Thickness, d | 5 μm |
| | Absorption axis 622 tilt φ to surface normal 199 | 0° |
| Biaxial retarder arrangement 730 comprising B-plate 732 | Refractive index profile | ny > nx > nz |
| | (nx − ny)d | −150 nm |
| | | (−130 nm to −170 nm) |
| | (nx − nz)d | +300 nm |
| | | (+270 nm to +330 nm) |
| | Rth | +370 nm |
| | | (+340 nm to +400 nm) |
| | nx alignment | 0° in plane |
| | ny alignment | 90° in plane |
| | nz alignment | 90° out of plane |
| In-plane polariser 610 | Absorption axis 620 in-plane angle | 0° |

In other words, the biaxial retarder arrangement 730 may comprise a B-plate 732. The B-plate 732 may comprise material 731 with principal components of refractive index nx, ny, nz and a thickness d, and wherein for light at a wavelength of 550 nm: the value of (nx−ny)d is in a range between −130 nm and −170 nm, the value of (nx−nz)d is in a range between +270 nm and +330 nm, and the value of a parameter Rth is in a range between +340 nm and +400 nm, wherein Rth=(nx+ny)/2−nz)d. A low thickness component may be provided that may be formed with low cost, for example by double stretching.

By way of comparison with FIG. 5B, the alternative embodiment of FIG. 10A illustrates that luminance is reduced in the quadrant regions such as regions 761 of FIG. 10A by means of the biaxial retarder arrangement 730. Advantageously the size of the region for which security factor, S≥1 may be increased.

Alternative biaxial retarder arrangements 730 will now be further described. In an alternative arrangement of B-plate, a negative Rth may be provided, and the B-plate is rotated by 90 degrees so that the values of nx and ny are reversed compared to the embodiment of TABLE 4. The embodiment of TABLE 4 is more conveniently provided by double stretching, in comparison to said alternative arrangement.

TABLE 5A provides illustrative arrangements for the embodiment of FIG. 9B to achieve the equivalent transmission profile of FIG. 10A.

TABLE 5A

| Item | Property | | Value (Range) |
| --- | --- | --- | --- |
| Biaxial retarder arrangement 730 | A-plate 734 | (ne − no)d | +100 nm |
| | | | (+85 nm to +115 nm) |
| | | ne alignment | 90° in plane |
| | Negative C-plate 737 | (ne − no)d | −220 nm |
| | | | (−190 nm to −250 nm) |
| | | ne alignment | 90° out of plane |

The biaxial retarder arrangement 730 may comprise a C-plate 736 arranged to receive the light output from an A-plate 734. For light at a wavelength of 550 nm the A-plate 734 has a retardance in a range between +85 nm and +115 nm, and the C-plate 736 is a negative C-plate with a retardance in a range between −190 nm and −250 nm. The complexity of manufacture of the retarders 734, 736 may be reduced, achieving reduced cost.

TABLE 5B provides illustrative arrangements for the embodiment of FIG. 9C to achieve the equivalent transmission profile of FIG. 10A.

TABLE 5B

| Item | Property | | Value (Range) |
| --- | --- | --- | --- |
| Biaxial retarder arrangement 730 | A-plate 734 | (ne − no)d | +100 nm |
| | | | (+85 nm to +115 nm) |
| | | ne alignment | 0° in plane |
| | Positive C-plate 738 | (ne − no)d | +250 nm |
| | | | (+220 nm to +280 nm) |
| | | ne alignment | 90° out of plane |

For light at a wavelength of 550 nm the A-plate 734 has a retardance in a range between +85 nm and +115 nm, and the positive C-plate 738 has a retardance in a range between +220 nm and +280 nm. The thickness of the positive C-plate 738 may be reduced compared to the thickness of the negative C-plate 736, for example by providing cured reactive mesogen layers on the A-plate 734.

It will be appreciated that the combination of values provided in TABLE 4 and TABLES 5A-B represent particularly beneficial or advantageous embodiments because in privacy mode the luminance in the viewing quadrants such as region 761 of the display device 100 may be reduced as shown in FIG. 10A in comparison to alternative combinations of values and advantageously image security improved.

In operation, the angular variation of output polarisation state of the out-of-plane polariser 750 of FIG. 9G may be modified by the means of the biaxial retarder arrangement 730 with said combination of values to achieve the angular variation of output polarisation state of FIG. 9H, which provides said reduction of luminance in region 761.

An illustrative embodiment for the liquid crystal polarisation switch layer 614 driven by driver 650 is given in TABLE 6 for a third minimum cell design to advantageously achieve low chromatic variation of polarisation state switching.

TABLE 6

| | LC polarisation switch layer 614 | | | | | | |
|---|---|---|---|---|---|---|---|
| Mode | Alignment layers 617A, 617B | Alignment direction | Pretilt/ deg | Δn · d/ nm | Twist | Δε | Voltage/ V |
| Share | Homogeneous | 90° | 2 | 168 | 90° | +13.2 | $V_{614}S$: 5.0 |
| Privacy | Homogeneous | 180° | 2 | | | | $V_{614}P$: 0.0 |

Figure 10C:
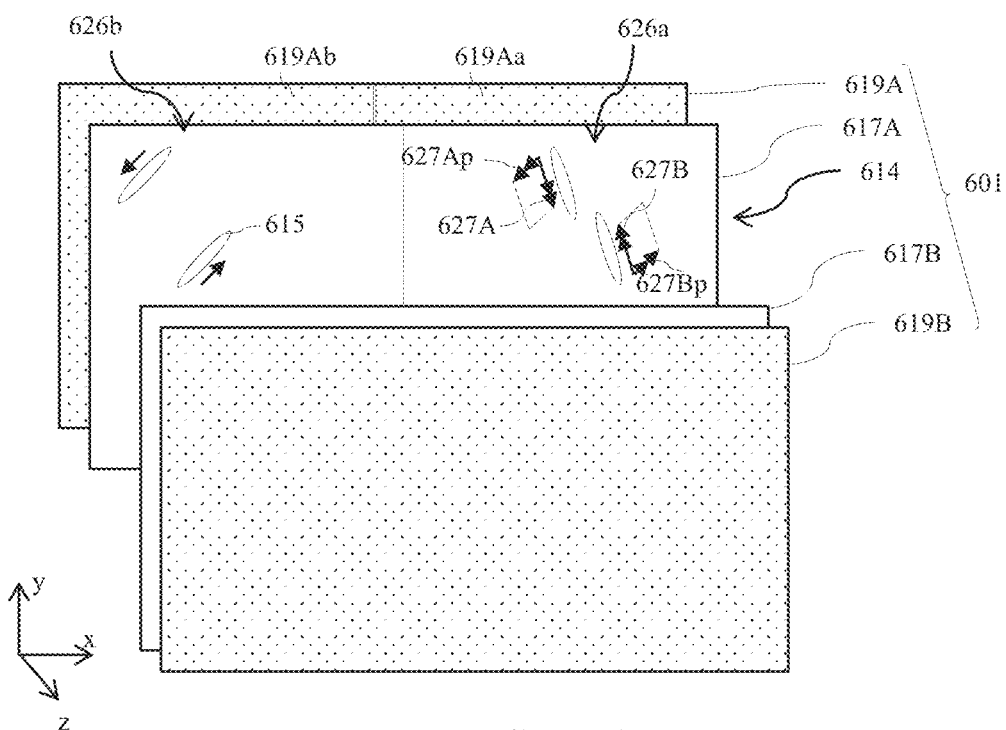
FIG. 10C is a schematic diagram illustrating in perspective front view a polarisation switch comprising a vertically aligned polarisation switch layer with privacy and share mode regions.
Figure 10D:
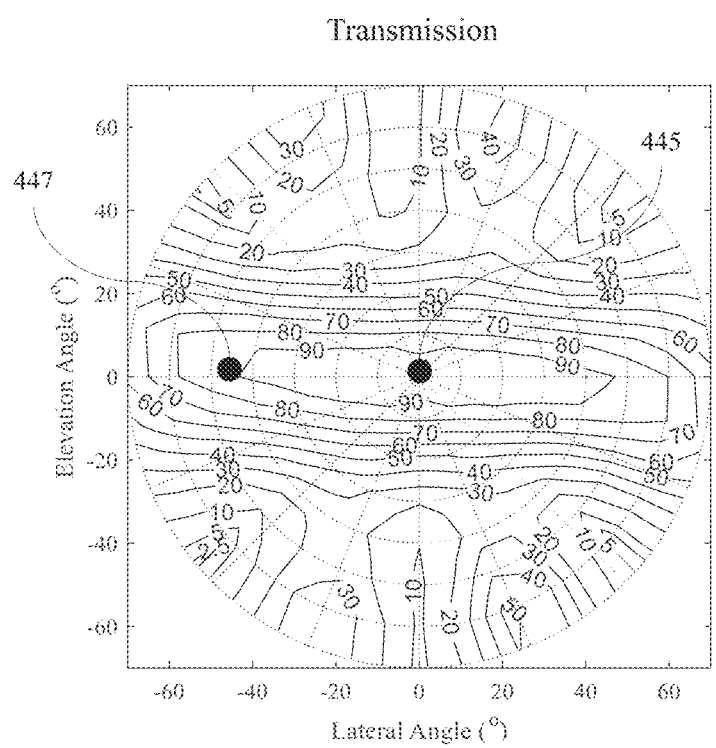
FIG. 10D is a schematic graph illustrating a polar variation of transmission for the out-of-plane polariser and the biaxial retarder of TABLE 4, and the polarisation switch of FIG. 10C and TABLE 7 in a share region of the display device.

FIG. 10C is a schematic diagram illustrating in perspective front view a polarisation switch comprising a vertically aligned polarisation switch layer with privacy and share mode regions; and FIG. 10D is a schematic graph illustrating a polar variation of transmission for the out-of-plane polariser 602 and the biaxial retarder 730 of TABLE 4, and the polarisation switch 601 of FIG. 10C and TABLE 7 in the share region of the display device that in FIG. 10C is the region 626b. Features of the embodiments of FIGS. 10C-D not discussed in further detail may be assumed to correspond to the features with equivalent reference numerals as discussed above, including any potential variations in the features.

By way of comparison with TABLE 6, the polarisation switch layer 601 of FIG. 10C and TABLE 7 may provide a switchable half waveplate to provide polarisation state 902 rotation to output polarisation state 904. The regions 626a, 626b may be provided by patterning of the electrode 619a or alternatively by patterning of electrode 619b.

TABLE 7

| | LC polarisation switch layer 614 | | | | | | |
|---|---|---|---|---|---|---|---|
| Mode | Alignment layers 617A, 617B | Alignment direction | Pretilt/ deg | Δn · d/ nm | Twist | Δε | Voltage/ V |
| Share | Homeotropic | 45° | 88 | 312 | 0° | +10.3 | $V_{614}S$: 7.0 |
| Privacy | Homeotropic | 225° | 88 | | | | $V_{614}P$: 0 |

Patterning of share and privacy mode regions is provided by a gap between electrodes 619Aa and 619Ab. The profile of transmission in privacy mode in region 626a is substantially the same as for FIG. 10A wherein in each case, the incident polarisation state 639 is substantially unmodified by the polarisation switch 601. By way of comparison with FIG. 10B, FIG. 10D illustrates that improved transmission may be achieved in the lateral direction in share mode operation.

Alternative arrangements of optical stacks will now be described.

FIGS. 11A-E are schematic diagrams illustrating in top view various alternative structures of optical stacks for display device 100 comprising at least one biaxial retarder 730. Features of the embodiments of FIGS. 11A-E not discussed in further detail may be assumed to correspond to the features with equivalent reference numerals as discussed above, including any potential variations in the features.

In the non-exhaustive optical stack embodiments of FIGS. 11A-E, at least one of the biaxial retarders 732 may be provided by the alternative embodiments illustrated in FIGS. 9B-C.

By way of comparison with FIG. 9A, the alternative embodiment of FIG. 11A illustrates that the biaxial retarder arrangement 730 may comprise first and second biaxial retarders 732A, 732B.

By way of comparison with FIG. 11A the alternative embodiment of FIG. 11B illustrates that the biaxial retarders 732AA, 732B may be arranged on opposite sides of the polarisation switch 601. Improved correction of chromaticity with viewing direction 663d may be achieved.

By comparison with the embodiments hereinabove, the alternative embodiments of FIGS. 11C-E comprise a further out-of-plane polariser 745 arranged between the polarisation switch 600 and the in-plane polariser 610. The transmission profile of the display device may have a non-switchable additional transmission profile of FIG. 10A. Off-axis luminance in privacy mode may be further reduced in comparison to the illustrative embodiments described hereinabove. Advantageously security factor may be further improved.

Figure 12A:
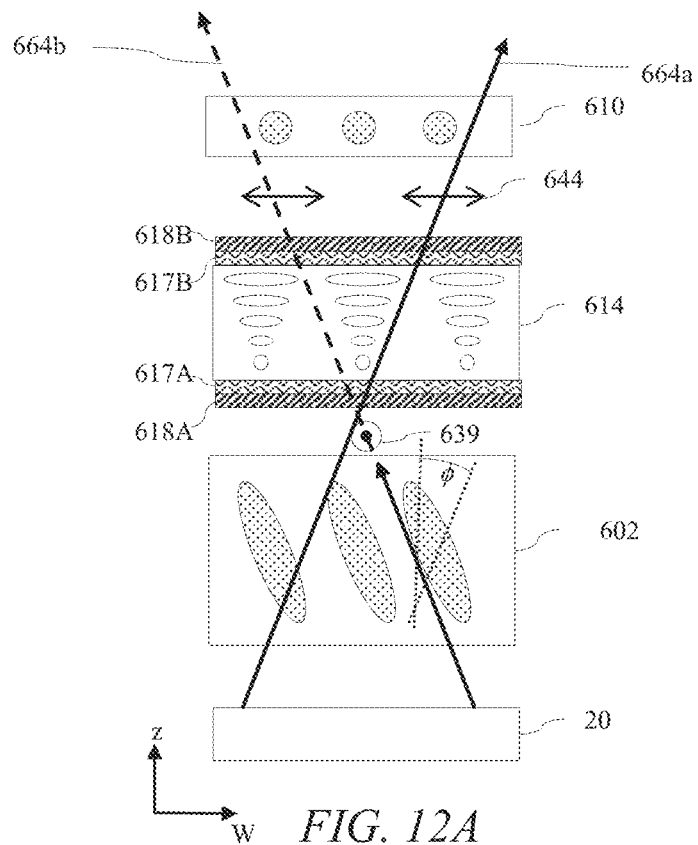
FIG. 12A is a schematic diagram illustrating in side view an out-of-plane polariser of the type illustrated in FIG. 2C, a liquid crystal polarisation switch and an in-plane polariser in an alternative second mode for two off-axis rays.
Figure 12B:
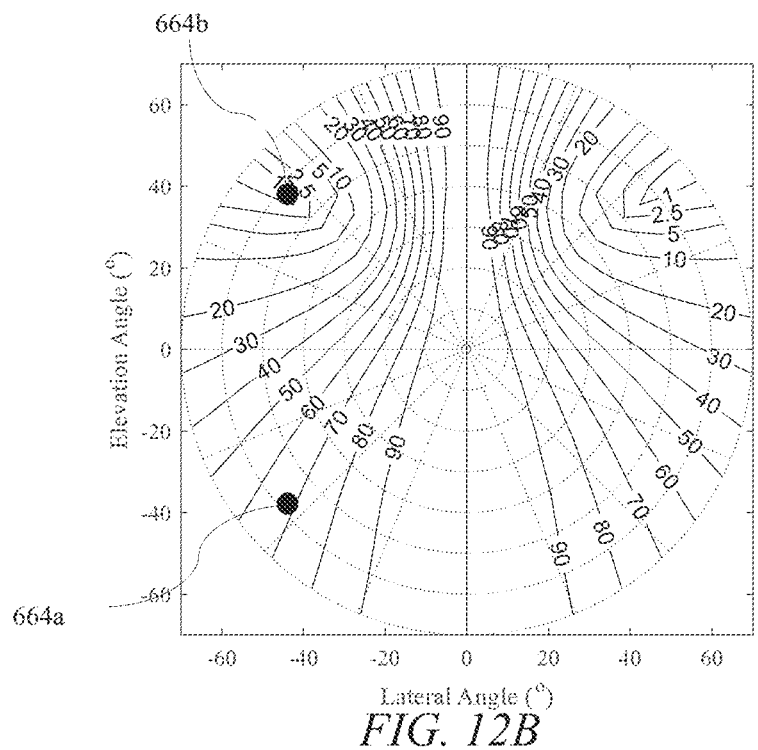
FIG. 12B is a schematic graph illustrating the polar variation of transmission for the structure illustrated in FIG. 12A wherein the absorption axis is tilted in the elevation direction and TABLE 8.

FIG. 12A is a schematic diagram illustrating in a cross sectional view across the z-W plane an out-of-plane polariser 602 of the type illustrated in FIG. 2C, a liquid crystal polarisation switch and a display polariser in an alternative second mode of operation for two off-axis rays; and FIG. 12B is a schematic graph illustrating the polar variation of luminance output for the structure illustrated in FIG. 12A and TABLE 8 where the W-axis is the y-axis, that is the arrangement of FIG. 12A is the side view of the out-of-plane polariser 602. Features of the embodiments of FIGS. 12A-B not discussed in further detail may be assumed to correspond to the features with equivalent reference numerals as discussed above, including any potential variations in the features.

TABLE 8

| Item | Property | Value |
|---|---|---|
| Out-of-plane polariser 602 | Material 603 ordinary refractive index, $n_o$ at 550 nm | 1.506 + 0.00165i |
|  | Material 603 extraordinary refractive index, $n_e$ at 550 nm | 1.53 + 0.116i |
|  | Thickness, d | 10 µm |
|  | Absorption axis 622 tilt ϕ to surface normal 199 | 20° |
|  | Absorption axis 622 azimuthal angle θ | 90° |
| In-plane polariser 610 | Absorption axis 620 in-plane angle | 0° |

In comparison to FIG. 5A, FIG. 12A illustrates in operation, for lateral angles different to the on-axis direction, the ray 664a has higher transmission than the ray 664b, and asymmetric transmission profile is achieved. In the display of FIG. 1A, advantageously reduced luminance may be achieved for desirable look-down directions.

It may be desirable to provide off-axis operation in the lateral direction.

Figure 12C:
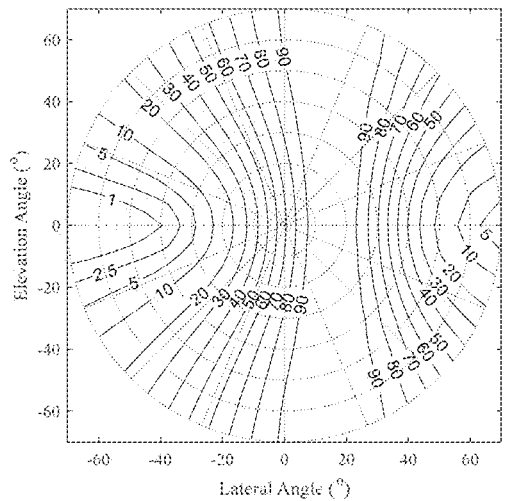
FIG. 12C is a schematic graph illustrating the polar variation of transmission for the structure FIG. 12A wherein the absorption axis is tilted in the lateral direction and TABLE 9 in a first mode.
Figure 12D:
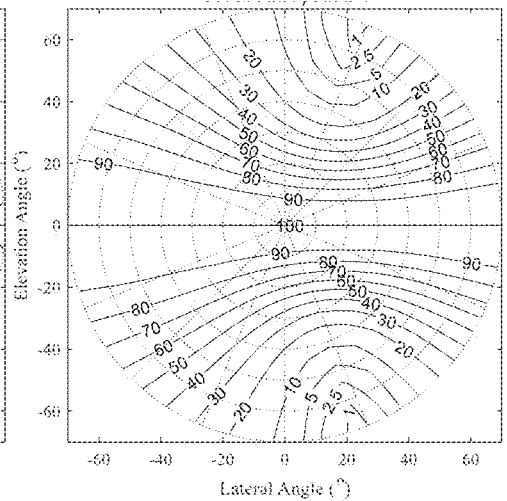
FIG. 12D is a schematic graph illustrating the polar variation of transmission for the arrangement of FIG. 12C in a second mode.
Figure 12E:
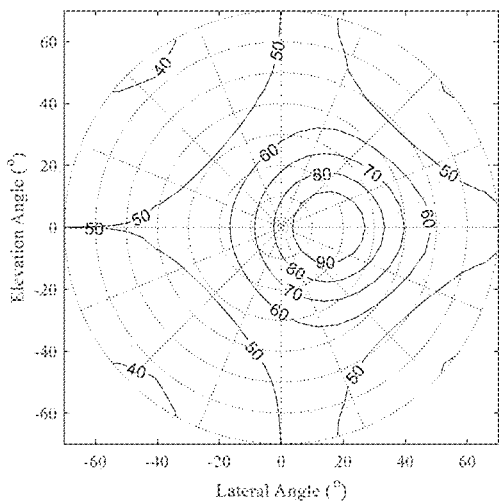
FIG. 12E is a schematic graph illustrating the polar variation of transmission for the arrangement of FIG. 12C in a third, mixed mode of operation.

FIG. 12C is a schematic graph illustrating the polar variation of transmission for the structure illustrated in FIG. 12A wherein the absorption axis 322 is tilted in the lateral direction and TABLE 9 in a first mode of operation; FIG. 12D is a schematic graph illustrating the polar variation of transmission for the arrangement of FIG. 12C in the second mode of operation; and FIG. 12E is a schematic graph illustrating the polar variation of transmission for the arrangement of FIG. 12C in the third, mixed mode of operation and as illustrated in TABLE 9. Features of the embodiments of FIGS. 12C-E not discussed in further detail may be assumed to correspond to the features with equivalent reference numerals as discussed above, including any potential variations in the features.

Considering the arrangement of FIG. 12A, in the alternative embodiments of FIGS. 12C-E, the W-axis is the x-axis and FIG. 12A is a top view of the out-of-plane polariser 602. By way of comparison with FIG. 12B, FIG. 12C illustrates that the direction of the maximum luminance is offset from the normal to the out-of-plane polariser 602. Further, FIG. 12E has a share mode maximum luminance that is similarly offset from the normal direction.

TABLE 9

| Item | Property | Value |
|---|---|---|
| Out-of-plane polariser 602 | Material 603 ordinary refractive index, $n_o$ at 550 nm | 1.506 + 0.00165i |
|  | Material 603 extraordinary refractive index, $n_e$ at 550 nm | 1.53 + 0.116i |
|  | Thickness, d | 7 µm |
|  | Absorption axis 622 tilt ϕ to surface normal 199 | 10° |
|  | Absorption axis 622 azimuthal angle θ | 0° |
| In-plane polariser 610 | Absorption axis 620 in-plane angle | 0° |

Figure 12F:
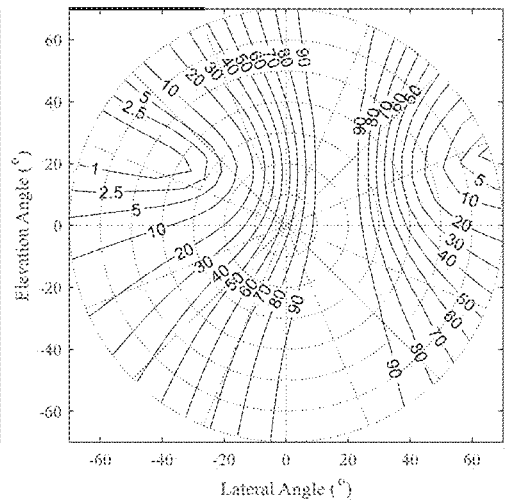
FIG. 12F is a schematic graph illustrating the polar variation of transmission for a collimated backlight of the type illustrated in FIG. 12A wherein the absorption axis is tilted and rotated on an axis inclined to the lateral and elevation directions.

FIG. 12F is a schematic graph illustrating the polar variation of transmission for a collimated backlight of the type illustrated in FIG. 12A wherein the absorption axis 322 is tilted and rotated on an axis inclined to the lateral and elevation directions and TABLE 10 in a first mode of operation. Features of the embodiment of FIG. 12F not discussed in further detail may be assumed to correspond to the features with equivalent reference numerals as discussed above, including any potential variations in the features.

Considering the arrangement of FIG. 12A, in the alternative embodiments of FIG. 12F, the W-axis is a bisector of the x-axis and y-axis and FIG. 12A is an inclined top-side view of the out-of-plane polariser 602.

TABLE 10

| Item | Property | Value |
|---|---|---|
| Out-of-plane polariser 602 | Material 603 ordinary refractive index, $n_o$ at 550 nm | 1.506 + 0.00165i |
|  | Material 603 extraordinary refractive index, $n_e$ at 550 nm | 1.53 + 0.116i |
|  | Thickness, d | 7 µm |
|  | Absorption axis 622 tilt ϕ to surface normal 199 | 15° |
|  | Absorption axis 622 azimuthal angle θ | 45° |
| In-plane polariser 610 | Absorption axis 620 in-plane angle | 0° |

Embodiments comprising the off-axis profiles of FIGS. 12B-F will now be further described.

Figure 13:
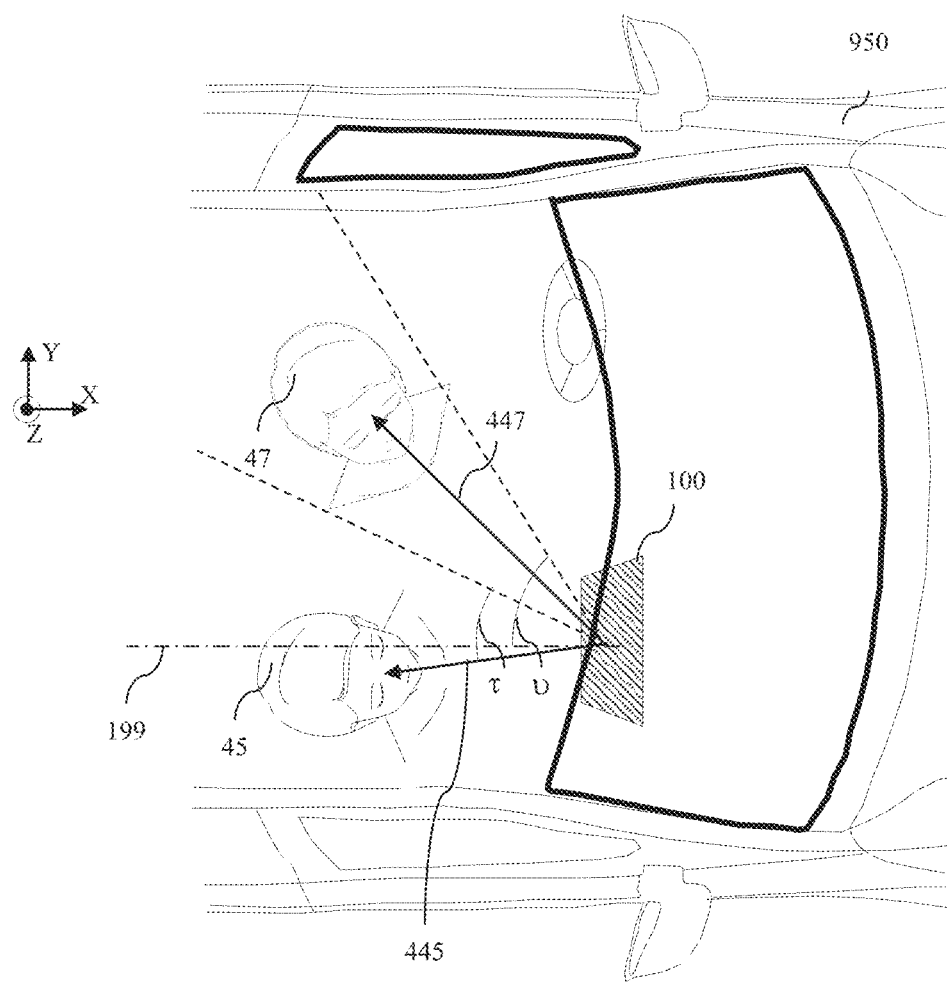
FIG. 13 is a schematic diagram illustrating in top view a vehicle comprising a passenger infotainment display.

FIG. 13 is a schematic diagram illustrating in top view a vehicle 950 comprising a passenger infotainment display device 100. Features of the embodiment of FIG. 13 not discussed in further detail may be assumed to correspond to the features with equivalent reference numerals as discussed above, including any potential variations in the features.

Polar control display device 100 is arranged to provide images to passenger 45 in nominal viewing direction 445, while preventing driver 47 in nominal direction 447, but with viewing freedom between angles t and v from the normal 199. It is desirable to provide passenger 45 with high image visibility and driver 47 with high image security, by means of luminance reduction to the driver 47. It is desirable to provide reduced luminance in the direction 447 to maximise security factor. FIG. 12C illustrates that the off-axis distribution of light transmission may be advantageously provided to improve the security factor S to the driver 47.

It may be desirable to improve the luminance uniformity of a privacy display device.

Figure 14A:
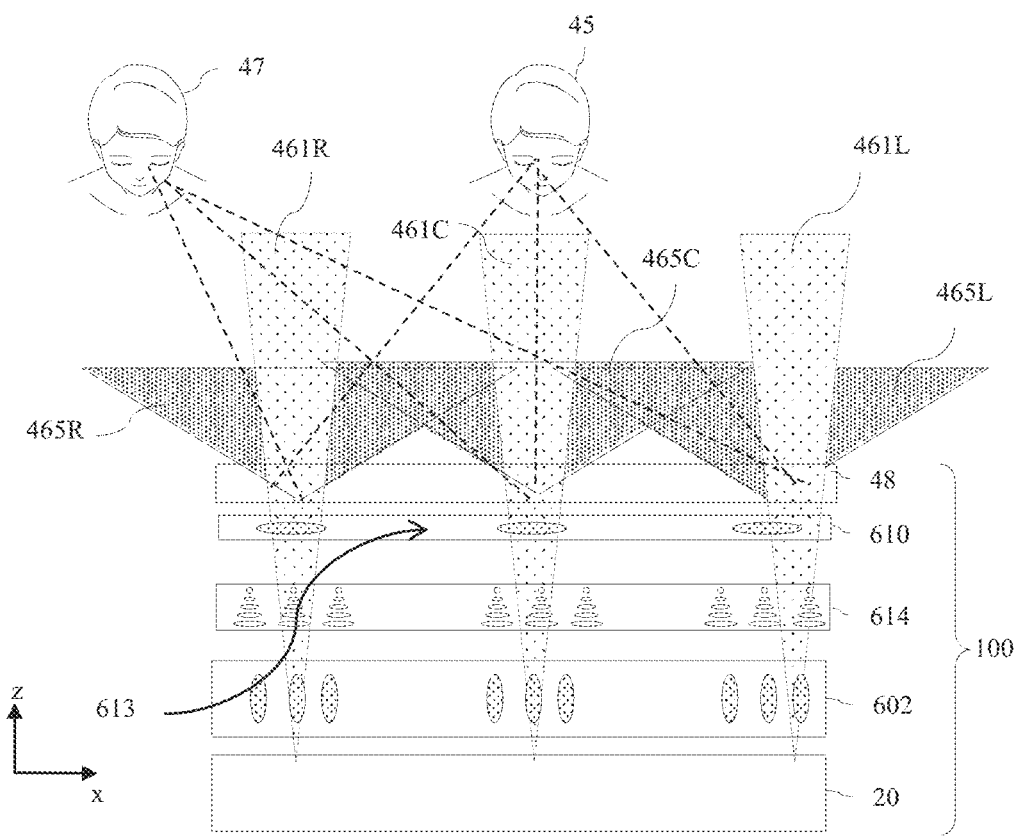
FIG. 14A is a schematic diagram illustrating in top view a polar angle control display device wherein the direction $k_e$ of the absorption axis tilt φ to surface normal is the same across the display device.

FIG. 14A is a schematic diagram illustrating in top view a polar angle control display device 100 wherein the direction $k_e$ of the absorption axis 622 tilt ϕ to surface normal 199 is the same across the display device 100. Features of the embodiment of FIG. 14A not discussed in further detail may be assumed to correspond to the features with equivalent reference numerals as discussed above, including any potential variations in the features.

The embodiment of FIG. 14A illustrates that the display may provide the same direction of light cones 461R, 461C, 461L from the backlight and the same transmission profiles 465R, 465C, 465L across the area 613 of the polar control display device 100. The out-of-plane polariser 602 may be provided with uniform alignment, advantageously reducing manufacturing cost and complexity.

In operation, the user or passenger 45 sees an image with different luminances from different locations across the area 613 of the display device 100. Undesirably image uniformity is degraded. Further, for a snooper or driver 47 then the uniformity of security factor is reduced so that some parts of the display device 100 may become undesirably visible.

Figure 14B:
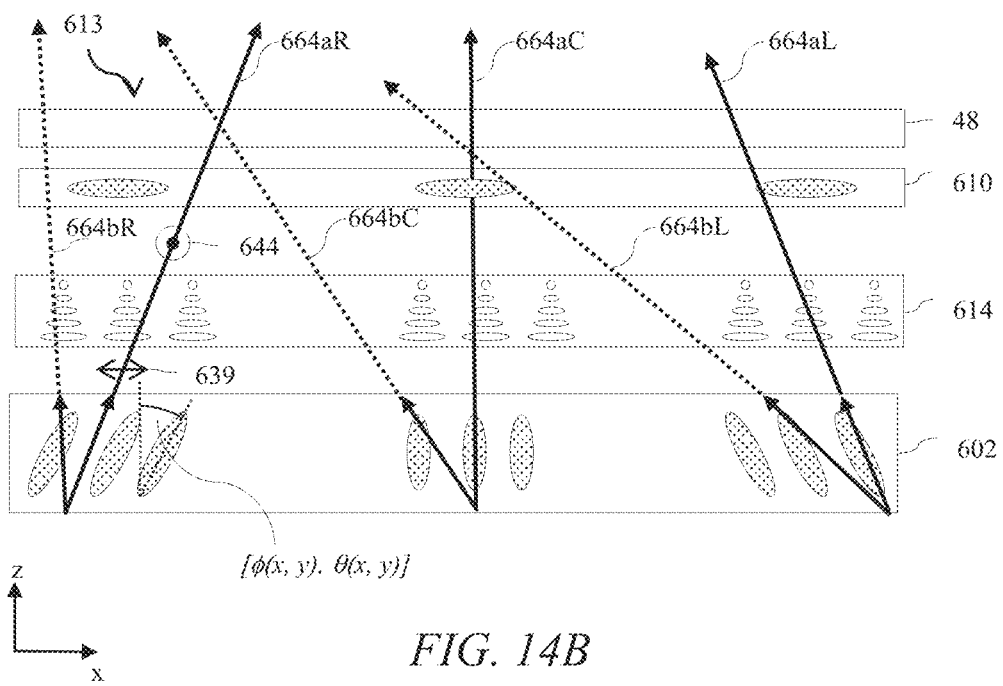
FIG. 14B is a schematic diagram illustrating in top view an out-of-plane polariser wherein the direction $k_e$ of the absorption axis tilt φ to surface normal changes monotonically along a predetermined axis across the out-of-plane polariser.

FIG. 14B is a schematic diagram illustrating in top view a display device 100 comprising an out-of-plane polariser 602 wherein the direction $k_e$ of the absorption axis 622 tilt ø to surface normal 199 changes monotonically along a predetermined axis across the out-of-plane polariser 602. Features of the embodiment of FIG. 14B not discussed in further detail may be assumed to correspond to the features with equivalent reference numerals as discussed above, including any potential variations in the features.

The direction of the absorption axis 622 of the out-of-plane polariser 602 changes monotonically along a predetermined axis across the display device 100.

Further, as illustrated in FIG. 12F, the direction of the absorption axis 622 of the out-of-plane polariser 602 may change across more than one predetermined axis so that the tilt and rotation angles [φ(x, y), θ(x, y)] vary with location across the area 613 of the display device 100.

In operation, the direction of maximum luminance also varies across the are 613 of the display device 100. Light rays 664aL, 664aC, 664aR are directed towards the user 45 with high luminance, while light rays 664bL, 664bC, 664bR with reduced luminance. Advantageously in comparison to the embodiment of FIG. 14A, luminance uniformity is improved for the user 45 and uniformity of security factor is improved for the snooper 47.

Figure 14C:
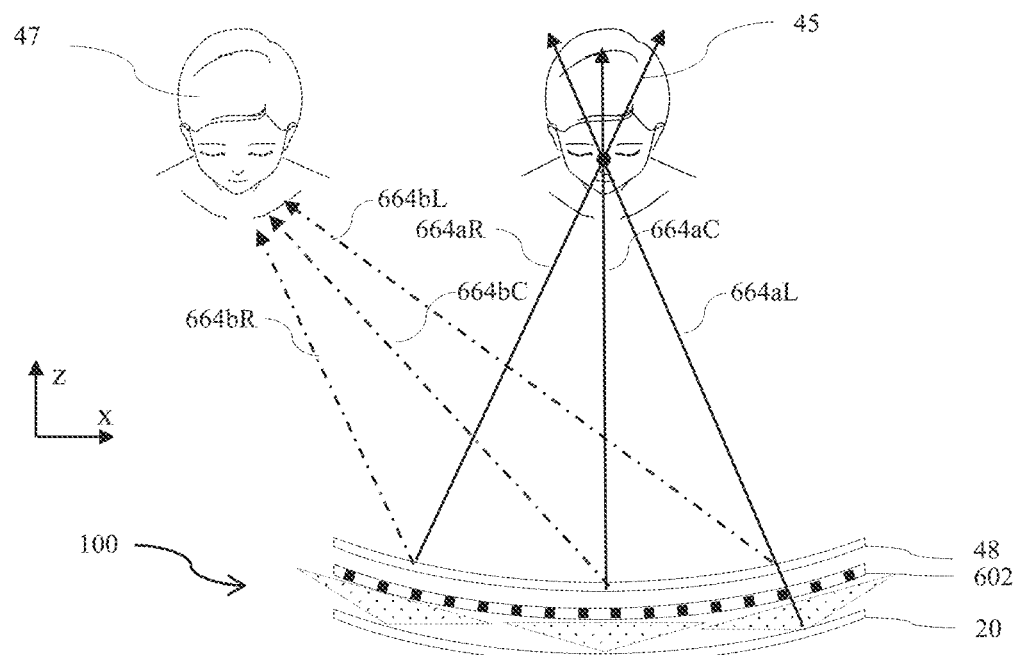
FIG. 14C is a schematic diagram illustrating in top view a polar angle control display device wherein the direction $k_e$ of the absorption axis tilt φ to surface normal changes monotonically along a predetermined axis across the display device for an off-axis viewing direction.

FIG. 14C is a schematic diagram illustrating in top view a polar angle control display device 100 wherein the direction $k_e$ of the absorption axis 622 tilt ø to surface normal 199 changes monotonically along a predetermined axis across the display device 100 for an off-axis viewing direction. Features of the embodiment of FIG. 14C not discussed in further detail may be assumed to correspond to the features with equivalent reference numerals as discussed above, including any potential variations in the features.

By way of comparison with FIG. 14A, the display device 100 is curved with a concave curvature as viewed from an output side of the display device 100. The curvature provides a variation in the direction 199 with location across the display and may provide that the rays 664aR. 664aC, 664aL may be directed towards the observer 45 with high transmission to advantageously achieve improved image uniformity; and the rays 664bR, 664bC, 664bL may be directed towards the snooper 47 with low transmission to advantageously achieve improved uniformity of security factor.

Further the direction of the absorption axis 622 of the out-of-plane polariser 602 changes monotonically along a predetermined axis which may be the lateral axis across the display device 100 to further improve the display uniformity.

Alternative arrangements of polar angle control display device 100 will now be described.

Figure 15A:
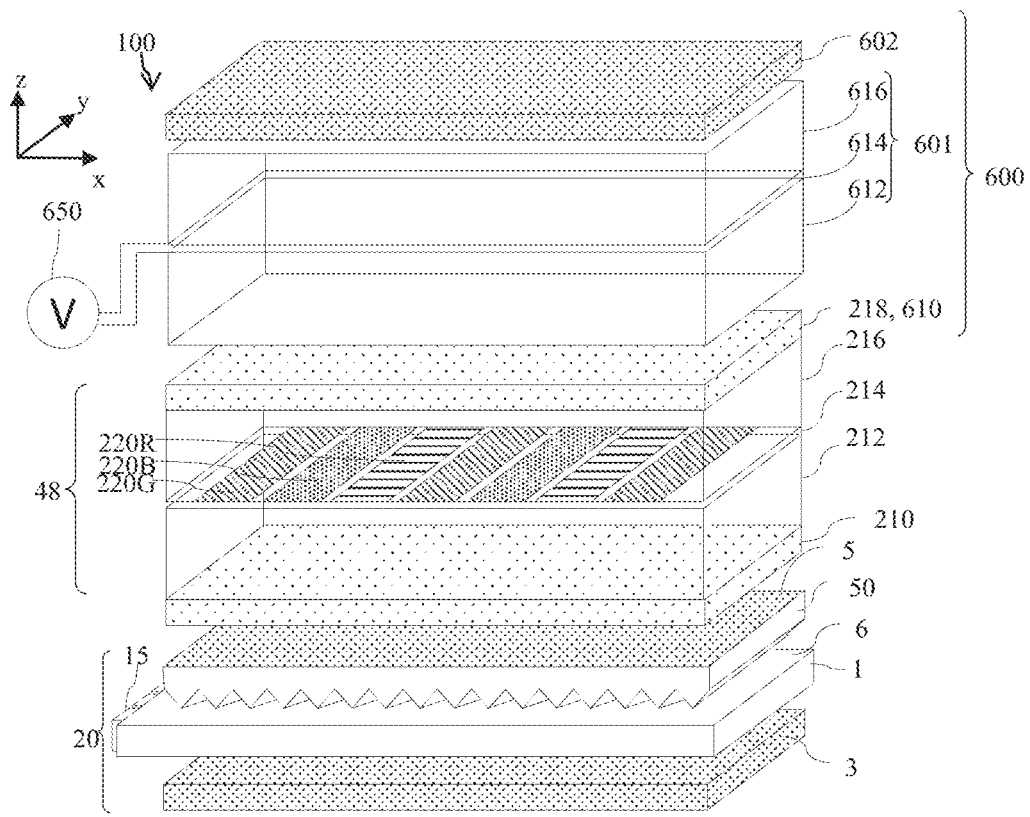
FIG. 15A is a schematic diagram illustrating in perspective side view a polar angle control display device comprising a backlight, a transmissive spatial light modulator, an in-plane polariser that is the output polariser of the spatial light modulator, a polarisation switch and an out-of-plane polariser.

FIG. 15A is a schematic diagram illustrating in perspective side view a polar angle control display device 100 comprising a backlight 20, a transmissive spatial light modulator 48, an in-plane polariser 610 that is the output polariser 218 of the spatial light modulator 48, a polarisation switch 601 and an out-of-plane polariser 602. Features of the embodiment of FIG. 15A not discussed in further detail may be assumed to correspond to the features with equivalent reference numerals as discussed above, including any potential variations in the features.

By way of comparison with FIG. 1A, in the alternative embodiment of FIG. 15A, the transmissive spatial light modulator 48 comprises an input polariser 210 and an output polariser 218, and the output polariser 218 is the in-plane polariser 610 and said side of the spatial light modulator 48 is an output side of the spatial light modulator 48. In other words, the spatial light modulator 48 comprises an output polariser 218, and the output polariser 218 is the in-plane polariser 610.

The polarisation switch 601 and out-of-plane polariser 602 may be provided as a separate component and may be conveniently added to the front of an existing spatial light modulator 48 to provide a user mounted switchable privacy display function. Alternatively or additionally, a touch screen control arrangement may be provided on or in the polarisation switch 601 such as described in U.S. Pat. No. 10,802,356, which is herein incorporated by reference in its entirety. Advantageously cost may be reduced.

Figure 15B:
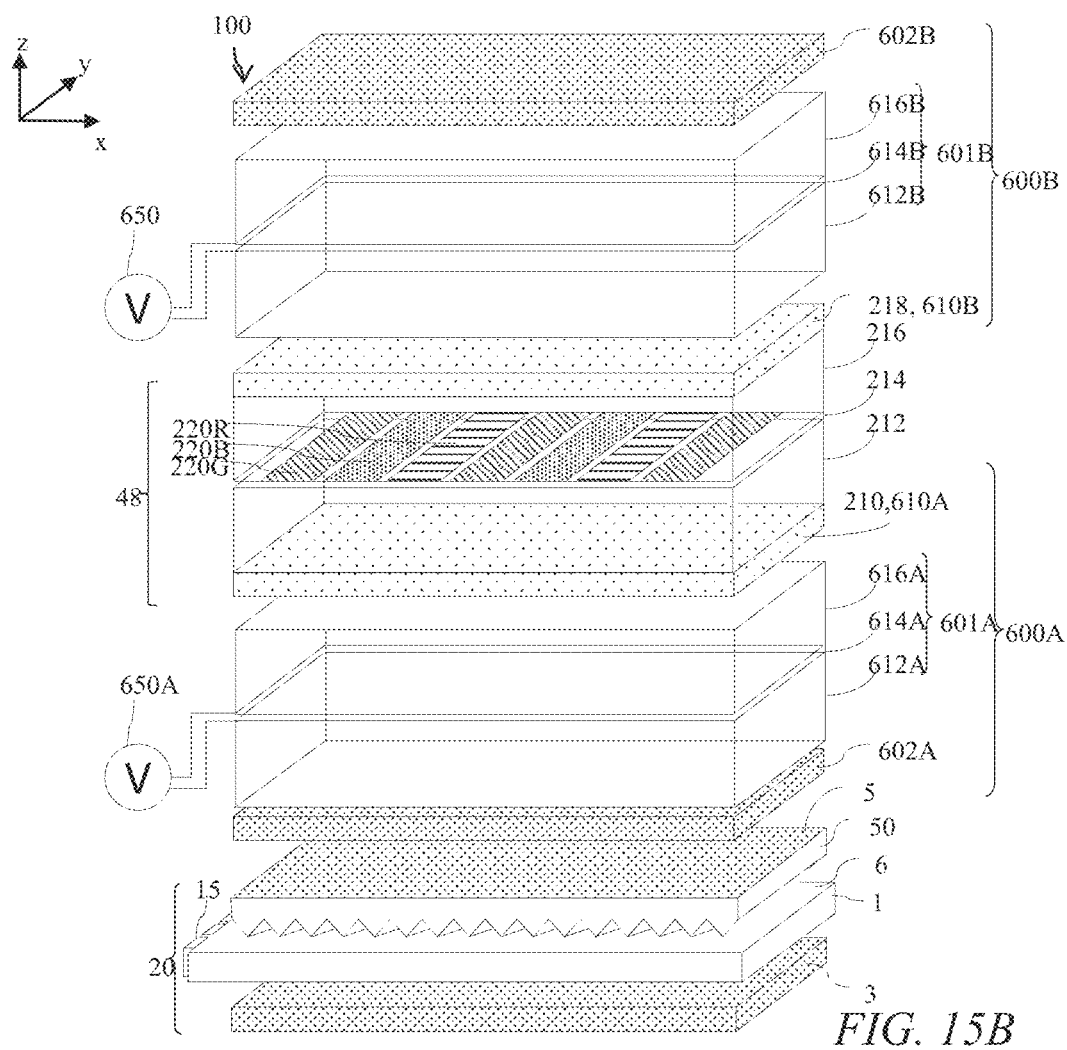
FIG. 15B is a schematic diagram illustrating in perspective side view a polar angle control display device comprising a backlight, an out-of-plane polariser, a polarisation switch, an in-plane polariser that is the input polariser of a spatial light modulator, a further in-plane polariser that is the output polariser of the spatial light modulator, a further polarisation switch and a further out-of-plane polariser.
Figure 15C:
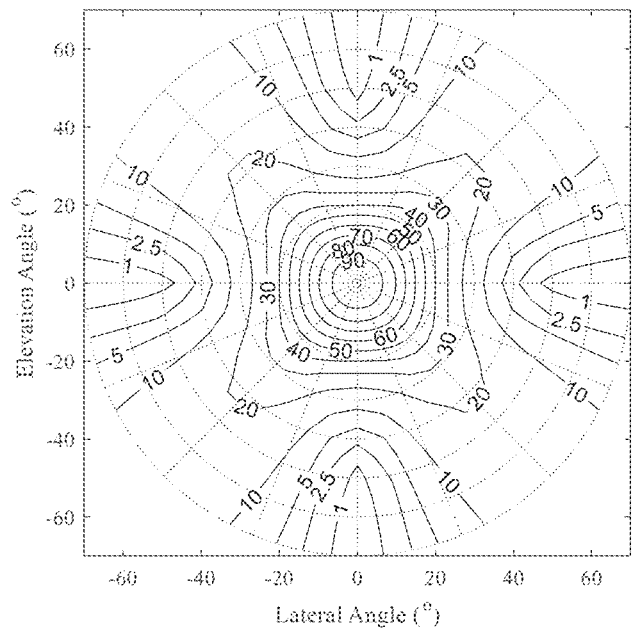
FIG. 15C is a schematic graph illustrating the polar variation of transmission for a collimated backlight of the type illustrated in FIG. 15B and comprising the arrangement of TABLE 11.

FIG. 15B is a schematic diagram illustrating in perspective side view a polar angle control display device 100 comprising a backlight 20, an out-of-plane polariser 602, a polarisation switch 601, an in-plane polariser 610 that is the input polariser of a spatial light modulator 48, a further in-plane polariser 610 that is the output polariser 218 of the spatial light modulator 48, a further polarisation switch 601 and a further out-of-plane polariser 602; and FIG. 15C is a schematic graph illustrating the polar variation of transmission for a collimated backlight of the type illustrated in FIG. 15B and comprising the arrangement of TABLE 11, in which the polarisation switch 601A and polarisation switch 601B are provided as for TABLE 1. Features of the embodiment of FIGS. 15B-C not discussed in further detail may be assumed to correspond to the features with equivalent reference numerals as discussed above, including any potential variations in the features.

By way of comparison with FIG. 1A, the alternative embodiment of FIG. 15B illustrates that the transmissive spatial light modulator 48 comprises an out-of-plane polariser 602A and a polarisation switch 601A with driver 650A arranged on the input side of the in-plane polariser 610 that is the input polariser 210, and further comprises a further in-plane polariser 610B that is the output polariser 218, a further polarisation switch 601B with driver 650B (that may alternatively be the same driver as the driver 650A) and a further out-of-plane polariser 602B on the output side of the further polarisation switch 601B. By way of comparison with FIG. 1A or FIG. 15A, additional functionality may be provided, for example as illustrated in FIG. 15C wherein the first and second in-plane polarisers are crossed.

TABLE 11

| | Item | Value |
|---|---|---|
| Out-of-plane polariser 602A | Material 603 ordinary refractive index, $n_o$ at 550 nm | 1.506 + 0.00165i |
| | Material 603 extraordinary refractive index, $n_e$ at 550 nm | 1.53 + 0.116i |
| | Thickness, d | 7 μm |
| | Absorption axis 622 tilt φ to surface normal 199 | 0° |
| In-plane polariser 610A | Absorption axis 620 in-plane angle | 0° |
| Out-of-plane polariser 602B | Material 603 ordinary refractive index, $n_o$ at 550 nm | 1.506 + 0.00165i |
| | Material 603 extraordinary refractive index, $n_e$ at 550 nm | 1.53 + 0.116i |
| | Thickness, d | 7 μm |
| | Absorption axis 622 tilt φ to surface normal 199 | 0° |
| In-plane polariser 610B | Absorption axis 620 in-plane angle | 90° |

Advantageously improved privacy performance may be achieved in landscape and portrait modes of operation.

It may be desirable to provide alternative profiles of light suppression in privacy mode of operation.

Figure 16A:
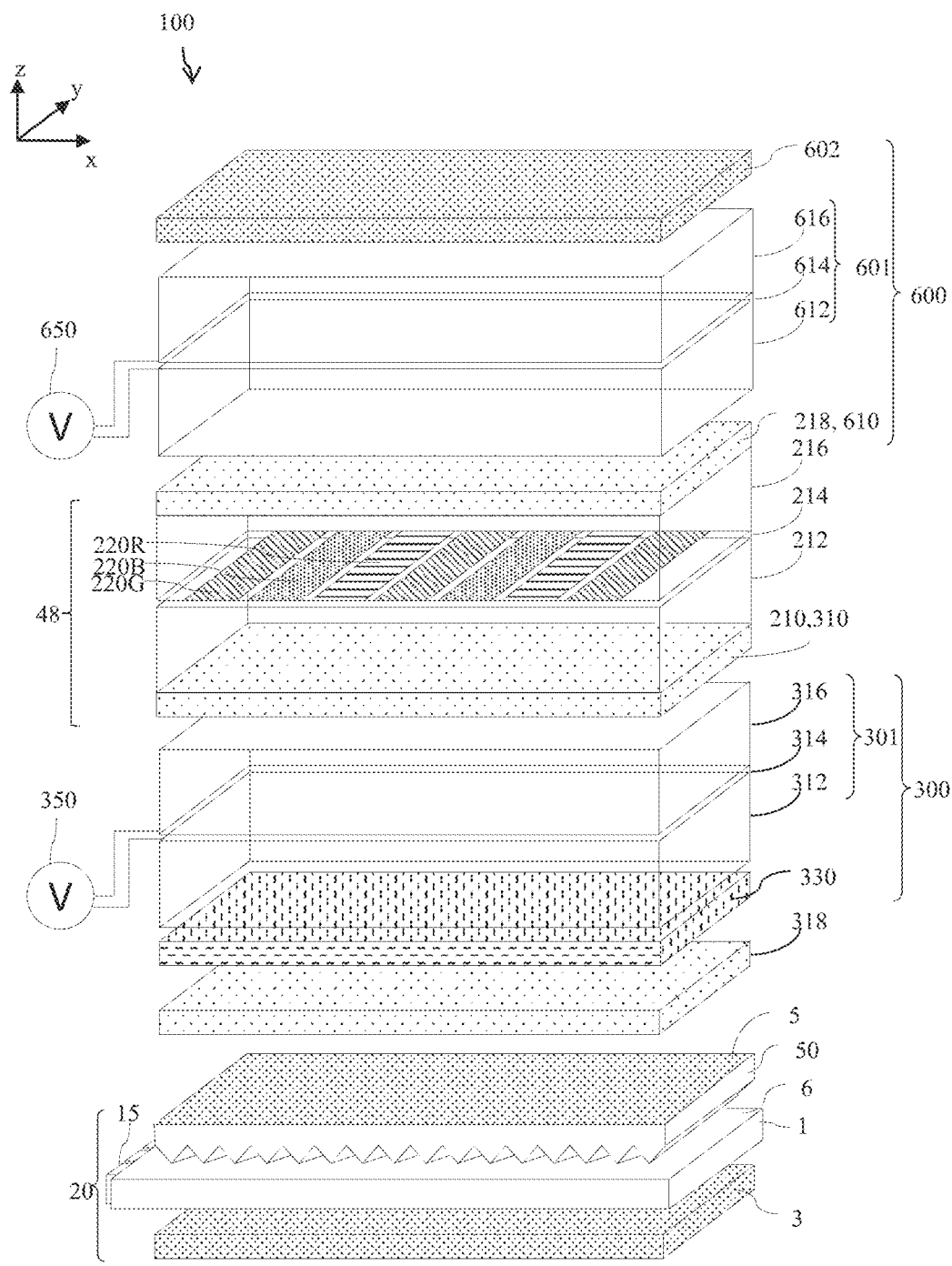
FIG. 16A is a schematic diagram illustrating in perspective side view a polar angle control display device comprising a backlight, an additional polariser, a polar control retarder comprising a layer of liquid crystal material and a passive compensation retarder, an input polariser of a transmissive spatial light modulator, an output polariser of a spatial light modulator, a reflective polariser that is an in-plane polariser, a polarisation switch and an out-of-plane polariser.

FIG. 16A is a schematic diagram illustrating in perspective side view a polar angle control display device 100 comprising a backlight 20, an additional polariser, a polar control retarder 300 comprising a layer 314 of liquid crystal material 315 and a passive compensation retarder 330, an input polariser 210 of the transmissive spatial light modulator 48, an in-plane polariser 610 that is the output polariser 218 of a spatial light modulator 48, a polarisation switch 601 and an out-of-plane polariser 602. Features of the embodiment of FIG. 16A not discussed in further detail may be assumed to correspond to the features with equivalent reference numerals as discussed above, including any potential variations in the features.

In other words, the out-of-plane polariser 602 is arranged on a side of the spatial light modulator 48 that is the output side of the spatial light modulator 48 and the spatial light modulator 48 comprises an output polariser 218. The output polariser 218 is the in-plane polariser 610.

By way of comparison with FIG. 15A, in the alternative embodiment of FIG. 16A the polar control retarder 300 and additional polariser 318 are arranged between the backlight 20 and in-plane polariser 310 that is the input polariser 210 of the spatial light modulator 48. The in-plane polariser 310 illustrated herein provides a different operation of the display to the display polariser 610 described hereinabove. Polar control retarder 300 is arranged to provide variation of transmission with polar angle when provided between in-plane polariser 310 and additional polariser 318, that is also an in-plane polariser and as illustrated in FIGS. 29A-B and FIGS. 30A-D hereinbelow.

Polar control retarders 300 are described in U.S. Pat. No. 11,092,851, 10,976,578, 10,802,356, 11,099,448, 11,340,482, 11,892,717, and U.S. patent application Ser. No. 18/609,272, all of which are herein incorporated by reference in their entireties. Polar control retarders 300 are further described in FIG. 29A and FIGS. 30A-B hereinbelow.

By way of comparison with FIG. 15A, advantageously improved control of light suppression may be achieved in privacy mode and alternative polar regions may be provided with improved security factor.

Figure 16B:
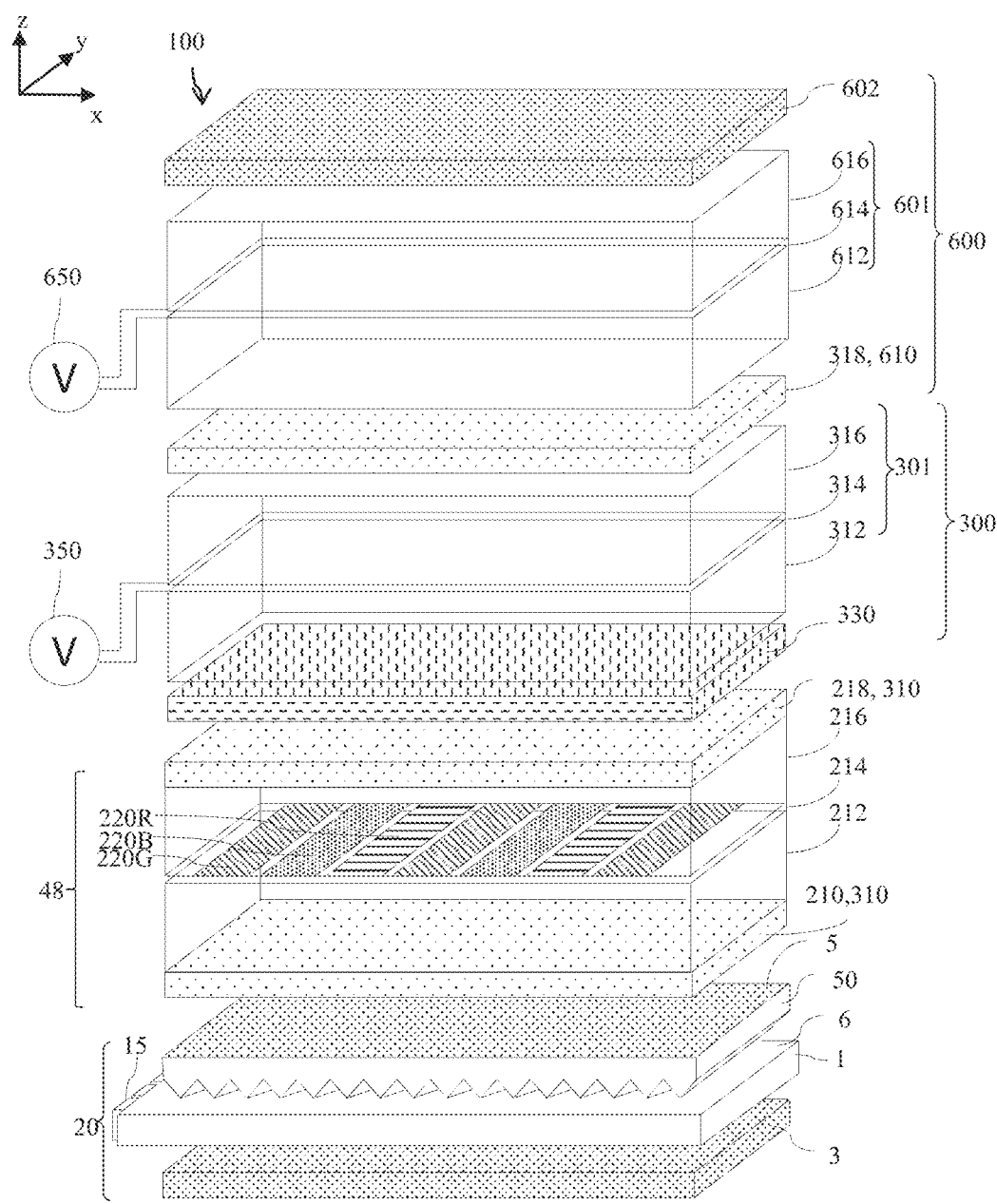
FIG. 16B is a schematic diagram illustrating in perspective side view a polar angle control display device comprising a backlight, a spatial light modulator comprising an input polariser and an output polariser, a polar control retarder comprising a layer of liquid crystal material and a passive compensation retarder, an additional polariser that is an in-plane polariser, a polarisation switch and an out-of-plane polariser.

FIG. 16B is a schematic diagram illustrating in perspective side view a polar angle control display device 100 comprising a backlight 20, a spatial light modulator 48 comprising an input polariser 210 and an output polariser 218, a polar control retarder 300 comprising a layer 314 of liquid crystal material 315 and a passive compensation retarder 330, an additional polariser 318 that is an in-plane polariser 610, a polarisation switch 601 and an out-of-plane polariser 602. Features of the embodiment of FIG. 16B not discussed in further detail may be assumed to correspond to the features with equivalent reference numerals as discussed above, including any potential variations in the features.

The alternative embodiment of FIG. 16B illustrates that the in-plane polariser 610 is a different component from the output polariser 218. The polar angle control display device 100 further comprises: an additional polariser 318 arranged on the output side of the output polariser 218; and at least one polar control retarder 300 arranged between the output polariser 218 and the additional polariser 318 wherein the additional polariser 318 is the in-plane polariser 610.

By way of comparison with FIG. 16A, the alternative embodiment of FIG. 16B comprises components polar control retarder 300 and polar transmission control arrangement 600 that are provided on the output side of the spatial light modulator 48. A polar angle control display device 100 may be conveniently provided with switchable privacy after manufacture of the spatial light modulator 48, for example by user fitting.

Figure 16C:
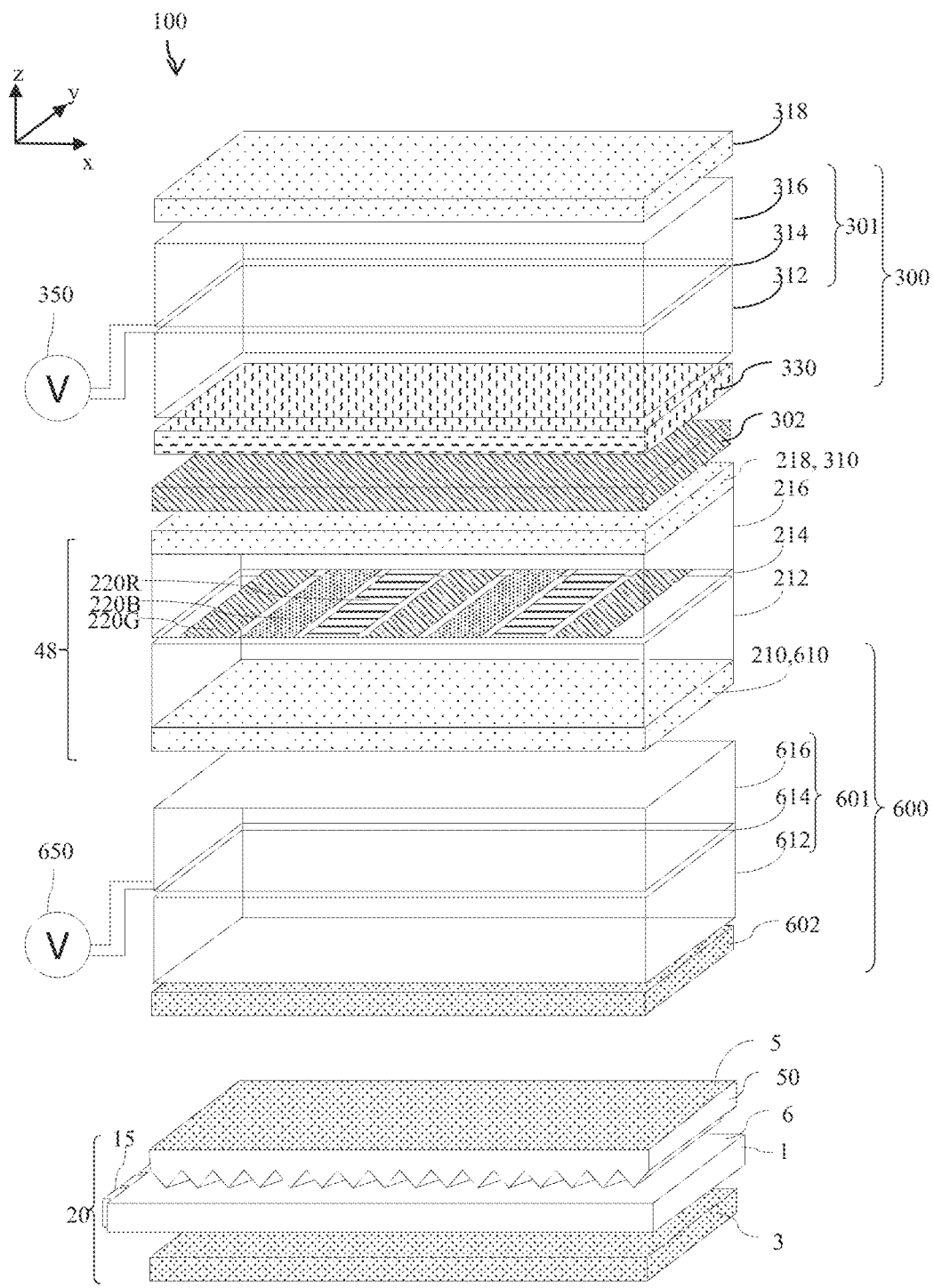
FIG. 16C is a schematic diagram illustrating in perspective side view a polar angle control display device comprising a backlight, an out-of-plane polariser, a polarisation switch, an in-plane polariser that is the input polariser of a spatial light modulator, a display polariser that is the input polariser of the spatial light modulator, an output polariser, a reflective polariser, a polar control retarder comprising a layer of liquid crystal material and a passive compensation retarder and an additional polariser.

FIG. 16C is a schematic diagram illustrating in perspective side view a polar angle control display device 100 comprising a backlight 20, an out-of-plane polariser 602, a polarisation switch 601, an in-plane polariser 610 that is the input polariser 210 of spatial light modulator 48, an output polariser 218, a reflective polariser 302, a polar control retarder 300 comprising a layer 314 of liquid crystal material 315 and a passive compensation retarder 330, and an additional polariser 318. Features of the embodiment of FIG. 16C not discussed in further detail may be assumed to correspond to the features with equivalent reference numerals as discussed above, including any potential variations in the features.

In other words, the out-of-plane polariser 602 is arranged on the side of the spatial light modulator 48 that is an input side of the spatial light modulator 48 and the spatial light modulator 48 comprises an input polariser 210 and the input polariser 210 is the in-plane polariser 610.

By way of comparison with FIG. 1A, in the alternative embodiment of FIG. 16C the polar control retarder 300 is arranged between the in-plane polariser 310 that is the output polariser 218 of the spatial light modulator 48 and a reflective polariser 302 that is provided between the polariser 310 and the polar control retarder 300.

By way of comparison with FIG. 16B, the reflective polariser 302 may be arranged to achieve increased reflectivity in non-viewing directions in the privacy mode of operation. Advantageously image security factor may be improved.

The operation of the reflective polariser 302, polar control retarder 300 and additional polariser 318 is described in FIG. 29B and FIGS. 30C-D hereinbelow. Advantageously improved image security may be achieved in privacy mode of operation and improved share mode performance may be achieved.

Figure 16D:
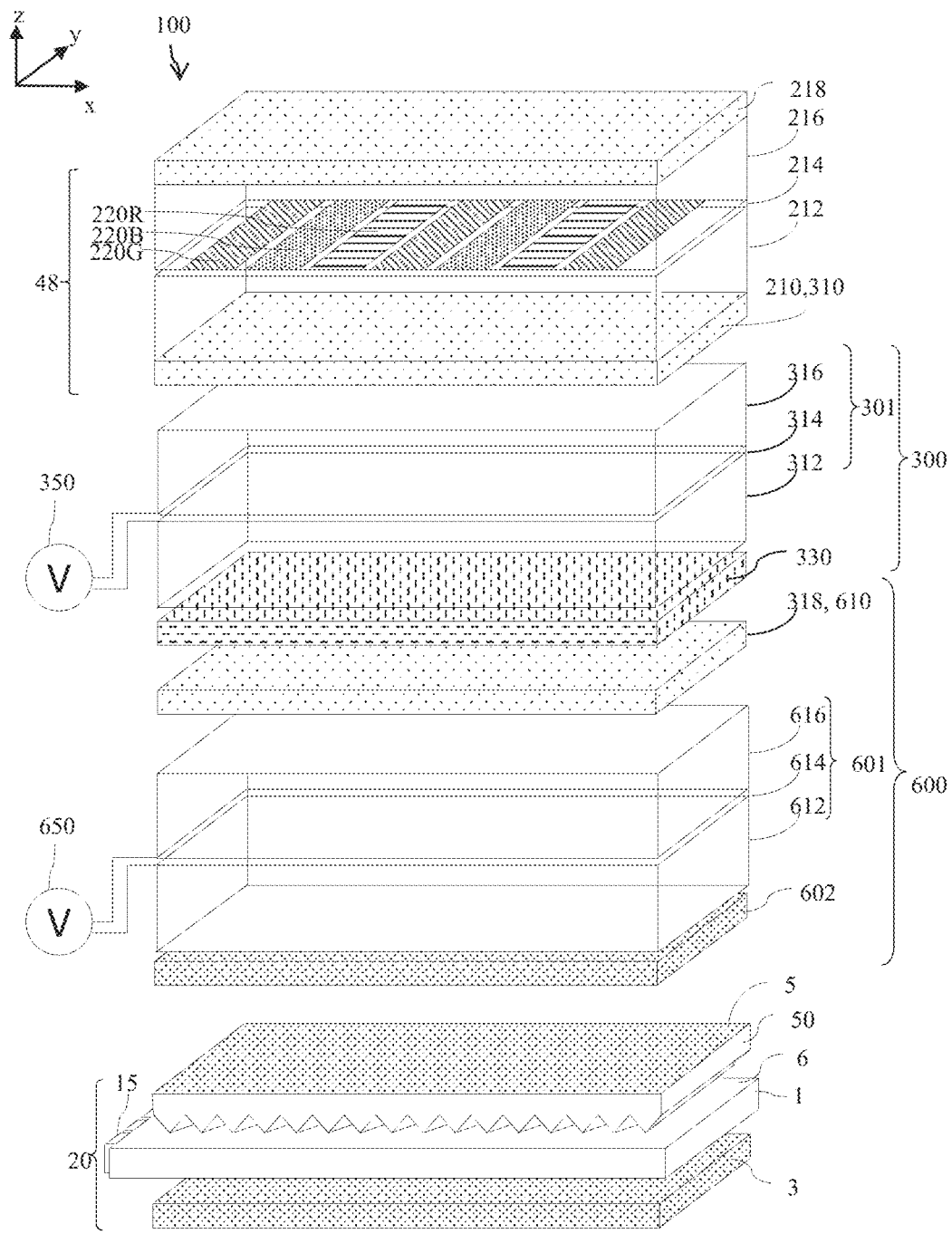
FIG. 16D is a schematic diagram illustrating in perspective side view a polar angle control display device comprising a backlight, an out-of-plane polariser, a polarisation switch, an in-plane polariser that is an additional polariser, a polar control retarder comprising a layer of liquid crystal material and a passive compensation retarder, an input display polariser, and a spatial light modulator comprising an output display polariser.

FIG. 16D is a schematic diagram illustrating in perspective side view a polar angle control display device 100 comprising a backlight 20, an out-of-plane polariser 602, a polarisation switch 601, an in-plane polariser 610 that is an additional polariser 318, a polar control retarder 300 comprising a layer 314 of liquid crystal material 315 and a passive compensation retarder 330, a polariser 310 that is the input polariser 210 of a spatial light modulator 48 further comprising an output display polariser 218. Features of the embodiment of FIG. 16D not discussed in further detail may be assumed to correspond to the features with equivalent reference numerals as discussed above, including any potential variations in the features.

By way of comparison with FIG. 1A, in the alternative embodiment of FIG. 16D, the spatial light modulator 48 comprises an input polariser 210 and an output polariser 218, and the in-plane polariser 610 is a different component from the input polariser 210 and the output polariser 218. The display polariser 610 is the in-plane additional polariser 318.

In other words, the out-of-plane polariser 602 is arranged on the side of the spatial light modulator 48 that is an input side of the spatial light modulator 48 and the spatial light modulator 48 comprises an input polariser 210. The in-plane polariser 610 is a different component from the input polariser 210. The polar angle control display device 100 further comprises: an additional polariser 318 arranged on the input side of the input polariser 210; and at least one polar control retarder 300 arranged between the input polariser 210 and the additional polariser 318. The additional polariser 318 is the in-plane polariser 610.

In comparison to the embodiments of FIGS. 16A-C, each of the out-of-plane polariser 602, polarisation switch 601 and polar control retarder 300 are arranged between the backlight 20 and the input polariser 210 of the spatial light modulator 48. Advantageously front-of-screen contrast is improved. In-cell touch sensing may be provided near the layer 314 of liquid crystal material 315 so that cost of the touch screen control is reduced and improved image contrast provided.

It may be desirable to reduce the cost and thickness of the optical stack while providing desirable image security.

Figure 17A:
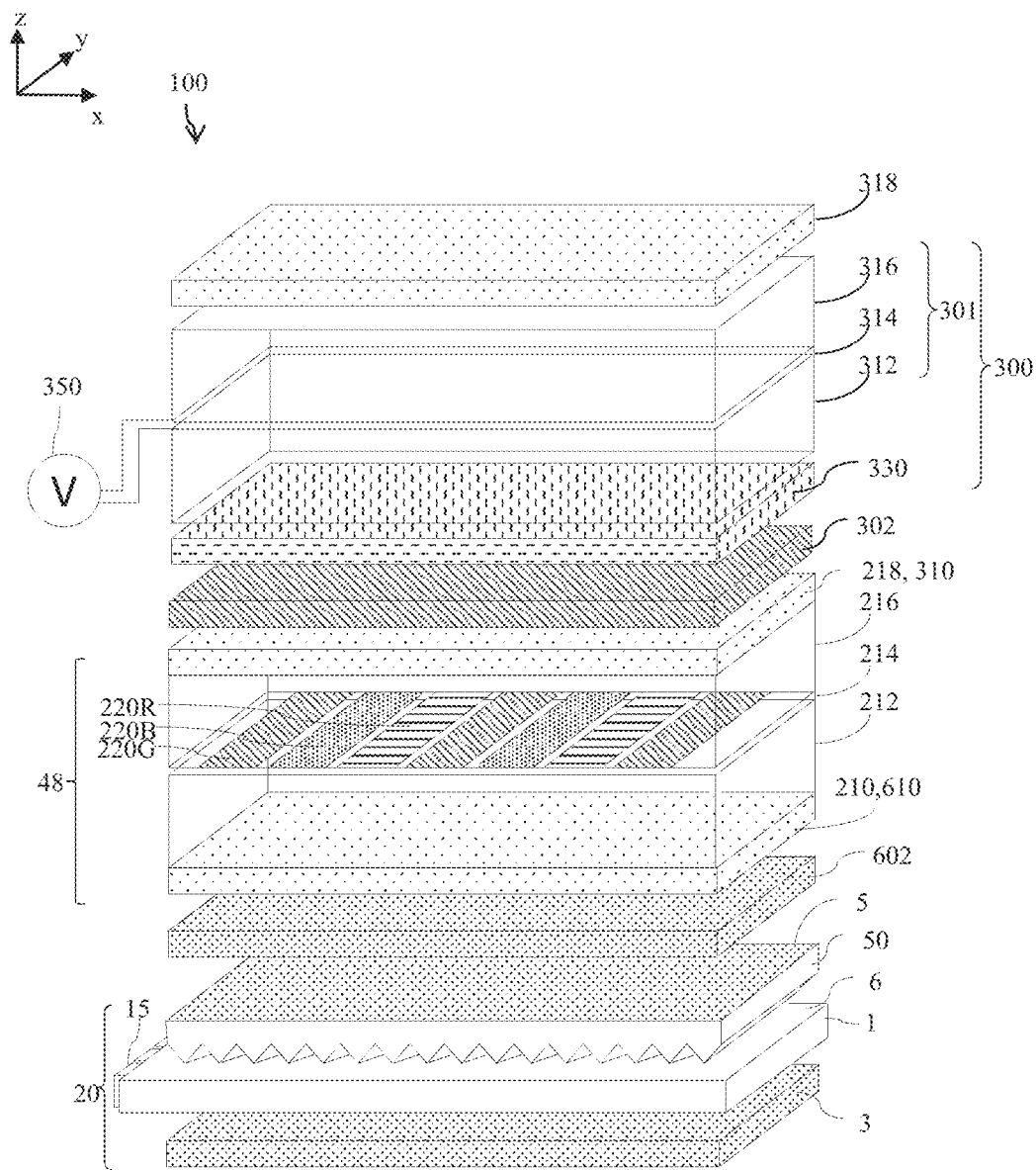
FIG. 17A is a schematic diagram illustrating in perspective side view a polar angle control display device comprising a backlight, an out-of-plane polariser, an in-plane polariser that is the input polariser of a spatial light modulator, an output polariser of the spatial light modulator, a reflective polariser, a polar control retarder comprising a layer of liquid crystal material and a passive compensation retarder, and an additional polariser.

FIG. 17A is a schematic diagram illustrating in perspective side view a polar angle control display device 100 comprising a backlight 20, an out-of-plane polariser 602, an in-plane polariser 610 that is the input polariser of a spatial light modulator 48, a polariser 310 that is the output polariser 218 of the spatial light modulator 48, a reflective polariser 302, a polar control retarder 300 comprising a layer 314 of liquid crystal material 315 and a passive compensation retarder 330, and an additional polariser 318. Features of the embodiment of FIG. 17A not discussed in further detail may be assumed to correspond to the features with equivalent reference numerals as discussed above, including any potential variations in the features.

Such an arrangement may provide a suppression of backlight 20 luminance profile at high angles, and improve image security. Device thickness may be reduced. Advantageously off-axis image security may be improved. In comparison to a micro-louver privacy film, Moiré patterning may be eliminated.

Figure 17B:
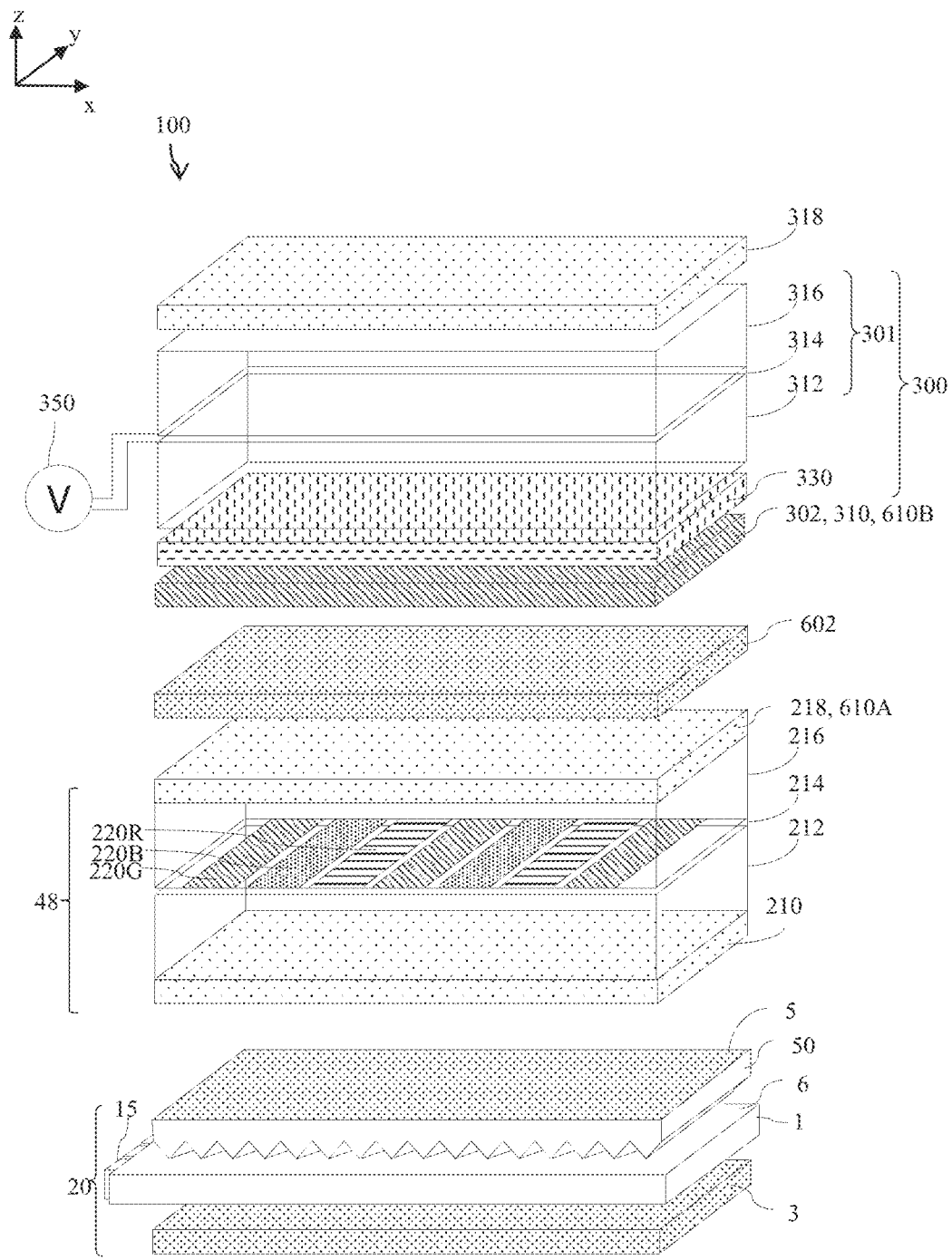
FIG. 17B is a schematic diagram illustrating in perspective side view a polar angle control display device comprising a backlight, a spatial light modulator, an in-plane polariser that is the output polariser of the spatial light modulator, an out-of-plane polariser, a reflective polariser that is a further in-plane polariser, a polar control retarder comprising a layer of liquid crystal material and a passive compensation retarder, and an additional polariser.

FIG. 17B is a schematic diagram illustrating in perspective side view a polar angle control display device 100 comprising a backlight 20, a spatial light modulator 48, an in-plane polariser 610A that is the output polariser 218 of the spatial light modulator 48, an out-of-plane polariser 602, a reflective polariser 302 that is a further in-plane polariser 610B and the in-plane polariser 310 for polar control retarder 300, a polar control retarder 300 comprising a layer 314 of liquid crystal material 315 and a passive compensation retarder 330, and an additional polariser 318. Features of the embodiment of FIG. 17B not discussed in further detail may be assumed to correspond to the features with equivalent reference numerals as discussed above, including any potential variations in the features.

The polar angle control display device 100 may further comprise a reflective polariser 302 arranged on the output side of the output polariser 218, wherein the reflective polariser 302 is the in-plane polariser 610B.

By way of comparison with FIG. 17A, in the alternative embodiment of FIG. 17B, the out-of-plane polariser 602 is arranged between the output polariser 218 of the spatial light modulator 48 that is the in-plane polariser 610 and in-plane polariser 310; and the polar control retarder 300. Further reflective polariser 302 may be arranged between the out-of-plane polariser 602 and the polar control retarder 300 to advantageously achieve improved security factor in a thin and reduced cost optical stack.

Figure 18:
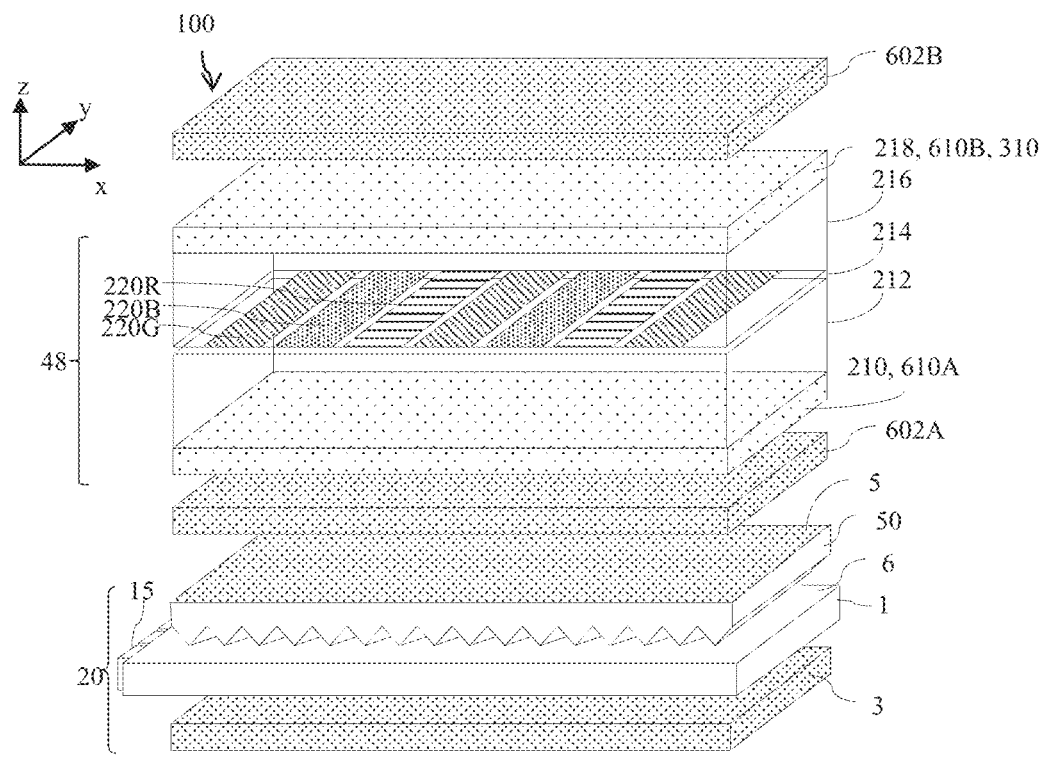
FIG. 18 is a schematic diagram illustrating in perspective side view a polar angle control display device comprising a backlight, an out-of-plane polariser, an in-plane polariser that is the input polariser of a spatial light modulator, a further in-plane polariser that is the output polariser of the spatial light modulator, and a further out-of-plane polariser.

FIG. 18 is a schematic diagram illustrating in perspective side view a polar angle control display device 100 comprising a backlight 20, an out-of-plane polariser 602A, an in-plane polariser 610A that is the input polariser 210 of a spatial light modulator 48, a further in-plane polariser 610B that is the output polariser 218 of the spatial light modulator 48, and a further out-of-plane polariser 602B. Features of the embodiment of FIG. 18 not discussed in further detail may be assumed to correspond to the features with equivalent reference numerals as discussed above, including any potential variations in the features.

By way of comparison with FIG. 15B, in the alternative embodiment of FIG. 18 both of the polarisation switches 601A, 601B are omitted. Advantageously thickness, cost and complexity are reduced and increased security factor may be achieved, including with the transmission profile of FIG. 15C. Such a display device may be suitable for use as a non-switchable privacy display device or may be a component for use with polar control retarders 300 and additional polarisers 318 as described elsewhere herein.

It may be desirable to provide improved image security from emissive spatial light modulator 48.

Figure 19A:
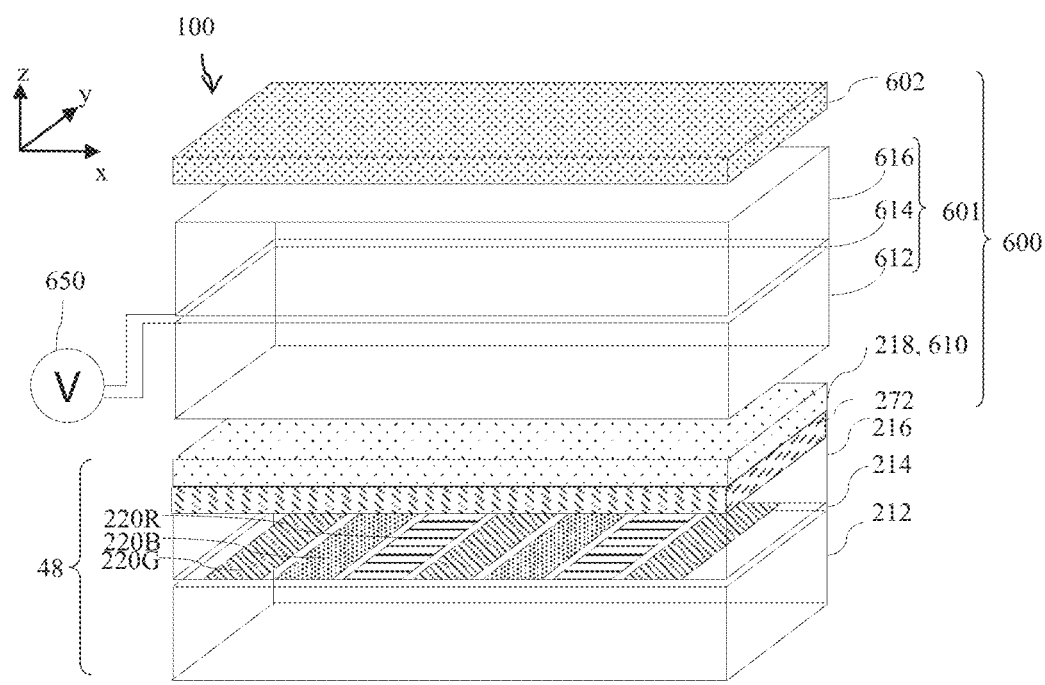
FIG. 19A is a schematic diagram illustrating in perspective side view a polar angle control display device comprising an emissive spatial light modulator, an in-plane polariser that is the output polariser of the spatial light modulator, a polarisation switch and an out-of-plane polariser.

FIG. 19A is a schematic diagram illustrating in perspective side view a polar angle control display device 100 comprising an emissive spatial light modulator 48, an in-plane polariser 610 that is the output polariser 218 of the spatial light modulator 48, a polarisation switch 601 and an out-of-plane polariser 602. Features of the embodiment of FIG. 19A not discussed in further detail may be assumed to correspond to the features with equivalent reference numerals as discussed above, including any potential variations in the features.

By way of comparison with the embodiments hereinabove, the spatial light modulator 48 is an emissive spatial light modulator 48 and said side of the spatial light modulator 48 is an output side of the spatial light modulator 48. By way of comparison with FIG. 1A, the pixel layer 214 may comprise emissive pixels for example pixels 220R, 220G, 220B.

The spatial light modulator 48 comprises an output polariser 218, and the output polariser 218 is the in-plane polariser 610. Retarder 272 that may be a quarter waveplate is arranged to provide reduced reflections from the pixel layer 214, increasing image contrast.

The spatial light modulator 48 may comprise pixels 220 that are organic LED (OLED) emitters or inorganic LED (microLED) emitters for example. The pixels 220 of the present embodiments may output red, green or blue light or may output in other spectral bands such as yellow or white; or may provide illumination output in non-visible wavelengths such as infra-red. The display device 100 may alternatively be arranged as an illumination apparatus.

The polar control transmission element 600 of FIG. 19A may further be provided by the polar control transmission elements 600 of the embodiments hereinabove when arranged on the output side of the spatial light modulator 48, including but not limited to the twisted nematic polarisation switch 601 of FIGS. 4A-D, FIGS. 5A-D, FIGS. 6A-B; the non-twisted nematic polarisation switch 601 of FIGS. 8A-B, the off-axis out-of-plane polariser 602 of FIGS. 12A-F, the automotive display 100 of FIG. 13, the pupillating display 100 of FIGS. 14B-C and the output optical stacks arranged to receive light from the output polariser 218 of the spatial light modulator 48 of FIGS. 17A-B, and FIG. 18.

By way of comparison with the optical profiles provided by backlight 20 of FIG. 7A, the output luminance profile of emissive displays is typically more widely distributed and further levels of luminance suppression are often desirable. Further illustrative embodiments will now be described.

Figure 19B:
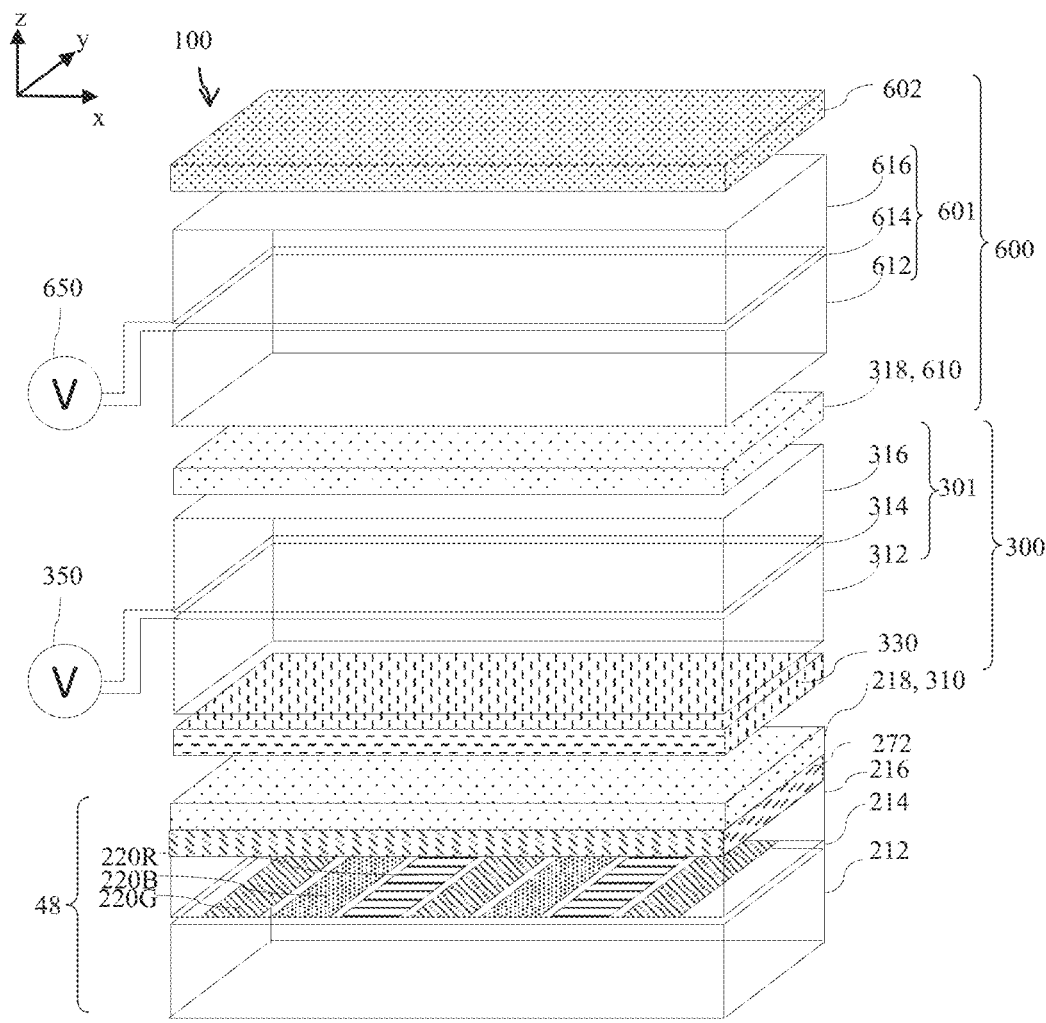
FIG. 19B is a schematic diagram illustrating in perspective side view a polar angle control display device comprising an emissive spatial light modulator, a display polariser that is an in-plane polariser that is the output polariser of the spatial light modulator, a polar control retarder comprising a layer of liquid crystal material and a passive compensation retarder, an additional polariser that is an in-plane polariser, a polarisation switch and an out-of-plane polariser.

FIG. 19B is a schematic diagram illustrating in perspective side view a polar angle control display device 100 comprising an emissive spatial light modulator 48, a polariser 310 that is the output polariser 218 of the spatial light modulator 48, a polar control retarder 300 comprising a layer 314 of liquid crystal material 315 and a passive compensation retarder 330, an additional polariser 318 that is an in-plane polariser 610, a polarisation switch 601 and an out-of-plane polariser 602. Features of the embodiment of FIG. 19B not discussed in further detail may be assumed to correspond to the features with equivalent reference numerals as discussed above, including any potential variations in the features.

In comparison to FIG. 19A, a polar control retarder 300 is arranged between the additional polariser 318 that is the in-plane polariser 610 and the polariser 310 that is the output display polariser 218. Advantageously improved image security may be provided in desirable non-viewing directions in a privacy mode of operation, and a switchable share mode is provided for viewing at wide viewing angles.

It may be desirable to reduce the thickness of the optical stack.

Figure 19C:
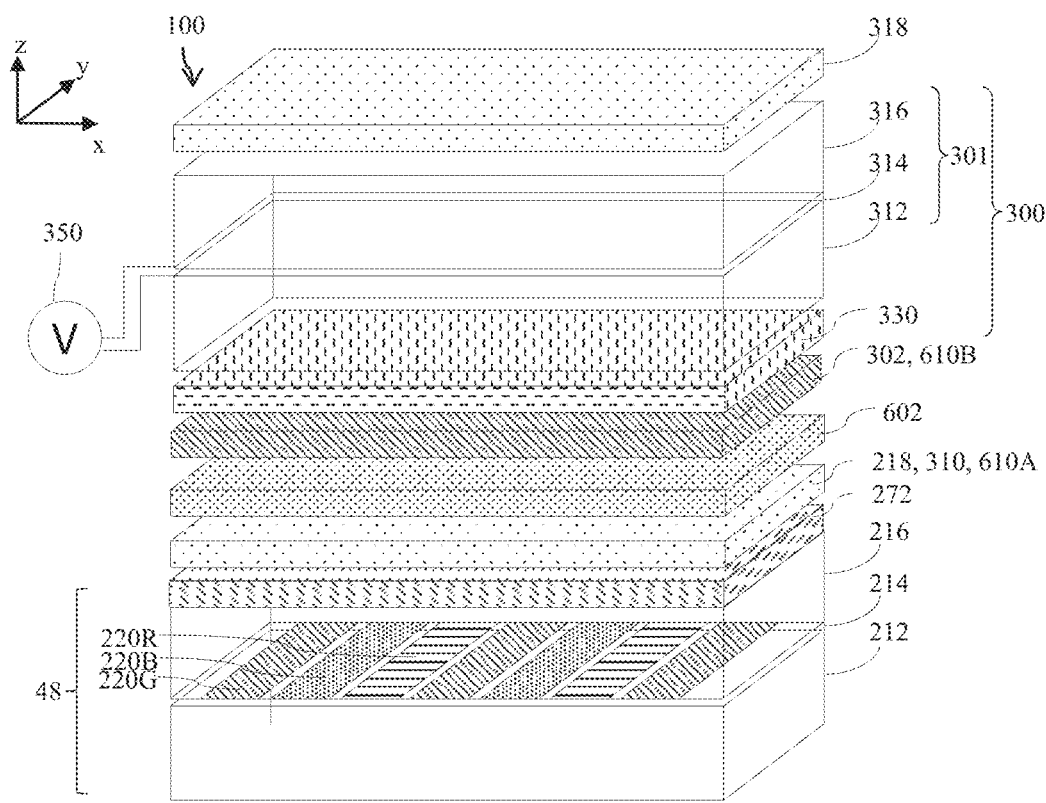
FIG. 19C is a schematic diagram illustrating in perspective side view a polar angle control display device comprising an emissive spatial light modulator, an in-plane polariser that is the output polariser of the spatial light modulator, an out-of-plane polariser, a reflective polariser, a polar control retarder comprising a layer of liquid crystal material and a passive compensation retarder, and an additional polariser that is an in-plane polariser.

FIG. 19C is a schematic diagram illustrating in perspective side view a polar angle control display device 100 comprising an emissive spatial light modulator 48, the output polariser 218 of the spatial light modulator 48 that is an in-plane polariser 610A, an out-of-plane polariser 602, a reflective polariser 302 that is a further in-plane polariser 610B, a polar control retarder 300 comprising a layer 314 of liquid crystal material 315 and a passive compensation retarder 330, and an additional polariser that is an in-plane polariser 610. Features of the embodiment of FIG. 19C not discussed in further detail may be assumed to correspond to the features with equivalent reference numerals as discussed above, including any potential variations in the features.

By way of comparison with FIG. 19B, the polarisation switch 601 is omitted and the out-of-plane polariser 602 is arranged between the output polariser 218 of the spatial light modulator 48 and a reflective polariser 302. The output polariser 218 further provides the polariser 310 for the polar control retarder 300 and the in-plane polariser 610A of the out-of-plane polariser 602. Further the reflective polariser 302 provides a further in-plane polariser 610B of the out-of-plane polariser 602. FIG. 19C thus illustrates an embodiment wherein an in-plane polariser 610B is provided by a reflective polariser 302.

In operation, the out-of-plane polariser 602 and in-plane polarisers 610A. 610B comprising reflective polariser 302 and display polariser 218 provide reduced transmission of light rays in non-viewing directions. The high luminance of the spatial light modulator 48 in non-viewing directions may be advantageously reduced to achieve improved security factor in privacy mode of operation of the polar control retarder 300 as described further hereinbelow with respect to FIGS. 29A-B and FIGS. 30A-D.

Figure 19D:
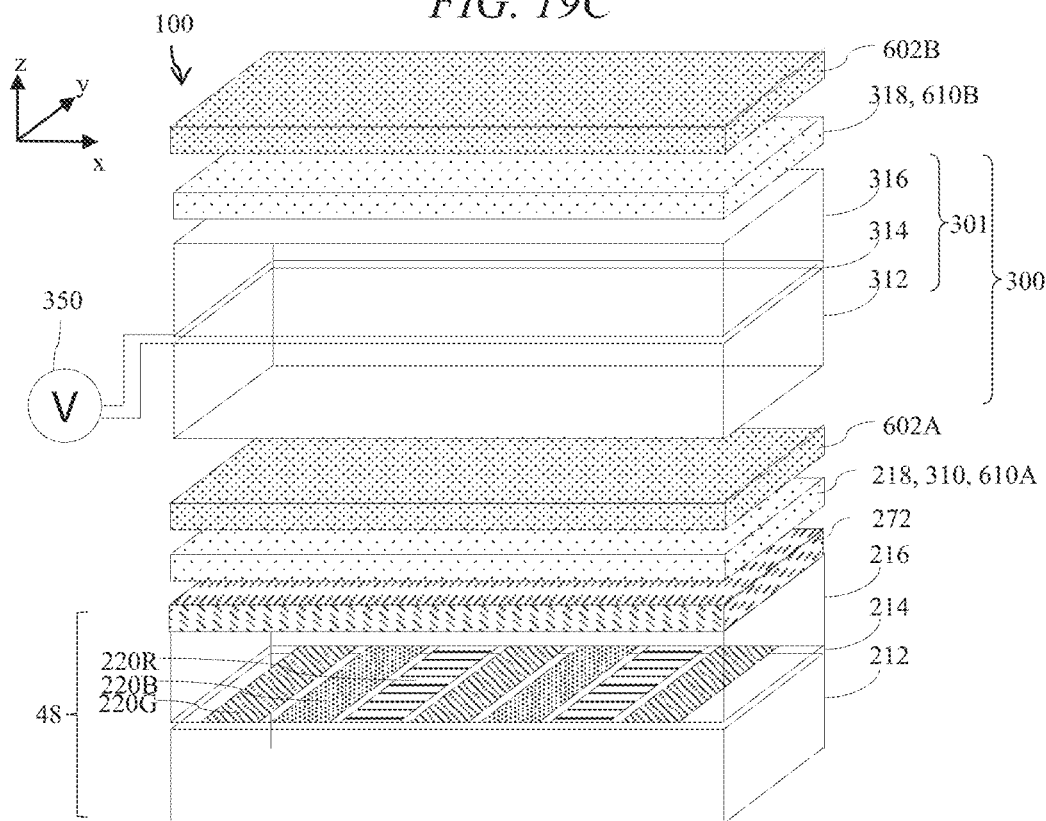
FIG. 19D is a schematic diagram illustrating in perspective side view a polar angle control display device comprising an emissive spatial light modulator, an in-plane polariser that is the output polariser of the spatial light modulator, an out-of-plane polariser, a polar control retarder comprising a twisted nematic layer of liquid crystal material, an additional polariser that is an in-plane polariser and a further out-of-plane polariser.

FIG. 19D is a schematic diagram illustrating in perspective side view a polar angle control display device 100 comprising an emissive spatial light modulator 48, the output polariser 218 of the spatial light modulator 48 that is an in-plane polariser 610A, an out-of-plane polariser 602A, a reflective polariser 302, a polar control retarder 300 comprising a layer 314 of liquid crystal material 315 and a passive compensation retarder 330, an additional polariser 318 that is a further in-plane polariser 610B, and a further out-of-plane polariser 602B. Features of the embodiment of FIG. 19D not discussed in further detail may be assumed to correspond to the features with equivalent reference numerals as discussed above, including any potential variations in the features.

By way of comparison with FIG. 19C, in the alternative embodiment of FIG. 19D, an out-of-plane polariser 602A is provided between the in-plane polariser 610A that is the display output polariser 218 and the polar control retarder 300. The out-of-plane polariser 602A provides a first luminance reduction for non-viewing directions. A further out-of-plane polariser 602B is provided to receive light from the additional polariser 318 of the polar control retarder 300 that is the further in-plane polariser 610B. The further out-of-plane polariser 602B advantageously achieves further off-axis luminance reduction to that provided by the embodiment of FIG. 19C.

FIG. 19D further illustrates that passive compensation retarder 330 may be omitted, for example for off-axis privacy provided by twisted nematic liquid crystal polar control retarder 301 for example as described in U.S. Patent Publ. No. 2023-0254457 and U.S. Pat. No. 11,977,286, both of which are herein incorporated by reference in their entireties. The arrangement of out-of-plane polariser 602 as illustrated in FIG. 12A and FIG. 12C may be provided to achieve asymmetric light suppression, for example for use in the vehicle 950 of FIG. 13.

In alternative embodiments, the polar control retarder 300 may comprise passive compensation retarder 330. The transmission profiles of the out-of-plane polariser 602A, 602B may be symmetric.

An alternative arrangement of reflective privacy display will now be described.

Figure 19E:
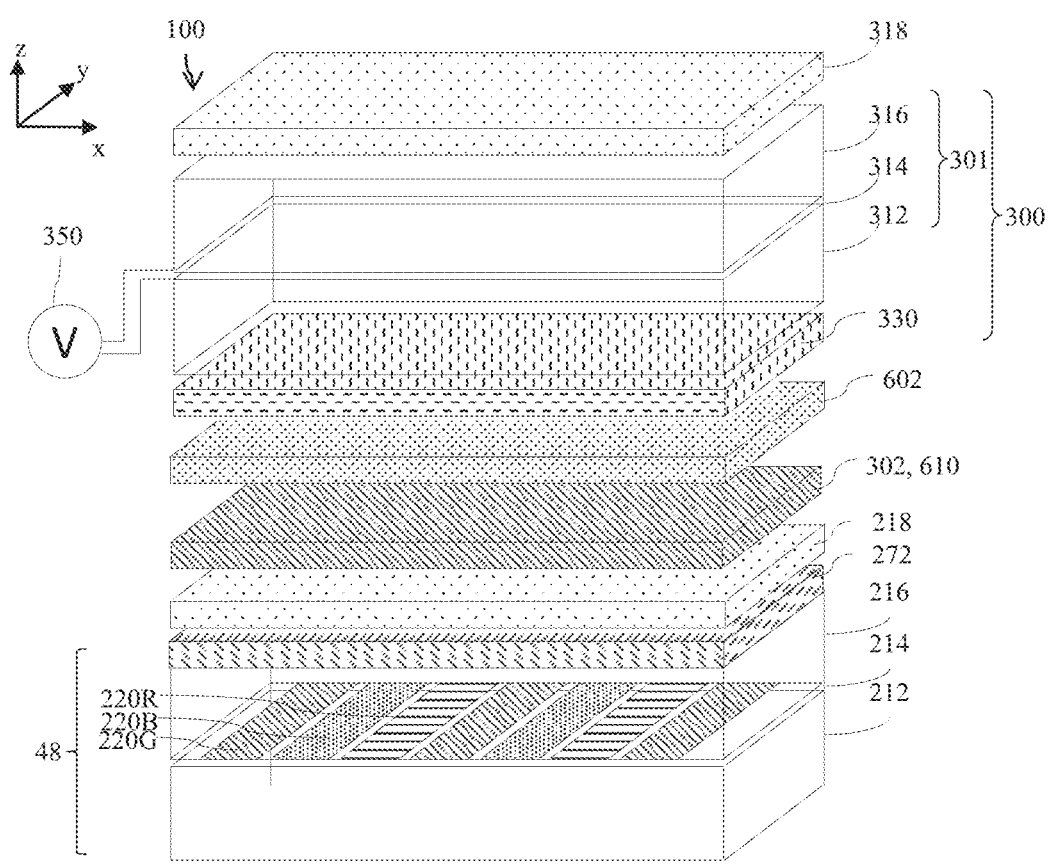
FIG. 19E is a schematic diagram illustrating in perspective side view a polar angle control display device comprising an emissive spatial light modulator, an in-plane polariser that is the output polariser of the spatial light modulator, a reflective polariser, an out-of-plane polariser, a passive compensation retarder, a polar control retarder comprising a layer of liquid crystal material, and an additional polariser that is an in-plane polariser.
Figure 19F:
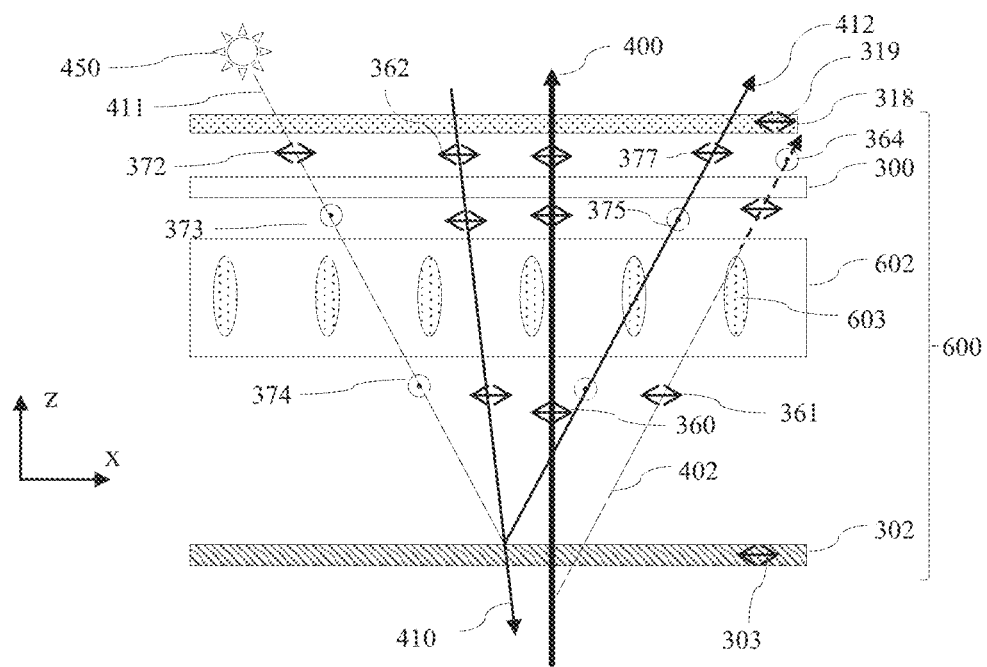
FIG. 19F is a schematic diagram illustrating in top view the transmission and reflection of light through the reflective polariser, out-of-plane polariser, polar control retarder and in-plane additional polariser of FIG. 19E in a privacy mode.
Figure 19G:
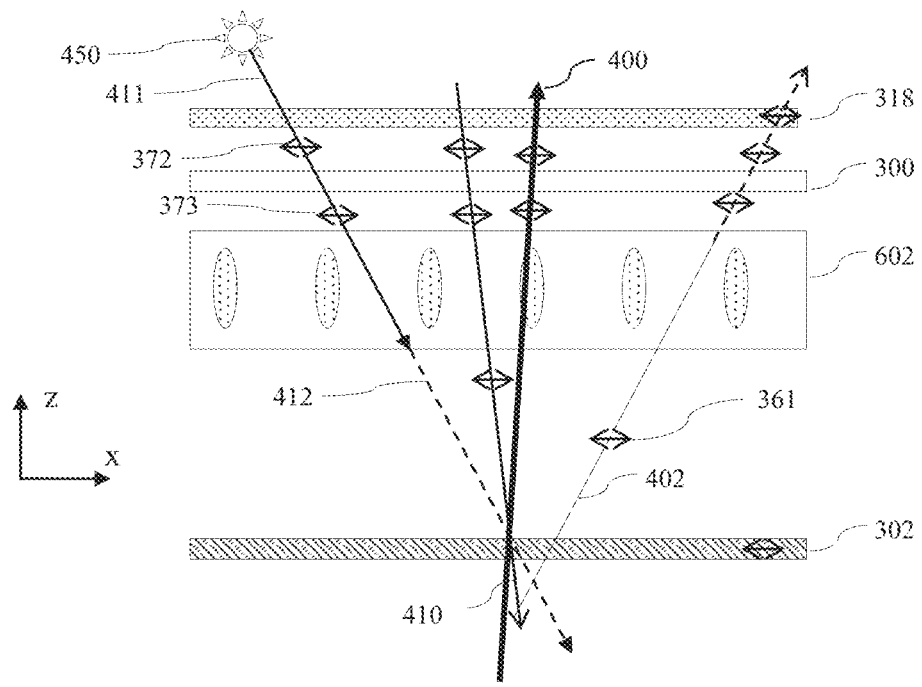
FIG. 19G is a schematic diagram illustrating in top view the transmission and reflection of light through the reflective polariser, out-of-plane polariser, polar control retarder and in-plane additional polariser of FIG. 19E in a share mode.

FIG. 19E is a schematic diagram illustrating in perspective side view a polar angle control display device 100 comprising an emissive spatial light modulator 48, the output polariser 218 of the spatial light modulator 48, a reflective polariser 302 that is an in-plane polariser 610, an out-of-plane polariser 602, a passive compensation retarder 330, a polar control retarder 300 comprising a layer of liquid crystal material 314, and an additional polariser 318; FIG. 19F is a schematic diagram illustrating in top view the transmission and reflection of light through the reflective polariser 302, out-of-plane polariser 602, polar control retarder 300 and in-plane additional polariser 318 of FIG. 19E in a privacy mode of operation; and FIG. 19G is a schematic diagram illustrating in top view the transmission and reflection of light through the reflective polariser 302, out-of-plane polariser 602, polar control retarder 300 and in-plane additional polariser 318 of FIG. 19E in a share mode of operation. Features of the embodiments of FIGS. 19E-G not discussed in further detail may be assumed to correspond to the features with equivalent reference numerals as discussed above, including any potential variations in the features.

By way of comparison with FIG. 19C, in the alternative embodiment of FIG. 19E the out-of-plane polariser 602 is provided between the reflective polariser 302 and the additional polariser 318. The polar angle control display device 100 may further comprise a reflective polariser 302 arranged on the output side of the output polariser 218, wherein the reflective polariser 302 is the in-plane polariser 610.

The operation for transmitted light rays 400, 402 and for reflected light ray 412 in the absence of out-of-plane polariser 602 is described hereinbelow with respect to FIGS. 29A-B and FIGS. 30A-C hereinbelow, wherein various rays are either transmitted, reflected or absorbed.

FIG. 19F illustrates incident light ray 411 from an ambient light source 450 is polarised with state 372 and converted most generally by the polar control retarder 300 to an elliptical polarisation state which at a design angle (such as 45° from the surface normal 199 direction) is the orthogonal polarisation state 373. Out-of-plane polariser 602 preferentially transmits the polarisation state 374 that is orthogonal to the electric vector transmission direction 303 of the reflective polariser 302 and is reflected thereby. The reflected polarisation state 375 is transmitted by the out-of-plane polariser 602 to provide linear polarisation state 375 incident onto the polar control retarder 300. The light ray 412 is then output most generally as elliptical polarisation state 377 that is the linear polarisation state 377 at the design angle and is transmitted by the additional polariser 318. Advantageously display reflectance is increased for off-axis snooper viewing locations and security factor increased.

Off-axis transmitted rays 402 have a polarisation state 361 incident onto the out-of-plane polariser 602 so that light is at least in part absorbed by the dichroic molecules 603. Any residual transmitted light is converted to polarisation state 364 by the polar control retarder 300 and absorbed in the additional polariser 318. Advantageously off-axis luminance is reduced and security factor increased.

By comparison, on-axis light rays 410, 400 with linear polarisation state 360, 362 are transmitted with low loss through the reflective polariser 302, out-of-plane polariser 602 and additional polariser 318. High image visibility is provided for on-axis viewing directions.

FIG. 19G illustrates the arrangement for share mode operation wherein for the incident ray 411 the polar control retarder 300 is arranged to provide small or no phase difference for polarisation state 372 so that polarisation state 373 is directed towards the out-of-plane polariser 602 and absorbed, or transmitted and further transmitted by the reflective polariser 302. Advantageously off-axis image visibility is improved. Considering light ray 402, any light that is transmitted by the out-of-plane polariser 602 is transmitted through the additional polariser 318 so that some increase in luminance is provided for off-axis viewing directions. Advantageously off-axis image visibility is improved in comparison to privacy mode of operation.

Arrangements of non-switchable display devices 100 will now be described.

Figure 20A:
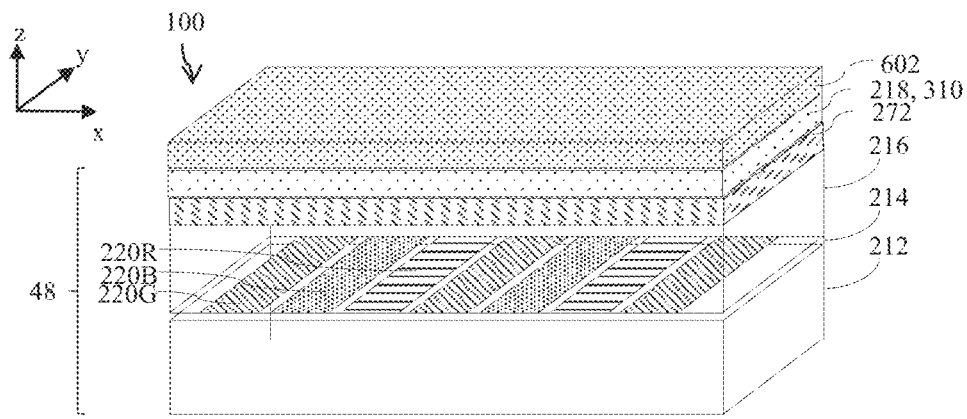
FIG. 20A is a schematic diagram illustrating in perspective side view a polar angle control display device comprising an emissive spatial light modulator, an in-plane polariser that is the output polariser of the spatial light modulator, and an out-of-plane polariser.
Figure 20B:
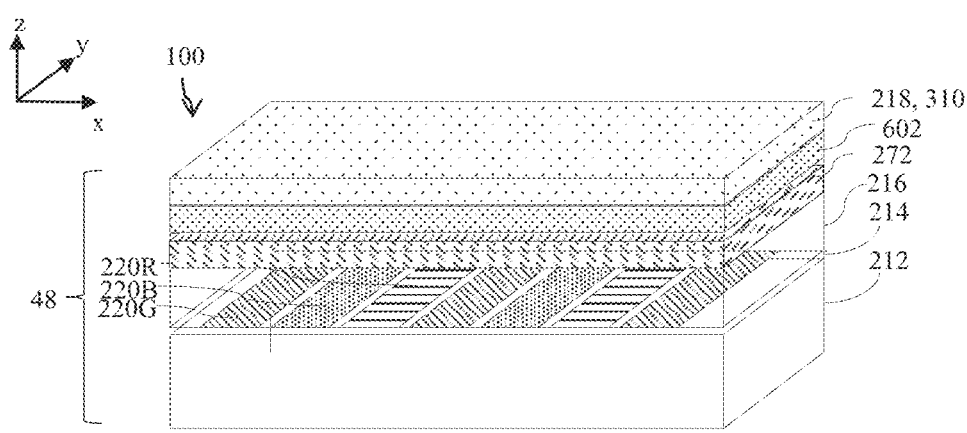
FIG. 20B is a schematic diagram illustrating in perspective side view a polar angle control display device comprising an emissive spatial light modulator, an out-of-plane polariser, and an in-plane polariser that is the output polariser of the spatial light modulator.
Figure 20C:
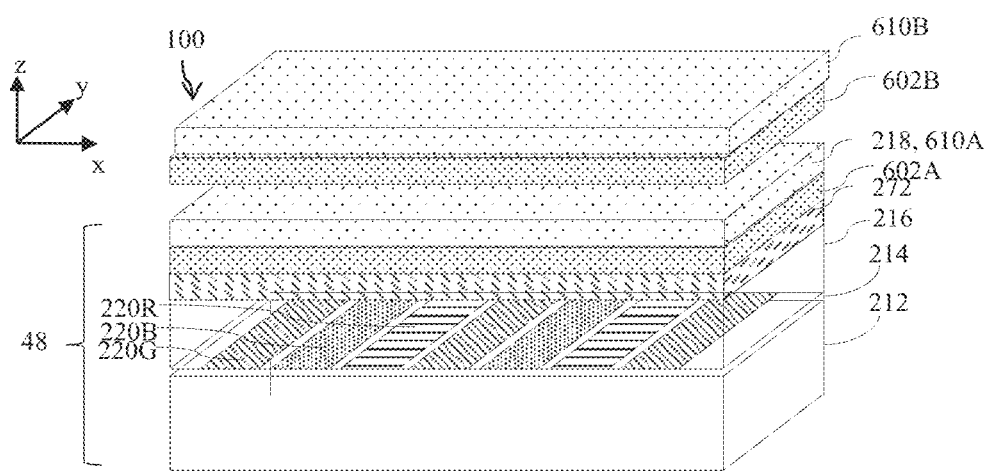
FIG. 20C is a schematic diagram illustrating in perspective side view a polar angle control display device comprising an emissive spatial light modulator, an out-of-plane polariser, and an in-plane polariser that is the output polariser of the spatial light modulator, a further out-of-plane polariser and a further in-plane polariser.

FIG. 20A is a schematic diagram illustrating in perspective side view a polar angle control display device 100 comprising an emissive spatial light modulator 48, an in-plane polariser 610 that is the output polariser 218 of the spatial light modulator 48, and an out-of-plane polariser 602; FIG. 20B is a schematic diagram illustrating in perspective side view a polar angle control display device 100 comprising an emissive spatial light modulator 48, an out-of-plane polariser 602, and an in-plane polariser 610 that is the output polariser 218 of the spatial light modulator 48; and FIG. 20C is a schematic diagram illustrating in perspective side view a polar angle control display device 100 comprising an emissive spatial light modulator 48, an out-of-plane polariser 602A, an in-plane polariser 610A that is the output polariser 218 of the spatial light modulator 48, a further out-of-plane polariser 602B and a further in-plane polariser 610B. Features of the embodiments of FIGS. 20A-C not discussed in further detail may be assumed to correspond to the features with equivalent reference numerals as discussed above, including any potential variations in the features.

By way of comparison with the embodiments described hereinabove, the embodiments of FIGS. 20A-C do not comprise a polarisation switch 601 or a polar control retarder 300. Such embodiments may achieve a low-thickness, low-cost fixed privacy display. Alternatively, the embodiments of FIGS. 20A-C may be provided with further polarisation switch 601 and/or polar control retarder 300 elements as described hereinabove to advantageously achieve switchable privacy mode operation with improved security factor in non-viewing directions; wherein the additional components may be provided during manufacture or may be added by a user. The embodiments of FIGS. 20A-C may further be provided for transmissive spatial light modulator 48, and the arrangements of out-of-plane polariser 602 may be provided with an out-of-plane polariser 602 that is arranged on the input side of the spatial light modulator 48 and the input display polariser 210 may be an in-plane polariser 610.

The alternative embodiment of FIG. 20A illustrates an arrangement with an output out-of-plane polariser 602. Advantageously reduced thickness may be achieved.

The alternative embodiment of FIG. 20B illustrates an arrangement wherein the out-of-plane polariser 602 is provided between the retarder 272 and the in-plane polariser 610 that is the output polariser 218. The output polariser 218 may provide protection of the out-of-plane polariser 602, to advantageously achieve increased robustness.

In comparison to the embodiment of FIG. 20B, the further out-of-plane polariser 602B and further in-plane polariser 610B may achieve reduced luminance in the non-viewing directions, advantageously achieving increased security factor.

Out-of-plane polarisers 602 comprising discotic dichroic molecules 607 will now be described.

Figure 20D:
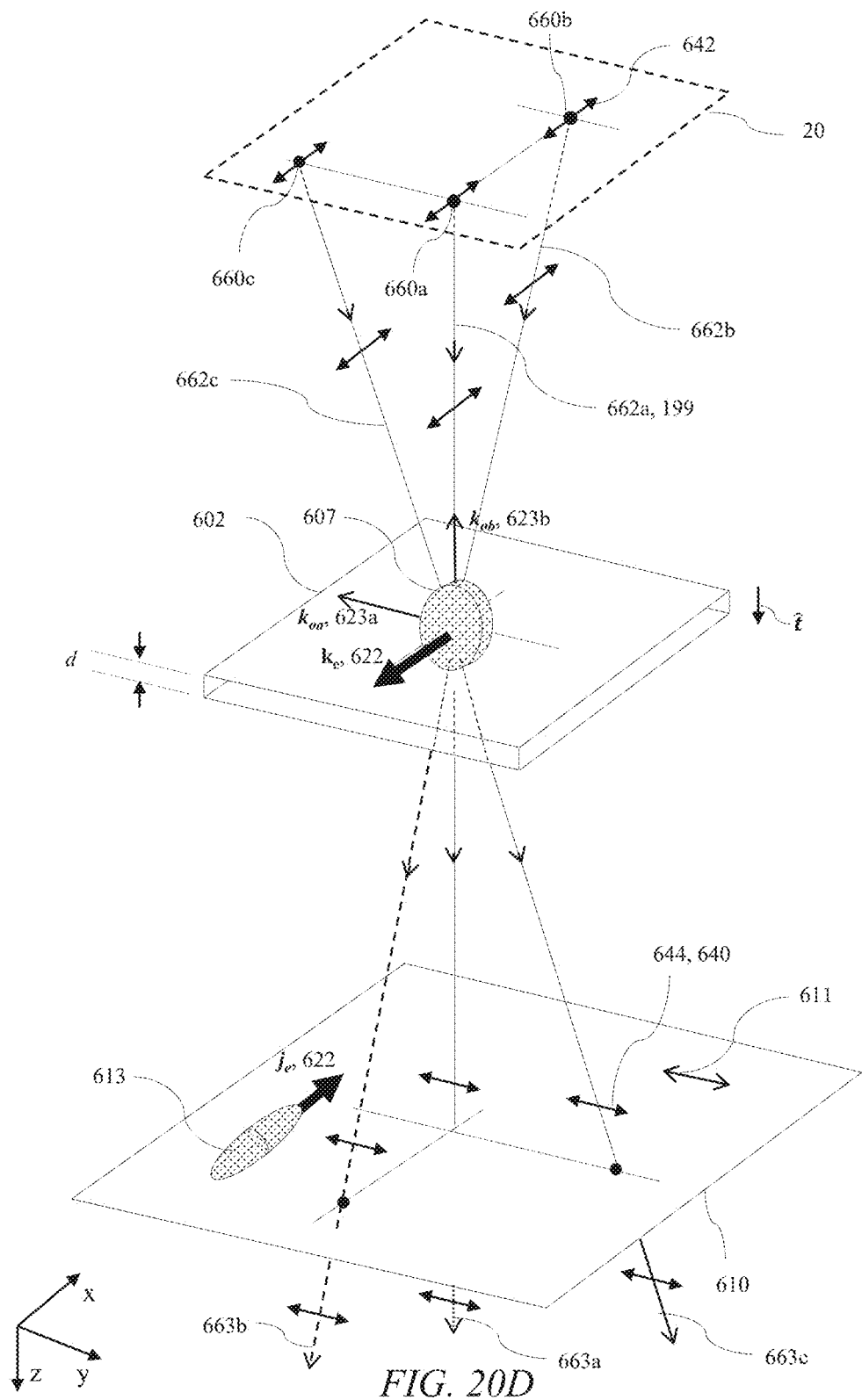
FIG. 20D is a schematic diagram illustrating in perspective side view operation of an out-of-plane polariser comprising discotic dichroic molecules, and an in-plane polariser for light rays inclined in lateral and elevation directions.

FIG. 20D is a schematic diagram illustrating in perspective side view operation of an out-of-plane polariser comprising discotic dichroic molecules, and an in-plane polariser for light rays inclined in lateral and elevation directions. Features of the embodiment of FIG. 20D not discussed in further detail may be assumed to correspond to the features with equivalent reference numerals as discussed above, including any potential variations in the features.

By way of comparison with FIG. 3B, the discotic molecules 607 may provide reduced transmission about a single axis for the polarisation state 642. Such an arrangement may be provided for non-switching transmission reduction. Layers of discotic molecules aligned with optical axis 622 direction $k_e$ may be provided in the arrangements of FIGS. 20A-C and other non-switching arrangements of out-of-plane polariser 602 as described hereinabove.

Optical components 102 comprising out-of-plane polariser 602 will now be described.

Figure 21:
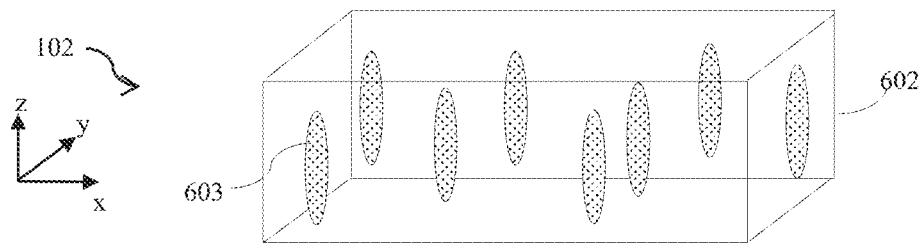
FIG. 21 is a schematic diagram illustrating in perspective side view a polar angle control component comprising an out-of-plane polariser.
Figure 22:
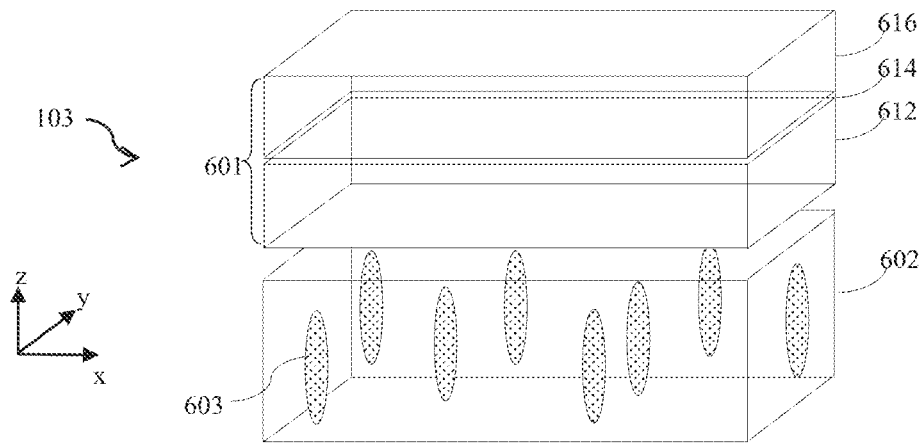
FIG. 22 is a schematic diagram illustrating in perspective side view a polar angle control component comprising an out-of-plane polariser and a polarisation switch.
Figure 23:
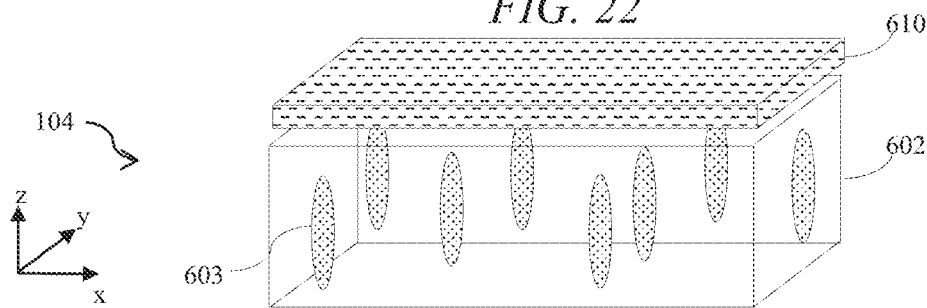
FIG. 23 is a schematic diagram illustrating in perspective side view a polar angle control component comprising an out-of-plane polariser and an in-plane polariser.
Figure 24:
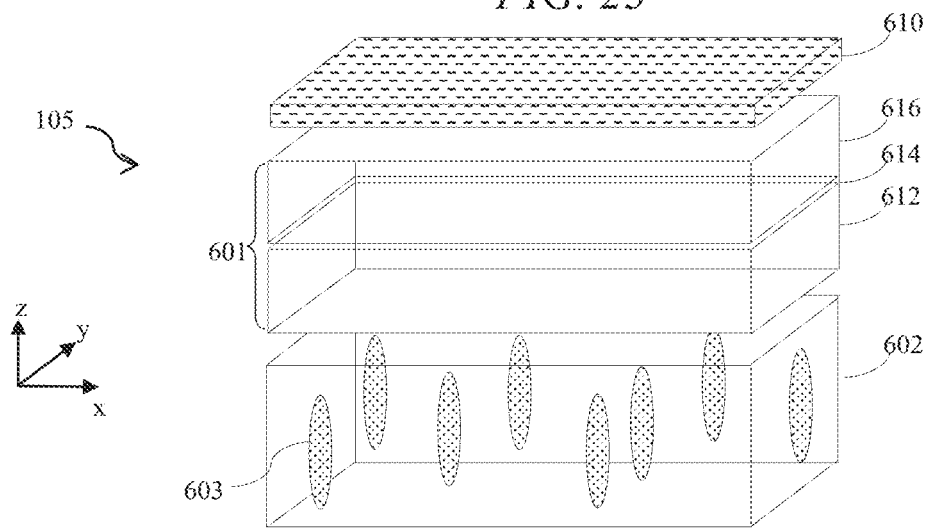
FIG. 24 is a schematic diagram illustrating in perspective side view a polar angle control component comprising a polarisation switch arranged between an out-of-plane polariser and an in-plane polariser.

FIG. 21 is a schematic diagram illustrating in perspective side view a polar angle control component comprising an out-of-plane polariser 602; FIG. 22 is a schematic diagram illustrating in perspective side view a polar angle control component comprising an out-of-plane polariser 602 and a polarisation switch 601; FIG. 23 is a schematic diagram illustrating in perspective side view a polar angle control component comprising an out-of-plane polariser 602 and an in-plane polariser 610; and FIG. 24 is a schematic diagram illustrating in perspective side view a polar angle control component comprising a polarisation switch 601 arranged between an out-of-plane polariser 602 and an in-plane polariser 610. Features of the embodiments of FIGS. 21-24 not discussed in further detail may be assumed to correspond to the features with equivalent reference numerals as discussed above, including any potential variations in the features.

In the alternative embodiments of FIGS. 21-24, a polar angle control component 102 for assembly with a display device 100 comprising a spatial light modulator 48 is provided. The polar angle control component 102 comprising an out-of-plane polariser 602 having an absorption axis 622 in a direction having a component out of the plane of the out-of-plane polariser 602. Out-of-plane polarisers 602 may comprise rod-like dichroic molecules 603. In alternative embodiments, the out-of-plane polariser 602 may be provided by a discotic material 607 having an absorption axis 622 in a direction having a component out of the plane of the out-of-plane polariser 60 and an absorption axis 622 in a direction having a component in the plane of the out-of-plane polariser 60.

By way of comparison with FIG. 21, in the alternative embodiment of FIG. 22 the polar angle control component 102 further comprises a polarisation switch 601, the polarisation switch 601 being switchable between a first mode in which it is arranged to change a polarisation state of the light passing therethrough and a second mode in which it is arranged to affect the polarisation state of the light passing therethrough differently from the first mode.

By way of comparison with FIG. 21, in the alternative embodiment of FIG. 23 the polar angle control component 102 further comprises an in-plane polariser 610 having an absorption axis 620 in a plane of the in-plane polariser 610.

By way of comparison with FIG. 23, in the alternative embodiment of FIG. 24 the polar angle control component 102 further comprises an in-plane polariser 610 having an absorption axis 620 in a plane of the in-plane polariser 610, the polarisation switch 601 being provided between the in-plane polariser 610 and the out-of-plane polariser 602.

Alternative arrangements of collimated backlights 20 will now be described.

Figure 25A:
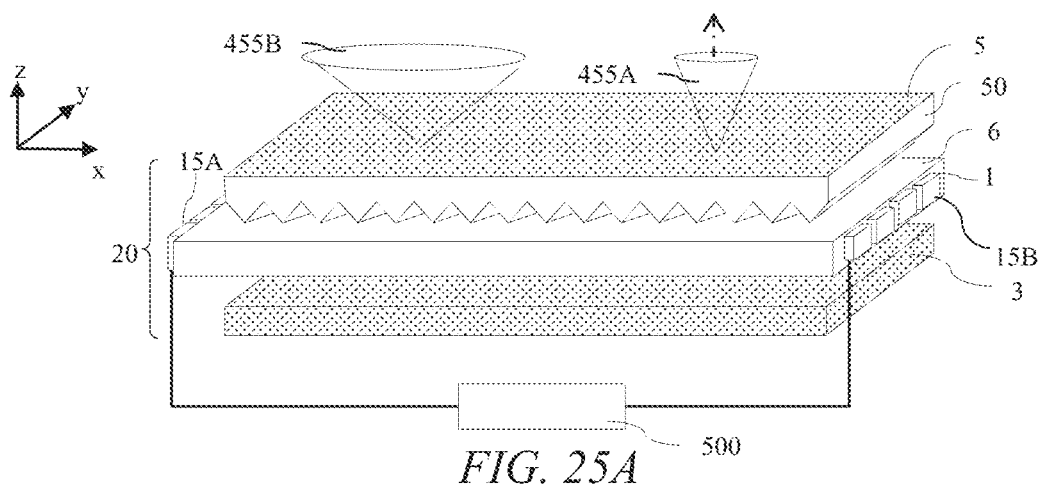
FIG. 25A is a schematic diagram illustrating in perspective side view an alternative backlight comprising addressable first and second arrays of light sources.
Figure 25B:
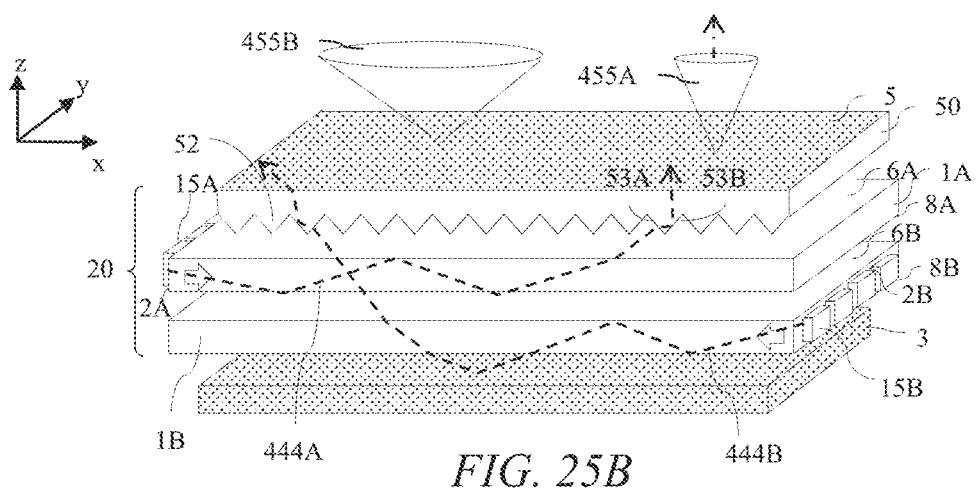
FIG. 25B is a schematic diagram illustrating in perspective side view an alternative backlight comprising first and second waveguides and respective aligned first and second arrays of light sources.

FIG. 25A is a schematic diagram illustrating in perspective side view an alternative backlight 20 comprising addressable first and second arrays of light sources 15A, 15B; and FIG. 25B is a schematic diagram illustrating in perspective side view an alternative backlight 20 comprising first and second waveguides 1A, 1B and respective aligned first and second arrays of light sources 15A, 15B. Features of the arrangements of FIGS. 25A-B not discussed in further detail may be assumed to correspond to the features with equivalent reference numerals, including any potential variations in the features.

The alternative embodiments of FIGS. 25A-B provide first and second light cones 455A, 455B in dependence on the array 15A. 15B that is illuminated respectively. In wide-angle mode, light source 15B may provide light cone 455B and optionally light source 15A may provide some light in light cone 445A. In privacy mode only light source 15A is illuminated and light primarily directed into light cone 445A.

The operation of the embodiment of FIG. 25B will now be further described.

Figure 26A:
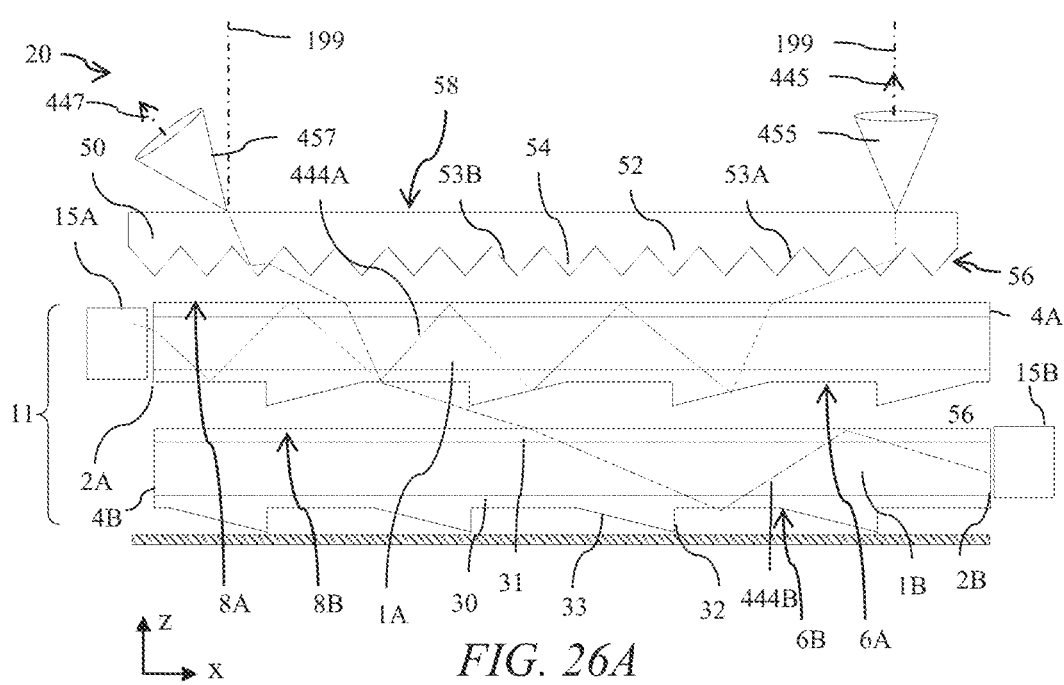
FIG. 26A is a schematic diagram illustrating in top view operation of the backlight of FIG. 25B.
Figure 26B:
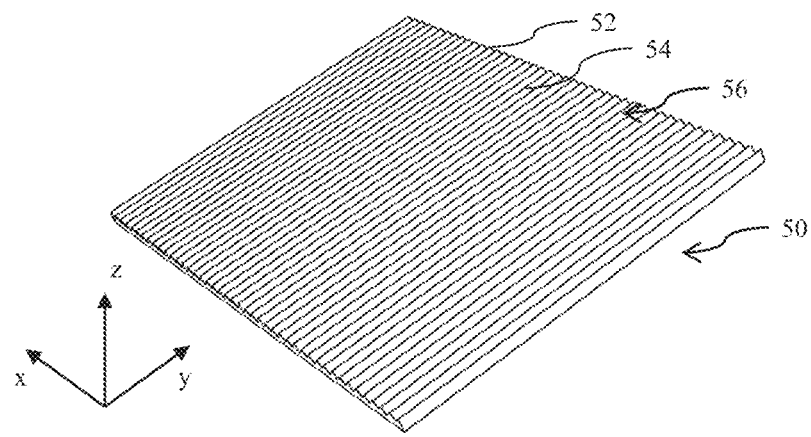
FIG. 26B is a schematic diagram illustrating in perspective rear view a light-turning component.
Figure 26C:
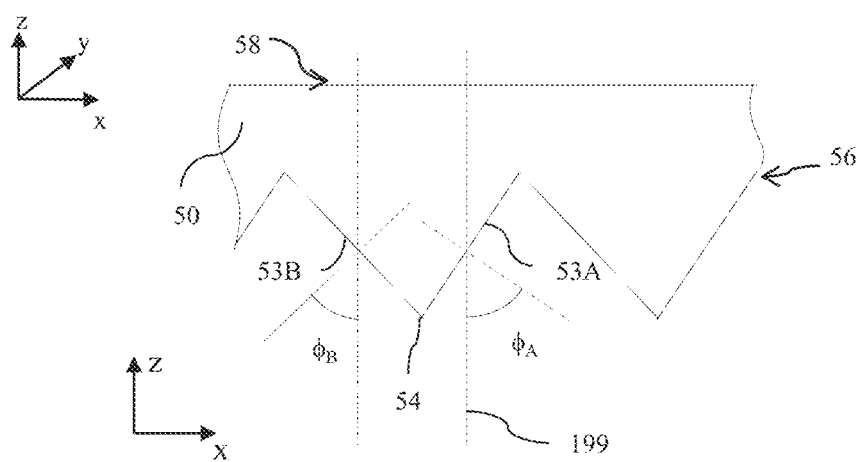
FIG. 26C is a schematic diagram illustrating in top view a light-turning component.

FIG. 26A is a schematic diagram illustrating in top view operation of the backlight 20 of FIG. 25B; FIG. 26B is a schematic diagram illustrating in perspective rear view a light-turning component 50; and FIG. 26C is a schematic diagram illustrating in top view a light-turning component 50. Features of the arrangements of FIGS. 26A-C not discussed in further detail may be assumed to correspond to the features with equivalent reference numerals, including any potential variations in the features.

The backlight 20 comprises: at least one first light source 15A arranged to provide input light; at least one second light source 15B arranged to provide input light in an opposite direction from the at least one first light source 15A; a waveguide arrangement 11 comprising at least one waveguide 1, the waveguide arrangement 11 being arranged to receive the input light from the at least one first light source and the at least one second light source and to cause light from the at least one first light source and the at least one second light source to exit from the waveguide arrangement 11 by breaking total internal reflection; and an optical turning film component 50 comprising: an input surface 56 arranged to receive the light exiting from a waveguide 1 through a light guiding surface 8 of the waveguide 1 by breaking total internal reflection, the input surface 56 extending across the plane; and an output surface 58 facing the input surface 56, wherein the input surface 56 comprises an array of prismatic elements 51. The prismatic elements 51 may be elongate.

The waveguide arrangement 11 comprises: a first waveguide 1A extending across a plane and comprising first and second opposed light guiding surfaces arranged to guide light along the waveguide, the second light guiding surface being arranged to guide light by total internal reflection; and a first input end 2A arranged between the first and second light guiding surfaces 6A, 8A and extending in a lateral direction between the first and second light guiding surfaces 6A, 8A; wherein the at least one first light source 15A is arranged to input light 445 into the first waveguide 1A through the first input end, and the first waveguide 1A is arranged to cause light from the at least one first light source 15A to exit from the first waveguide 1A through one of the first and second light guiding surfaces 6A, 8A by breaking total internal reflection; a second waveguide 1B extending across the plane arranged in series with the first waveguide 1A and comprising first and second opposed light guiding surfaces 6B, 8B arranged to guide light along the waveguide 1B, the second light guiding surface 8B being arranged to guide light by total internal reflection, and a second input end 2B arranged between the first and second light guiding surfaces 6B, 8B and extending in a lateral direction between the first and second light guiding surfaces 6B. 8B; wherein the at least one second light source 15B is arranged to input light 447 into the second waveguide 1B through the second input end 2B, and the second waveguide 1B is arranged to cause light from the at least one second light source 15B to exit from the second waveguide 1B through one of the first and second light guiding surfaces 6B. 8B by breaking total internal reflection, and wherein the first and second waveguides 1A, 1B are oriented so that at least one first light source 15A and at least one second light source 15B input light 445, 447 into the first and second waveguides 1A, 1B in opposite directions.

The optical turning film component 50 comprises: an input surface 56 arranged to receive the light 444A, 444B exiting from the waveguide arrangement 11 through a light guiding surface of the at least one waveguide 1A, 1B of the waveguide arrangement by breaking total internal reflection, the input surface 56 extending across the plane; and an output surface 58 facing the input surface, wherein the input surface 56 comprises an array of prismatic elements 52. The prismatic elements each comprise a pair of elongate facets 52 defining a ridge 54 therebetween. Angles $\phi_A$, $\phi_B$ of prism surfaces 53A, 53B are provided to direct the nominal light output from waveguides 1A, 1B to directions 445, 447 by refraction and reflection at surfaces 53A, 53B. Advantageously desirable illumination directions such as illustrated in FIGS. 4A-F may be achieved by selection of angles $\phi_A$, $\phi_B$.

The backlight 20 of FIG. 26A may provide two different luminance profiles, for example for use in the passenger infotainment display device 100 of FIGS. 19A-B. In operation, the light 444A from the first light source 15A exits the backlight 20 with a first angular distribution 445 towards the passenger 45 and the light from the second light source 15B exits the backlight 20 with a second angular distribution 457 towards the driver. The first angular distribution 455 may be symmetrical about an axis 199 of symmetry of the backlight 20 and the second angular distribution 457 is asymmetrical about the same axis 199 of symmetry of the backlight 20. In a left-hand drive vehicle, the asymmetrical distribution 457 may be to the left of the axis 199 of symmetry of the backlight 20 and in a right-hand drive vehicle the asymmetrical distribution 457 may be to right of the axis 199 of symmetry of the backlight 20.

Waveguides 1A, 1B comprise surface relief features that are arranged to leak some of the guiding light either towards the rear reflector 3 or towards the light-turning component 50. Each waveguide 1A, 1B comprises a surface relief 30 arranged on the first side 6A, 6B that may comprise prism surfaces 32, 33. Further the second sides 8A, 8B may further comprise surface relief 31 that may comprise elongate features or prism features. In operation the surface reliefs 30, 31 provide leakage of light 445, 447 from waveguide 1A, 1B for light guiding along the waveguide 1A, 1B.

Figure 27:
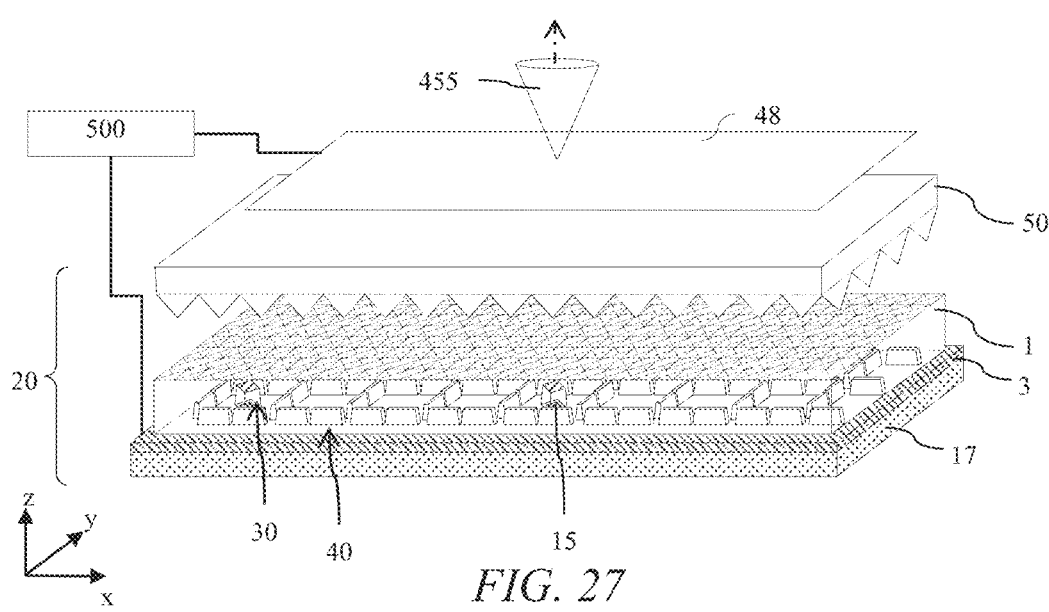
FIG. 27 is a schematic diagram illustrating in perspective side view an alternative backlight comprising an array of light sources and an array of light-deflecting wells.

FIG. 27 is a schematic diagram illustrating in perspective side view an alternative backlight 20 comprising an array of light sources 15a-n that may be mini-LEDs and an array of light-deflecting wells 40a-n. Features of the arrangement of FIG. 27 not discussed in further detail may be assumed to correspond to the features with equivalent reference numerals, including any potential variations in the features.

Backlight 20 is described in U.S. Patent Publ. No 2022-0404540, which is herein incorporated by reference in its entirety. The backlight 20 is arranged to illuminate a predetermined area of a transmissive spatial light modulator 48. Backlight 20 and spatial light modulator 48 are controlled by means of controller 500.

The size and profile of the light output cone 455 is determined by the structure and operation of the backlight 20 and other optical layers in the optical stack 5. As will be described hereinbelow the backlight 20 is arranged to provide a distribution of luminous intensity within a relatively small cone angle 402 in comparison with conventional backlights using brightness enhancement films such as BEF™ from 3M corporation.

Backlight 20 comprises a support substrate 17, reflective layer 3, an array of light emitting elements 15 and an optical waveguide 1 comprising light input wells 30 and light-deflecting wells 40. The light emitting elements 15 are aligned to the light input wells 30. The light-deflecting wells 40 are arranged in an array between the light input wells 30.

The waveguide 1 comprises rear and front light guiding surfaces 6, 8 and may comprise a light transmitting material such as PMMA, PC, COP or other known transmissive material. The light input wells may comprise air between the rear light guiding surface 6 and the end 34. The waveguide 1 comprises an array of catadioptric elements wherein light is refracted at the light input well and is reflected by total internal reflection and/or reflection at coated reflective surfaces.

The backlight 20 further comprises a reflective layer 3 behind the rear light guiding surface 6 that is arranged to reflect light extracted from the waveguide 1 through the rear light guiding surface 6 back through the waveguide 1 for output forwardly.

The backlight 20 further comprises a light-turning optical arrangement that is a light-turning optical component 50 arranged to direct light output rays 415G from the waveguide 1 into desirable light output cone 402. Light-turning optical component 50 may comprise a film. Advantageously low thickness may be achieved.

Control system 500 is arranged to control the light emitting elements 15 and the pixels 220R, 220G, 220B of the spatial light modulator 48. High resolution image data may be provided to the spatial light modulator 48 and lower resolution image data may be provided to the light emitting elements 15 by the control system. The display device 100 may advantageously be provided with high dynamic range, high luminance and high efficiency as will be described further hereinbelow.

It may be desirable to provide a backlight 20 comprising brightness enhancement films 41A, 41B.

Figure 28A:
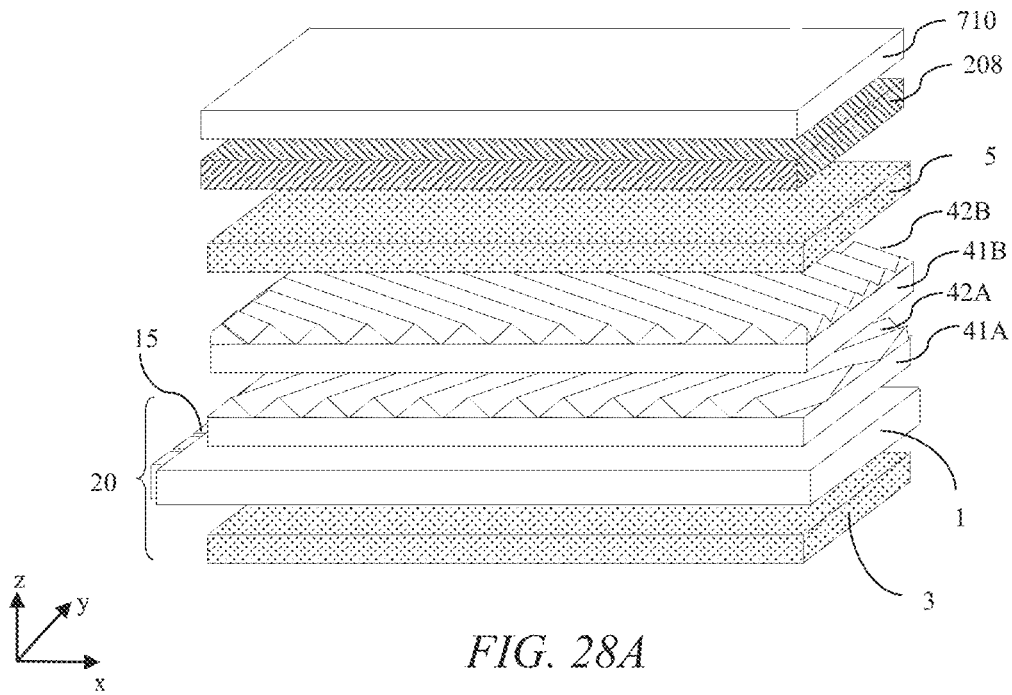
FIG. 28A is a schematic diagram illustrating in perspective side view an alternative backlight comprising a light-scattering waveguide, a rear reflector, crossed prismatic films and a light control film.
Figure 28B:
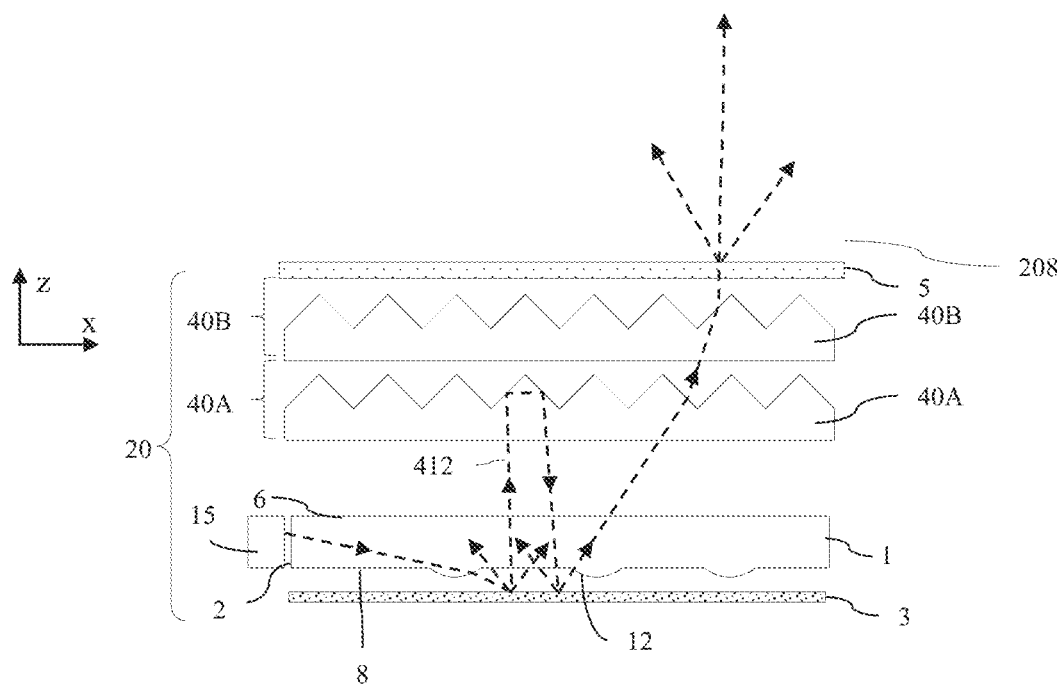
FIG. 28B is a schematic diagram illustrating in side view operation of the backlight of FIG. 26.

FIG. 28A is a schematic diagram illustrating in perspective side view an alternative backlight 20 comprising a light-scattering waveguide 1, a rear reflector 3, crossed prismatic films 40A, 40B and a light control film 700; and FIG. 28B is a schematic diagram illustrating in side view operation of the backlight 20 of FIG. 28A. Features of the arrangements of FIGS. 28A-B not discussed in further detail may be assumed to correspond to the features with equivalent reference numerals, including any potential variations in the features.

The backlight apparatus 20 of FIGS. 28A-B comprises a rear reflector 3; and an illumination apparatus comprising waveguide 1 and light sources 15. Light rays 412 from the source 15 are input through input side 2 and guide within the surfaces 6, 8 of the waveguide 1. Light is output by means of extraction features 12 and is incident onto rear reflector 3 which may reflect light either by scattering or specular reflection back through the waveguide 1.

In alternative embodiments (not shown), the light sources 15 and waveguide 1 may be replaced by a two-dimensional array of mini-LEDs arrayed across the area of the spatial light modulator 48 and optionally various scattering layers including wavelength conversion layers provided.

Output light is directed towards crossed brightness enhancement films 41A, 41B that are arranged to receive light exiting from the first surface 6 of waveguide 1. In the present embodiments, 'crossed' refers to an angle of substantially 90° between the optical axes of the two retarders in the plane of the retarders.

Brightness enhancement films 41A, 41B each comprise a prismatic layer with prismatic surfaces 42A, 42B arranged between the optical waveguide 1 and the spatial light modulator 48 to receive output light from the optical waveguide 1 or array of mini-LEDs. Light rays 412 from the waveguide 1 or array of mini-LEDs are directed through the spatial light modulator 48.

The prismatic surfaces 42A, 42B are elongate and the orientation of the elongate prismatic surfaces of the turning film and further turning film are crossed. Light that is in directions near to the optical axis 199 are reflected back towards the reflector 3, whereas light rays 410 that are closer to grazing the surface 6 are output in the normal direction.

Optionally reflective polariser 208 may be provided between the input display polariser 210 and backlight 20 to provide recirculated light and increase display efficiency. Advantageously efficiency may be increased.

The light recirculating components 3, 41A, 41B, 208 of backlight 20 achieve a mixing of output light from the waveguide. Such recirculation is tolerant to manufacturing defects and backlights 20 may advantageously be provided with larger size, lower cost and higher luminance uniformity than the collimated backlights illustrated elsewhere herein. However, the backlights of FIG. 28A-B provide increased luminance at higher polar angles that may degrade security factor in privacy mode as will be described below.

It would be desirable to provide high uniformity backlights with low manufacturing cost while achieving high security factor in privacy mode, and achieving desirable luminance in the public mode of operation.

A light control film 700 is arranged between the backlight 20 and the spatial light modulator 48. The light control film 700 comprises an input surface 706, an output surface 708 facing the input surface 706, an array of light transmissive regions 704 extending between the input surface 706 and the output surface 708, and absorptive regions 702 between the transmissive regions and extending between the input surface and the output surface.

Light control film 700 is arranged between the reflective polariser 208 of the backlight 20 and the display input polariser 210. Light control film 700 may further comprise a support substrate 710. Advantageously the flatness of the light control film may be increased to achieve increased uniformity. The structure and operation of the light control film will be further described hereinbelow.

The arrangements of FIGS. 28A-B in combination with liquid crystal polar control retarders are described further in U.S. Pat. No. 11,099,447, which is herein incorporated by reference in its entirety.

Advantageously the embodiments of FIGS. 28A-B used for the backlight 20 of the present embodiments may provide reduce cost of manufacture. Improved wide-angle mode visibility may be achieved and high security factor for viewers 47 in privacy mode.

The principles of operation of the switchable polar control retarders of FIG. 3A will now be described further.

Figure 29A:
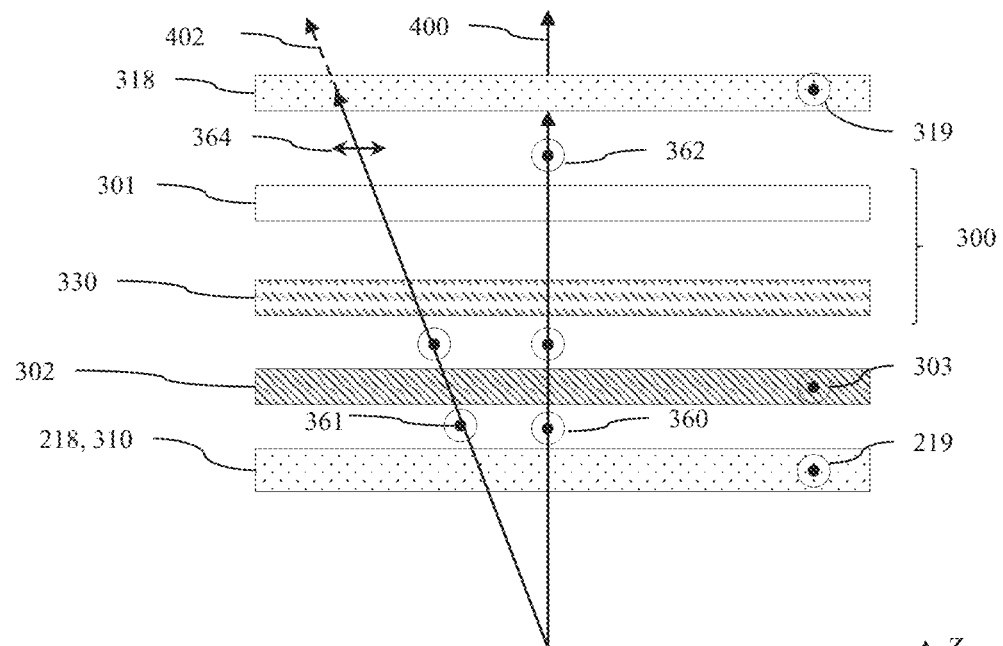
FIG. 29A is a schematic diagram illustrating in top view propagation of transmitted light through a polar control retarder arranged between a reflective polariser and an additional polariser in privacy mode.

FIG. 29A is a schematic diagram illustrating in top view propagation of transmitted light through a polar control retarder 300 arranged between a reflective polariser 302 and an additional polariser 318 in privacy mode of operation. Features of the embodiment of FIG. 29A not discussed in further detail may be assumed to correspond to the features with equivalent reference numerals as discussed above, including any potential variations in the features.

FIG. 29A illustrates the output polariser 218, reflective polariser 302 that is a display polariser 310 for the polar control retarder 300 and additional polariser 318 wherein the polar control retarder 300 comprises a liquid crystal polar control retarder 301 and passive compensation retarder 330. The propagation of polarised light will now be described.

When the layer 314 of liquid crystal material 315 is driven to operate in the privacy mode, the retarders 300 provide no overall transformation of polarisation component 360 to output light rays 400 passing therethrough along an axis perpendicular to the plane of the switchable retarder, but provides an overall transformation of polarisation component 361 to light rays 402 passing therethrough for some polar angles which are at an acute angle to the perpendicular to the plane of the retarders.

Polarisation component 360 from the output polariser 218 is transmitted by reflective polariser 302 and incident on retarders 300. On-axis light has a polarisation component 362 that is unmodified from component 360 while off-axis light has a polarisation component 364 that is transformed by the retarders 300. At a minimum, the polarisation component 361 is transformed to a linear polarisation component 364 and absorbed by additional polariser 318. More generally, the polarisation component 361 is transformed to an elliptical polarisation component, that is partially absorbed by additional polariser 318.

The polar distribution of light transmission illustrated in FIG. 8B modifies the polar distribution of luminance output of the underlying spatial light modulator 48. In the case that the spatial light modulator 48 comprises a directional backlight 20 then off-axis luminance may be further be reduced as described above.

Advantageously, a privacy display is provided that has low luminance to an off-axis snooper while maintaining high luminance for an on-axis viewer.

The operation of the reflective polariser 302 for light from ambient light source 404 will now be described for the display operating in privacy mode.

Figure 29B:
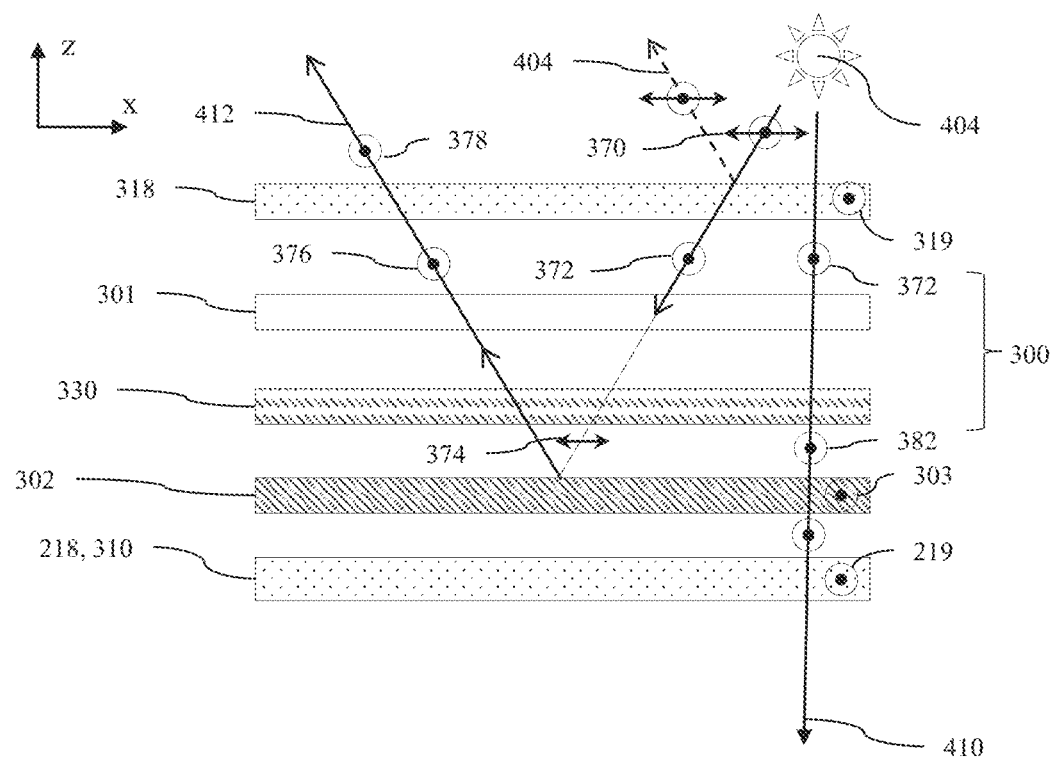
FIG. 29B is a schematic diagram illustrating in top view propagation of ambient light through a polar control retarder arranged between a reflective polariser and an additional polariser in privacy mode.

FIG. 29B is a schematic diagram illustrating in top view propagation of ambient light through a polar control retarder 300 arranged between a reflective polariser 302 and an additional polariser 318 in privacy mode of operation. Features of the embodiment of FIG. 29B not discussed in further detail may be assumed to correspond to the features with equivalent reference numerals as discussed above, including any potential variations in the features.

Ambient light source 404 illuminates the display device 100 with unpolarised light. Additional polariser 318 transmits light ray 410 normal to the display device 100 with a first polarisation component 372 that is a linear polarisation component parallel to the electric vector transmission direction 319 of the additional polariser 318.

In both states of operation, the polarisation component 372 remains unmodified by the retarders 300 and so transmitted polarisation component 382 is parallel to the transmission axis of the reflective polariser 302 and the output polariser 218, so ambient light is directed through the spatial light modulator 48 and lost.

By comparison, for ray 412, off-axis light is directed through the retarders 300 such that polarisation component 374 incident on the reflective polariser 302 may be reflected. Such polarisation component is re-converted into component 376 after passing through retarders 300 and is transmitted through the additional polariser 318.

Thus when the layer 314 of liquid crystal material is in the second state of said two states, the reflective polariser 302 provides no reflected light for ambient light rays 410 passing through the additional polariser 318 and then the retarders 300 along an axis perpendicular to the plane of the retarders 300, but provides reflected light rays 412 for ambient light passing through the additional polariser 318 and then the retarders 300 at some polar angles which are at an acute angle to the perpendicular to the plane of the retarders 300; wherein the reflected light 412 passes back through the retarders 300 and is then transmitted by the additional polariser 318.

The retarders 300 thus provide no overall transformation of polarisation component 380 to ambient light rays 410 passing through the additional polariser 318 and then the retarder 300 along an axis perpendicular to the plane of the switchable retarder, but provides an overall transformation of polarisation component 372 to ambient light rays 412 passing through the absorptive polariser 318 and then the retarders 300 at some polar angles which are at an acute angle to the perpendicular to the plane of the retarders 300.

The polar distribution of light reflection illustrated in FIG. 7C thus illustrates that high reflectivity can be provided at typical snooper locations by means of the privacy state of the retarders 300. Thus, in the privacy mode, the reflectivity for off-axis viewing positions is increased as illustrated in FIG. 7E, and the luminance for off-axis light from the spatial light modulator 48 is reduced as illustrated in FIG. 6B.

In the wide-angle mode, the control system 710, 752, 350 is arranged to switch the switchable liquid crystal retarder 301 into a second retarder state in which a phase shift is introduced to polarisation components of light passing therethrough along an axis inclined to a normal to the plane of the switchable liquid crystal retarder 301.

By way of comparison, solid angular extent 402D may be substantially the same as solid angular extent 402B in a wide-angle mode. Such control of output solid angular extents 402C, 402D may be achieved by synchronous control of the sets 15, 17 of light sources and the at least one switchable liquid crystal retarder 300.

Advantageously a privacy mode may be achieved with low image visibility for off-axis viewing and a large solid angular extent may be provided with high efficiency for a wide-angle mode, for sharing display imagery between multiple users and increasing image spatial uniformity.

Additional polariser 318 is arranged on the same output side of the spatial light modulator 48 as the display output polariser 218 which may be an absorbing dichroic polariser. The display polariser 218 and the additional polariser 318 have electric vector transmission directions 219, 319 that are parallel. As will be described below, such parallel alignment provides high transmission for central viewing locations.

A transmissive spatial light modulator 48 is arranged to receive the output light from the backlight; an input polariser 210 is arranged on the input side of the spatial light modulator between the backlight 20 and the spatial light modulator 48; an output polariser 218 is arranged on the output side of the spatial light modulator 48; an additional polariser 318 is arranged on the output side of the output polariser 218; and a switchable liquid crystal retarder 300 comprising a layer 314 of liquid crystal material is arranged between the at least one additional polariser 318 and the output polariser 318 in this case in which the additional polariser 318 is arranged on the output side of the output polariser 218; and a control system 710 is arranged to synchronously control the light sources 15, 17 and the at least one switchable liquid crystal retarder 300.

Control system 710 further comprises control of voltage controller 752 that is arranged to provide control of voltage driver 350, in order to achieve control of switchable liquid crystal retarder 301.

Advantageously, a privacy display is provided that has high reflectivity to an off-axis snooper while maintaining low reflectivity for an on-axis viewer. As described above, such increased reflectivity provides enhanced privacy performance for the display in an ambiently illuminated environment.

The embodiments of FIGS. 29A-B may alternatively be provided without the reflective polariser 302. Thickness and complexity is reduced. Ambient light absorbed with the display optical stack. In alternative embodiments as illustrated hereinabove, the display polariser 310 may be the input polariser 210 and the additional polariser 318 arranged between a backlight 20 and the input polariser 210.

Operation in wide-angle mode will now be described.

Figure 30A:
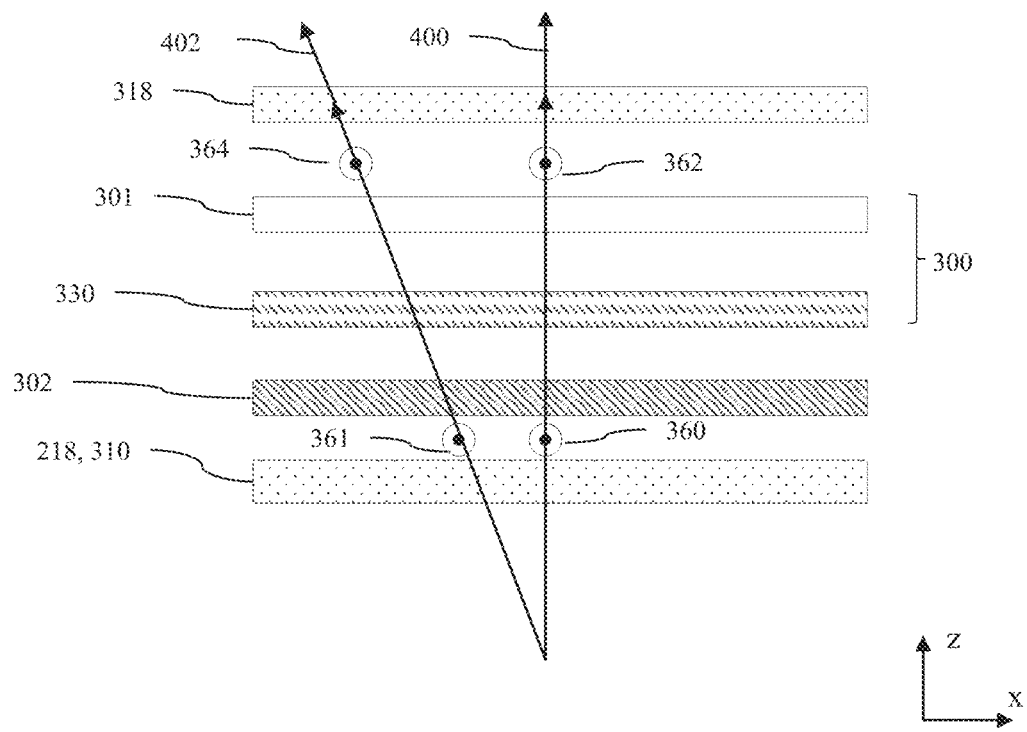
FIG. 30A is a schematic diagram illustrating in side view propagation of output light from a spatial light modulator through the optical stack of FIG. 29A in a wide-angle mode.
Figure 30B:
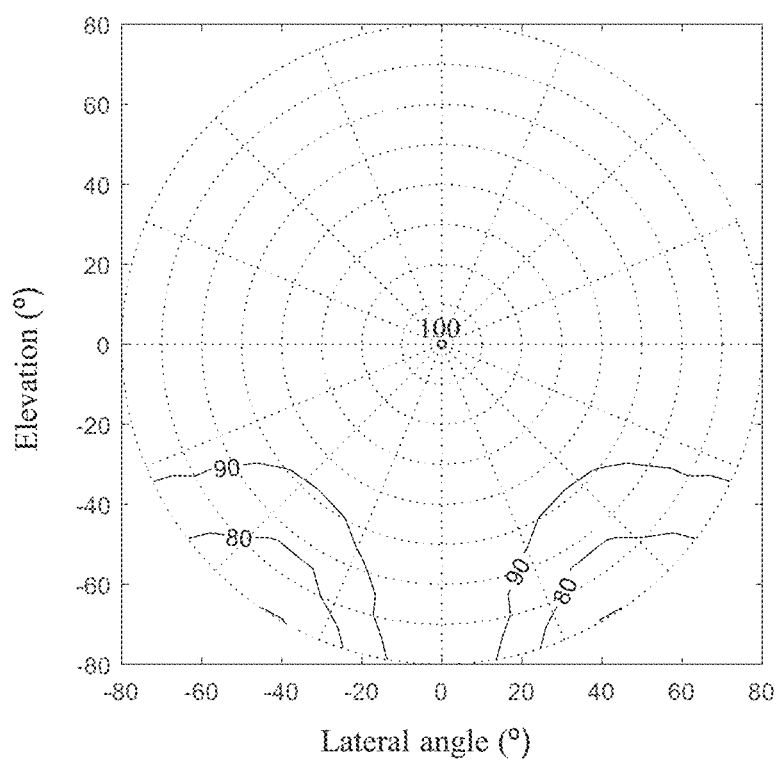
FIG. 30B is a schematic graph illustrating the polar variation of output luminance with polar direction for the transmitted light rays in FIG. 30A.

FIG. 30A is a schematic diagram illustrating in side view propagation of output light from a spatial light modulator through the optical stack of FIG. 29A in a wide-angle mode; and FIG. 30B is a schematic graph illustrating the variation of output luminance with polar direction for the transmitted light rays in FIG. 30A. Features of the embodiment of FIG. 30A and FIG. 30B not discussed in further detail may be assumed to correspond to the features with equivalent reference numerals as discussed above, including any potential variations in the features.

When the liquid crystal retarder 301 is in a first state of said two states, the retarders 300 provide no overall transformation of polarisation component 360, 361 to output light passing therethrough perpendicular to the plane of the switchable retarder 301 or at an acute angle to the perpendicular to the plane of the switchable retarder 301. That is, polarisation component 362 is substantially the same as polarisation component 360 and polarisation component 364 is substantially the same as polarisation component 361. Thus the angular transmission profile of FIG. 30B is substantially uniformly transmitting across a wide polar region. Advantageously a display may be switched to a wide field of view.

Figure 30C:
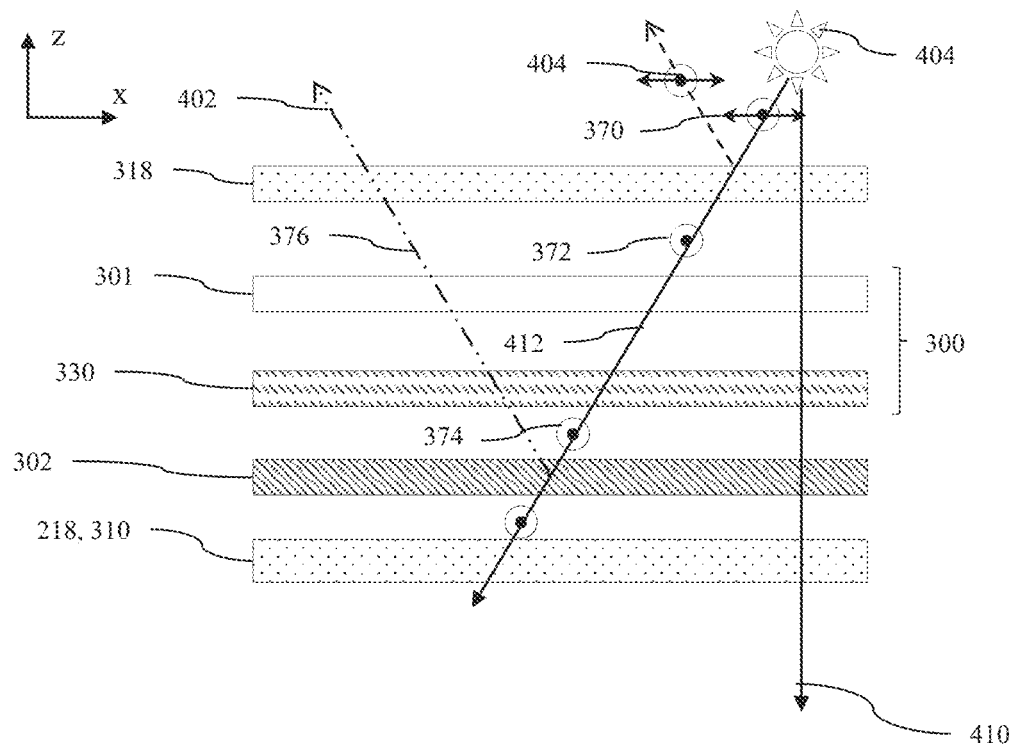
FIG. 30C is a schematic diagram illustrating in top view propagation of ambient illumination light through the optical stack of FIG. 29A in a wide-angle mode.
Figure 30D:
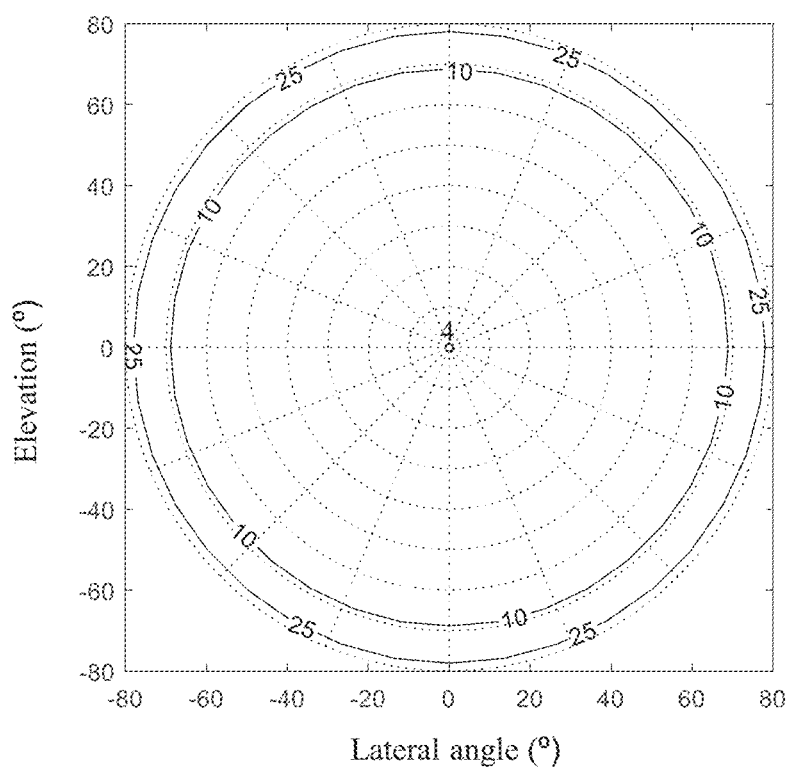
FIG. 30D is a schematic graph illustrating the polar variation of reflectivity with polar direction for the reflected light rays in FIG. 30C.

FIG. 30C is a schematic diagram illustrating in top view propagation of ambient illumination light through the optical stack of FIG. 29A in a wide-angle mode; and FIG. 30D is a schematic graph illustrating the variation of reflectivity with polar direction for the reflected light rays in FIG. 30C. Features of the embodiment of FIG. 30C and FIG. 30D not discussed in further detail may be assumed to correspond to the features with equivalent reference numerals as discussed above, including any potential variations in the features.

Thus when the liquid crystal retarder 301 is in the first state of said two states, the retarders 300 provide no overall transformation of polarisation component 372 to ambient light rays 412 passing through the additional polariser 318 and then the retarders 300, that is perpendicular to the plane of the retarders 300 or at an acute angle to the perpendicular to the plane of the retarders 300.

In operation in wide-angle mode, input light ray 412 has polarisation state 372 after transmission through the additional polariser 318. For both head-on and off-axis directions, no polarisation transformation occurs and thus the reflectivity for light rays 402 from the reflective polariser 302 is low. Light ray 412 is transmitted by reflective polariser 302 and lost in the display polarisers 218, 210 or the backlight of FIG. 1A.

Advantageously in a wide-angle mode, high luminance and low reflectivity is provided across a wide field of view. Such a display can be conveniently viewed with high contrast by multiple viewers. Other types of switchable privacy display will now be described.

A display device 100 that may be switched between privacy and wide-angle modes of operation comprises an imaging waveguide and an array of light sources as described in U.S. Pat. No. 9,519,153, which is herein incorporated by reference in its entirety. The imaging waveguide images an array of light sources to optical windows that may be controlled to provide high luminance on-axis and low luminance off-axis in a privacy mode, and high luminance with a large solid angle cone for share operation.

It may be desirable to provide high image visibility for viewer movement in the elevation direction in both privacy and share modes.

FIG. 31A is a schematic diagram illustrating in perspective front view a polar transmission control arrangement 600 comprising an in-plane polariser 610 that is the display output polariser 218, a polarisation switch 601 comprising a homeotropic alignment layer 617B and a homogeneous alignment layer 617A and an out-of-plane polariser 602; FIG. 31B is a schematic diagram illustrating in perspective side view the arrangement of FIG. 31A; and FIG. 31C is a schematic diagram illustrating in top view the arrangement of FIG. 31A. Features of the embodiment of FIGS. 31A-C not discussed in further detail may be assumed to correspond to the features with equivalent reference numerals as discussed above, including any potential variations in the features.

Most generally in the present embodiments, the polarisation switch 601 comprises two surface alignment layers 617A. 617B disposed adjacent to the layer 601 of liquid crystal material 615 on opposite sides thereof and each arranged to provide alignment in the adjacent liquid crystal material 615. One or both of the surface alignment layers 617A, 617B may be arranged to provide homogeneous alignment in the adjacent liquid crystal material; and one or both of the surface alignment layers 617A. 617B is arranged to provide homeotropic alignment in the adjacent liquid crystal material 615.

More specifically in the alternative embodiment of FIGS. 31A-C, one of the surface alignment layers 617B is arranged to provide homogeneous alignment in the adjacent liquid crystal material 615 and the other of the surface alignment layers 617A is arranged to provide homeotropic alignment in the adjacent liquid crystal material 615.

Figure 32A:
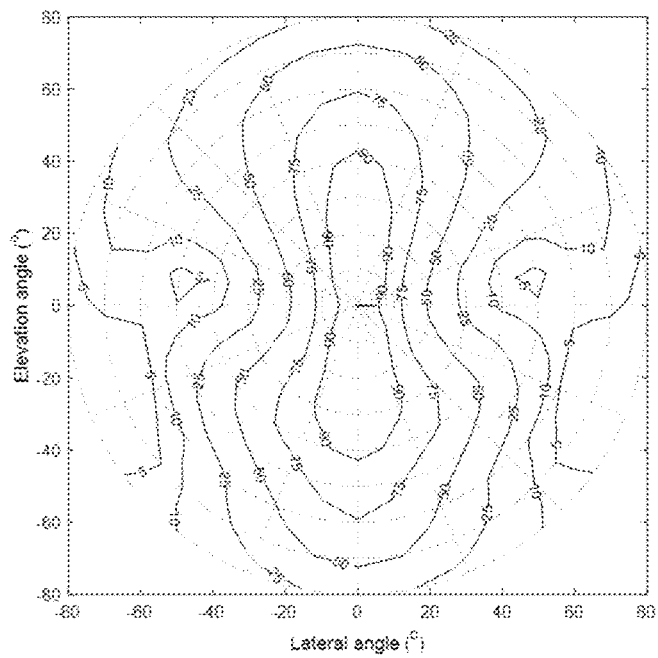
FIG. 32A is a schematic graph illustrating the polar variation of luminance transmission for the arrangement of FIG. 31A operating in the first mode and as described in TABLE 12.
Figure 32B:
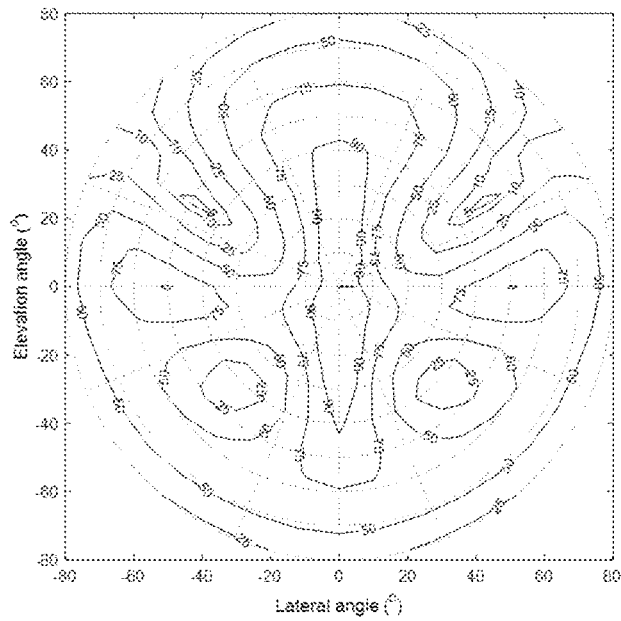
FIG. 32B is a schematic graph illustrating the polar variation of luminance transmission for the arrangement of FIG. 31A operating in the second mode and as described in TABLE 12.

FIG. 32A is a schematic graph illustrating the polar variation of luminance transmission for the arrangement of FIGS. 31A-C operating in the first mode and as described in TABLE 12; and FIG. 32B is a schematic graph illustrating the polar variation of luminance transmission for the arrangement of FIG. 31A operating in the second mode and as described in TABLE 12.

operation. Features of the embodiment of FIGS. 33A-C not discussed in further detail may be assumed to correspond to the features with equivalent reference numerals as discussed above, including any potential variations in the features.

Figure 33A:
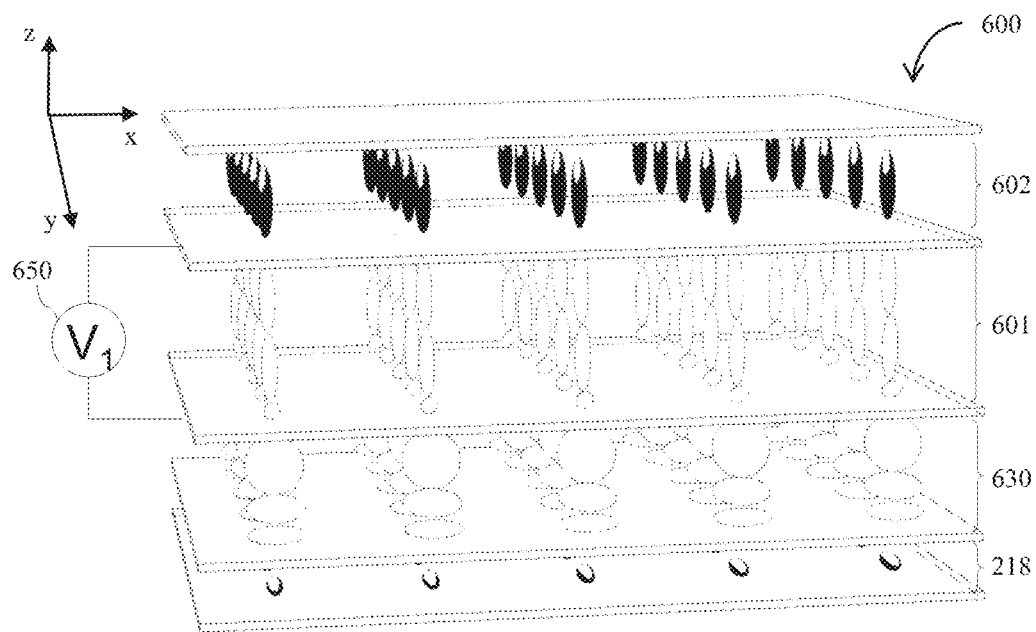
FIG. 33A is a schematic diagram illustrating in perspective side view a polar transmission control arrangement comprising an in-plane polariser, a splayed discotic passive compensation retarder, a polarisation switch comprising a homeotropic alignment layer and a homogeneous alignment layer and an out-of-plane polariser.
Figures 33B, 33C:
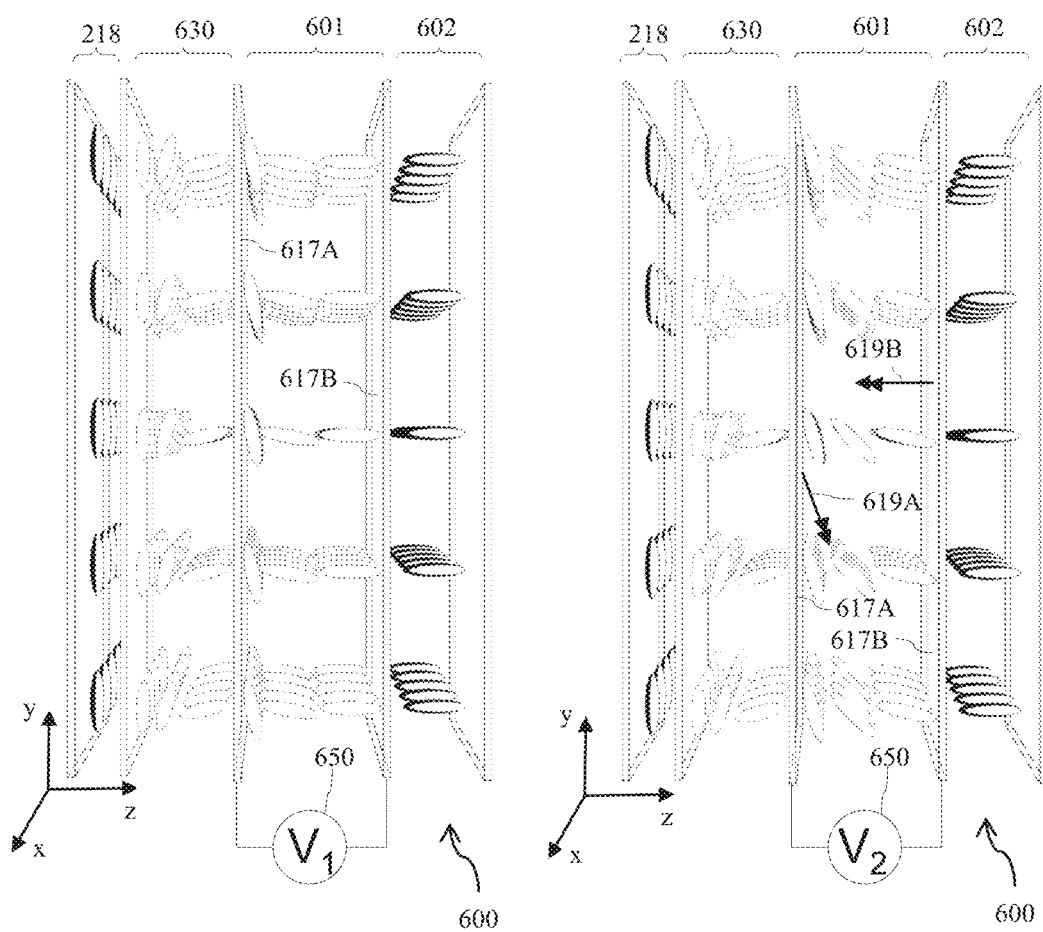
FIG. 33B is a schematic diagram illustrating in perspective side view the arrangement of FIG. 31B operating in a first mode.
FIG. 33C is a schematic diagram illustrating in perspective side view the arrangement of FIG. 31B operating in a second mode.

By way of comparison with FIGS. 31A-C, in the alternative embodiment of FIGS. 33A-C both alignment layers 617A, 617B provide homeotropic alignment in the liquid crystal material 615. Further passive retarder 630 that is a negative C-plate is arranged to compensate for residual splay artefacts of the alignment of the polarisation switch 601. Improved control of the polar luminance profiles may be provided in at least one of share and privacy modes of operation. Further variation of colour with viewing angle may be reduced.

Figures 34A, 34B:
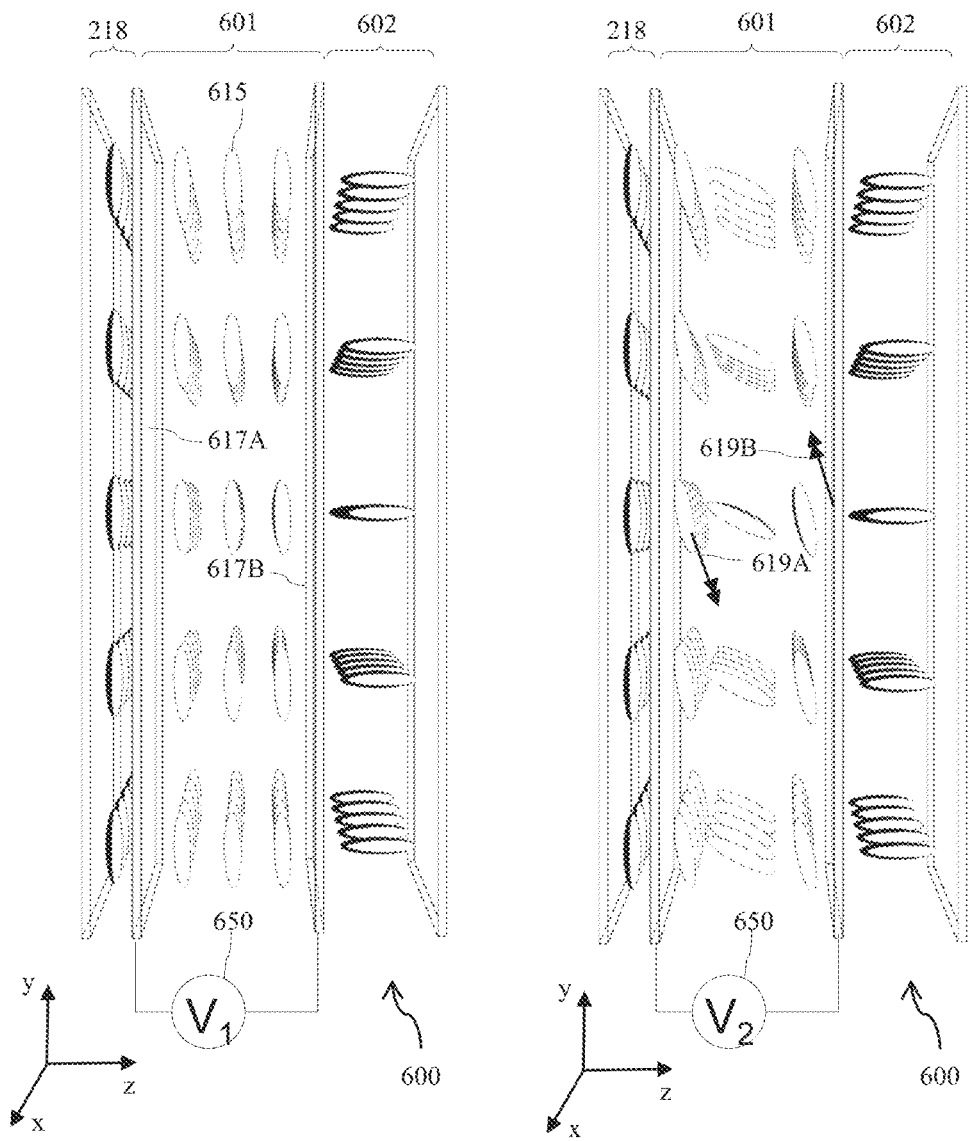
FIG. 34A is a schematic diagram illustrating in perspective side view a polar transmission control arrangement comprising an in-plane polariser, a polarisation switch comprising two homogeneous alignment layers and an out-of-plane polariser arranged in a first mode.
FIG. 34B is a schematic diagram illustrating in perspective side view the arrangement of FIG. 34A arranged in a second mode.

FIG. 34A is a schematic diagram illustrating in perspective side view a polar transmission control arrangement 600 comprising an in-plane polariser 218, a polarisation switch 601 comprising two homogeneous alignment layers 617A, 617B and an out-of-plane polariser 602 arranged in a first mode of operation; and FIG. 34B is a schematic diagram illustrating in perspective side view the arrangement of FIG.

TABLE 12

| Item | | Value |
|---|---|---|
| Out-of-plane polariser 602 | Material 603 ordinary refractive index, $n_o$ at 550 nm | 1.506 + 0.00165i |
| | Material 603 extraordinary refractive index, $n_e$ at 550 nm | 1.53 + 0.116i |
| | Thickness, d | 6 μm |
| | Absorption axis 622 tilt φ to surface normal 199 | 0° |
| Polarisation switch 601 | Layer 614 of liquid crystal material 615 retardance | 1000 nm |
| | Layer 614 of liquid crystal material 615 in-plane alignment direction, 619Ap angle θ | 90° |
| | Layer 614 of liquid crystal material 615 in-plane alignment direction, 619Bp angle θ | 180° |
| | Privacy mode voltage | 14 V |
| | Share mode voltage | 2 V |
| In-plane polariser 610 | Absorption axis 620 in-plane angle | 90° |

By way of comparison with the embodiment of FIG. 7F, the alternative embodiments of FIG. 32B achieves increased symmetry about the lateral direction in share mode of operation as illustrated in FIG. 32B. Further the adiabatic propagation of polarisation states through the layer 614 of the polarisation switch 601 provides reduced visibility of colour variations in share mode of operation in comparison to the embodiments of FIGS. 34A-B or FIGS. 36A-B hereinbelow.

FIG. 33A is a schematic diagram illustrating in perspective side view a polar transmission control arrangement 600 comprising an in-plane polariser 218, a splayed discotic passive compensation retarder 630, a polarisation switch 601 comprising a homeotropic alignment layer 617B and a homogeneous alignment layer 617A and an out-of-plane polariser 602; FIG. 33B is a schematic diagram illustrating in perspective side view the arrangement of FIG. 31B operating in a first mode of operation; FIG. 33C is a schematic diagram illustrating in perspective side view the arrangement of FIG. 31B operating in a second mode of 34A arranged in a second mode of operation. Features of the embodiment of FIGS. 34A-B not discussed in further detail may be assumed to correspond to the features with equivalent reference numerals as discussed above, including any potential variations in the features.

By way of comparison with the embodiment of FIGS. 31A-C, the alternative embodiment of FIGS. 34A-B provides homogeneous alignment layers 617A, 617B. Advantageously reduced visibility of polarisation switch 601 deformation due to liquid crystal material 615 flow under applied pressure may be achieved.

Figure 35A:
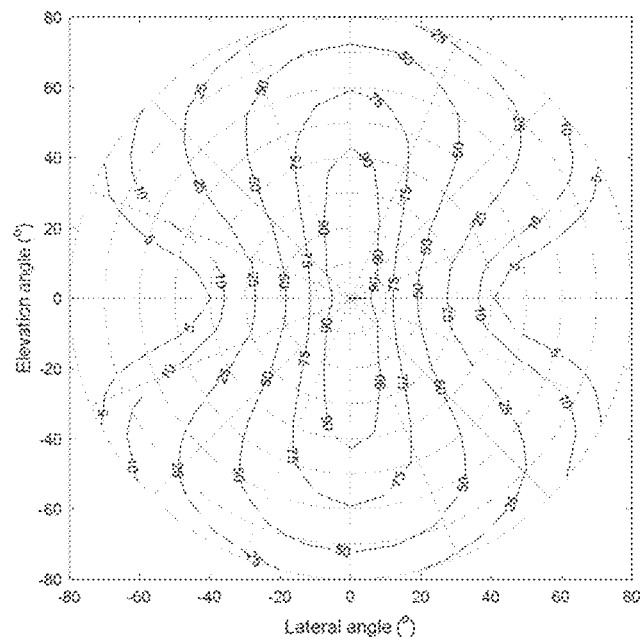
FIG. 35A is a schematic graph illustrating the polar variation of luminance transmission for the arrangement of FIG. 34A operating in the first mode and as described in TABLE 13.
Figure 35B:
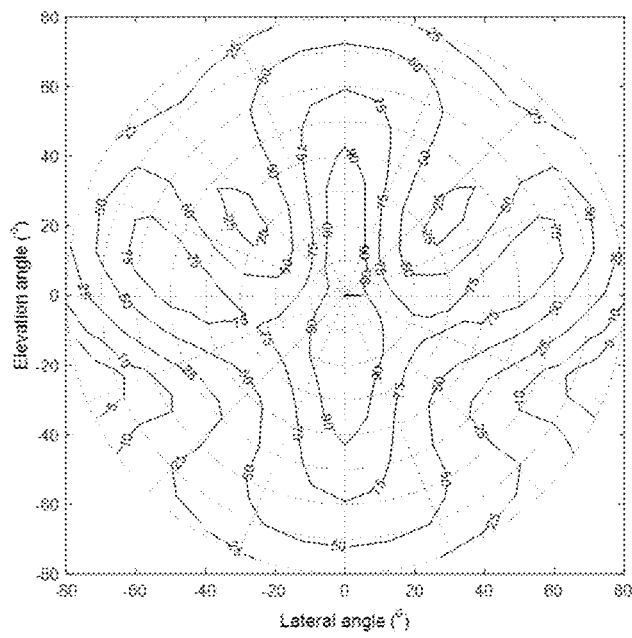
FIG. 35B is a schematic graph illustrating the polar variation of luminance transmission for the arrangement of FIG. 34B operating in the second mode and as described in TABLE 13.

FIG. 35A is a schematic graph illustrating the polar variation of luminance transmission for the arrangement of FIG. 34A operating in the first mode and as described in TABLE 13; and FIG. 35B is a schematic graph illustrating the polar variation of luminance transmission for the arrangement of FIG. 34B operating in the second mode and as described in TABLE 13.

TABLE 13

| Item | | Value |
|---|---|---|
| Out-of-plane polariser 602 | Material 603 ordinary refractive index, $n_o$ at 550 nm | 1.506 + 0.00165i |
| | Material 603 extraordinary refractive index, $n_e$ at 550 nm | 1.53 + 0.116i |
| | Thickness, d | 6 μm |
| | Absorption axis 622 tilt φ to surface normal 199 | 0° |

TABLE 13-continued

| Item | | Value |
|---|---|---|
| Polarisation switch 601 | Layer 614 of liquid crystal material 615 retardance | 750 nm |
| | Layer 614 of liquid crystal material 615 in-plane alignment direction, 619Ap angle θ | 90° |
| | Layer 614 of liquid crystal material 615 in-plane alignment direction, 619Bp angle θ | 180° |
| | Privacy mode voltage | 0 V |
| | Share mode voltage | 3 V |
| In-plane polariser 610 | Absorption axis 620 in-plane angle | 90° |

By way of comparison with the embodiment of FIGS. 31A-C, the alternative embodiment of FIGS. 34A-B provides homogeneous alignment layers 617A, 617B. Advantageously reduced visibility of polarisation switch 601 deformation due to liquid crystal material 615 flow under applied pressure may be achieved.

Figures 36A, 36B:
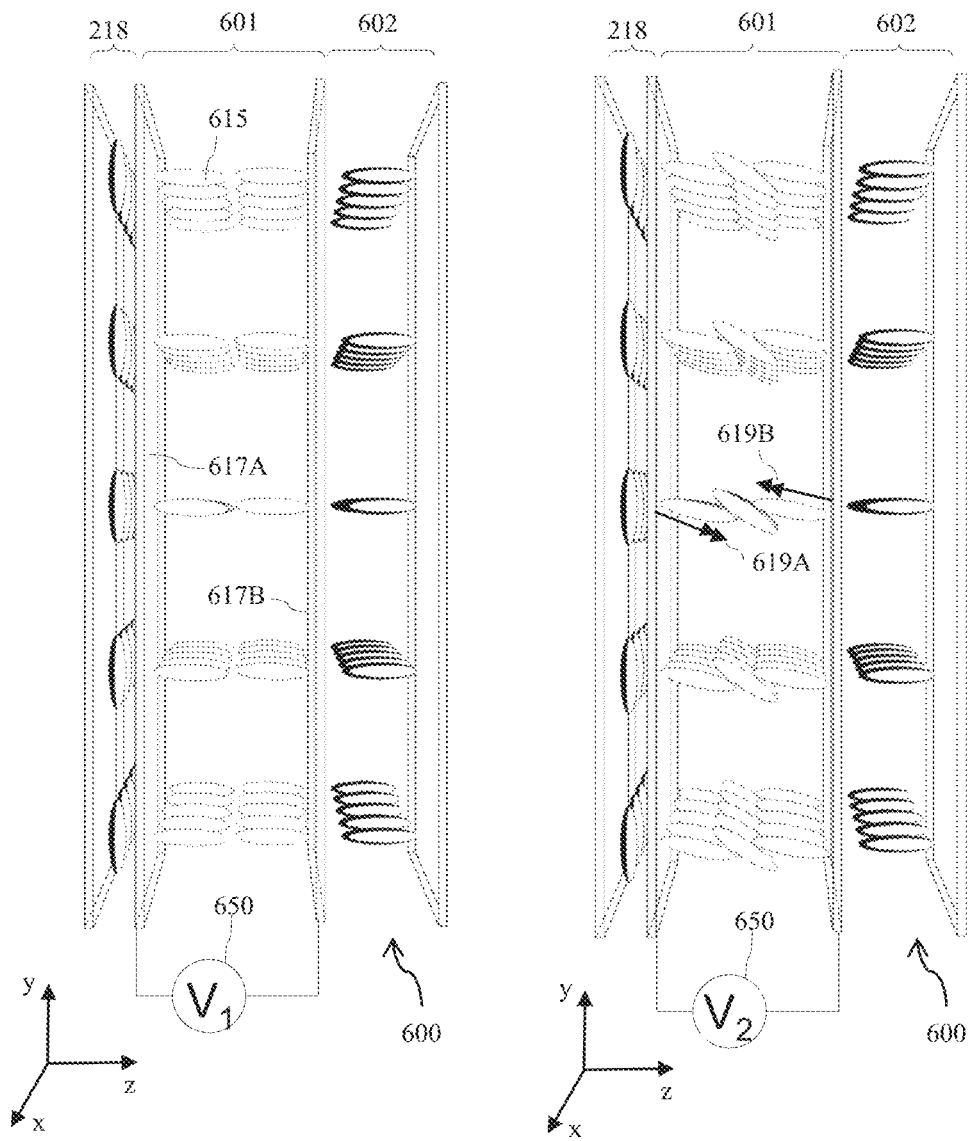
FIG. 36A is a schematic diagram illustrating in perspective side view a polar transmission control arrangement comprising an in-plane polariser, a polarisation switch comprising two homogeneous alignment layers and an out-of-plane polariser arranged in a first mode.
FIG. 36B is a schematic diagram illustrating in perspective side view the arrangement of FIG. 34A arranged in a second mode.

FIG. 36A is a schematic diagram illustrating in perspective side view a polar transmission control arrangement 600 comprising an in-plane polariser 218, a polarisation switch 601 comprising two homogeneous alignment layers 617A, 617B and an out-of-plane polariser 602 arranged in a first mode of operation; and FIG. 36B is a schematic diagram illustrating in perspective side view the arrangement of FIG. 34A arranged in a second mode of operation. Features of the embodiment of FIGS. 36A-B not discussed in further detail may be assumed to correspond to the features with equivalent reference numerals as discussed above, including any potential variations in the features.

By way of comparison with the embodiment of FIGS. 31A-C, the alternative embodiment of FIGS. 36A-B provides homeotropic alignment layers 617A, 617B. Advantageously reduced visibility of colour variations with viewing angle may be achieved.

Figure 37A:
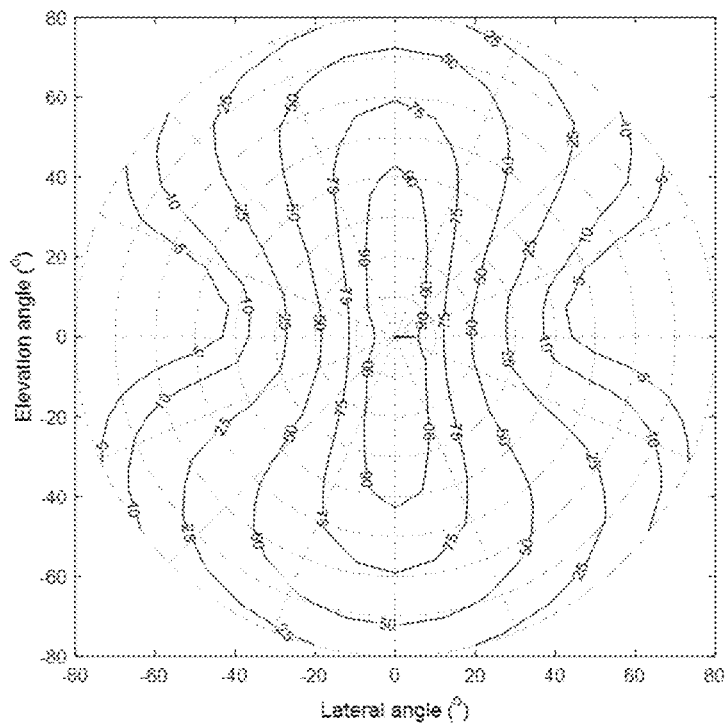
FIG. 37A is a schematic graph illustrating the polar variation of luminance transmission for the arrangement of FIG. 36A operating in the first mode and as described in TABLE 14.
Figure 37B:
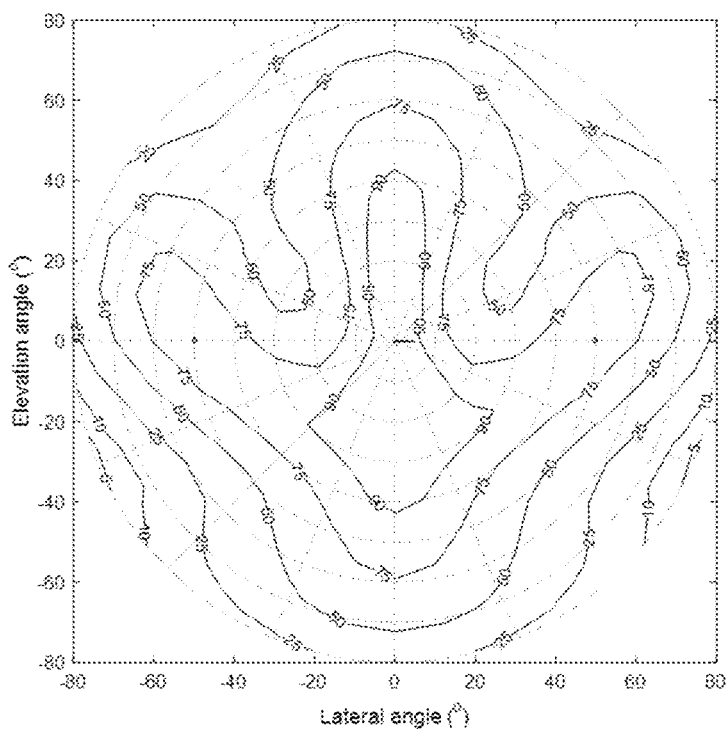
FIG. 37B is a schematic graph illustrating the polar variation of luminance transmission for the arrangement of FIG. 36B operating in the second mode and as described in TABLE 14.

FIG. 37A is a schematic graph illustrating the polar variation of luminance transmission for the arrangement of FIG. 36A operating in the first mode and as described in TABLE 14; FIG. 37B is a schematic graph illustrating the polar variation of luminance transmission for the arrangement of FIG. 36B operating in the second mode and as described in TABLE 14.

mode of the display device. The structure of a switchable privacy display will now be described.

It may be desirable to provide increased security factor in privacy mode for off-axis snoopers and increased image visibility in share mode for off-axis viewers.

Figure 38A:
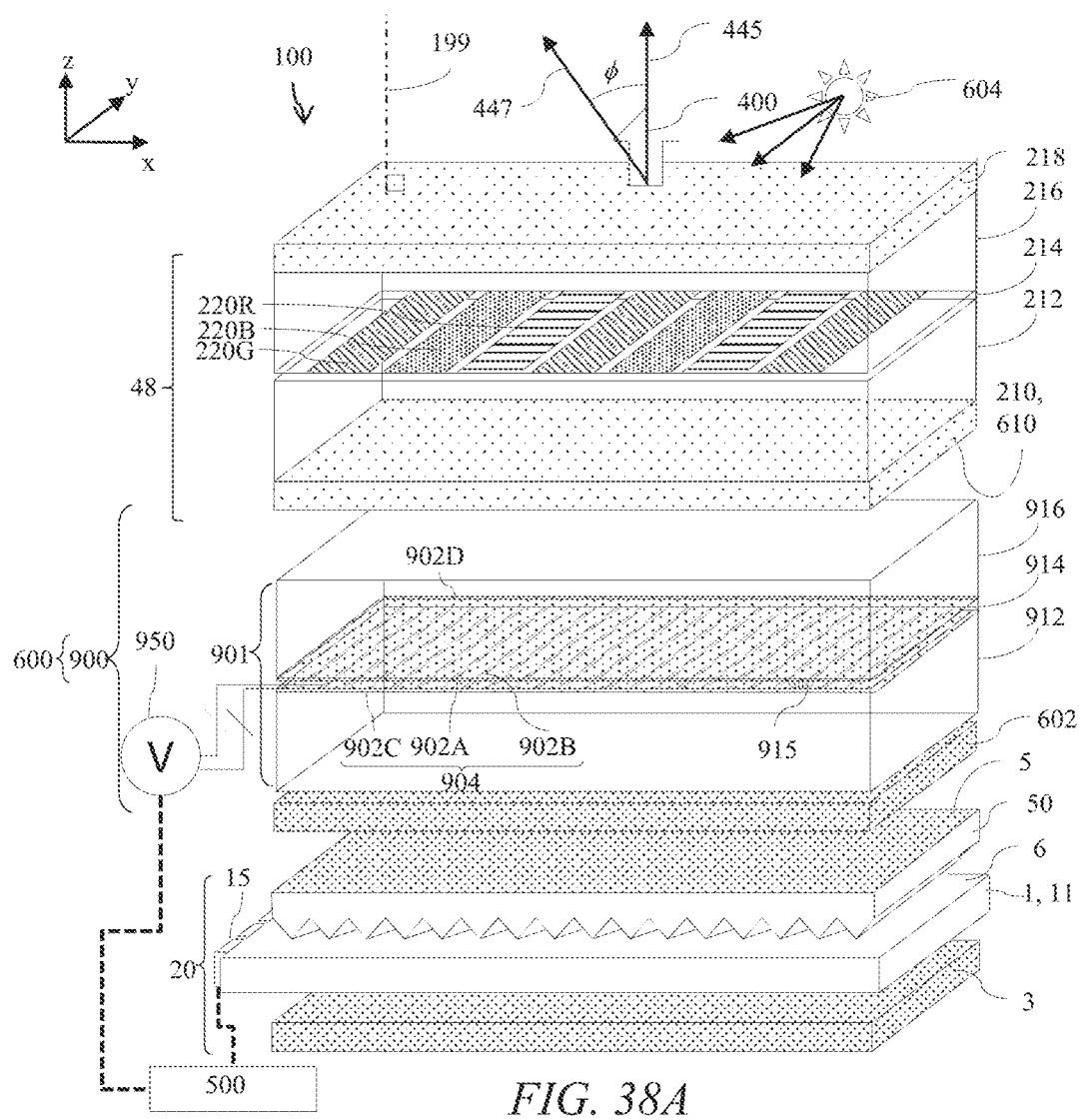
FIG. 38A is a schematic diagram illustrating in perspective side view a switchable privacy display device comprising a backlight comprising an array of light sources, a waveguide, a rear reflector and a light turning component; an out-of-plane polariser; a switchable diffractive polar control retarder; and a transmissive spatial light modulator.
Figure 38B:
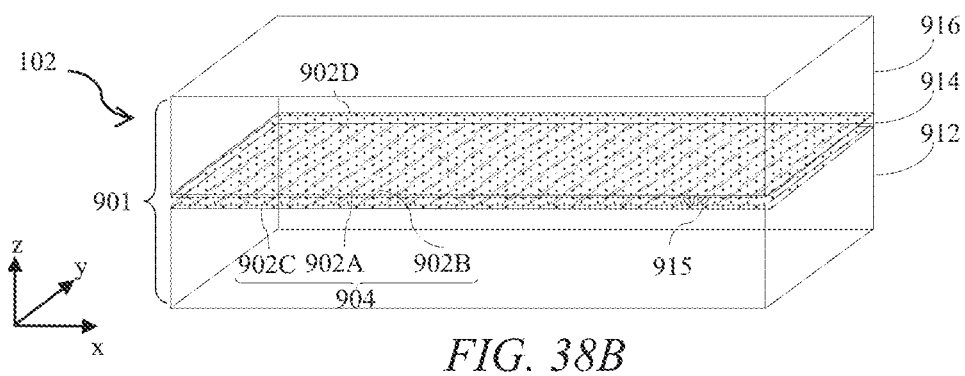
FIG. 38B is a schematic diagram illustrating in perspective side view a switchable diffractive polar control retarder component.
Figure 38C:
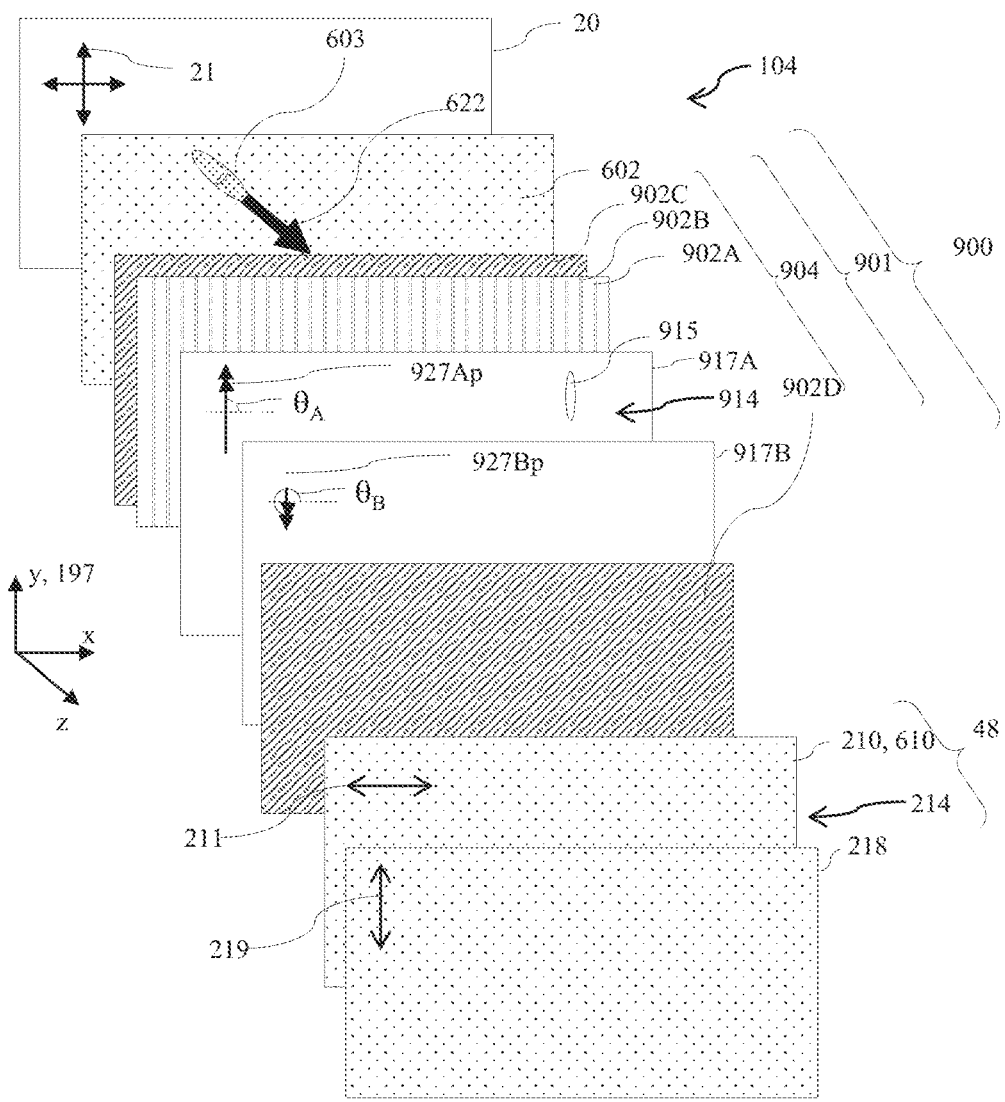
FIG. 38C is a schematic diagram illustrating in perspective front view alignment orientations for an optical stack for use in the embodiment of FIG. 38A.

FIG. 38A is a schematic diagram illustrating in perspective side view a switchable privacy display device 100 comprising a backlight 20 comprising a source array, a waveguide 1, a rear reflector 3 and a light turning component 50; polar control transmission element 600 comprising a switchable diffractive arrangement 900 comprising a switchable diffractive liquid crystal retarder 901, and an out-of-plane polariser 602; and a transmissive spatial light modulator 48; FIG. 38B is a schematic diagram illustrating in perspective side view a switchable diffractive liquid crystal retarder 901 component 102; and FIG. 38C is a schematic diagram illustrating in perspective front view alignment orientations for an optical stack for use in the display device 100 of FIG. 38A. Features of the embodiments of FIGS. 38A-C not discussed in further detail may be assumed to correspond to the features with equivalent reference numerals, including any potential variations in the features.

By way of comparison with FIG. 1A, the reflective polariser 217 is omitted and the polar transmission control arrangement 600 comprises a switchable diffractive arrangement 900 comprising a switchable diffractive liquid crystal retarder 901 and out-of-plane polariser 602.

Switchable diffractive arrangement 900 is arranged between the out-of-plane polariser 602 and the display polariser 610. The switchable diffractive arrangement 900

TABLE 14

| Item | | Value |
|---|---|---|
| Out-of-plane polariser 602 | Material 603 ordinary refractive index, $n_o$ at 550 nm | 1.506 + 0.00165i |
| | Material 603 extraordinary refractive index, $n_e$ at 550 nm | 1.53 + 0.116i |
| | Thickness, d | 6 μm |
| | Absorption axis 622 tilt φ to surface normal 199 | 0° |
| Polarisation switch 601 | Layer 614 of liquid crystal material 615 retardance | 750 nm |
| | Layer 614 of liquid crystal material 615 in-plane alignment direction, 619Ap angle θ | 90° |
| | Layer 614 of liquid crystal material 615 in-plane alignment direction, 619Bp angle θ | 180° |
| | Privacy mode voltage | 1.6 V |
| | Share mode voltage | 2.0 V |
| In-plane polariser 610 | Absorption axis 620 in-plane angle | 90° |

By way of comparison with the embodiment of FIGS. 32A-B, the alternative embodiment of FIGS. 37A-B provides improved uniformity in share mode and reduced luminance for off-axis locations near to the optical axis 199 in privacy mode.

It may be desirable to provide high visual security levels for a display device in a privacy mode and to provide high luminance in off-axis viewing angles in the wide-angle comprises a switchable diffractive liquid crystal retarder 901 comprising a layer 914 of liquid crystal material 915 arranged between transparent substrates 912, 916.

A transmissive electrode arrangement 904 is arranged to drive the layer 914 of liquid crystal material 915 by means of applied voltages V from voltage drivers 950. The display device 100 further comprises a control system 500 arranged to supply voltages by means of the drivers 950 to the transmissive electrode arrangement 904 for driving the layer 914 of liquid crystal material 915.

FIG. 38B is an alternative embodiment illustrating that the switchable diffractive liquid crystal retarder 901 may be provided as a separate component 102. Component 102 may be added during manufacture of the display device 100 or alternatively may be added to the display device 100 by a display user. Advantageously a switchable privacy display device 100 upgrade may be achieved.

FIG. 38C illustrates that the backlight 20 typically provides unpolarised or partially polarised light state 21. Out-of-plane polariser 602 comprising dichroic material 603 with absorption axis 622 direction provides an output that is incident onto the switchable diffractive arrangement 900 with luminance that varies with polar angle as described hereinabove. The electrodes 902 of the switchable diffractive liquid crystal retarder 901 are patterned and arranged to extend along the vertical axis, that is with an orientation angle of 90°. The direction of diffraction orders described hereinbelow is provided along the 0°-180° lateral axis (x-axis direction).

The switchable diffractive liquid crystal retarder 901 comprises alignment layers 617A, 617B arranged to provide alignment of the layer 914 of liquid crystal material 915. The two surface alignment layers 617A. 617B are disposed adjacent to the layer 914 of liquid crystal material 915 and on opposite sides thereof.

The alignment directions 927A, 927B at the respective alignment layers 617A, 617B provide in-plane components 927Ap, 927Bp in the plane of the layer 914 of liquid crystal material 915.

Further, pretilt of the alignment directions 927A, 927B provides an out-of-plane component in the thickness direction $\hat{t}$ through the layer 914 of liquid crystal material 915 that reduces degeneracy of the structure 965 of liquid crystal material 915 orientations and advantageously improves uniformity across the area 103 of the layer 914 of liquid crystal material 915.

The alignment layer 617A on the side of the liquid crystal layer adjacent the array of separated electrodes has a component of alignment in the plane of the layer of liquid crystal material in the direction 197 that is orthogonal to the one direction 195, and desirably achieves high transmission efficiency and high diffraction efficiency.

Spatial light modulator 48 comprises input polariser 210 which is the display polariser 610 and output display polariser 218 with electric vector transmission directions 211, 219 respectively.

An illustrative electrode arrangement 904 will now be described.

Figure 38D:
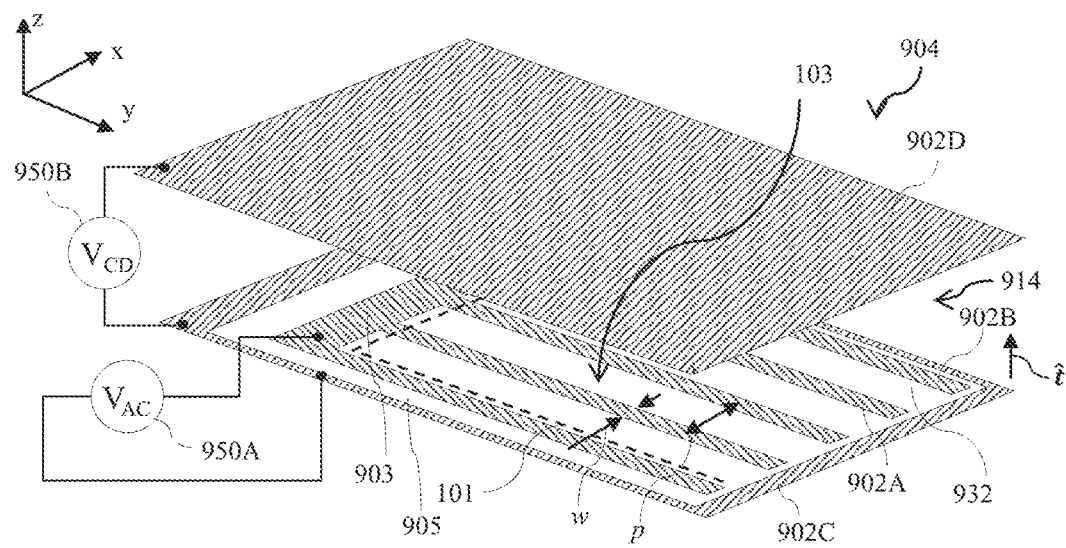
FIG. 38D is a schematic diagram illustrating in perspective side view a transmissive electrode arrangement for the switchable diffractive polar control retarder of FIG. 38A.
Figure 38E:
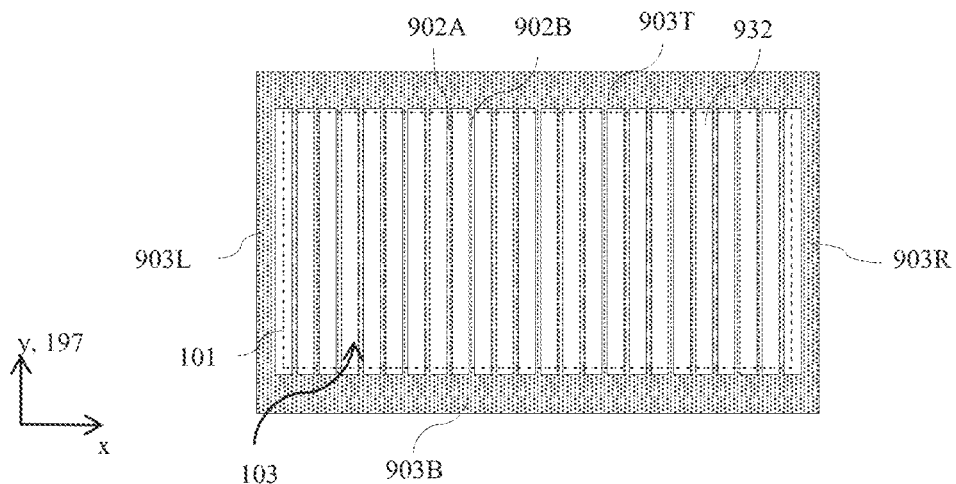
FIG. 38E is a schematic diagram illustrating in front view a transmissive electrode for the transmissive electrode arrangement of FIG. 38D.

FIG. 38D is a schematic diagram illustrating in perspective side view a transmissive electrode arrangement 904 for the switchable diffractive liquid crystal retarder 901 of FIG. 38A; and FIG. 38E is a schematic diagram illustrating in front view a transmissive electrode for the transmissive electrode arrangement of FIG. 38D. Features of the embodiments of FIGS. 38D-E not discussed in further detail may be assumed to correspond to the features with equivalent reference numerals, including any potential variations in the features.

The electrode arrangement 904 of FIG. 38D comprises electrodes 902A, 902B, 902C arranged on a first side of the layer 914 of liquid crystal material 915 and the transmissive reference electrode 902D arranged on the opposite side of the layer 914 of liquid crystal material 915. Dielectric material 905 such as SiOx or $Si_3N_4$ may be arranged between the transmissive separated electrodes 902A, 902B and transmissive control electrode 902C. The electrodes 902A, 902B, 902C, 902D may be provided by transmissive conductive material such as ITO for example.

The electrodes 902A, 902B, 902C, 902D may be buried by the dielectric material 905 with respective refractive indices arranged to minimise diffraction from the electrodes 902A, 902B, 902C, 902D and the gaps 932 between the electrodes 902A, 902B, 902C, 902D in the direction 195.

The transmissive electrode arrangement 904 comprises an array of separated electrodes 902A, 902B and the array of separated electrodes 902A, 902B is arrayed in one direction 195, that is in across the lateral direction (x-axis). The separated electrodes 902A, 902B extend across the area of the layer of liquid crystal material in the direction orthogonal to the one direction 195.

The electrode width w and the electrode pitch p may be selected to provide desirable diffractive properties of the switchable diffractive liquid crystal retarder 901 as will be described further hereinbelow.

In the embodiment of FIG. 38D, the separated electrodes 902A, 902B have a common connection 203, and may alternatively be referred to as separated electrodes 902A hereinbelow. In other embodiments such as those described further hereinbelow, the separated electrodes 902A, 902B may be connected separately.

Common connection 903 of FIG. 38D and common connections 903T, 903B, 903L and 903R of FIG. 38E may be termed bus bars or shorting bars. The common connection is formed by conductors located outside an area of the spatial light modulator 48, that is the common connection 903 is illustrated to be arranged outside of the border 101 of the active area 103 of the display device 100. FIG. 38D illustrates a common connection 903 to one end of the separated electrodes 902A, 902B, however the common connection 903 bus bar connection may be extended to enclose the separated electrodes 902A. 902B so that the bus bar extends along both ends 903T, 903B and optionally the sides 903L, 903R. Connecting at both ends enables a substantial reduction in the impedance of the "fingers" of the separated electrodes, which then become electrically connected in parallel. This is important when the separated electrodes 902A, 902B are formed from a transparent conductor such as ITO that has a trade-off between transparency and conductivity. Further common electrode connections 903 may be provided by transparent common connection 903 electrodes within the active area or may be provided by transmissive or low impedance materials, such as metals, which are light blocking electrodes outside of the active area 103. Voltage drops along the transmissive electrodes 902 may be reduced, advantageously achieving increased uniformity.

The transmissive electrode arrangement 904 further comprises a control electrode 902C extending across the layer 914, the control electrode 902C being arranged on the same side of the layer 914 of liquid crystal material 915 as the array of separated electrodes 902A. 902B covering the array of separated electrodes 902A, 902B. The control electrode 902C and reference electrode 902D may be planar electrodes.

The transmissive electrode arrangement 904 further comprises a reference electrode 902D extending across the entirety of the spatial light modulator 48, the reference electrode 902D being arranged on the opposite side of the layer 914 of liquid crystal material 915 from the array of separated electrodes 902A, 902B.

Respective voltage drivers 950A, 950B at least are provided to drive the electrode arrangement 904 as will be described further hereinbelow.

The operation of the display device 100 of FIG. 38A operating in wide-angle mode will now be described further.

Figure 39A:
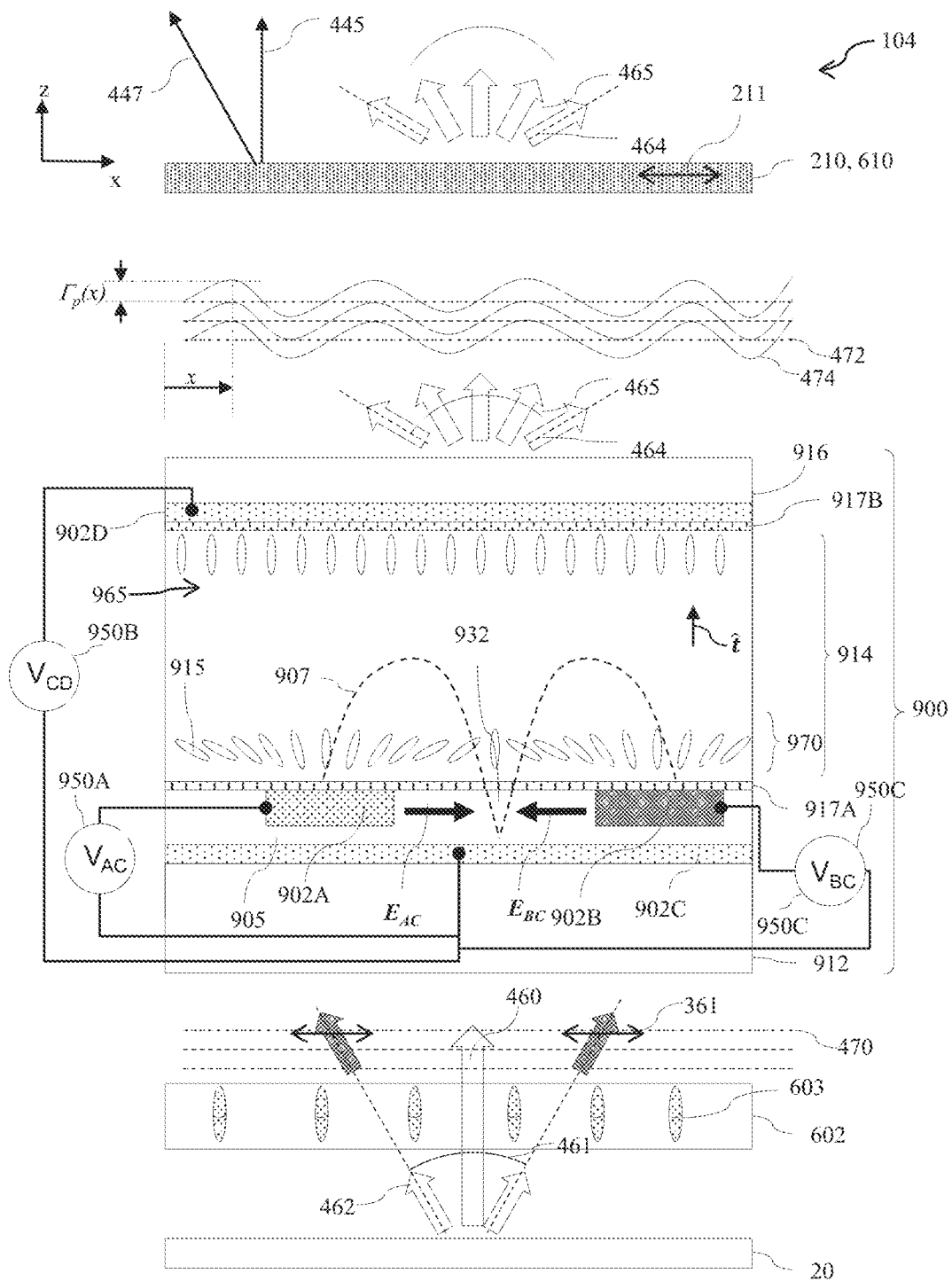
FIG. 39A is a schematic diagram illustrating in top view the structure and operation of the optical stack comprising a switchable diffractive polar control retarder for wide-angle mode.

FIG. 39A is a schematic diagram illustrating in top view the structure and operation of the optical stack comprising a switchable diffractive arrangement 900 comprising switchable diffractive liquid crystal retarder 901 with the electrode arrangement 904 of FIG. 38D for wide-angle mode; FIG. 39B is a schematic diagram illustrating in perspective front view a transmissive electrode arrangement 904 and structure 965 of liquid crystal material 915 orientations for the switchable diffractive liquid crystal retarder 901 in wide-angle mode; and FIG. 39C is a schematic diagram illustrating in top view a transmissive electrode arrangement 904 and structure 965 of liquid crystal material 915 orientations for the switchable diffractive liquid crystal retarder 901 in wide-angle mode. Features of the embodiment of FIGS. 39A-C not discussed in further detail may be assumed to correspond to the features with equivalent reference numerals, including any potential variations in the features.

Backlight 20 provides light output in cone 461, with high luminance in direction 460 and typically lower luminance in directions 462. Out-of-plane polariser 602 reduces the luminance for off-axis light in direction 460 with the polarisation state 461 that after propagation through the switchable diffractive liquid crystal retarder 901 is transmitted by the display polariser 610 that is the input polariser 210 of the spatial light modulator 48.

For illustrative purposes, plane waves 470 provide light that propagates in the direction 460.

Voltages $V_{AC}$, $V_{BC}$, $V_{CD}$, are applied to respective electrodes 902A, 902B (connected to electrode 902A in the embodiment using the electrode arrangement 904 of FIG. 38D, where driver 950C may be omitted). Electric fields $E_{AC}$, $E_{BC}$ produce electric field lines 907 that provide reorientation of the liquid crystal material 915 into the gaps 932 to provide a diffractive molecular orientation 965 region 970 in a layer through the thickness direction t that may be greatest in magnitude near the alignment layer 617A but also through the layer 914 of liquid crystal material 915.

Figure 39E:
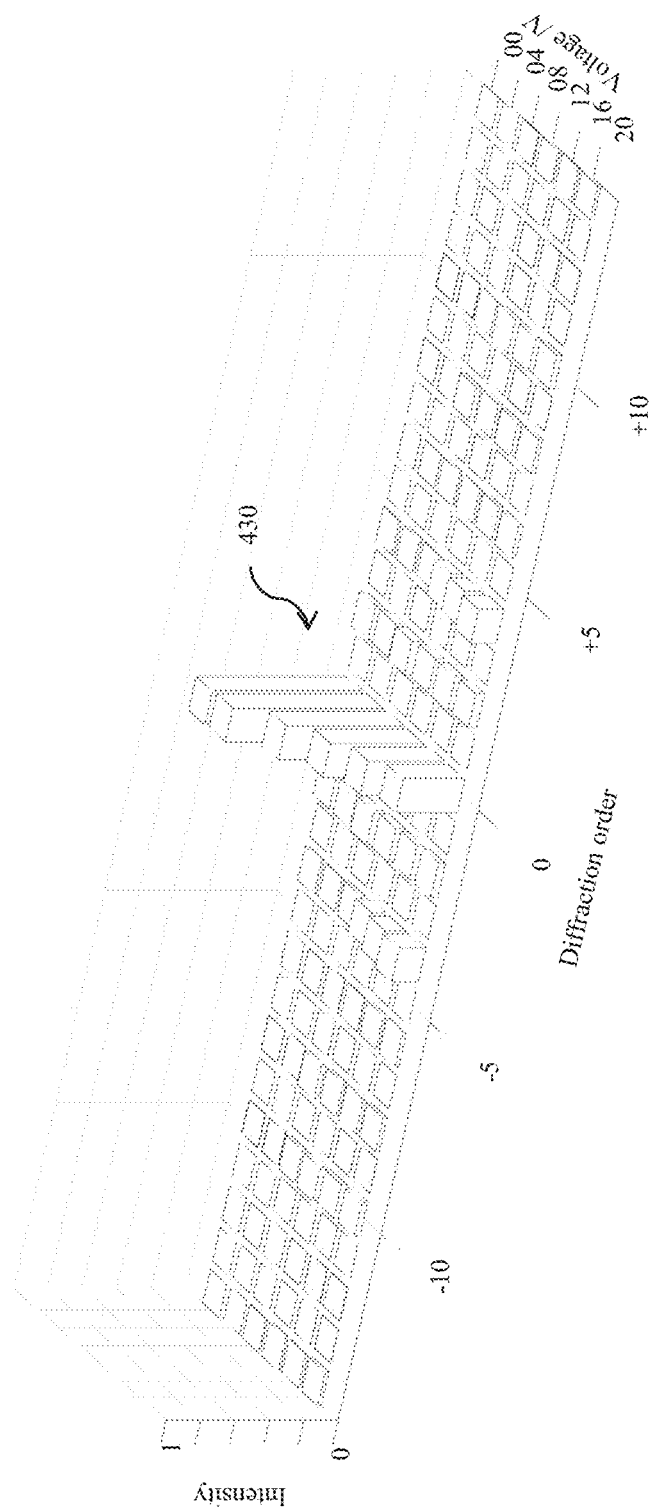
FIG. 39B is a schematic diagram illustrating in perspective front view an electrode and liquid crystal molecular arrangement for the switchable diffractive polar control retarder in wide-angle mode.
FIG. 39C is a schematic diagram illustrating in top view an electrode and liquid crystal molecular arrangement for the switchable diffractive polar control retarder in wide-angle mode.
FIG. 39D is a schematic graph illustrating a profile of diffracted luminance into diffractive orders for the embodiment of FIG. 39C in wide-angle mode for a first drive voltage.

FIG. 39D is a schematic graph illustrating a profile 430 of diffracted luminance into diffractive orders for the embodiment of FIG. 39C in wide-angle mode and TABLES 15-16; and FIG. 39E is a schematic graph illustrating a profile 430 of diffracted luminance into diffractive orders for the embodiment of FIG. 39C and TABLE 15 in wide-angle mode.

TABLE 15

| Item | Property | Illustrative embodiment |
|---|---|---|
| Display polariser 610 | Electric vector transmission direction, 911 | 0° |
| Electrode 902A, 902B | Pitch, p | 10 μm |
| | Width, w | 3 μm |
| Alignment layer 617A | Type | Homogeneous |
| | In-plane alignment direction 927Ap angle $\theta_A$ | 90° |
| | Pretilt angle | 2° |
| Alignment layer 617B | Type | Homeotropic |
| | In-plane alignment direction 927Bp angle $\theta_B$ | 270° |
| | Pretilt angle | 90° |
| LC layer 914 | Retardance | 1000 nm |

The control system 500 of FIG. 38A is arranged to supply voltages $V_{AC}$, $V_{BC}$ and $V_{CD}$ to the transmissive electrode arrangement 904 for driving the layer 314 of liquid crystal material 315 and arranged to control switchable light dispersion element 800.

FIG. 39E illustrates that the amount of light diffraction provided by the switchable diffractive arrangement 900 may be modified by adjusting the drive voltage levels in the wide-angle mode. The control system 500 may be arranged to provide selection of the peak luminance, power efficiency and image visibility by control of the respective voltage drivers 950. Advantageously increased display performance may be achieved depending on desirable characteristics for display device 100 operation.

TABLE 16 shows exemplary voltages applied in three different modes of operation. The applied voltages $V_{AC}$, $V_{BC}$ and $V_{CD}$ are typically alternating voltages so that no net DC voltage is applied for any longer than 1 second to the liquid crystal material 915. Charge build-up in the layer 914 of liquid crystal material 915 is reduced and advantageously lifetime extended.

TABLE 16

| Item | Wide-angle mode | Privacy mode |
|---|---|---|
| FIGURES | 39A-H | 40A-D |
| $V_{AC}$ & $V_{BC}$ | −20 V | 0 V |
| $V_{CD}$ | −10 V | 20 V |

The operation of the display device 100 will now be described.

Figure 39F:
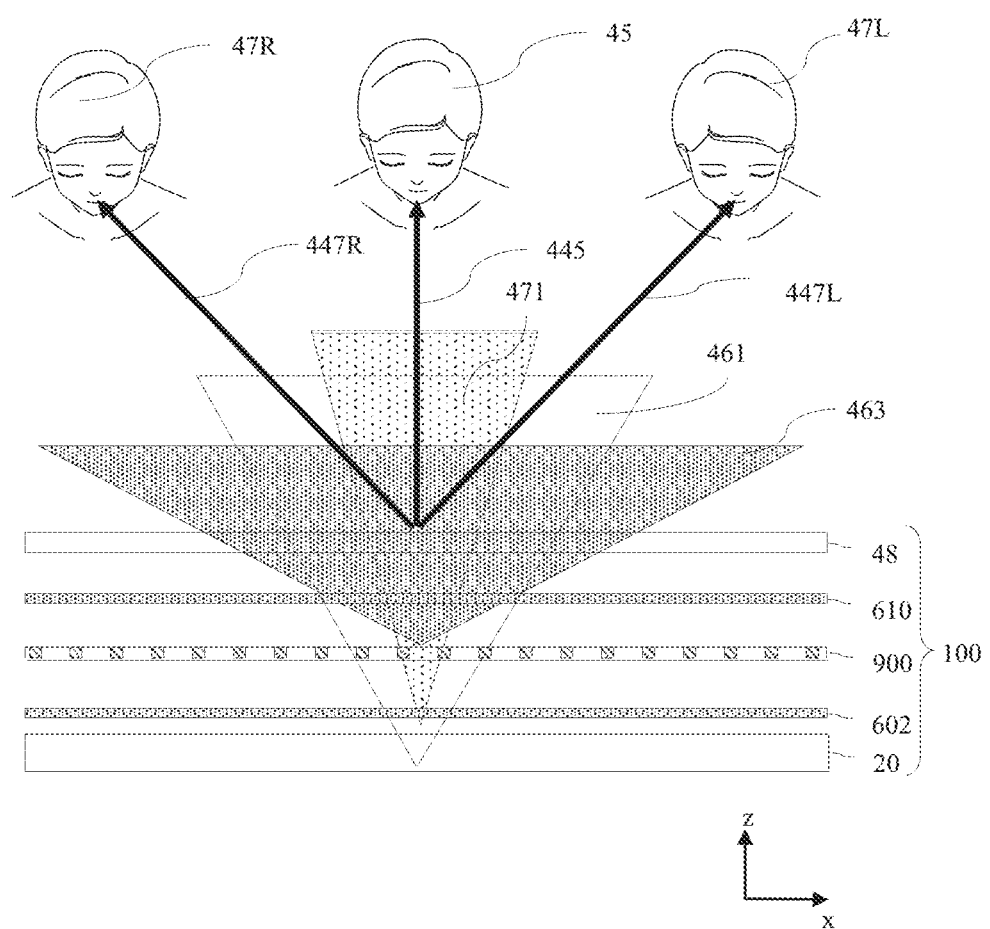

FIG. 39F is a schematic diagram illustrating in top view the structure and operation of the display device comprising a switchable diffractive arrangement 900 for wide-angle mode. Features of the arrangement of FIG. 39F not discussed in further detail may be assumed to correspond to the features with equivalent reference numerals, including any potential variations in the features.

Backlight 20 provides light in light cone 461. The size of cone 461 may for example be determined by the angle of full width half maximum luminance.

Out-of-plane polariser 602 provides a reduction in off-axis luminance so that light cone 461 is output from the display polariser 610.

In wide-angle mode, diffraction in the switchable diffractive liquid crystal retarder 901 provides output cone 463 that has a wider cone angle than cone 471.

In operation, viewer 45 in viewing direction 445 and further viewers 47L, 47R in directions 447L, 447R also see light directed from the display device with higher luminance than would be provided by light from the light cone 471. Advantageously wide-angle mode luminance is increased.

A description of phase shifts for light that is diffracted in diffractive liquid crystal polar control retarders 901 will now be given.

Figure 39G:
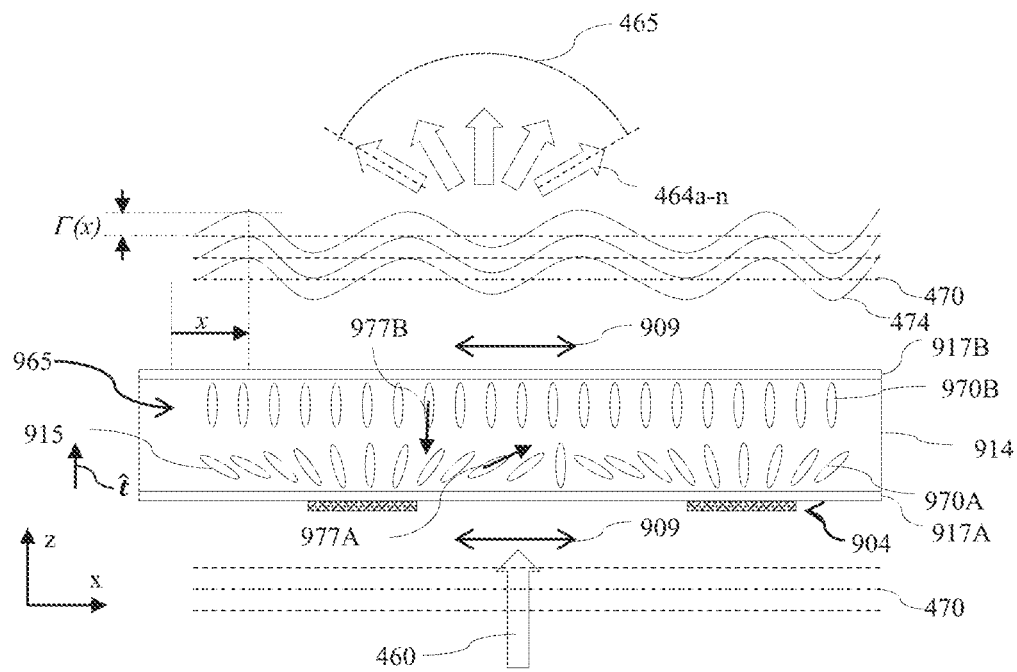
Figure 39H:
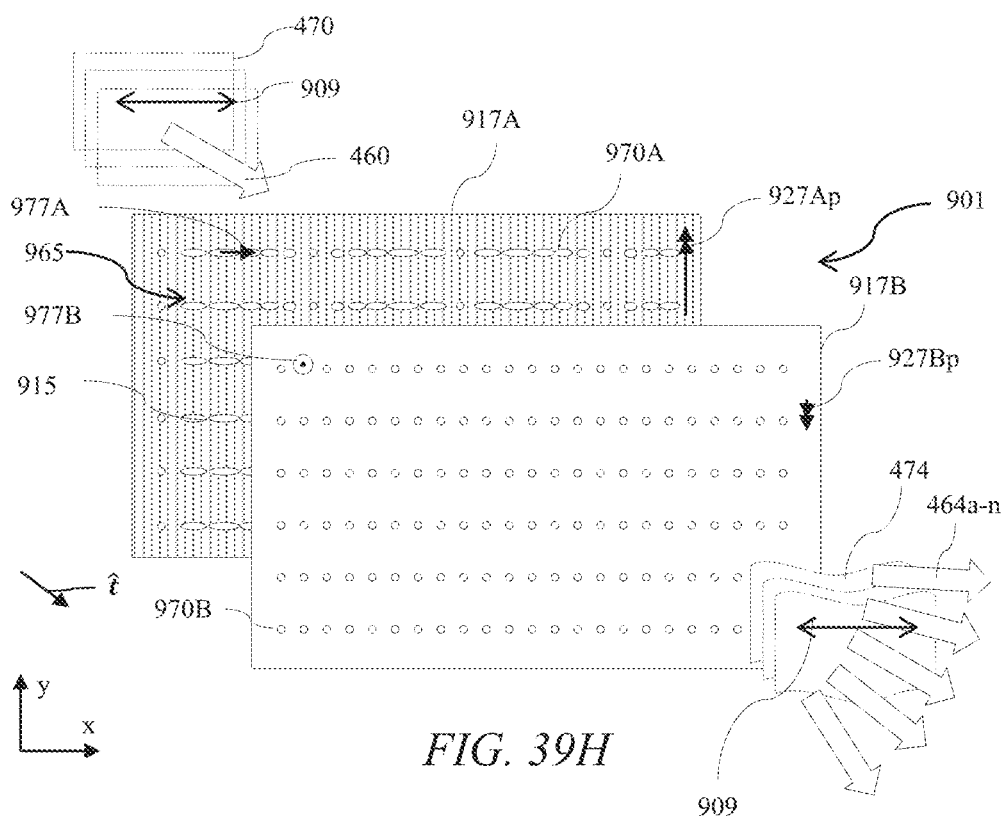

FIG. 39G is a schematic diagram illustrating in top view the propagation of a first linear polarisation state 909 through a switchable diffractive liquid crystal retarder 901 arranged in wide-angle mode; and FIG. 39H is a schematic diagram illustrating in perspective front view the propagation of the first polarisation state 909 through the switchable diffractive liquid crystal retarder 901 arranged in wide-angle mode. Features of the arrangement of FIGS. 39G-H not discussed in further detail may be assumed to correspond to the features with equivalent reference numerals, including any potential variations in the features.

FIG. 39G illustrates a light ray 460 provided by a plane waves 470 incident onto a liquid crystal polar control retarder 901.

A plane wave 470 propagates through the spatially varying transparent material of the switchable diffractive liquid crystal retarder 901 such that its phase $\Gamma$ on exiting the material becomes spatially varied $\Gamma(x)$. This spatial variation of phase $\Gamma(x)$ leads to diffraction whereby the light couples into a series of plane waves propagating at varying angles away from the material.

The transmissive electrode arrangement 904 is patterned to be capable of driving the layer 914 of liquid crystal material 915 into a structure 965 of orientations providing relative phase shifts $\Gamma(x)$ that vary spatially across the area 103 of the layer 914 of liquid crystal material 915 so that the layer 914 of liquid crystal material 915 provides a diffractive effect. Further, the transmissive electrode arrangement 904 is patterned to be capable of driving the layer 914 of liquid crystal material into a structure 965 of orientations providing relative phase shifts $\Gamma(x)$ that vary spatially in one direction 195 across the area 103 of the layer 914 of liquid crystal material 915 so that the layer 914 of liquid crystal material 915 provides a diffractive effect in the one direction 195.

In FIG. 39A, the control system 500 is arranged in a wide-angle mode, to supply voltages to the transmissive electrode arrangement 904 that are selected to drive the liquid crystal material 915 into the structure 965 of orientations providing relative phase shifts $\Gamma(x)$ that vary spatially across the area 103 of the layer 914 of liquid crystal material 915 so that the layer 914 of liquid crystal material 915 provides a diffractive effect.

The operation of the display device 100 operating in privacy mode will now be described.

Figure 40A:
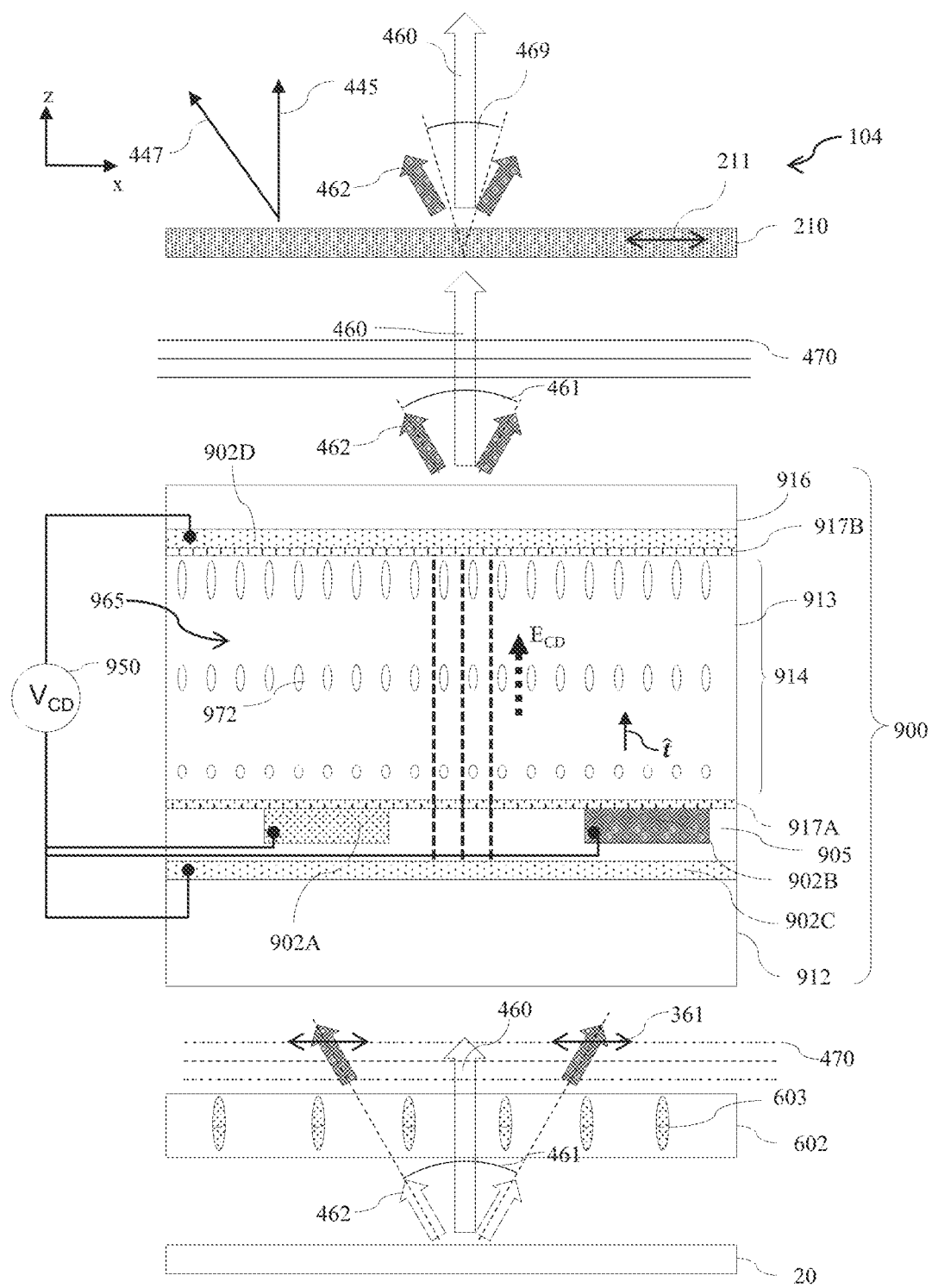

FIG. 40A is a schematic diagram illustrating in top view the structure and operation of the optical stack 104 comprising a switchable polar control retarder 900 for privacy mode; FIG. 40B is a schematic diagram illustrating in perspective front view an arrangement 904 of electrodes 902A, 902B, 902C, 902D and structure 965 of liquid crystal material 915 orientations for a switchable diffractive liquid crystal retarder 901 in privacy mode; and FIG. 40C is a schematic diagram illustrating in side view an arrangement 904 of electrodes 902A, 902B, 902C, 902D and structure 965 of liquid crystal material 915 orientations for a switchable diffractive liquid crystal retarder 901 in privacy mode. Features of the arrangements of FIGS. 40A-C not discussed in further detail may be assumed to correspond to the features with equivalent reference numerals, including any potential variations in the features.

In FIG. 40A, the control system 500 of FIG. 38A is arranged in a narrow-angle mode, to supply voltages to the transmissive electrode arrangement 904 that are selected to drive the liquid crystal material 915 into a structure 965 of orientations providing relative phase shifts $\Gamma(x)$ that are uniform across the area 103 of the layer 914 of liquid crystal material 915.

A uniform voltage $V_{AC}$, $V_{BC}$ is applied to the spaced electrodes 902A, 902B so that a uniform structure 965 of orientations of liquid crystal molecules 977 is provided across the area 103. The transmissive electrode arrangement 904 drives the layer 914 of liquid crystal material 915 into a structure 965 of orientations providing uniform phase shifts/o across the area 103 of the layer 914 of liquid crystal material 915 so that the layer 914 of liquid crystal material 915 provides no diffractive effect.

Comparing FIG. 40B with FIG. 39B, the present embodiments typically achieve switching between a wide-angle mode with optical axis 977 of the liquid crystal material 915 with an alignment direction along the direction 195; and narrow-angle mode(s) with optical axis 977 of the liquid crystal material 915 with an alignment direction perpendicular to the direction 195, for example provided by the alignment direction 927Ap. In other words switching may be provided by in-plane rotation of the liquid crystal material 915 by application of suitable drive voltages.

Such arrangements advantageously achieve high image security at desirable non-viewing direction 447 in privacy mode, while providing switching into a wide-angle mode with high image visibility in viewing direction 447 for example.

FIG. 40D is a schematic diagram illustrating in top view the structure and operation of the display device 100 comprising a switchable polar control retarder 900 for wide-angle mode. Features of the arrangement of FIG. 40D not discussed in further detail may be assumed to correspond to the features with equivalent reference numerals, including any potential variations in the features.

By way of comparison with FIG. 39F, the cone 461 is not diffused to cone 463 by diffraction of the switchable diffractive liquid crystal retarder 901. Further, the layer 914 of liquid crystal material 915 provides luminance reduction in light cones 467 so that the output cone 469 is reduced in size in comparison to the input light cone 461. Advantageously security factor. S in non-viewing directions 447 is increased. High transmission efficiency of throughput of the switchable polar control retarder 900 is provided.

Alternative electrode arrangements 904 for use in switchable diffractive liquid crystal retarders 901 will now be described.

Figure 41A:
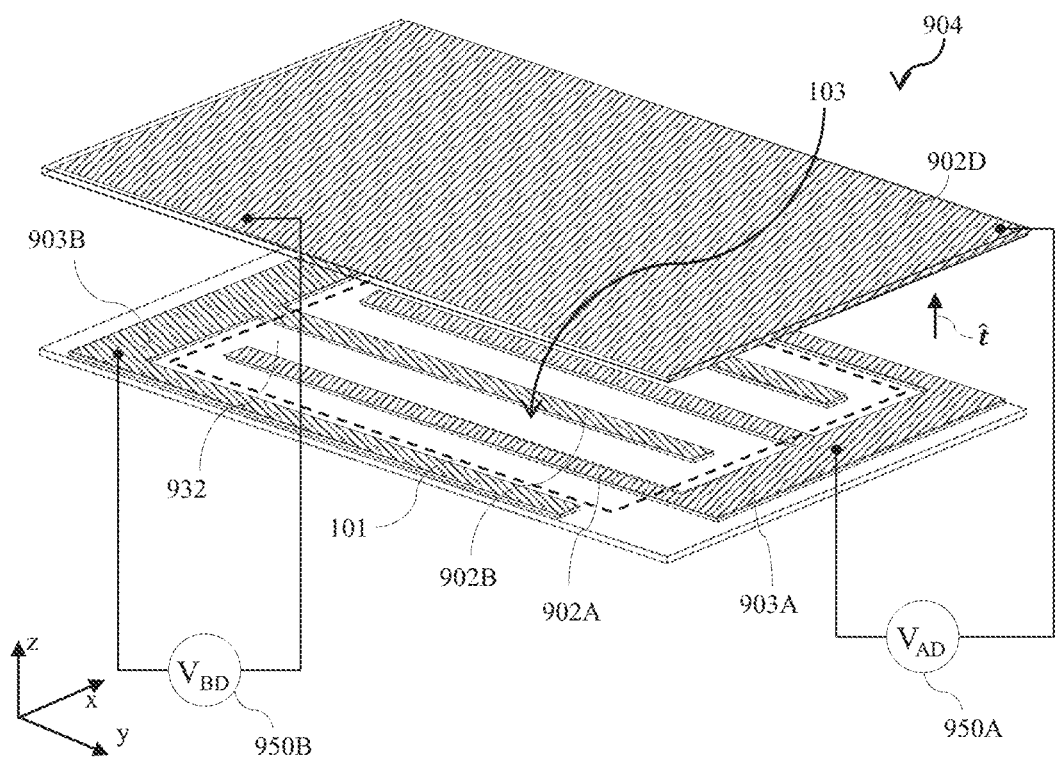
Figure 41B:
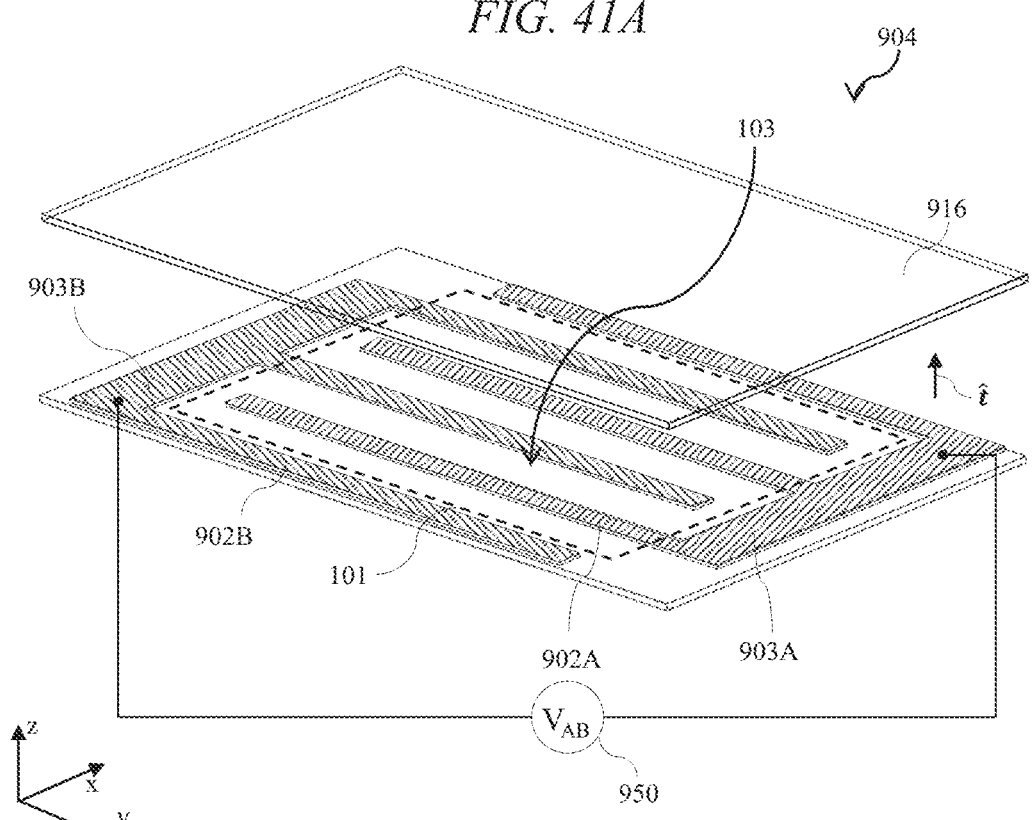
Figure 41C:
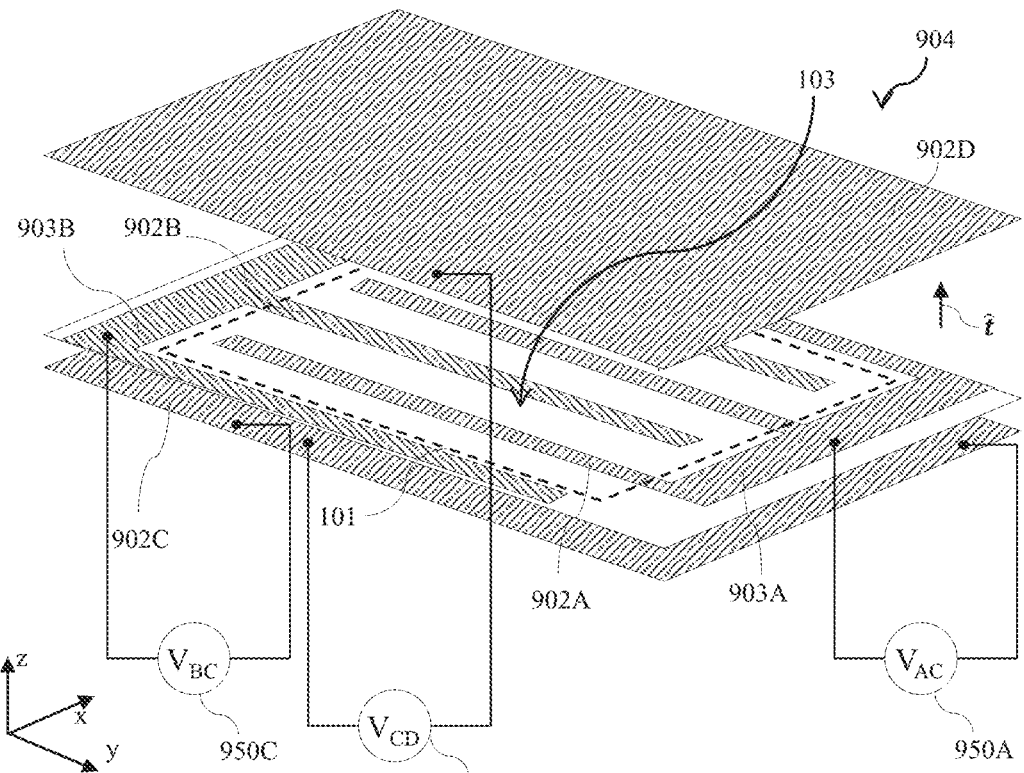
Figure 41D:
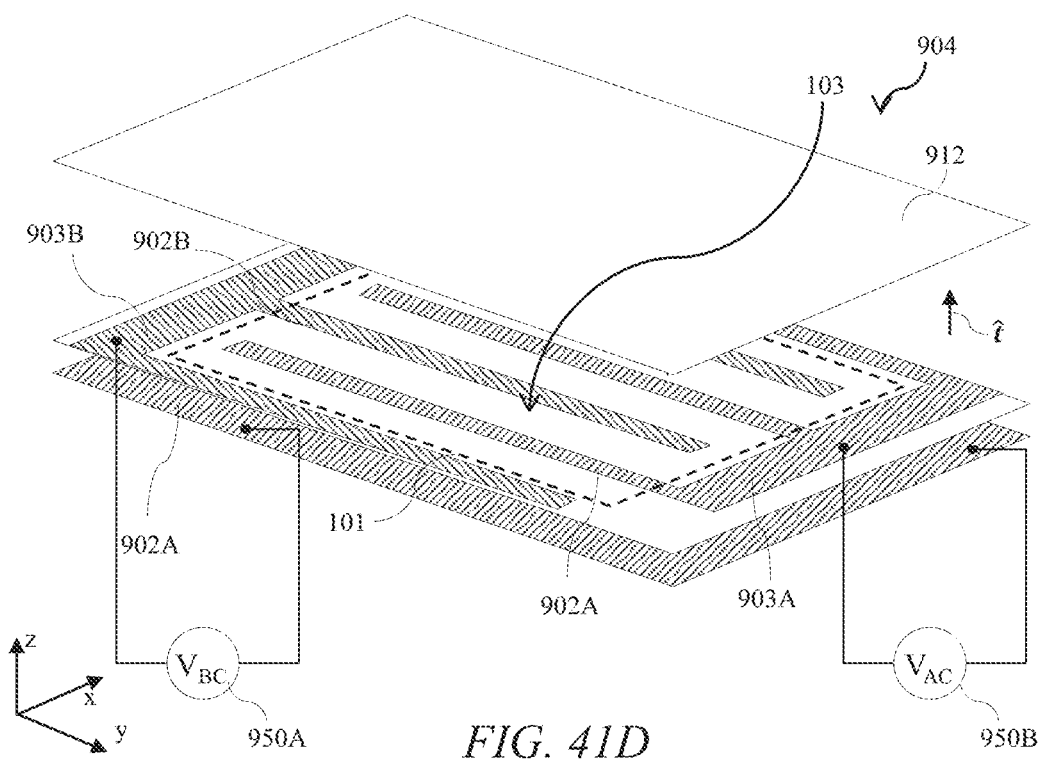

FIGS. 41A-B are schematic diagrams illustrating in perspective side views alternative transmissive electrode arrangements 904 comprising interdigitated electrodes 902A, 902B; and FIGS. 41C-D are schematic diagrams illustrating in perspective side views alternative electrode arrangements comprising interdigitated electrodes arranged on a single substrate and further control and reference electrodes. Features of the arrangements of FIGS. 41A-D not discussed in further detail may be assumed to correspond to the features with equivalent reference numerals, including any potential variations in the features.

By way of comparison to FIG. 38D, in the alternative embodiment of FIGS. 41A-B, the array of separated electrodes 902 comprises two interdigitated sets of separated electrodes 902A, 902B. Each set of separated electrodes 902A, 902B has a common connection 903A, 903B respectively.

The common connection 903 for each set of separated electrodes 902A, 902B is formed by a respective bar 903A, 903B, the bars being located outside the active area 103 of the spatial light modulator 48. The electrodes 902A, 902B may be formed by etching a single layer of transparent conductor. Alternatively, the electrodes may be formed by etching two transparent conductors separated by an insulator (not shown). In this case each of the electrodes 902A, 902B may be formed with a bus bar 903A at each end in order to reduce the electrode impedance, as described in FIGS. 38D-E.

The alternative embodiment of FIG. 41A comprises the transmissive reference electrode 902D, which may be embodied by ITO or silver nanowire for example. FIG. 41A illustrates voltages $V_{AD}$ and $V_{BD}$ which are the voltages applied respectively to the common connection 903A and 903B, each with respect to the potential of the reference electrode 902D. The potentials $V_{AD}$ and $V_{BD}$ may be equal and opposite to each other to provide a symmetrical diffraction effect. The reference electrode 902D can provide a field perpendicular to the plane of the cell. This field can augment or override the effect of the alignment layers 617A. 617B (not shown). If a homogeneous alignment layer is used at either side of layer 914, the electric field can at least partially override the alignment of the layer 914 of liquid crystal material 915 on opposing sides of the layer 914 of liquid crystal material 915.

The potentials $V_{AD}$ and $V_{BD}$ may also be set differently from each other to provide an asymmetrical diffraction effect. The same effect may be produced by using three ground referenced voltages applied to electrode 902A, 902B and 902D. Increased control of the structure 965 of liquid crystal material 915 orientations may be provided. Increased diffusion into light cone 465 may be achieved and advantageously increased visibility in direction 447.

By comparison, the alternative embodiment of FIG. 41B has the transmissive reference electrode 902D omitted. In this case the potential $V_{AB}$ which will typically be an ac signal such as a square wave or sine wave, is applied directly between the common connections 903A and 903B. A symmetrical diffraction effect is produced. Capacitance is reduced. Advantageously cost and complexity may be reduced, and light transmission increased and power consumption reduced.

In comparison to FIGS. 41A-B, in the alternative embodiments of FIGS. 41C-D a further control electrode 902C is provided. The further control electrode 902C, in conjunction with the reference electrode 902D provides for a mode in which a uniform field perpendicular to the plane of the of the layer 914 of liquid crystal material 915 may be applied. In this case the potential $V_{BC}$ and $V_{AC}$ may be set to zero volts. In a further mode $V_{CD}$ may also be set to zero. In these modes the structure may operate like a polar control retarder, as described elsewhere herein. In another mode, when $V_{AC}$ and $V_{BC}$ are set to the same non-zero potential then an electric field pattern that produces a periodic phase pattern in the liquid crystal layer 914 is produced.

The structure may also be operated with $V_{AC}$ and $V_{BC}$ set to different voltages such as $V_{BC}$ is the negative waveform to that for $V_{AC}$. Different distributions of diffraction orders may be produced. Advantageously the visibility of the wide-angle mode in the direction 447 may be adjusted by the control system 500.

FIG. 41D illustrates a case where the additional polar control retarder operation modes are not provided within the diffractive diffuser, and reference electrode 902D is omitted. In the diffractive diffuser mode, the voltages $V_{BC}$ and $V_{AC}$ would be provided as described with reference to FIG. 41C.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A polar angle control display device comprising:
a spatial light modulator arranged to output light;
an in-plane polariser having an absorption axis in a plane of the in-plane polariser arranged on a side of the spatial light modulator; and
an out-of-plane polariser having an absorption axis in a direction having a component out of a plane of the out-of-plane polariser arranged on the same side of the spatial light modulator as the in-plane polariser.

2. A polar angle control display device according to claim 1, further comprising a polarisation switch provided between the in-plane polariser and the out-of-plane polariser, the polarisation switch being switchable between a first mode in which it is arranged to change a polarisation state of the light passing therethrough and a second mode in which it is arranged to affect the polarisation state of the light passing therethrough differently from the first mode.

3. A polar angle control display device according to claim 2, wherein, in the first mode, the polarisation switch is arranged to change the polarisation state of the light passing therethrough from a first linear polarisation state to a second linear polarisation state that is orthogonal to the first linear polarisation state.

4. A polar angle control display device according to claim 2, wherein, in the second mode, the polarisation switch is arranged not to change the polarisation state of the light passing therethrough.

5. A polar angle control display device according to claim 2, wherein the polarisation switch comprises a switchable layer of liquid crystal material and at least one electrode arranged to switch the state of the liquid crystal material.

6. A polar angle control display device according to claim 5, wherein the polarisation switch further comprises two surface alignment layers disposed adjacent to the switchable layer of liquid crystal material on opposite sides thereof and each arranged to provide alignment in the adjacent liquid crystal material.

7. A polar angle control display device according to claim 6, wherein one or both of the surface alignment layers is arranged to provide homogeneous alignment in the adjacent liquid crystal material.

8. A polar angle control display device according to claim 6, wherein one or both of the surface alignment layers is arranged to provide homeotropic alignment in the adjacent liquid crystal material.

9. A polar angle control display device according to claim 6, wherein one of the surface alignment layers is arranged to provide homogeneous alignment in the adjacent liquid crystal material and the other of the surface alignment layers is arranged to provide homeotropic alignment in the adjacent liquid crystal material.

10. A polar angle control display device according to claim 6, wherein each of the surface alignment layers has a pretilt having a pretilt direction with a component in the plane of the switchable layer of liquid crystal material that is parallel or anti-parallel or orthogonal to the electric vector transmission direction of the in-plane polariser.

11. A polar angle control display device according to claim 6, wherein each alignment layer has a pretilt having a pretilt direction with a component in the plane of the switchable layer of liquid crystal material and the components are orthogonal.

12. A polar angle control display device according to claim 5, wherein the polarisation switch further comprises at least one passive retarder.

13. A polar angle control display device according to claim 1, further comprising a biaxial retarder arrangement arranged between the out-of-plane polariser and the in-plane polariser.

14. A polar angle control display device according to claim 13, wherein the biaxial retarder arrangement comprises a B-plate.

15. A polar angle control display device according to claim 14, wherein the B-plate has principal components of refractive index nx, ny, nz and a thickness d, and
wherein for light at a wavelength of 550 nm:
the value of (nx−ny) d is in a range between −130 nm and −170 nm,
the value of (nx−nz) d is in a range between +270 nm and +330 nm, and
the value of a parameter Rth is in a range between +340 nm and +400 nm,
wherein Rth=(nx+ny)/2−nz)d.

16. A polar angle control display device according to claim 13, wherein the biaxial retarder arrangement comprises a C-plate arranged to receive the light output from an A-plate.

17. A polar angle control display device according to claim 16, wherein for light at a wavelength of 550 nm:
the A-plate has a retardance in a range between +85 nm and +115 nm, and
either:
the C-plate is a negative C-plate with a retardance in a range between −190 nm and −250 nm, or
the C-plate is a positive C-plate with a retardance in a range between +220 nm and +280 nm.

18. A polar angle control display device according to claim 1, wherein the direction of the absorption axis of the out-of-plane polariser is normal to the plane of the out-of-plane polariser.

19. A polar angle control display device according to claim 1, wherein the direction of the absorption axis of the out-of-plane polariser is inclined at an acute angle to the normal orthogonal to the plane of the out-of-plane polariser.

20. A polar angle control display device according to claim 1, wherein the direction of the absorption axis of the out-of-plane polariser changes monotonically along a predetermined axis across the polar angle control display device.

21. A polar angle control display device according to claim 1, wherein the polar angle control display device is curved with a concave curvature as viewed from an output side of the polar angle control display device.

22. A polar angle control display device according to claim 1, wherein said side of the spatial light modulator is an output side of the spatial light modulator and the spatial light modulator comprises an output polariser.

23. A polar angle control display device according to claim 22, wherein the output polariser is the in-plane polariser.

24. A polar angle control display device according to claim 22, wherein the in-plane polariser is a different component from the output polariser.

25. A polar angle control display device according to claim 22, further comprising:
an additional polariser arranged on the output side of the output polariser; and
at least one polar control retarder arranged between the output polariser and the additional polariser.

26. A polar angle control display device according to claim 25, wherein the additional polariser is the in-plane polariser.

27. A polar angle control display device according to claim 25, further comprising a reflective polariser arranged on the output side of the output polariser, wherein the reflective polariser is the in-plane polariser.

28. A polar angle control display device according to claim 1, wherein said side of the spatial light modulator is an input side of the spatial light modulator and the spatial light modulator comprises an input polariser.

29. A polar angle control display device according to claim 22, wherein the in-plane polariser is an input polariser.

30. A polar angle control display device according to claim 22, further comprising an input polariser, wherein the in-plane polariser is a different component from the input polariser.

31. A polar angle control display device according to claim 28, further comprising:
an additional polariser arranged on the input side of the input polariser; and
at least one polar control retarder arranged between the input polariser and the additional polariser.

32. A polar angle control display device according to claim 31, wherein the additional polariser is the in-plane polariser.

33. A polar angle control display device according to claim 1, wherein the spatial light modulator is a transmissive spatial light modulator.

34. A polar angle control display device according to claim 1, wherein the spatial light modulator is an emissive spatial light modulator and said side of the spatial light modulator is an output side of the spatial light modulator.

35. A polar angle control display device according to claim 1, further comprising:
at least one polar control retarder arranged between the in-plane polariser and the out-of-plane polariser, the at least one polar control retarder including a switchable liquid crystal retarder comprising a layer of liquid crystal material; and
a transmissive electrode arrangement arranged to drive the layer of liquid crystal material, wherein the transmissive electrode arrangement is patterned to be capable of driving the layer of liquid crystal material into a structure of orientations providing relative phase shifts that vary spatially across an area of the layer of liquid crystal material so that the layer of liquid crystal material provides a diffractive effect.

36. A polar angle control display device according to claim 35, wherein the transmissive electrode arrangement is also capable of driving the layer of liquid crystal material into a structure of orientations providing uniform phase shifts across the area of the layer of liquid crystal material so that the layer of liquid crystal material provides no diffractive effect.

37. A polar angle control display device according to claim 35, wherein the transmissive electrode arrangement comprises an array of separated electrodes.

38. A polar angle control display device according to claim 37, wherein the array of separated electrodes is arrayed in one direction and the separated electrodes extend across the area of the layer of liquid crystal material in the direction orthogonal to the one direction.

39. A polar angle control display device according to claim 37, wherein the array of separated electrodes comprises two interdigitated sets of separated electrodes.

40. A polar angle control display device according to claim 37, wherein the transmissive electrode arrangement further comprises a control electrode extending across the entirety of the spatial light modulator, the control electrode being arranged on the same side of the layer of liquid crystal material as the array of separated electrodes, outside the array of separated electrodes.

41. A polar angle control display device according to claim 37, wherein the transmissive electrode arrangement further comprises a reference electrode extending across the entirety of the spatial light modulator, the reference electrode being arranged on the opposite side of the layer of liquid crystal material from the array of separated electrodes.

42. A polar angle control display device according to claim 35, further comprising a control system arranged to supply voltages to the transmissive electrode arrangement for driving the layer of liquid crystal material.

43. A polar angle control display device according to claim 42, wherein the control system is arranged:
in a narrow-angle mode, to supply voltages to the transmissive electrode arrangement that are selected to drive the layer of liquid crystal material into a structure of orientations providing relative phase shifts that are uniform across the area of the layer of liquid crystal material; and
in a wide-angle mode, to supply voltages to the transmissive electrode arrangement that are selected to drive the layer of liquid crystal material into the structure of orientations providing relative phase shifts that vary spatially across the area of the layer of liquid crystal material so that the layer of liquid crystal material provides a diffractive effect.

44. A polar angle control display device according to claim 35, wherein the switchable liquid crystal retarder comprises two surface alignment layers disposed adjacent to the layer of liquid crystal material and on opposite sides thereof.

45. A polar angle control display device according to claim 38, wherein the switchable liquid crystal retarder comprises two surface alignment layers disposed adjacent to the layer of liquid crystal material and on opposite sides thereof, and the alignment layer on the side of the layer of liquid crystal material adjacent the array of separated electrodes has a component of alignment in the plane of the layer of liquid crystal material in the direction that is orthogonal to the one direction.

46. A polar angle control component for assembly with a display device comprising a spatial light modulator, the polar angle control component comprising an out-of-plane polariser having an absorption axis in a direction having a component out of the plane of the out-of-plane polariser.

47. A polar angle control component according to claim 46, wherein the polar angle control component further comprises a polarisation switch, the polarisation switch being switchable between a first mode in which it is arranged to change a polarisation state of the light passing therethrough and a second mode in which it is arranged to affect the polarisation state of the light passing therethrough differently from the first mode.

48. A polar angle control component according to claim 47, wherein the polar angle control component further comprises an in-plane polariser having an absorption axis in a plane of the in-plane polariser, the polarisation switch being provided between the in-plane polariser and the out-of-plane polariser.

49. A polar angle control component according to claim 46, wherein the polar angle control component further comprises an in-plane polariser having an absorption axis in a plane of the in-plane polariser.

* * * * *